(12) United States Patent
Cella et al.

(10) Patent No.: US 11,106,188 B2
(45) Date of Patent: Aug. 31, 2021

(54) METHODS AND SYSTEMS FOR THE INDUSTRIAL INTERNET OF THINGS

(71) Applicant: Strong Force IOT Portfolio 2016, LLC, Santa Monica, CA (US)

(72) Inventors: Charles Howard Cella, Pembroke, MA (US); Gerald William Duffy, Jr., Philadelphia, PA (US); Jeffrey P. McGuckin, Philadelphia, PA (US)

(73) Assignee: Strong Force IOT Portfolio 2016, LLC, Fort Lauderdale, FL (US)

( * ) Notice: Subject to any disclaimer, the term of this patent is extended or adjusted under 35 U.S.C. 154(b) by 0 days.

(21) Appl. No.: 16/382,400

(22) Filed: Apr. 12, 2019

(65) Prior Publication Data

US 2019/0235462 A1 Aug. 1, 2019

Related U.S. Application Data

(63) Continuation of application No. 15/859,294, filed on Dec. 29, 2017, now Pat. No. 10,416,634, which is a
(Continued)

(51) Int. Cl.
*G05B 19/048* (2006.01)
*G05B 19/418* (2006.01)
(Continued)

(52) U.S. Cl.
CPC ........... *G05B 19/0425* (2013.01); *G01H 1/00* (2013.01); *G05B 11/32* (2013.01);
(Continued)

(58) Field of Classification Search
CPC .......................... G05B 11/32; G05B 23/0283; G05B 19/0423; G05B 19/0425; G05B 19/4185;
(Continued)

(56) References Cited

U.S. PATENT DOCUMENTS 4,074,142 A 2/1978 Jackson
4,605,928 A 8/1986 Georgiou
(Continued)

FOREIGN PATENT DOCUMENTS

CN 101694577 A 4/2010
CN 202583862 U 12/2012
(Continued)

OTHER PUBLICATIONS

International Search Report and Written Opinion dated Jun. 12, 2017 for PCT International Application No. PCT/US2017/016113, 10 pages.
(Continued)

*Primary Examiner* — Mark A Connolly
(74) *Attorney, Agent, or Firm* — RMCK Law Group, PLC

(57) ABSTRACT

The system generally includes a crosspoint switch in the local data collection system having multiple inputs and multiple outputs including a first input connected to the first sensor and a second input connected to the second sensor. The multiple outputs include a first output and a second output configured to be switchable between a condition in which the first output is configured to switch between delivery of the first sensor signal and the second sensor signal and a condition in which there is simultaneous delivery of the first sensor signal from the first output and the second sensor signal from the second output. Each of multiple inputs is configured to be individually assigned to any of the multiple outputs. Unassigned outputs are configured to be switched off producing a high-impedance state. The local data collection system includes multiple data acquisition units each having an onboard card set configured to store calibration information and maintenance history of a data acquisition unit in which the onboard card set is
(Continued)

located. The local data collection system is configured to manage data collection bands.

30 Claims, 17 Drawing Sheets

Related U.S. Application Data continuation of application No. PCT/US2017/031721, filed on May 9, 2017.

(60) Provisional application No. 62/427,141, filed on Nov. 28, 2016, provisional application No. 62/412,843, filed on Oct. 26, 2016, provisional application No. 62/350,672, filed on Jun. 15, 2016, provisional application No. 62/333,589, filed on May 9, 2016.

(51) Int. Cl.

| | |
|---|---|
| *G05B 23/02* | (2006.01) |
| *G05B 19/042* | (2006.01) |
| *G06N 20/00* | (2019.01) |
| *H04L 29/08* | (2006.01) |
| *G06N 5/04* | (2006.01) |
| *H04W 4/38* | (2018.01) |
| *G05B 11/32* | (2006.01) |
| *H04W 84/18* | (2009.01) |
| *G06F 3/0488* | (2013.01) |
| *G06N 3/02* | (2006.01) |
| *G01H 1/00* | (2006.01) |
| *G06N 3/04* | (2006.01) |
| *G06N 3/08* | (2006.01) |
| *H04Q 9/00* | (2006.01) |
| *H04W 84/20* | (2009.01) |
| *G01M 13/028* | (2019.01) |
| *G01M 13/045* | (2019.01) |

(52) U.S. Cl.
CPC ....... *G05B 19/0423* (2013.01); *G05B 19/418* (2013.01); *G05B 19/4183* (2013.01); *G05B 19/4185* (2013.01); *G05B 23/0283* (2013.01); *G06F 3/0488* (2013.01); *G06N 3/02* (2013.01); *G06N 3/0427* (2013.01); *G06N 3/08* (2013.01); *G06N 5/047* (2013.01); *G06N 20/00* (2019.01); *H04L 67/10* (2013.01); *H04L 67/12* (2013.01); *H04L 67/125* (2013.01); *H04Q 9/00* (2013.01); *H04W 4/38* (2018.02); *H04W 84/18* (2013.01); *G01M 13/028* (2013.01); *G01M 13/045* (2013.01); *G05B 19/042* (2013.01); *G05B 23/0221* (2013.01); *G05B 23/0272* (2013.01); *G05B 2219/23253* (2013.01); *G05B 2219/23258* (2013.01); *G05B 2219/24015* (2013.01); *G05B 2219/25174* (2013.01); *G05B 2219/25255* (2013.01); *G05B 2219/25268* (2013.01); *G05B 2219/31156* (2013.01); *G05B 2219/31282* (2013.01); *G05B 2219/33333* (2013.01); *H04Q 2209/20* (2013.01); *H04Q 2209/40* (2013.01); *H04W 84/20* (2013.01); *Y02P 80/10* (2015.11); *Y02P 90/02* (2015.11)

(58) Field of Classification Search
CPC .. H04W 4/38; G06N 3/02; G06N 3/08; G06N 20/00; H04Q 9/00; H04L 67/125
See application file for complete search history.

(56) References Cited

U.S. PATENT DOCUMENTS

| | | |
|---|---|---|
| 4,620,304 A | 10/1986 | Faran, Jr. et al. |
| 4,740,736 A | 4/1988 | Sidman et al. |
| 4,852,083 A | 7/1989 | Niehaus et al. |
| 5,072,366 A | 12/1991 | Simcoe |
| 5,123,011 A | 6/1992 | Hein et al. |
| 5,157,629 A | 10/1992 | Sato et al. |
| 5,166,926 A | 11/1992 | Cisneros et al. |
| 5,469,150 A | 11/1995 | Sitte |
| 5,541,914 A | 7/1996 | Krishnamoorthy et al. |
| 5,568,356 A | 10/1996 | Schwartz |
| 5,629,870 A | 5/1997 | Farag et al. |
| 5,650,951 A | 7/1997 | Staver |
| 5,842,034 A | 11/1998 | Bolstad et al. |
| 5,854,994 A | 12/1998 | Canada et al. |
| 5,874,790 A | 2/1999 | Macks |
| 5,982,776 A | 11/1999 | Manning et al. |
| 6,108,616 A | 8/2000 | Borchers et al. |
| 6,141,355 A | 10/2000 | Palmer et al. |
| 6,184,713 B1 | 2/2001 | Agrawal et al. |
| 6,421,341 B1 | 7/2002 | Han et al. |
| 6,484,109 B1 | 11/2002 | Lofall |
| 6,554,978 B1 | 4/2003 | Vandenborre |
| 6,581,048 B1 | 6/2003 | Werbos |
| 6,633,782 B1 | 10/2003 | Schleiss et al. |
| 6,650,142 B1 | 11/2003 | Agrawal et al. |
| 6,678,268 B1 | 1/2004 | Francis et al. |
| 6,703,860 B1 | 3/2004 | Agrawal et al. |
| 6,737,958 B1 | 5/2004 | Satyanarayana |
| 6,789,030 B1 | 9/2004 | Coyle et al. |
| 6,856,600 B1 | 2/2005 | Russell et al. |
| 6,970,758 B1 | 11/2005 | Shi et al. |
| 6,982,974 B1 | 1/2006 | Saleh et al. |
| 7,027,981 B2 | 4/2006 | Bizjak |
| 7,043,728 B1 | 5/2006 | Galpin |
| 7,135,888 B1 | 11/2006 | Hutton et al. |
| 7,142,990 B2 | 11/2006 | Bouse et al. |
| 7,225,037 B2 | 5/2007 | Shani |
| 7,710,153 B1 | 5/2010 | Masleid et al. |
| 8,057,646 B2 | 11/2011 | Hinatsu et al. |
| 8,060,017 B2 | 11/2011 | Schlicht et al. |
| 8,102,188 B1 | 1/2012 | Chan et al. |
| 8,200,775 B2 | 6/2012 | Moore |
| 8,352,149 B2 | 1/2013 | Meacham |
| 8,381,053 B1 | 2/2013 | Joshi |
| 8,571,904 B2 | 10/2013 | Guru et al. |
| 8,615,374 B1 | 12/2013 | Discenzo |
| 8,766,925 B2 | 7/2014 | Perlin et al. |
| 8,799,800 B2 | 8/2014 | Hood et al. |
| 8,902,936 B2 | 12/2014 | Stephanson |
| 8,924,033 B2 | 12/2014 | Goutard et al. |
| 8,977,578 B1 | 3/2015 | Cruz-Albrecht et al. |
| 9,092,593 B2 | 7/2015 | Nasle |
| 9,225,783 B2 | 12/2015 | Stephanson |
| 9,314,190 B1 | 4/2016 | Giuffrida et al. |
| 9,432,298 B1 | 8/2016 | Smith |
| 9,435,684 B2 | 9/2016 | Baldwin |
| 9,619,999 B2 | 4/2017 | Stephanson |
| 9,621,173 B1 | 4/2017 | Xiu |
| 9,721,210 B1 | 8/2017 | Brown |
| 9,824,311 B1 | 11/2017 | Cruz-Albrecht et al. |
| 9,846,752 B2 | 12/2017 | Nasle |
| 9,912,595 B1 | 3/2018 | Ramasamy |
| 9,916,702 B2 | 3/2018 | Rudenko et al. |
| 9,929,979 B2 | 3/2018 | Germain |
| 9,976,986 B2 | 5/2018 | Wayman et al. |
| 10,409,245 B2 * | 9/2019 | Cella .................... G05B 19/418 |
| 10,409,246 B2 * | 9/2019 | Cella .................... H04L 67/125 |
| 10,416,634 B2 * | 9/2019 | Cella .................... H04L 67/125 |
| 10,437,218 B2 * | 10/2019 | Cella .................... G05B 19/4185 |
| 10,551,811 B2 * | 2/2020 | Cella ........................ G06N 3/02 |
| 10,551,812 B2 * | 2/2020 | Cella .................... G05B 19/4183 |
| 10,627,795 B2 * | 4/2020 | Cella ........................ G06N 3/02 |
| 10,739,743 B2 * | 8/2020 | Cella .................... G05B 23/0283 |
| 2001/0015918 A1 | 8/2001 | Bhatnagar |
| 2002/0004694 A1 | 1/2002 | Mcleod et al. |

(56) References Cited

U.S. PATENT DOCUMENTS

| | | |
|---|---|---|
| 2002/0016856 A1 | 2/2002 | Tallegas et al. |
| 2002/0084815 A1 | 7/2002 | Murphy et al. |
| 2002/0114984 A1 | 8/2002 | Edlund et al. |
| 2002/0152037 A1 | 10/2002 | Sunshine et al. |
| 2002/0174708 A1 | 11/2002 | Mattes |
| 2002/0177878 A1 | 11/2002 | Poore et al. |
| 2002/0181799 A1 | 12/2002 | Matsugu et al. |
| 2003/0054960 A1 | 3/2003 | Bedard |
| 2003/0069648 A1 | 4/2003 | Douglas et al. |
| 2003/0094992 A1 | 5/2003 | Geysen |
| 2003/0137648 A1 | 7/2003 | Voorhis et al. |
| 2004/0019461 A1 | 1/2004 | Bouse et al. |
| 2004/0093516 A1 | 5/2004 | Hornbeek et al. |
| 2004/0109065 A1 | 6/2004 | Tokunaga |
| 2004/0205097 A1 | 10/2004 | Toumazou et al. |
| 2005/0007249 A1 | 1/2005 | Eryurek et al. |
| 2005/0011266 A1 | 1/2005 | Robinson et al. |
| 2005/0100172 A1 | 5/2005 | Schliep et al. |
| 2005/0162258 A1 | 7/2005 | King |
| 2005/0165581 A1 | 7/2005 | Roba et al. |
| 2006/0006997 A1 | 1/2006 | Rose-Pehrsson et al. |
| 2006/0010230 A1 | 1/2006 | Karklins et al. |
| 2006/0028993 A1 | 2/2006 | Yang et al. |
| 2006/0034569 A1 | 2/2006 | Shih et al. |
| 2006/0069689 A1 | 3/2006 | Karklins et al. |
| 2006/0150738 A1 | 7/2006 | Leigh |
| 2006/0155900 A1 | 7/2006 | Sagues et al. |
| 2006/0241907 A1 | 10/2006 | Armstrong et al. |
| 2006/0271617 A1 | 11/2006 | Hughes et al. |
| 2007/0025382 A1 | 2/2007 | Jones et al. |
| 2007/0041338 A1 | 2/2007 | Rowe |
| 2007/0047444 A1 | 3/2007 | Leroy et al. |
| 2007/0078802 A1 | 4/2007 | Bestgen et al. |
| 2007/0111661 A1 | 5/2007 | Bargroff et al. |
| 2007/0270671 A1 | 11/2007 | Gal |
| 2008/0033695 A1 | 2/2008 | Sahara et al. |
| 2008/0065290 A1 | 3/2008 | Breed et al. |
| 2008/0079029 A1 | 4/2008 | Williams |
| 2008/0112140 A1 | 5/2008 | Wong |
| 2008/0162302 A1 | 7/2008 | Sundaresan et al. |
| 2008/0170853 A1 | 7/2008 | Rakib et al. |
| 2008/0278197 A1 | 11/2008 | Murotake |
| 2008/0319279 A1 | 12/2008 | Ramsay et al. |
| 2009/0003599 A1 | 1/2009 | Hart et al. |
| 2009/0055126 A1 | 2/2009 | Yanovich et al. |
| 2009/0061775 A1 | 3/2009 | Warren et al. |
| 2009/0063739 A1 | 3/2009 | Weddle |
| 2009/0066505 A1 | 3/2009 | Jensen et al. |
| 2009/0083019 A1 | 3/2009 | Nasle |
| 2009/0135761 A1 | 5/2009 | Khandekar et al. |
| 2009/0204232 A1 | 8/2009 | Guru et al. |
| 2009/0243732 A1 | 10/2009 | Tarng et al. |
| 2009/0256817 A1 | 10/2009 | Perlin et al. |
| 2009/0303197 A1 | 12/2009 | Bonczek et al. |
| 2010/0060296 A1 | 3/2010 | Jiang et al. |
| 2010/0156632 A1 | 6/2010 | Hyland et al. |
| 2010/0161283 A1 | 6/2010 | Qing et al. |
| 2010/0216523 A1 | 8/2010 | Sebastiano et al. |
| 2010/0241601 A1 | 9/2010 | Carson et al. |
| 2010/0249976 A1 | 9/2010 | Aharoni et al. |
| 2010/0262401 A1 | 10/2010 | Pfeifer et al. |
| 2011/0071794 A1 | 3/2011 | Bronczyk et al. |
| 2011/0071963 A1 | 3/2011 | Piovesan et al. |
| 2011/0277010 A1 | 11/2011 | Paul |
| 2011/0282508 A1 | 11/2011 | Goutard et al. |
| 2012/0013497 A1 | 1/2012 | Katsuki et al. |
| 2012/0025526 A1 | 2/2012 | Luo et al. |
| 2012/0111978 A1 | 5/2012 | Murphy et al. |
| 2012/0219089 A1 | 8/2012 | Murakami et al. |
| 2012/0246055 A1 | 9/2012 | Schlifstein et al. |
| 2012/0254803 A1 | 10/2012 | Grist et al. |
| 2012/0265359 A1 | 10/2012 | Das et al. |
| 2012/0323741 A1 | 12/2012 | Rangachari et al. |
| 2013/0060524 A1 | 3/2013 | Liao |
| 2013/0115535 A1 | 5/2013 | Delfino |
| 2013/0163619 A1 | 6/2013 | Stephanson |
| 2013/0211559 A1 | 8/2013 | Lawson et al. |
| 2013/0218451 A1 | 8/2013 | Yamada |
| 2013/0243963 A1 | 9/2013 | Rina |
| 2013/0245795 A1 | 9/2013 | McGreevy et al. |
| 2013/0346628 A1 | 12/2013 | Canion et al. |
| 2013/0346667 A1 | 12/2013 | Stroud et al. |
| 2014/0067289 A1 | 3/2014 | Baldwin |
| 2014/0074433 A1 | 3/2014 | Crepet |
| 2014/0120972 A1 | 5/2014 | Hartman |
| 2014/0161135 A1 | 6/2014 | Acharya et al. |
| 2014/0176203 A1 | 6/2014 | Matheny et al. |
| 2014/0198615 A1 | 7/2014 | Ray |
| 2014/0271449 A1 | 9/2014 | McAlister |
| 2014/0288876 A1 | 9/2014 | Donaldson |
| 2014/0314099 A1 | 10/2014 | Dress |
| 2014/0324389 A1 | 10/2014 | Baldwin et al. |
| 2015/0055633 A1 | 2/2015 | Wu |
| 2015/0059442 A1 | 3/2015 | Liljenberg et al. |
| 2015/0080044 A1 | 3/2015 | McHenry et al. |
| 2015/0142384 A1 | 5/2015 | Chao et al. |
| 2015/0271106 A1 | 9/2015 | Walker et al. |
| 2015/0277399 A1 | 10/2015 | Maturana et al. |
| 2015/0278839 A1 | 10/2015 | Hansen |
| 2015/0288257 A1 | 10/2015 | Cooper et al. |
| 2015/0302664 A1 | 10/2015 | Miller |
| 2015/0330950 A1 | 11/2015 | Bechhoefer |
| 2015/0354607 A1 | 12/2015 | Avni |
| 2016/0007102 A1 | 1/2016 | Raza et al. |
| 2016/0011692 A1 | 1/2016 | Heim et al. |
| 2016/0026729 A1 | 1/2016 | Gil et al. |
| 2016/0048399 A1 | 2/2016 | Shaw |
| 2016/0054284 A1 | 2/2016 | Washburn |
| 2016/0098647 A1 | 4/2016 | Nixon et al. |
| 2016/0104330 A1 | 4/2016 | Rudenko et al. |
| 2016/0153806 A1 | 6/2016 | Ciasulli et al. |
| 2016/0163186 A1 | 6/2016 | Davidson et al. |
| 2016/0171846 A1 | 6/2016 | Brav et al. |
| 2016/0196375 A1 | 7/2016 | Nasle |
| 2016/0209831 A1 | 7/2016 | Pal |
| 2016/0219024 A1 | 7/2016 | Verzun et al. |
| 2016/0245686 A1 | 8/2016 | Pal et al. |
| 2016/0301991 A1 | 10/2016 | Loychik et al. |
| 2016/0378086 A1 | 12/2016 | Plymill et al. |
| 2017/0006135 A1 | 1/2017 | Siebel et al. |
| 2017/0012861 A1 | 1/2017 | Blumenthal et al. |
| 2017/0030349 A1 | 2/2017 | Bassett et al. |
| 2017/0046458 A1 | 2/2017 | Meagher et al. |
| 2017/0074715 A1 | 3/2017 | Bartos et al. |
| 2017/0075552 A1 | 3/2017 | Berenbaum et al. |
| 2017/0130700 A1 | 5/2017 | Sakaguchi et al. |
| 2017/0149605 A1 | 5/2017 | Strasser |
| 2017/0173458 A1 | 6/2017 | Billington et al. |
| 2017/0205451 A1 | 7/2017 | Moinuddin |
| 2017/0222999 A1 | 8/2017 | Banga et al. |
| 2017/0238072 A1 | 8/2017 | Mackie et al. |
| 2018/0052428 A1 | 2/2018 | Abramov |
| 2018/0188714 A1 | 7/2018 | Cella et al. |
| 2019/0056107 A1 | 2/2019 | Desai et al. |

FOREIGN PATENT DOCUMENTS

| | | |
|---|---|---|
| CN | 103220552 A | 7/2013 |
| EP | 2983056 A1 | 2/2016 |
| JP | S5913084 B2 | 3/1984 |
| JP | 2014203274 A | 10/2014 |
| WO | 9412917 A1 | 6/1994 |
| WO | 2010138831 A2 | 12/2010 |
| WO | 2016068929 A1 | 5/2016 |
| WO | 2016137848 A1 | 9/2016 |
| WO | 2019028269 A2 | 2/2019 |

OTHER PUBLICATIONS

International Search Report and Written Opinion for International Application No. PCT/US2017/031721 dated Sep. 11, 2017, 23 pages.

(56) References Cited

OTHER PUBLICATIONS

PCT International Search Report and Written Opinion dated Mar. 21, 2019 for International Application No. PCT/US2018/045036, 187 pages.
Reinhardt, A., "Designing sensor networks for smart spaces, Unified Interfacing and Energy-Efficient Communication Between Wireless Sensor and Actuator Nodes," Vom Fachbereich Elektrotechnik und Informationstechnik der Technischen Universitat Darmstadt, 2011, 165 pages.
PCT International Search Report and Written Opinion dated Apr. 2, 2019 for International Application No. PCT/US2018/060043, 29 pages.
Extended European Search Report dated Apr. 14, 2020 for EP Application No. 17796676.9, 10 pages.

\* cited by examiner

METHODS AND SYSTEMS FOR THE INDUSTRIAL INTERNET OF THINGS

CROSS-REFERENCE TO RELATED APPLICATIONS

This application is a continuation of U.S. application Ser. No. 15/859,294, filed on 29 Dec. 2017, which is a bypass continuation of International Pat. App. No. PCT/US2017/031721, filed on 9 May 2017 and published on 16 Nov. 2017 as WO/2017/196821, which claims priority to U.S. Provisional Pat. App. No. 62/333,589, filed 9 May 2016, entitled Strong Force Industrial IoT Matrix; U.S. Provisional Pat. App. No. 62/350,672, filed 15 Jun. 2016, entitled Strategy for High Sampling Rate Digital Recording of Measurement Waveform Data as Part of an Automated Sequential List that Streams Long-Duration and Gap-Free Waveform Data to Storage for more flexible Post-Processing; U.S. Provisional Pat. App. No. 62/412,843, filed 26 Oct. 2016, entitled Methods and Systems for the Industrial Internet of Things; and U.S. Provisional Pat. App. No. 62/427,141, filed 28 Nov. 2016, entitled Methods and Systems for the Industrial Internet of Things. All of the above applications are hereby incorporated by reference as if fully set forth herein.

BACKGROUND

1. Field

The present disclosure relates to methods and systems for data collection in industrial environments, as well as methods and systems for leveraging collected data for monitoring, remote control, autonomous action, and other activities in industrial environments.

2. Description of the Related Art

Heavy industrial environments, such as environments for large scale manufacturing (such as of aircraft, ships, trucks, automobiles, and large industrial machines), energy production environments (such as oil and gas plants, renewable energy environments, and others), energy extraction environments (such as mining, drilling, and the like), construction environments (such as for construction of large buildings), and others, involve highly complex machines, devices and systems and highly complex workflows, in which operators must account for a host of parameters, metrics, and the like in order to optimize design, development, deployment, and operation of different technologies in order to improve overall results. Historically, data has been collected in heavy industrial environments by human beings using dedicated data collectors, often recording batches of specific sensor data on media, such as tape or a hard drive, for later analysis. Batches of data have historically been returned to a central office for analysis, such as by undertaking signal processing or other analysis on the data collected by various sensors, after which analysis can be used as a basis for diagnosing problems in an environment and/or suggesting ways to improve operations. This work has historically taken place on a time scale of weeks or months, and has been directed to limited data sets.

The emergence of the Internet of Things (IoT) has made it possible to connect continuously to and among a much wider range of devices. Most such devices are consumer devices, such as lights, thermostats, and the like. More complex industrial environments remain more difficult, as the range of available data is often limited, and the complexity of dealing with data from multiple sensors makes it much more difficult to produce "smart" solutions that are effective for the industrial sector. A need exists for improved methods and systems for data collection in industrial environments, as well as for improved methods and systems for using collected data to provide improved monitoring, control, and intelligent diagnosis of problems and intelligent optimization of operations in various heavy industrial environments.

SUMMARY

Methods and systems are provided herein for data collection in industrial environments, as well as for improved methods and systems for using collected data to provide improved monitoring, control, and intelligent diagnosis of problems and intelligent optimization of operations in various heavy industrial environments. These methods and systems include methods, systems, components, devices, workflows, services, processes, and the like that are deployed in various configurations and locations, such as: (a) at the "edge" of the Internet of Things, such as in the local environment of a heavy industrial machine; (b) in data transport networks that move data between local environments of heavy industrial machines and other environments, such as of other machines or of remote controllers, such as enterprises that own or operate the machines or the facilities in which the machines are operated; and (c) in locations where facilities are deployed to control machines or their environments, such as cloud-computing environments and on-premises computing environments of enterprises that own or control heavy industrial environments or the machines, devices or systems deployed in them. These methods and systems include a range of ways for providing improved data include a range of methods and systems for providing improved data collection, as well as methods and systems for deploying increased intelligence at the edge, in the network, and in the cloud or premises of the controller of an industrial environment.

Methods and systems are disclosed herein for continuous ultrasonic monitoring, including providing continuous ultrasonic monitoring of rotating elements and bearings of an energy production facility.

Methods and systems are disclosed herein for cloud-based, machine pattern recognition based on fusion of remote, analog industrial sensors.

Methods and systems are disclosed herein for cloud-based, machine pattern analysis of state information from multiple analog industrial sensors to provide anticipated state information for an industrial system.

Methods and systems are disclosed herein for on-device sensor fusion and data storage for industrial IoT devices, including on-device sensor fusion and data storage for an Industrial IoT device, where data from multiple sensors is multiplexed at the device for storage of a fused data stream.

Methods and systems are disclosed herein for a self-organizing data marketplace for industrial IoT data, including a self-organizing data marketplace for industrial IoT data, where available data elements are organized in the marketplace for consumption by consumers based on training a self-organizing facility with a training set and feedback from measures of marketplace success.

Methods and systems are disclosed herein for self-organizing data pools, including self-organization of data pools based on utilization and/or yield metrics, including utilization and/or yield metrics that are tracked for a plurality of data pools.

Methods and systems are disclosed herein for training artificial intelligence ("AI") models based on industry-specific feedback, including training an AI model based on industry-specific feedback that reflects a measure of utilization, yield, or impact, where the AI model operates on sensor data from an industrial environment.

Methods and systems are disclosed herein for a self-organized swarm of industrial data collectors, including a self-organizing swarm of industrial data collectors that organize among themselves to optimize data collection based on the capabilities and conditions of the members of the swarm.

Methods and systems are disclosed herein for an industrial IoT distributed ledger, including a distributed ledger supporting the tracking of transactions executed in an automated data marketplace for industrial IoT data.

Methods and systems are disclosed herein for a self-organizing collector, including a self-organizing, multi-sensor data collector that can optimize data collection, power and/or yield based on conditions in its environment.

Methods and systems are disclosed herein for a network-sensitive collector, including a network condition-sensitive, self-organizing, multi-sensor data collector that can optimize based on bandwidth, quality of service, pricing and/or other network conditions.

Methods and systems are disclosed herein for a remotely organized universal data collector that can power up and down sensor interfaces based on need and/or conditions identified in an industrial data collection environment.

Methods and systems are disclosed herein for a self-organizing storage for a multi-sensor data collector, including self-organizing storage for a multi-sensor data collector for industrial sensor data.

Methods and systems are disclosed herein for a self-organizing network coding for a multi-sensor data network, including self-organizing network coding for a data network that transports data from multiple sensors in an industrial data collection environment.

Methods and systems are disclosed herein for a haptic or multi-sensory user interface, including a wearable haptic or multi-sensory user interface for an industrial sensor data collector, with vibration, heat, electrical and/or sound outputs.

Methods and systems are disclosed herein for a presentation layer for augmented reality and virtual reality (AR/VR) industrial glasses, where heat map elements are presented based on patterns and/or parameters in collected data.

Methods and systems are disclosed herein for condition-sensitive, self-organized tuning of AR/VR interfaces based on feedback metrics and/or training in industrial environments.

In embodiments, a system for data collection, processing, and utilization of signals from at least a first element in a first machine in an industrial environment includes a platform including a computing environment connected to a local data collection system having at least a first sensor signal and a second sensor signal obtained from at least the first machine in the industrial environment. The system includes a first sensor in the local data collection system configured to be connected to the first machine and a second sensor in the local data collection system. The system further includes a crosspoint switch in the local data collection system having multiple inputs and multiple outputs including a first input connected to the first sensor and a second input connected to the second sensor. The multiple outputs include a first output and second output configured to be switchable between a condition in which the first output is configured to switch between delivery of the first sensor signal and the second sensor signal and a condition in which there is simultaneous delivery of the first sensor signal from the first output and the second sensor signal from the second output. Each of multiple inputs is configured to be individually assigned to any of the multiple outputs. Unassigned outputs are configured to be switched off producing a high-impedance state.

In embodiments, the first sensor signal and the second sensor signal are continuous vibration data about the industrial environment. In embodiments, the second sensor in the local data collection system is configured to be connected to the first machine. In embodiments, the second sensor in the local data collection system is configured to be connected to a second machine in the industrial environment. In embodiments, the computing environment of the platform is configured to compare relative phases of the first and second sensor signals. In embodiments, the first sensor is a single-axis sensor and the second sensor is a three-axis sensor. In embodiments, at least one of the multiple inputs of the crosspoint switch includes internet protocol, front-end signal conditioning, for improved signal-to-noise ratio. In embodiments, the crosspoint switch includes a third input that is configured with a continuously monitored alarm having a pre-determined trigger condition when the third input is unassigned to any of the multiple outputs.

In embodiments, the local data collection system includes multiple multiplexing units and multiple data acquisition units receiving multiple data streams from multiple machines in the industrial environment. In embodiments, the local data collection system includes distributed complex programmable hardware device ("CPLD") chips each dedicated to a data bus for logic control of the multiple multiplexing units and the multiple data acquisition units that receive the multiple data streams from the multiple machines in the industrial environment. In embodiments, the local data collection system is configured to provide high-amperage input capability using solid state relays. In embodiments, the local data collection system is configured to power-down at least one of an analog sensor channel and a component board.

In embodiments, the local data collection system includes an external voltage reference for an A/D zero reference that is independent of the voltage of the first sensor and the second sensor. In embodiments, the distributed CPLD chips each dedicated to the data bus for logic control of the multiple multiplexing units and the multiple data acquisition units includes as high-frequency crystal clock reference configured to be divided by at least one of the distributed CPLD chips for at least one delta-sigma analog-to-digital converter to achieve lower sampling rates without digital resampling.

In embodiments, the local data collection system is configured to obtain long blocks of data at a single relatively high-sampling rate as opposed to multiple sets of data taken at different sampling rates. In embodiments, the single relatively high-sampling rate corresponds to a maximum frequency of about forty kilohertz. In embodiments, the long blocks of data are for a duration that is in excess of one minute. In embodiments, the local data collection system includes multiple data acquisition units each having an onboard card set configured to store calibration information and maintenance history of a data acquisition unit in which the onboard card set is located. In embodiments, the local data collection system is configured to plan data acquisition routes based on hierarchical templates.

In embodiments, the local data collection system is configured to manage data collection bands. In embodiments, the data collection bands define a specific frequency band and at least one of a group of spectral peaks, a true-peak level, a crest factor derived from a time waveform, and an overall waveform derived from a vibration envelope. In embodiments, the local data collection system includes a neural net expert system using intelligent management of the data collection bands. In embodiments, the local data collection system is configured to create data acquisition routes based on hierarchical templates that each include the data collection bands related to machines associated with the data acquisition routes. In embodiments, at least one of the hierarchical templates is associated with multiple interconnected elements of the first machine. In embodiments, at least one of the hierarchical templates is associated with similar elements associated with at least the first machine and a second machine. In embodiments, at least one of the hierarchical templates is associated with at least the first machine being proximate in location to a second machine.

In embodiments, the local data collection system includes a graphical user interface ("GUI") system configured to manage the data collection bands. In embodiments, the GUI system includes an expert system diagnostic tool. In embodiments, the platform includes cloud-based, machine pattern analysis of state information from multiple sensors to provide anticipated state information for the industrial environment. In embodiments, the platform is configured to provide self-organization of data pools based on at least one of the utilization metrics and yield metrics. In embodiments, the platform includes a self-organized swarm of industrial data collectors. In embodiments, the local data collection system includes a wearable haptic user interface for an industrial sensor data collector with at least one of vibration, heat, electrical, and sound outputs.

In embodiments, multiple inputs of the crosspoint switch include a third input connected to the second sensor and a fourth input connected to the second sensor. The first sensor signal is from a single-axis sensor at an unchanging location associated with the first machine. In embodiments, the second sensor is a three-axis sensor. In embodiments, the local data collection system is configured to record gap-free digital waveform data simultaneously from at least the first input, the second input, the third input, and the fourth input. In embodiments, the platform is configured to determine a change in relative phase based on the simultaneously recorded gap-free digital waveform data. In embodiments, the second sensor is configured to be movable to a plurality of positions associated with the first machine while obtaining the simultaneously recorded gap-free digital waveform data. In embodiments, multiple outputs of the crosspoint switch include a third output and fourth output. The second, third, and fourth outputs are assigned together to a sequence of tri-axial sensors each located at different positions associated with the machine. In embodiments, the platform is configured to determine an operating deflection shape based on the change in relative phase and the simultaneously recorded gap-free digital waveform data.

In embodiments, the unchanging location is a position associated with the rotating shaft of the first machine. In embodiments, tri-axial sensors in the sequence of the tri-axial sensors are each located at different positions on the first machine but are each associated with different bearings in the machine. In embodiments, tri-axial sensors in the sequence of the tri-axial sensors are each located at similar positions associated with similar bearings but are each associated with different machines. In embodiments, the local data collection system is configured to obtain the simultaneously recorded gap-free digital waveform data from the first machine while the first machine and a second machine are both in operation. In embodiments, the local data collection system is configured to characterize a contribution from the first machine and the second machine in the simultaneously recorded gap-free digital waveform data from the first machine. In embodiments, the simultaneously recorded gap-free digital waveform data has a duration that is in excess of one minute.

In embodiments, a method of monitoring a machine having at least one shaft supported by a set of bearings includes monitoring a first data channel assigned to a single-axis sensor at an unchanging location associated with the machine. The method includes monitoring second, third, and fourth data channels each assigned to an axis of a three-axis sensor. The method includes recording gap-free digital waveform data simultaneously from all of the data channels while the machine is in operation and determining a change in relative phase based on the digital waveform data.

In embodiments, the tri-axial sensor is located at a plurality of positions associated with the machine while obtaining the digital waveform. In embodiments, the second, third, and fourth channels are assigned together to a sequence of tri-axial sensors each located at different positions associated with the machine. In embodiments, the data is received from all of the sensors simultaneously. In embodiments, the method includes determining an operating deflection shape based on the change in relative phase information and the waveform data. In embodiments, the unchanging location is a position associated with the shaft of the machine. In embodiments, the tri-axial sensors in the sequence of the tri-axial sensors are each located at different positions and are each associated with different bearings in the machine. In embodiments, the unchanging location is a position associated with the shaft of the machine. The tri-axial sensors in the sequence of the tri-axial sensors are each located at different positions and are each associated with different bearings that support the shaft in the machine.

In embodiments, the method includes monitoring the first data channel assigned to the single-axis sensor at an unchanging location located on a second machine. The method includes monitoring the second, the third, and the fourth data channels, each assigned to the axis of a three-axis sensor that is located at the position associated with the second machine. The method also includes recording gap-free digital waveform data simultaneously from all of the data channels from the second machine while both of the machines are in operation. In embodiments, the method includes characterizing the contribution from each of the machines in the gap-free digital waveform data simultaneously from the second machine.

In embodiments, a method for data collection, processing, and utilization of signals with a platform monitoring at least a first element in a first machine in an industrial environment includes obtaining, automatically with a computing environment, at least a first sensor signal and a second sensor signal with a local data collection system that monitors at least the first machine. The method includes connecting a first input of a crosspoint switch of the local data collection system to a first sensor and a second input of the crosspoint switch to a second sensor in the local data collection system. The method includes switching between a condition in which a first output of the crosspoint switch alternates between delivery of at least the first sensor signal and the second sensor signal and a condition in which there is simultaneous delivery of the first sensor signal from the first output and the second sensor signal from a second output of the crosspoint switch. The method also includes switching off unassigned outputs of the crosspoint switch into a high-impedance state.

In embodiments, the first sensor signal and the second sensor signal are continuous vibration data from the industrial environment. In embodiments, the second sensor in the local data collection system is connected to the first machine. In embodiments, the second sensor in the local data collection system is connected to a second machine in the industrial environment. In embodiments, the method includes comparing, automatically with the computing environment, relative phases of the first and second sensor signals. In embodiments, the first sensor is a single-axis sensor and the second sensor is a three-axis sensor. In embodiments, at least the first input of the crosspoint switch includes internet protocol front-end signal conditioning for improved signal-to-noise ratio.

In embodiments, the method includes continuously monitoring at least a third input of the crosspoint switch with an alarm having a pre-determined trigger condition when the third input is unassigned to any of multiple outputs on the crosspoint switch. In embodiments, the local data collection system includes multiple multiplexing units and multiple data acquisition units receiving multiple data streams from multiple machines in the industrial environment. In embodiments, the local data collection system includes distributed (CPLD) chips each dedicated to a data bus for logic control of the multiple multiplexing units and the multiple data acquisition units that receive the multiple data streams from the multiple machines in the industrial environment. In embodiments, the local data collection system provides high-amperage input capability using solid state relays.

In embodiments, the method includes powering down at least one of an analog sensor channel and a component board of the local data collection system. In embodiments, the local data collection system includes a phase-lock loop band-pass tracking filter that obtain slow-speed RPMs and phase information. In embodiments, the method includes digitally deriving phase using on-board timers relative to at least one trigger channel and at least one of multiple inputs on the crosspoint switch.

In embodiments, the method includes auto-scaling with a peak-detector using a separate analog-to-digital converter for peak detection. In embodiments, the method includes routing at least one trigger channel that is one of raw and buffered into at least one of multiple inputs on the crosspoint switch. In embodiments, the method includes increasing input oversampling rates with at least one delta-sigma analog-to-digital converter to reduce sampling rate outputs and to minimize anti-aliasing filter requirements. In embodiments, the distributed CPLD chips are each dedicated to the data bus for logic control of the multiple multiplexing units and the multiple data acquisition units and each include a high-frequency crystal clock reference divided by at least one of the distributed CPLD chips for at least one delta-sigma analog-to-digital converter to achieve lower sampling rates without digital resampling. In embodiments, the method includes obtaining long blocks of data at a single relatively high-sampling rate with the local data collection system as opposed to multiple sets of data taken at different sampling rates. In embodiments, the single relatively high-sampling rate corresponds to a maximum frequency of about forty kilohertz. In embodiments, the long blocks of data are for a duration that is in excess of one minute. In embodiments, the local data collection system includes multiple data acquisition units and each data acquisition unit has an onboard card set that stores calibration information and maintenance history of a data acquisition unit in which the onboard card set is located.

In embodiments, the method includes planning data acquisition routes based on hierarchical templates associated with at least the first element in the first machine in the industrial environment. In embodiments, the local data collection system manages data collection bands that define a specific frequency band and at least one of a group of spectral peaks, a true-peak level, a crest factor derived from a time waveform, and an overall waveform derived from a vibration envelope. In embodiments, the local data collection system includes a neural net expert system using intelligent management of the data collection bands. In embodiments, the local data collection system creates data acquisition routes based on hierarchical templates that each include the data collection bands related to machines associated with the data acquisition routes. In embodiments, at least one of the hierarchical templates is associated with multiple interconnected elements of the first machine. In embodiments, at least one of the hierarchical templates is associated with similar elements associated with at least the first machine and a second machine. In embodiments, at least one of the hierarchical templates is associated with at least the first machine being proximate in location to a second machine.

In embodiments, the method includes controlling a GUI system of the local data collection system to manage the data collection bands. The GUI system includes an expert system diagnostic tool. In embodiments, the computing environment of the platform includes cloud-based, machine pattern analysis of state information from multiple sensors to provide anticipated state information for the industrial environment. In embodiments, the computing environment of the platform provides self-organization of data pools based on at least one of the utilization metrics and yield metrics. In embodiments, the computing environment of the platform includes a self-organized swarm of industrial data collectors. In embodiments, each of multiple inputs of the crosspoint switch is individually assignable to any of multiple outputs of the crosspoint switch.

DETAILED DESCRIPTION

Detailed embodiments of the present disclosure are disclosed herein; however, it is to be understood that the disclosed embodiments are merely exemplary of the disclosure, which may be embodied in various forms. Therefore, specific structural and functional details disclosed herein are not to be interpreted as limiting, but merely as a basis for the claims and as a representative basis for teaching one skilled in the art to variously employ the present disclosure in virtually any appropriately detailed structure.

The terms "a" or "an," as used herein, are defined as one or more than one. The term "another," as used herein, is defined as at least a second or more. The terms "including" and/or "having," as used herein, are defined as comprising (i.e., open transition).

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

Figure 1:
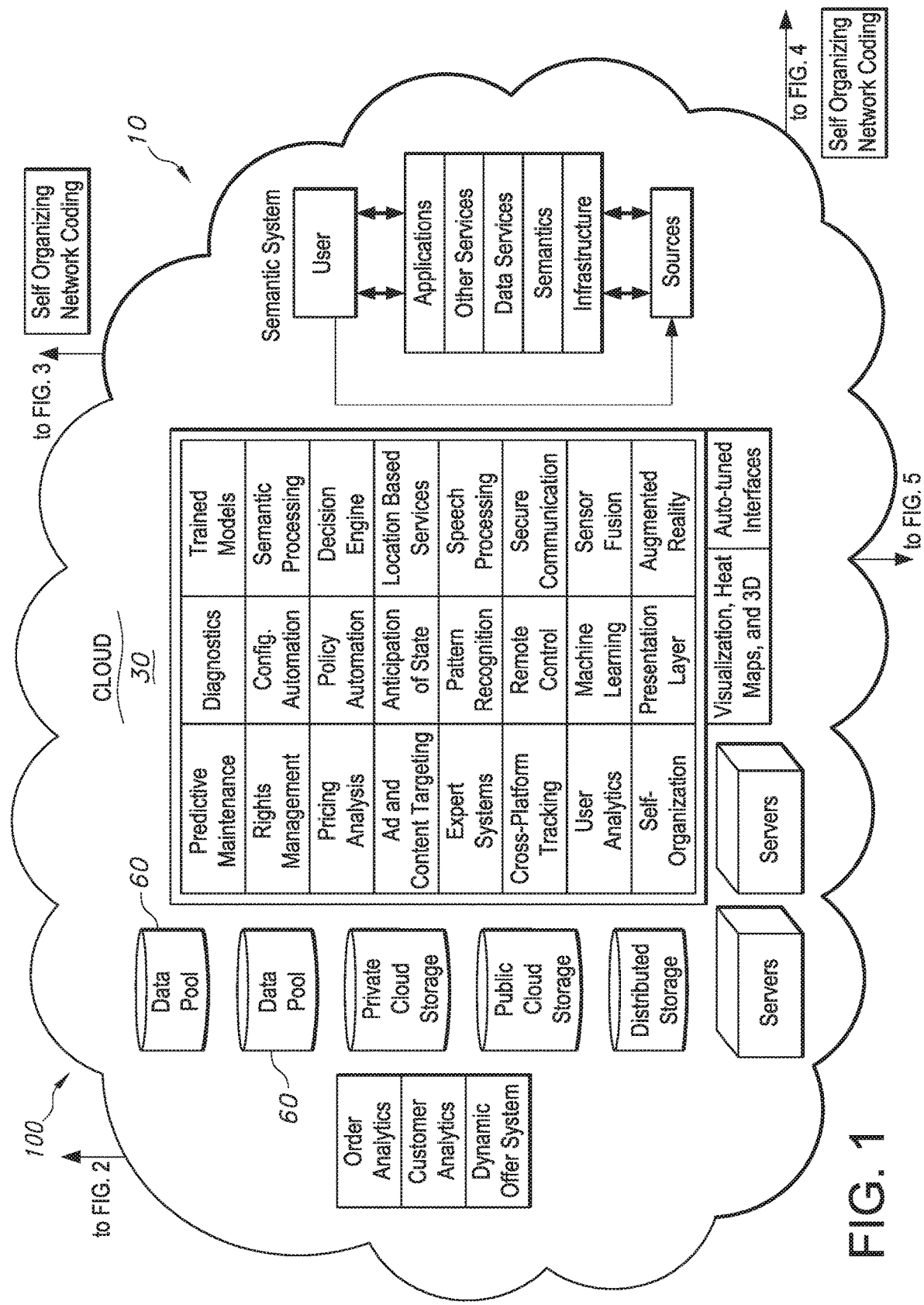
FIGS. 1 through FIG. 5 are diagrammatic views that each depicts portions of an overall view of an industrial Internet of Things (IoT) data collection, monitoring and control system in accordance with the present disclosure.
Figure 2:
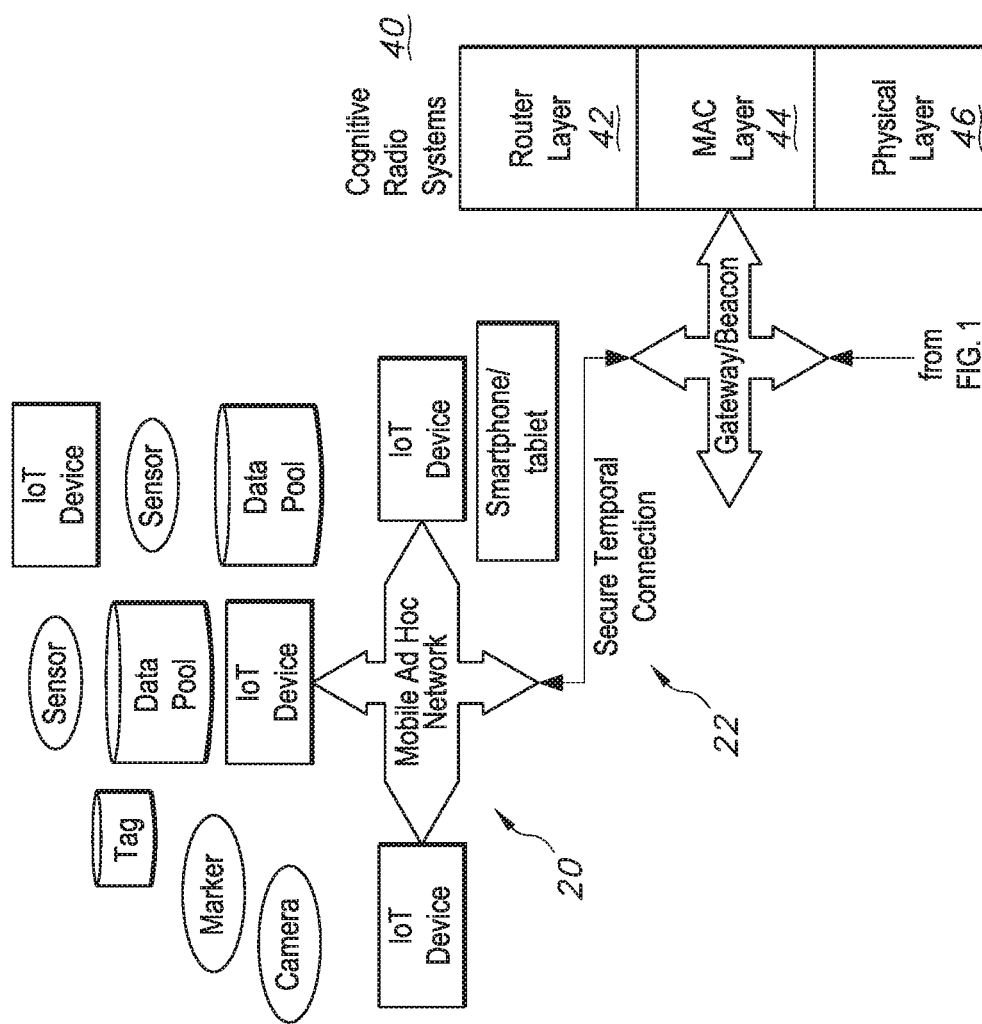

FIGS. 1 through 5 depict portions of an overall view of an industrial Internet of Things (IoT) data collection, monitoring and control system 10. FIG. 2 shows an upper left portion of a schematic view of an industrial IoT system 10 of FIGS. 1-5. FIG. 2 includes a mobile ad hoc network ("MANET") 20, which may form a secure, temporal network connection 22 (sometimes connected and sometimes isolated), with a cloud 30 or other remote networking system, so that network functions may occur over the MANET 20 within the environment, without the need for external networks, but at other times information can be sent to and from a central location. This allows the industrial environment to use the benefits of networking and control technologies, while also providing security, such as preventing cyber-attacks. The MANET 20 may use cognitive radio technologies 40, including ones that form up an equivalent to the IP protocol, such as router 42, MAC 44, and physical layer technologies 46. Also, depicted is network-sensitive or network-aware transport of data over the network to and from a data collection device or a heavy industrial machine.

Figure 3:
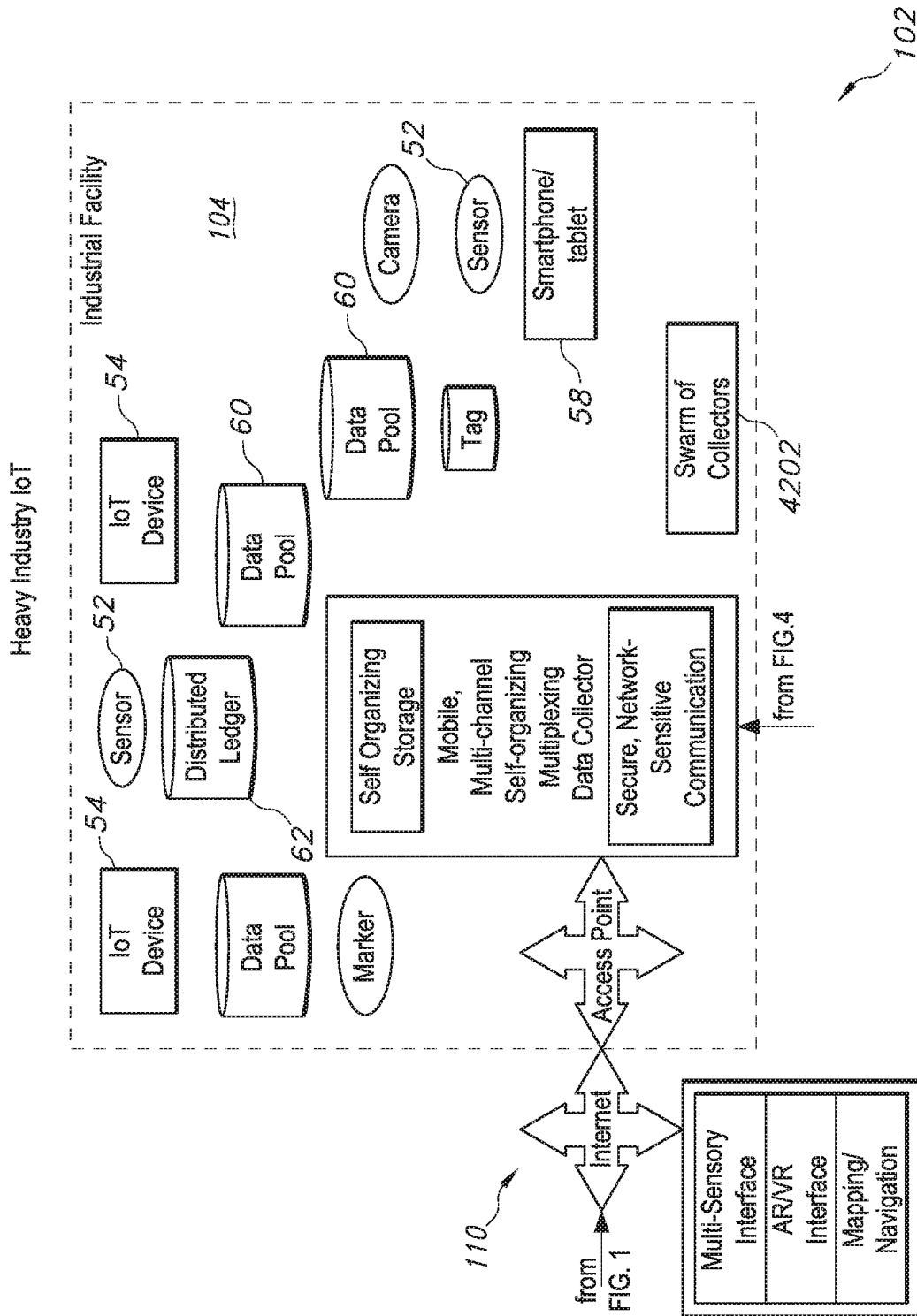

FIG. 3 shows the upper right portion of a schematic view of an industrial IoT system 10 of FIGS. 1 through 5. This includes intelligent data collection technologies 50 deployed locally, at the edge of an IoT deployment, where heavy industrial machines are located. This includes various sensors 52, IoT devices 54, data storage capabilities 56 (including intelligent, self-organizing storage), sensor fusion (including self-organizing sensor fusion) and the like. FIG. 3 shows interfaces for data collection, including multi-sensory interfaces, tablets, smartphones 58, and the like. FIG. 3 also shows data pools 60 that may collect data published by machines or sensors that detect conditions of machines, such as for later consumption by local or remote intelligence. A distributed ledger system 62 may distribute storage across the local storage of various elements of the environment, or more broadly throughout the system.

FIG. 1 shows a center portion of a schematic view of an industrial IoT system of FIGS. 1 through 5. This includes use of network coding (including self-organizing network coding) that configures a network coding model based on feedback measures, network conditions, or the like, for highly efficient transport of large amounts of data across the network to and from data collection systems and the cloud. In the cloud or on an enterprise owner's or operator's premises may be deployed a wide range of capabilities for intelligence, analytics, remote control, remote operation, remote optimization, and the like, including a wide range of capabilities depicted in FIG. 1. This includes various storage configurations, which may include distributed ledger storage, such as for supporting transactional data or other elements of the system.

Figure 4:
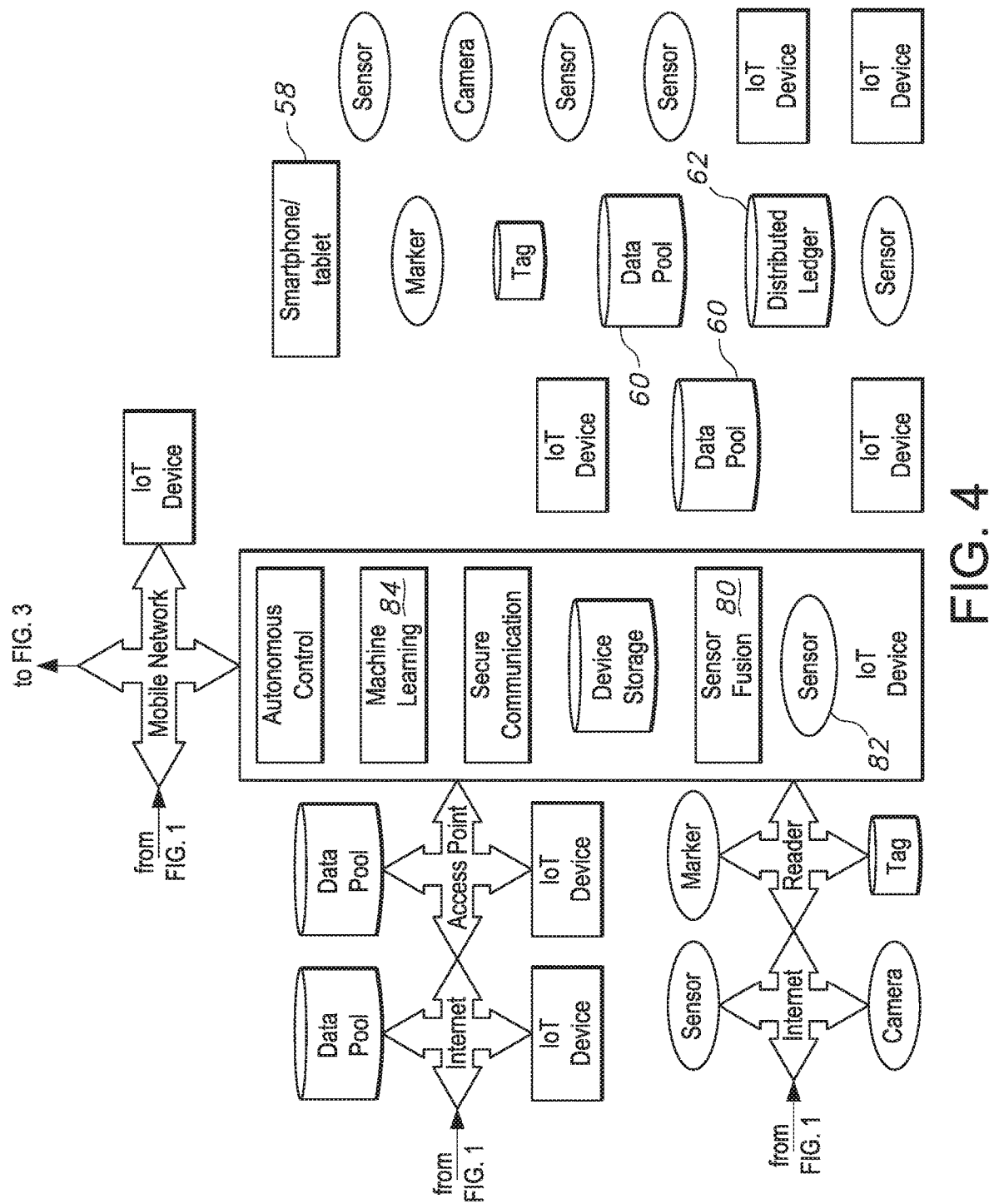
Figure 5:
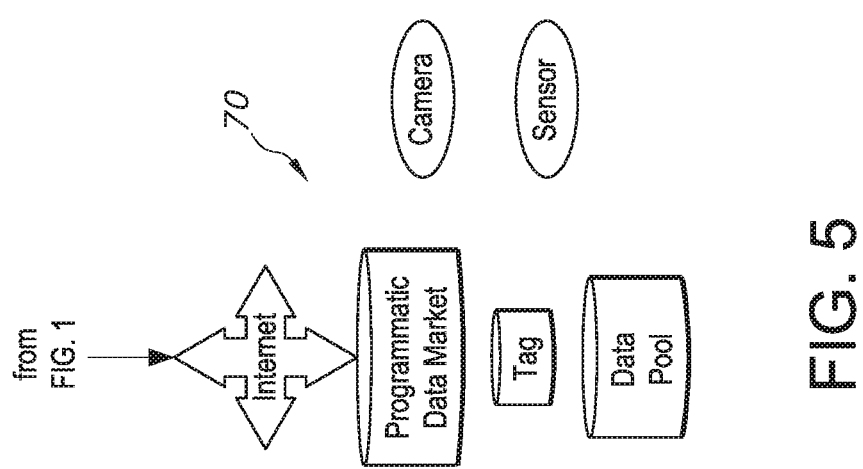

FIGS. 1, 4, and 5 show the lower right corner of a schematic view of an industrial IoT system of FIGS. 1 through 5. This includes a programmatic data marketplace 70, which may be a self-organizing marketplace, such as for making available data that is collected in industrial environments, such as from data collectors, data pools, distributed ledgers, and other elements disclosed herein and depicted in FIGS. 1 through 5. FIGS. 1, 4, and 5 also show on-device sensor fusion 80, such as for storing on a device data from multiple analog sensors 82, which may be analyzed locally or in the cloud, such as by machine learning 84, including by training a machine based on initial models created by humans that are augmented by providing feedback (such as based on measures of success) when operating the methods and systems disclosed herein. Additional detail on the various components and sub-components of FIGS. 1 through 5 is provided throughout this disclosure.

Figure 6:
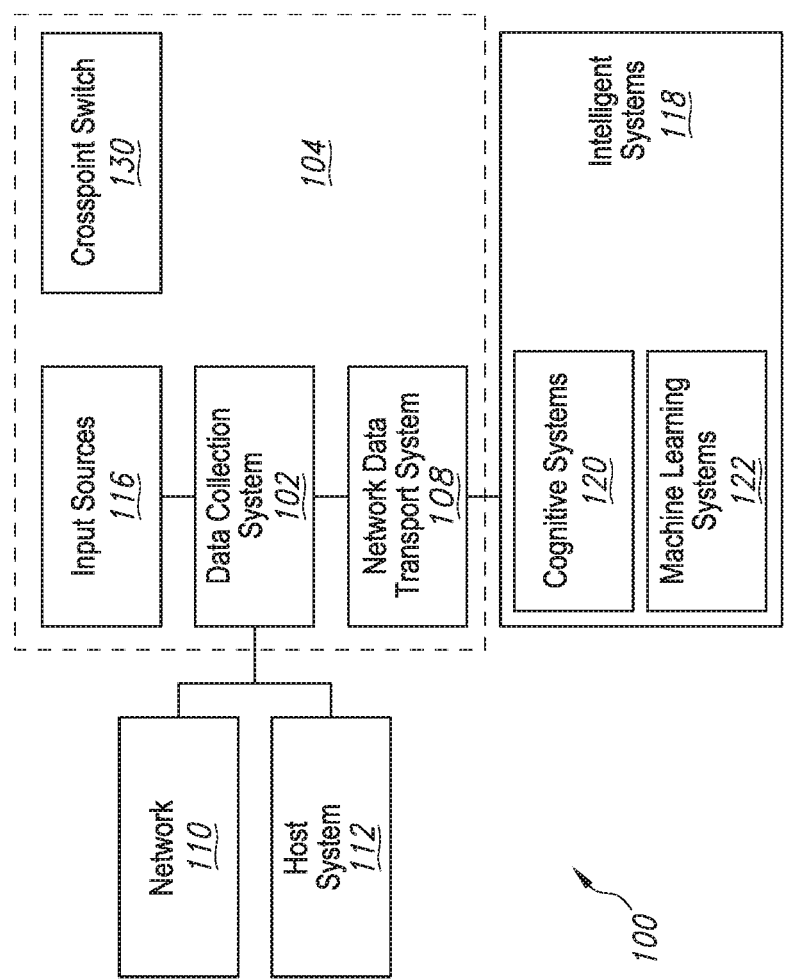
FIG. 6 is a diagrammatic view of a platform including a local data collection system disposed in an industrial environment for collecting data from or about the elements of the environment, such as machines, components, systems, subsystems, ambient conditions, states, workflows, processes, and other elements in accordance with the present disclosure.

In embodiments, methods and systems are provided for a system for data collection, processing, and utilization in an industrial environment, referred to herein as the platform 100. With reference to FIG. 6, the platform 100 may include a local data collection system 102, which may be disposed in an environment 104, such as an industrial environment, for collecting data from or about the elements of the environment, such as machines, components, systems, sub-systems, ambient conditions, states, workflows, processes, and other elements. The platform 100 may connect to or include portions of the industrial IoT data collection, monitoring and control system 10 depicted in FIGS. 1-5. The platform 100 may include a network data transport system 108, such as for transporting data to and from the local data collection system 102 over a network 110, such as to a host processing system 112, such as one that is disposed in a cloud computing environment or on the premises of an enterprise, or that consists of distributed components that interact with each other to process data collected by the local data collection system 102. The host processing system 112, referred to for convenience in some cases as the host system 112, may include various systems, components, methods, processes, facilities, and the like for enabling automated, or automation-assisted processing of the data, such as for monitoring one or more environments 104 or networks 110 or for remotely controlling one or more elements in a local environment 104 or in a network 110. The platform 100 may include one or more local autonomous systems 114, such as for enabling autonomous behavior, such as reflecting artificial, or machine-based intelligence or such as enabling automated action based on the applications of a set of rules or models upon input data from the local data collection system 102 or from one or more input sources 116, which may comprise information feeds and inputs from a wide array of sources, including ones in the local environment 104, in a network 110, in the host system 112, or in one or more external systems, databases, or the like. The platform 100 may include one or more intelligent systems 118, which may be disposed in, integrated with, or acting as inputs to one or more components of the platform 100. Details of these and other components of the platform 100 are provided throughout this disclosure.

Intelligent systems may include cognitive systems 120, such as enabling a degree of cognitive behavior as a result of the coordination of processing elements, such as mesh, peer-to-peer, ring, serial and other architectures, where one or more node elements is coordinated with other node elements to provide collective, coordinated behavior to assist in processing, communication, data collection, or the like. The MANET 20 depicted in FIG. 2 may also use cognitive radio technologies, including ones that form up an equivalent to the IP protocol, such as router 42, MAC 44, and physical layer technologies 46. In one example, the cognitive system technology stack can include examples disclosed in U.S. Pat. No. 8,060,017 to Schlicht et al., issued 15 Nov. 2011 and hereby incorporated by reference as if fully set forth herein. Intelligent systems may include machine learning systems 122, such as for learning on one or more data sets. The one or may data sets may include information collections using local data collection systems 102 or other information from input sources 116, such as to recognize states, objects, events, patterns, conditions, or the like that may in turn be used for processing by the processing system 112 as inputs to components of the platform 100 and portions of the industrial IoT data collection, monitoring and control system 10, or the like. Learning may be human-supervised or fully-automated, such as using one or more input sources 116 to provide a data set, along with information about the item to be learned. Machine learning may use one or more models, rules, semantic understandings, workflows, or other structured or semi-structured understanding of the world, such as for automated optimization of control of a system or process based on feedback or feed forward to an operating model for the system or process. One such machine learning technique for semantic and contextual understandings, workflows, or other structured or semi-structured understandings is disclosed in U.S. Pat. No. 8,200,775 to Moore, issued 12 Jun. 2012 and hereby incorporated by reference as if fully set forth herein. Machine learning may be used to improve the foregoing, such as by adjusting one or more weights, structures, rules, or the like (such as changing a function within a model) based on feedback (such as regarding the success of a model in a given situation) or based on iteration (such as in a recursive process). Where sufficient understanding of the underlying structure or behavior of a system is not known, insufficient data is not available, or in other cases where preferred for various reasons, machine learning may also be undertaken in the absence of an underlying model; that is, input sources may be weighted, structured, or the like within a machine learning facility without regard to any a priori understanding of structure, and outcomes (such as based on measures of success at accomplishing various desired objectives) can be serially fed to the machine learning system to allow it to learn how to achieve the targeted objectives. For example, the system may learn to recognize faults, to recognize patterns, to develop models or functions, to develop rules, to optimize performance, to minimize failure rates, to optimize profits, to optimize resource utilization, to optimize flow (such as of traffic), or to optimize many other parameters that may be relevant to successful outcomes (such as in a wide range of environments). Machine learning may use genetic programming techniques, such as promoting or demoting one or more input sources, structures, data types, objects, weights, nodes, links, or other factors based on feedback (such that successful elements emerge over a series of generations). For example, alternative available sensor inputs for a data collection system 102 may be arranged in alternative configurations and permutations, such that the system may, using genetic programming techniques over a series of data collection events, determine what permutations provide successful outcomes based on various conditions (such as conditions of components of the platform 100, conditions of the network 110, conditions of a data collection system 102, conditions of an environment 104), or the like. In embodiments, local machine learning may turn on or off one or more sensors in a multi-sensor data collector 102 in permutations over time, while tracking success outcomes (such as contributing to success in predicting a failure, contributing to a performance indicator (such as efficiency, effectiveness, return on investment, yield, or the like), contributing to optimization of one or more parameters, identification of a pattern (such as relating to a threat, a failure mode, a success mode, or the like) or the like. For example, a system may learn what sets of sensors should be turned on or off under given conditions to achieve the highest value utilization of a data collector 102. In embodiments, similar techniques may be used to handle optimization of transport of data in the platform 100 (such as in the network 110, by using genetic programming or other machine learning techniques to learn to configure network elements (such as configuring network transport paths, configuring network coding types and architectures, configuring network security elements), and the like.

In embodiments, the local data collection system 102 may include a high-performance, multi-sensor data collector having a number of novel features for collection and processing of analog and other sensor data. In embodiments, a local data collection system 102 may be deployed to the industrial facilities depicted in FIG. 3. A local data collection system 102 may also be deployed monitor other machines such as the machine 2300 in FIG. 9 and FIG. 10, the machines 2400, 2600, 2800, 2950, 3000 depicted in FIG. 12, and the machines 3202, 3204 depicted in FIG. 13. The data collection system 102 may have on board intelligent systems (such as for learning to optimize the configuration and operation of the data collector, such as configuring permutations and combinations of sensors based on contexts and conditions). In one example, the data collection system 102 includes a crosspoint switch 130. Automated, intelligent configuration of the local data collection system 102 may be based on a variety of types of information, such as from various input sources, such as based on available power, power requirements of sensors, the value of the data collected (such as based on feedback information from other elements of the platform 100), the relative value of information (such as based on the availability of other sources of the same or similar information), power availability (such as for powering sensors), network conditions, ambient conditions, operating states, operating contexts, operating events, and many others.

Figure 7:
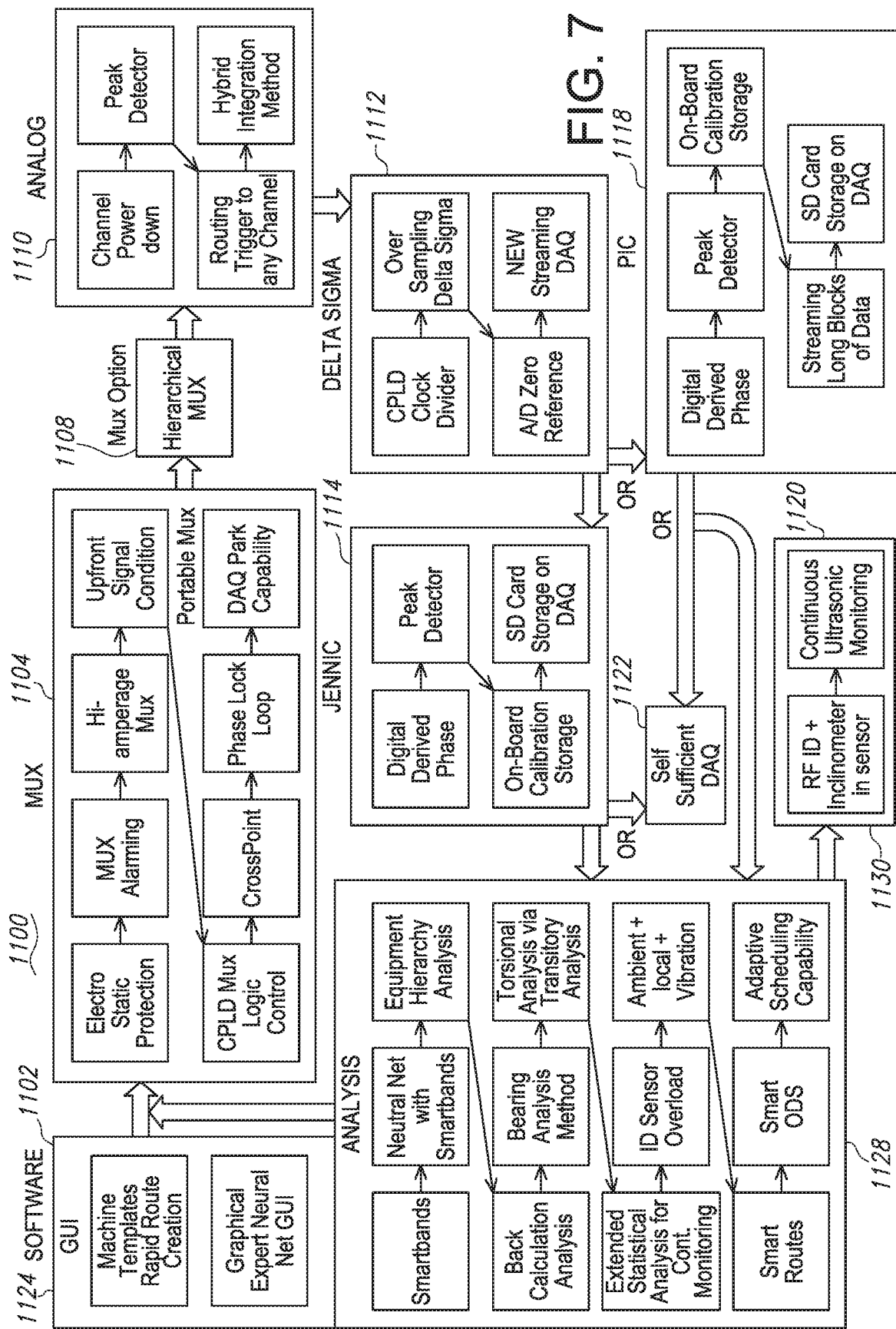
FIG. 7 is a diagrammatic view that depicts elements of an industrial data collection system for collecting analog sensor data in an industrial environment in accordance with the present disclosure.

FIG. 7 shows elements and sub-components of a data collection and analysis system 1100 for sensor data (such as analog sensor data) collected in industrial environments. As depicted in FIG. 7, embodiments of the methods and systems disclosed herein may include hardware that has several different modules starting with the multiplexer ("Mux") 1104. In embodiments, the Mux 1104 is made up of a main board and an option board 1108. The main board is where the sensors connect to the system. These connections are on top to enable ease of installation. Then there are numerous settings on the underside of this board as well as on the Mux option board, which attaches to the main board via two headers one at either end of the board. In embodiments, the Mux option board has the male headers, which mesh together with the female header on the main Mux board. This enables them to be stacked on top of each other taking up less real estate.

In embodiments, the main Mux then connects to the mother (e.g., with 4 simultaneous channels) and daughter (e.g., with 4 additional channels for 8 total channels) analog boards 1110 via cables where some of the signal conditioning (such as hardware integration) occurs. The signals then move from the analog boards 1110 to the anti-aliasing board where some of the potential aliasing is removed. The rest of the aliasing is done on the delta sigma board 1112, which it connects to through cables. The delta sigma board 1112 provides more aliasing protection along with other conditioning and digitizing of the signal. Next, the data moves to the Jennic™ board 1114 for more digitizing as well as communication to a computer via USB or Ethernet. In embodiments, the Jennic™ board 1114 may be replaced with a pic board 1118 for more advanced and efficient data collection as well as communication. Once the data moves to the computer software 1102, the computer software 1102 can manipulate the data to show trending, spectra, waveform, statistics, and analytics.

In embodiments, the system is meant to take in all types of data from volts to 4-20 mA signals. In embodiments, open formats of data storage and communication may be used. In some instances, certain portions of the system may be proprietary especially some of research and data associated with the analytics and reporting. In embodiments, smart band analysis is a way to break data down into easily analyzed parts that can be combined with other smart bands to make new more simplified yet sophisticated analytics. In embodiments, this unique information is taken and graphics are used to depict the conditions because picture depictions are more helpful to the user. In embodiments, complicated programs and user interfaces are simplified so that any user can manipulate the data like an expert.

In embodiments, the system in essence, works in a big loop. It starts in software with a general user interface. Most, if not all, online systems require the OEM to create or develop the system GUI 1124. In embodiments, rapid route creation takes advantage of hierarchical templates. In embodiments, a "GUI" is created so any general user can populate the information itself with simple templates. Once the templates are created the user can copy and paste whatever the user needs. In addition, users can develop their own templates for future ease of use and institutionalizing the knowledge. When the user has entered all of the user's information and connected all of the user's sensors, the user can then start the system acquiring data. In some applications, rotating machinery can build up an electric charge which can harm electrical equipment. In embodiments, in order to diminish this charge's effect on the equipment, a unique electrostatic protection for trigger and vibration inputs is placed upfront on the Mux and DAQ hardware in order to dissipate this electric charge as the signal passed from the sensor to the hardware. In embodiments, the Mux and analog board also can offer upfront circuitry and wider traces in high-amperage input capability using solid state relays and design topology that enables the system to handle high amperage inputs if necessary.

In embodiments, an important part at the front of the Mux is up front signal conditioning on Mux for improved signal-to-noise ratio which provides upfront signal conditioning. Most multiplexers are after thoughts and the original equipment manufacturers usually do not worry or even think about the quality of the signal coming from it. As a result, the signals quality can drop as much as 30 dB or more. Every system is only as strong as its weakest link, so no matter if you have a 24 bit DAQ that has a S/N ratio of 110 dB, your signal quality has already been lost through the Mux. If the signal to noise ratio has dropped to 80 dB in the Mux, it may not be much better than a 16-bit system from 20 years ago.

In embodiments, in addition to providing a better signal, the multiplexer also can play a key role in enhancing a system. Truly continuous systems monitor every sensor all the time but these systems are very expensive. Multiplexer systems can usually only monitor a set number of channels at one time and switches from bank to bank from a larger set of sensors. As a result, the sensors not being collected on are not being monitored so if a level increases the user may never know. In embodiments, a multiplexer continuous monitor alarming feature provides a continuous monitoring alarming multiplexer by placing circuitry on the multiplexer that can measure levels against known alarms even when the data acquisition ("DAQ") is not monitoring the channel. This in essence makes the system continuous without the ability to instantly capture data on the problem like a true continuous system. In embodiments, coupling this capability to alarm with adaptive scheduling techniques for continuous monitoring and the continuous monitoring system's software adapting and adjusting the data collection sequence based on statistics, analytics, data alarms and dynamic analysis the system will be able to quickly collect dynamic spectral data on the alarming sensor very soon after the alarm sounds.

Another restriction of multiplexers is that they often have a limited number of channels. In embodiments, use of distributed complex programmable logic device ("CPLD") chips with dedicated bus for logic control of multiple Mux and data acquisition sections enables a CPLD to control multiple mux and DAQs so that there is no limit to the number of channels a system can handle. In embodiments, multiplexers and DAQs can stack together offering additional input and output channels to the system.

Besides having limited number of channels, multiplexers also usually can only collect sensors in the same bank. For detailed analysis, this is very limiting as there is tremendous value in being able to review data simultaneously from sensors on the same machine. In embodiments, use of an analog crosspoint switch for collecting variable groups of vibration input channels addresses this issue by using a crosspoint switch which is often used in the phone industry and provides a matrix circuit so the system can access any set of eight channels from the total number of input sensors.

In embodiments, the system provides all the same capabilities as onsite will allow phase-lock-loop band pass tracking filter method for obtaining slow-speed revolutions per minute ("RPM") and phase for balancing purposes to remotely balance slow speed machinery such as in paper mills as well as offer additional analysis from its data.

In embodiments, ability to control multiple multiplexers with use of distributed CPLD chips with dedicated bus for logic control of multiple Mux and data acquisition sections is enhanced with a hierarchical multiplexer which allows for multiple DAQ to collect data from multiple multiplexers. In embodiments, this allows for faster data collection as well as more channels of simultaneous data collection which enhances analysis. In embodiments, the Mux may be configured slightly to make it portable and use data acquisition parking features, which turns SV3X DAQ into a protect system.

In embodiments, once the signals leave the multiplexer and hierarchical Mux they move to the analog board where there are other enhancements. In embodiments, power-down of analog channels when not in use as well other power-saving measures including powering down of component boards allow the system to power down channels on the mother and the daughter analog boards in order to save power. In embodiments, this can offer the same power saving benefits to a protect system especially if it is battery operated or solar powered. In embodiments, in order to maximize the signal to noise ratio and provide the best data, a peak-detector for auto-scaling routed into a separate A/D will provide the system the highest peak in each set of data so it can rapidly scale the data to that peak. In embodiments, improved integration using both analog and digital methods create an innovative hybrid integration which also improves or maintains the highest possible signal to noise ratio.

In embodiments, a section of the analog board allows routing of a trigger channel, either raw or buffered, into other analog channels. This allows users to route the trigger to any of the channels for analysis and trouble shooting. In embodiments, once the signals leave the analog board, the signals move into the delta-sigma board where precise voltage reference for A/D zero reference offers more accurate direct current sensor data. The delta sigma's high speeds also provide for using higher input oversampling for delta-sigma A/D for lower sampling rate outputs to minimize antialiasing filter requirements to oversample the data at a higher input which minimizes anti-aliasing requirements. In embodiments, a CPLD may be used as a clock-divider for a delta-sigma A/D to achieve lower sampling rates without the need for digital resampling so the delta-sigma A/D can achieve lower sampling rates without digitally resampling the data.

In embodiments, the data then moves from the delta-sigma board to the Jennic™ board where digital derivation of phase relative to input and trigger channels using on-board timers digitally derives the phase from the input signal and the trigger using on board timers. In embodiments, the Jennic™ board also has the ability to store calibration data and system maintenance repair history data in an on-board card set. In embodiments, the Jennic™ board will enable acquiring long blocks of data at high-sampling rate as opposed to multiple sets of data taken at different sampling rates so it can stream data and acquire long blocks of data for advanced analysis in the future.

In embodiments, after the signal moves through the Jennic™ board it is then transmitted to the computer. Once on the computer, the software has a number of enhancements that improve the systems analytic capabilities. In embodiments, rapid route creation takes advantage of hierarchical templates and provides rapid route creation of all the equipment using simple templates which also speeds up the software deployment. In embodiments, the software will be used to add intelligence to the system. It will start with an expert system GUIs graphical approach to defining smart bands and diagnoses for the expert system, which will offer a graphical expert system with simplified user interface so anyone can develop complex analytics. In embodiments, this user interface will revolve around smart bands, which are a simplified approach to complex yet flexible analytics for the general user. In embodiments, the smart bands will pair with a self-learning neural network for an even more advanced analytical approach. In embodiments, this system will also use the machine's hierarchy for additional analytical insight. One critical part of predictive maintenance is the ability to learn from known information during repairs or inspections. In embodiments, graphical approaches for back calculations may improve the smart bands and correlations based on a known fault or problem.

In embodiments, besides detailed analysis via smart bands, a bearing analysis method is provided. In recent years, there has been a strong drive in industry to save power which has resulted in an influx of variable frequency drives. In embodiments, torsional vibration detection and analysis utilizing transitory signal analysis provides an advanced torsional vibration analysis for a more comprehensive way to diagnose machinery where torsional forces are relevant (such as machinery with rotating components). In embodiments, the system can deploy a number of intelligent capabilities on its own for better data and more comprehensive analysis. In embodiments, this intelligence will start with a smart route where the software's smart route can adapt the sensors it collects simultaneously in order to gain additional correlative intelligence. In embodiments, smart operational data store ("ODS") allows the system to elect to gather operational deflection shape analysis in order to further examine the machinery condition. In embodiments, besides changing the route, adaptive scheduling techniques for continuous monitoring allow the system to change the scheduled data collected for full spectral analysis across a number (e.g., eight), of correlative channels. The systems intelligence will provide data to enable extended statistics capabilities for continuous monitoring as well as ambient local vibration for analysis that combines ambient temperature and local temperature and vibration levels changes for identifying machinery issues.

Embodiments of the methods and systems disclosed herein may include a self-sufficient DAQ box. In embodiments, a data acquisition device may be controlled by a personal computer ("PC") to implement the desired data acquisition commands. In embodiments, the system has the ability to be self-sufficient and can acquire, process, analyze and monitor independent of external PC control. Embodiments of the methods and systems disclosed herein may include secure digital ("SD") card storage. In embodiments, significant additional storage capability is provided utilizing an SD card such as cameras, smart phones, and so on. This can prove critical for monitoring applications where critical data can be stored permanently. Also, if a power failure should occur, the most recent data may be stored despite the fact that it was not off-loaded to another system. Embodiments of the methods and systems disclosed herein may include a DAQ system. A current trend has been to make DAQ systems as communicative as possible with the outside world usually in the form of networks including wireless. Whereas in the past it was common to use a dedicated bus to control a DAQ system with either a microprocessor or microcontroller/microprocessor paired with a PC, today the demands for networking are much greater and so it is out of this environment that arises this new design prototype. In embodiments, multiple microprocessor/microcontrollers or dedicated processors may be utilized to carry out various aspects of this increase in DAQ functionality with one or more processor units focused primarily on the communication aspects with the outside world. This negates the need for constantly interrupting the main processes which include the control of the signal conditioning circuits, triggering, raw data acquisition using the A/D, directing the A/D output to the appropriate on-board memory and processing that data. In embodiments, a specialized microcontroller/microprocessor is designated for all communications with the outside. These include USB, Ethernet and wireless with the ability to provide an IP address or addresses in order to host a webpage. All communications with the outside world are then accomplished using a simple text based menu. The usual array of commands (in practice more than a hundred) such as InitializeCard, AcquireData, StopAcquisition, RetrieveCalibration Info, and so on, would be provided. In addition, in embodiments, other intense signal processing activities including resampling, weighting, filtering, and spectrum processing can be performed by dedicated processors such as field-programmable gate array ("FPGAs"), digital signal processor ("DSP"), microprocessors, microcontrollers, or a combination thereof. In embodiments, this subsystem will communicate via a specialized hardware bus with the communication processing section. It will be facilitated with dual-port memory, semaphore logic, and so on. This embodiment will not only provide a marked improvement in efficiency but can significantly improve the processing capability, including the streaming of the data as well other high-end analytical techniques.

Embodiments of the methods and systems disclosed herein may include sensor overload identification. A need exists for monitoring systems to identify when the sensor is overloading. A monitoring system may identify when their system is overloading, but in embodiments, the system may look at the voltage of the sensor to determine if the overload is from the sensor, which is useful to the user to get another sensor better suited to the situation, or the user can try to gather the data again. There are often situations involving high frequency inputs that will saturate a standard 100 mv/g sensor (which is most commonly used in the industry) and having the ability to sense the overload improves data quality for better analysis.

Embodiments of the methods and systems disclosed herein may include radio frequency identification ("RF ID") and inclinometer on accelerometer or RF ID on other sensors so the sensor can tell the system/software what machine/bearing and direction it is attached to and can automatically set it up in the software to store the data without the user telling it. In embodiments, users could, in turn, put the system on any machine or machines and the system would automatically set itself up and be ready for data collection in seconds Embodiments of the methods and systems disclosed herein may include ultrasonic online monitoring by placing ultrasonic sensors inside transformers, motor control centers, breakers and the like where the system will monitor via a sound spectrum continuously looking for patterns that identify arcing, corona and other electrical issues indicating a break down or issue. In embodiments, an analysis engine will be used in ultrasonic online monitoring as well as identifying other faults by combining this data with other parameters such as vibration, temperature, pressure, heat flux, magnetic fields, electrical fields, currents, voltage, capacitance, inductance, and combinations (e.g., simple ratios) of the same, among many others.

Embodiments of the methods and systems disclosed herein may include use of an analog crosspoint switch for collecting variable groups of vibration input channels. For vibration analysis, it is useful to obtain multiple channels simultaneously from vibration transducers mounted on different parts of a machine (or machines) in multiple directions. By obtaining the readings at the same time, for example, the relative phases of the inputs may be compared for the purpose of diagnosing various mechanical faults. Other types of cross channel analyses such as cross-correlation, transfer functions, Operating Deflection Shape ("ODS") may also be performed. Current systems using conventional fixed bank multiplexers can only compare a limited number of channels (based on the number of channels per bank) that were assigned to a particular group at the time of installation. The only way to provide some flexibility is to either overlap channels or incorporate lots of redundancy in the system both of which can add considerable expense (in some cases an exponential increase in cost versus flexibility). The simplest Mux design selects one of many inputs and routes it into a single output line. A banked design would consist of a group of these simple building blocks, each handling a fixed group of inputs and routing to its respective output. Typically, the inputs are not overlapping so that the input of one Mux grouping cannot be routed into another. Unlike conventional Mux chips which typically switch a fixed group or banks of a fixed selection of channels into a single output (e.g., in groups of 2, 4, 8, etc.), a crosspoint Mux allows the user to assign any input to any output. Previously, crosspoint multiplexers were used for specialized purposes such as RGB digital video applications and were as a practical matter too noisy for analog applications such as vibration analysis; however more recent advances in the technology now make it feasible. Another advantage of the crosspoint Mux is the ability to disable outputs by putting them into a high impedance state. This is ideal for an output bus so that multiple Mux cards may be stacked and their output buses joined together without the need for bus switches.

Embodiments of the methods and systems disclosed herein may include up front signal conditioning on Mux for improved signal-to-noise ratio. Embodiments may perform signal conditioning (such as range/gain control, integration, filtering, etc.) on vibration as well as other signal inputs up front before Mux switching to achieve the highest signal-to-noise ratio.

Embodiments of the methods and systems disclosed herein may include a Mux continuous monitor alarming feature. In embodiments, continuous monitoring Mux bypass offers a mechanism whereby channels not being currently sampled by the Mux system may be continuously monitored for significant alarm conditions via a number of trigger conditions using filtered peak-hold circuits or functionally similar that are in turn passed on to the monitoring system in an expedient manner using hardware interrupts or other means.

Embodiments of the methods and systems disclosed herein may include use of distributed CPLD chips with dedicated bus for logic control of multiple Mux and data acquisition sections. Interfacing to multiple types of predictive maintenance and vibration transducers requires a great deal of switching. This includes AC/DC coupling, 4-20 interfacing, integrated electronic piezoelectric transducer, channel power-down (for conserving op amp power), single-ended or differential grounding options, and so on. Also required is the control of digital pots for range and gain control, switches for hardware integration, AA filtering and triggering. This logic can be performed by a series of CPLD chips strategically located for the tasks they control. A single giant CPLD requires long circuit routes with a great deal of density at the single giant CPLD. In embodiments, distributed CPLDs not only address these concerns but offer a great deal of flexibility. A bus is created where each CPLD that has a fixed assignment has its own unique device address. For multiple boards (e.g., for multiple Mux boards), jumpers are provided for setting multiple addresses. In another example, three bits can permit up to 8 boards that are jumper configurable. In embodiments, a bus protocol is defined such that each CPLD on the bus can either be addressed individually or as a group.

Embodiments of the methods and systems disclosed herein may include high-amperage input capability using solid state relays and design topology. Typically, vibration data collectors are not designed to handle large input voltages due to the expense and the fact that, more often than not, it is not needed. A need exists for these data collectors to acquire many varied types of PM data as technology improves and monitoring costs plummet. In embodiments, a method is using the already established OptoMOS™ technology which can permit the switching up front of high voltage signals rather than using more conventional reed-relay approaches. Many historic concerns regarding non-linear zero crossing or other non-linear solid-state behaviors have been eliminated with regard to the passing through of weakly buffered analog signals. In addition, in embodiments, printed circuit board routing topologies place all of the individual channel input circuitry as close to the input connector as possible.

Embodiments of the methods and systems disclosed herein may include power-down of analog channels when not in use as well other power-saving measures including powering down of component boards. In embodiments, power-down of analog signal processing op-amps for non-selected channels as well as the ability to power down component boards and other hardware by the low-level firmware for the DAQ system makes high-level application control with respect to power-saving capabilities relatively easy. Explicit control of the hardware is always possible but not required by default.

Embodiments of the methods and systems disclosed herein may include unique electrostatic protection for trigger and vibration inputs. In many critical industrial environments where large electrostatic forces may build up, for example low-speed balancing using large belts, proper transducer and trigger input protection is required. In embodiments, a low-cost but efficient method is described for such protection without the need for external supplemental devices.

Embodiments of the methods and systems disclosed herein may include precise voltage reference for A/D zero reference. Some A/D chips provide their own internal zero voltage reference to be used as a mid-scale value for external signal conditioning circuitry to ensure that both the A/D and external op amps use the same reference. Although this sounds reasonable in principle, there are practical complications. In many cases these references are inherently based on a supply voltage using a resistor-divider. For many current systems, especially those whose power is derived from a PC via USB or similar bus, this provides for an unreliable reference, as the supply voltage will often vary quite significantly with load. This is especially true for delta-sigma A/D chips which necessitate increased signal processing. Although the offsets may drift together with load, a problem arises if one wants to calibrate the readings digitally. It is typical to modify the voltage offset expressed as counts coming from the A/D digitally to compensate for the DC drift. However, for this case, if the proper calibration offset is determined for one set of loading conditions, they will not apply for other conditions. An absolute DC offset expressed in counts will no longer be applicable. As a result, it becomes necessary to calibrate for all loading conditions which becomes complex, unreliable, and ultimately unmanageable. In embodiments, an external voltage reference is used which is simply independent of the supply voltage to use as the zero offset.

Embodiments of the methods and systems disclosed herein may include phase-lock-loop band pass tracking filter method for obtaining slow-speed RPMs and phase for balancing purposes. For balancing purposes, it is sometimes necessary to balance at very slow speeds. A typical tracking filter may be constructed based on a phase-lock loop or PLL design. However, stability and speed range are overriding concerns. In embodiments, a number of digitally controlled switches are used for selecting the appropriate RC and damping constants. The switching can be done all automatically after measuring the frequency of the incoming tach signal. Embodiments of the methods and systems disclosed herein may include digital derivation of phase relative to input and trigger channels using on-board timers. In embodiments, digital phase derivation uses digital timers to ascertain an exact delay from a trigger event to the precise start of data acquisition. This delay, or offset, then, is further refined using interpolation methods to obtain an even more precise offset which is then applied to the analytically determined phase of the acquired data such that the phase is "in essence" an absolute phase with precise mechanical meaning useful for among other things, one-shot balancing, alignment analysis, and so on.

Embodiments of the methods and systems disclosed herein may include peak-detector for auto-scaling routed into separate A/D. Many microprocessors in use today feature built-in A/D converters. For vibration analysis purposes, they are more often than not inadequate with regards to number of bits, number of channels or sampling frequency versus not slowing the microprocessor down significantly. Despite these limitations, it is useful to use them for purposes of auto-scaling. In embodiments, a separate A/D may be used that has reduced functionality and is cheaper. For each channel of input, after the signal is buffered (usually with the appropriate coupling: AC or DC) but before it is signal conditioned, the signal is fed directly into the microprocessor or low-cost A/D. Unlike the conditioned signal for which range, gain and filter switches are thrown, no switches are varied. This can permit the simultaneous sampling of the auto-scaling data while the input data is signal conditioned, fed into a more robust external A/D, and directed into on-board memory using direct memory access (DMA) methods where memory is accessed without requiring a CPU. This significantly simplifies the auto-scaling process by not having to throw switches and then allow for settling time, which greatly slows down the auto-scaling process. Furthermore, the data can be collected simultaneously, which assures the best signal-to-noise ratio. The reduced number of bits and other features is usually more than adequate for auto-scaling purposes.

Embodiments of the methods and systems disclosed herein may include routing of trigger channel either raw or buffered into other analog channels. Many systems have trigger channels for the purposes of determining relative phase between various input data sets or for acquiring significant data without the needless repetition of unwanted input. In embodiments, digitally controlled relays are used to switch either the raw or buffered trigger signal into one of the input channels. Many times, it is extremely useful to examine the quality of the triggering pulse because it is often corrupted for a variety of reasons. These reasons include inadequate placement of the trigger sensor, wiring issues, faulty setup issues such as a dirty piece of reflective tape if using an optical sensor, and so on. The ability to look at either the raw or buffered signal offers an excellent diagnostic or debugging vehicle. It also can offer some improved phase analysis capability by making use of the recorded data signal for various signal processing techniques such as variable speed filtering algorithms.

Embodiments of the methods and systems disclosed herein may include using higher input oversampling for delta-sigma A/D for lower sampling rate outputs to minimize AA filter requirements. In embodiments, higher input oversampling rates for delta-sigma A/D are used for lower sampling rate output data to minimize the AA filtering requirements. Lower oversampling rates can be used for higher sampling rates. For example, a $3^{rd}$ order AA filter set for the lowest sampling requirement for 256 Hz (Fmax of 100 Hz) is then adequate for Fmax ranges of 200 and 500 Hz. Another higher-cutoff AA filter can then be used for Fmax ranges from 1 kHz and higher (with a secondary filter kicking in at 2.56× the highest sampling rate of 128 kHz). Embodiments of the methods and systems disclosed herein may include use of a CPLD as a clock-divider for a delta-sigma A/D to achieve lower sampling rates without the need for digital resampling. In embodiments, a high-frequency crystal reference can be divided down to lower frequencies by employing a CPLD as a programmable clock divider. The accuracy of the divided down lower frequencies is even more accurate than the original source relative to their longer time periods. This also minimizes or removes the need for resampling processing by the delta-sigma A/D.

Embodiments of the methods and systems disclosed herein may include signal processing firmware/hardware. In embodiments, long blocks of data are acquired at high-sampling rate as opposed to multiple sets of data taken at different sampling rates. Typically, in modern route collection for vibration analysis, it is customary to collect data at a fixed sampling rate with a specified data length. The sampling rate and data length may vary from route point to point based on the specific mechanical analysis requirements at hand. For example, a motor may require a relatively low sampling rate with high resolution to distinguish running speed harmonics from line frequency harmonics. The practical trade-off here though is that it takes more collection time to achieve this improved resolution. In contrast, some high-speed compressors or gear sets require much higher sampling rates to measure the amplitudes of relatively higher frequency data although the precise resolution may not be as necessary. Ideally, however, it would be better to collect a very long sample length of data at a very high sampling rate. When digital acquisition devices first started to be popularized in the early 1980's, the A/D sampling, digital storage, and computational abilities were not close to what they are today, so compromises were made between the time required for data collection and the desired resolution and accuracy. It was because of this limitation that some analysts in the field even refused to give up their analog tape recording systems, which did not suffer as much from these same digitizing drawbacks. A few hybrid systems were employed that would digitize the play back of the recorded analog data at multiple sampling rates and lengths desired, though these systems were admittedly less automated. The more common approach, as mentioned earlier, is to balance data collection time with analysis capability and digitally acquire the data blocks at multiple sampling rates and sampling lengths and digitally store these blocks separately. In embodiments, a long data length of data can be collected at the highest practical sampling rate (e.g., 102.4 kHz; corresponding to a 40 kHz Fmax) and stored. This long block of data can be acquired in the same amount of time as the shorter length of the lower sampling rates utilized by a priori methods so that there is no effective delay added to the sampling at the measurement point, always a concern in route collection. In embodiments, analog tape recording of data is digitally simulated with such a precision that it can be in effect considered continuous or "analog" for many purposes, including for purposes of embodiments of the present disclosure, except where context indicates otherwise.

Embodiments of the methods and systems disclosed herein may include storage of calibration data and maintenance history on-board card sets. Many data acquisition devices which rely on interfacing to a PC to function store their calibration coefficients on the PC. This is especially true for complex data acquisition devices whose signal paths are many and therefore whose calibration tables can be quite large. In embodiments, calibration coefficients are stored in flash memory which will remember this data or any other significant information for that matter, for all practical purposes, permanently. This information may include nameplate information such as serial numbers of individual components, firmware or software version numbers, maintenance history and the calibration tables. In embodiments, no matter which computer the box is ultimately connected to, the DAQ box remains calibrated and continues to hold all of this critical information. The PC or external device may poll for this information at any time for implantation or information exchange purposes.

Embodiments of the methods and systems disclosed herein may include rapid route creation taking advantage of hierarchical templates. In the field of vibration monitoring, as well as parametric monitoring in general, it is necessary to establish in a database or functional equivalent the existence of data monitoring points. These points are associated a variety of attributes including the following categories: transducer attributes, data collection settings, machinery parameters and operating parameters. The transducer attributes would include probe type, probe mounting type and probe mounting direction or axis orientation. Data collection attributes associated with the measurement would involve a sampling rate, data length, integrated electronic piezoelectric probe power and coupling requirements, hardware integration requirements, 4-20 or voltage interfacing, range and gain settings (if applicable), filter requirements, and so on. Machinery parametric requirements relative to the specific point would include such items as operating speed, bearing type, bearing parametric data which for a rolling element bearing includes the pitch diameter, number of balls, inner race, and outer-race diameters. For a tilting pad bearing, this would include the number of pads and so on. For measurement points on a piece of equipment such as a gearbox, needed parameters would include, for example, the number of gear teeth on each of the gears. For induction motors, it would include the number of rotor bars and poles; for compressors, the number of blades and/or vanes; for fans, the number of blades. For belt/pulley systems, the number of belts as well as the relevant belt-passing frequencies may be calculated from the dimensions of the pulleys and pulley center-to-center distance. For measurements near couplings, the coupling type and number of teeth in a geared coupling may be necessary, and so on. Operating parametric data would include operating load, which may be expressed in megawatts, flow (either air or fluid), percentage, horsepower, feet-per-minute, and so on. Operating temperatures both ambient and operational, pressures, humidity, and so on, may also be relevant. As can be seen, the setup information required for an individual measurement point can be quite large. It is also crucial to performing any legitimate analysis of the data. Machinery, equipment and bearing specific information is essential for identifying fault frequencies as well as anticipating the various kinds of specific faults to be expected. The transducer attributes as well as data collection parameters are vital for properly interpreting the data along with providing limits for the type of analytical techniques suitable. The traditional means of entering this data has been manual and quite tedious, usually at the lowest hierarchical level (for example, at the bearing level with regards to machinery parameters), and at the transducer level for data collection setup information. It cannot be stressed enough, however, the importance of the hierarchical relationships necessary to organize data both for analytical and interpretive purposes as well as the storage and movement of data. Here, we are focusing primarily on the storage and movement of data. By its nature, the aforementioned setup information is extremely redundant at the level of the lowest hierarchies. However, because of its strong hierarchical nature, it can be stored quite efficiently in that form. In embodiments, hierarchical nature can be utilized when copying data in the form of templates. As an example, hierarchical storage structure suitable for many purposes is defined from general to specific of company, plant or site, unit or process, machine, equipment, shaft element, bearing, and transducer. It is much easier to copy data associated with a particular machine, piece of equipment, shaft element or bearing than it is to copy only at the lowest transducer level. In embodiments, the system not only stores data in this hierarchical fashion, but robustly supports the rapid copying of data using these hierarchical templates. Similarity of elements at specific hierarchical levels lends itself to effective data storage in hierarchical format. For example, so many machines have common elements such as motors, gearboxes, compressors, belts, fans, and so on. More specifically, many motors can be easily classified as induction, DC, fixed or variable speed. Many gearboxes can be grouped into commonly occurring groupings such as input/output, input pinion/intermediate pinion/output pinion, 4-posters, and so on. Within a plant or company, there are many similar types of equipment purchased and standardized on for both cost and maintenance reasons. This results in an enormous overlapping of similar types of equipment and, as a result, offers a great opportunity for taking advantage of a hierarchical template approach.

Embodiments of the methods and systems disclosed herein may include smart bands. Smart bands refer to any processed signal characteristics derived from any dynamic input or group of inputs for the purposes of analyzing the data and achieving the correct diagnoses. Furthermore, smart bands may even include mini or relatively simple diagnoses for the purposes of achieving a more robust and complex one. Historically, in the field of mechanical vibration analysis, Alarm Bands have been used to define spectral frequency bands of interest for the purposes of analyzing and/or trending significant vibration patterns. The Alarm Band typically consists of a spectral (amplitude plotted against frequency) region defined between a low and high frequency border. The amplitude between these borders is summed in the same manner for which an overall amplitude is calculated. A Smart Band is more flexible in that it not only refers to a specific frequency band but can also refer to a group of spectral peaks such as the harmonics of a single peak, a true-peak level or crest factor derived from a time waveform, an overall derived from a vibration envelope spectrum or other specialized signal analysis technique or a logical combination (AND, OR, XOR, etc.) of these signal attributes. In addition, a myriad assortment of other parametric data, including system load, motor voltage and phase information, bearing temperature, flow rates, and the like, can likewise be used as the basis for forming additional smart bands. In embodiments, Smart Band symptoms may be used as building blocks for an expert system whose engine would utilize these inputs to derive diagnoses. Some of these mini-diagnoses may then in turn be used as SmartBand symptoms (smart bands can include even diagnoses) for more generalized diagnoses.

Embodiments of the methods and systems disclosed herein may include a neural net expert system using smart bands. Typical vibration analysis engines are rule-based (i.e. they use a list of expert rules which, when met, trigger specific diagnoses). In contrast, a neural approach utilizes the weighted triggering of multiple input stimuli into smaller analytical engines or neurons which in turn feed a simplified weighted output to other neurons. The output of these neurons can be also classified as smart bands which in turn feed other neurons. This produces a more layered approach to expert diagnosing as opposed to the one-shot approach of a rule-based system. In embodiments, the expert system utilizes this neural approach using smart bands; however, it does not preclude rule-based diagnoses being reclassified as smart bands as further stimuli to be utilized by the expert system. From this point-of-view, it can be overviewed as a hybrid approach, although at the highest level it is essentially neural.

Embodiments of the methods and systems disclosed herein may include use of database hierarchy in analysis. smart band symptoms and diagnoses may be assigned to various hierarchical database levels. For example, a smart band may be called "Looseness" at the bearing level, trigger "Looseness" at the equipment level, and trigger "Looseness" at the machine level. Another example would be having a smart band diagnosis called "Horizontal Plane Phase Flip" across a coupling and generate a smart band diagnosis of "Vertical Coupling Misalignment" at the machine level.

Embodiments of the methods and systems disclosed herein may include expert system GUIs. In embodiments, the system undertakes a graphical approach to defining smart bands and diagnoses for the expert system. The entry of symptoms, rules, or more generally smart bands for creating a particular machine diagnosis, can be tedious and time consuming. One means of making the process more expedient and efficient is to provide a graphical means by use of wiring. The proposed graphical interface consists of four major components: a symptom parts bin, diagnoses bin, tools bin, and graphical wiring area ("GWA"). In embodiments, a symptom parts bin includes various spectral, waveform, envelope and any type of signal processing characteristic or grouping of characteristics such as a spectral peak, spectral harmonic, waveform true-peak, waveform crest-factor, spectral alarm band, and so on. Each part may be assigned additional properties. For example, a spectral peak part may be assigned a frequency or order (multiple) of running speed. Some parts may be pre-defined or user defined such as a 1×, 2×, 3× running speed, 1×, 2×, 3× gear mesh, 1×, 2×, 3× blade pass, number of motor rotor bars× running speed, and so on.

In embodiments, a diagnoses bin includes various pre-defined as well as user-defined diagnoses such as misalignment, imbalance, looseness, bearing faults, and so on. Like parts, diagnoses may also be used as parts for the purposes of building more complex diagnoses. In embodiments, a tools bin includes logical operations such as AND, OR, XOR, etc. or other ways of combining the various parts listed above such as Find Max, Find Min, Interpolate, Average, other Statistical Operations, etc. In embodiments, a graphical wiring area includes parts from the parts bin or diagnoses from the diagnoses bin and may be combined using tools to create diagnoses. The various parts, tools and diagnoses will be represented with icons which are simply graphically wired together in the desired manner. Embodiments of the methods and systems disclosed herein may include an expert system GUIs graphical approach to defining smart bands and diagnoses for the Expert System. The entry of symptoms, rules or more generally smart bands, for creating a particular machine diagnosis, can be tedious and time consuming. One means of making the process more expedient and efficient is to provide a graphical means by use of wiring. In embodiments, a graphical interface may consist of four major components: a symptom parts bin, diagnoses bin, tools bin and graphical wiring area ("GWA"). The symptom parts bin consists of various spectral, waveform, envelope and any type of signal processing characteristic or grouping of characteristics such as a spectral peak, spectral harmonic, waveform true-peak, waveform crest-factor, spectral alarm band, and so on. Each part may be assigned additional properties; for example, a spectral peak part may be assigned a frequency or order (multiple) of running speed. Some parts may be pre-defined or user defined such as a 1×, 2×, 3× running speed, 1×, 2×, 3× gear mesh, 1×, 2×, 3× blade pass, number of motor rotor bars× running speed, and so on. The diagnoses bin consists of various pre-defined as well as user-defined diagnoses such as misalignment, imbalance, looseness, bearing faults, and so on. Like parts, diagnoses may also be used as parts for the purposes of building more complex diagnoses. The tools bin consists of logical operations such as AND, OR, XOR, etc., or other ways of combining the various parts listed above such as find fax, find min, interpolate, average, other statistical operations, etc. A GWA may consist of, in general, parts from the parts bin or diagnoses from the diagnoses bin which are wired together using tools to create diagnoses. The various parts, tools and diagnoses will be represented with icons, which are simply graphically wired together in the desired manor.

Embodiments of the methods and systems disclosed herein may include a graphical approach for back-calculation definition. In embodiments, the expert system also provides the opportunity for the system to learn. If one already knows that a unique set of stimuli or smart bands corresponds to a specific fault or diagnosis, then it is possible to back-calculate a set of coefficients that when applied to a future set of similar stimuli would arrive at the same diagnosis. In embodiments, if there are multiple sets of data a best-fit approach may be used. Unlike the smart band GUI, this embodiment will self-generate a wiring diagram. In embodiments, the user may tailor the back-propagation approach settings and use a database browser to match specific sets of data with the desired diagnoses. In embodiments, the desired diagnoses may be created or custom tailored with a smart band GUI. In embodiments, after that, a user may press the GENERATE button and a dynamic wiring of the symptom-to-diagnosis may appear on the screen as it works through the algorithms to achieve the best fit. In embodiments, when complete, a variety of statistics are presented which detail how well the mapping process proceeded. In some cases, no mapping may be achieved if, for example, the input data was all zero or the wrong data (mistakenly assigned) and so on. Embodiments of the methods and systems disclosed herein may include bearing analysis methods. In embodiments, bearing analysis methods may be used in conjunction with a computer aided design ("CAD"), predictive deconvolution, minimum variance distortionless response ("MVDR") and spectrum sum-of-harmonics.

Embodiments of the methods and systems disclosed herein may include torsional vibration detection and analysis utilizing transitory signal analysis. There has been a marked trend in recent times regarding the prevalence of variable speed machinery. Due primarily to the decrease in cost of motor speed control systems, as well as the increased cost and consciousness of energy-usage, it has become more economically justifiable to take advantage of the potentially vast energy savings of load control. Unfortunately, one frequently overlooked design aspect of this issue is that of vibration. When a machine is designed to run at only one speed, it is far easier to design the physical structure accordingly so as to avoid mechanical resonances both structural and torsional, each of which can dramatically shorten the mechanical health of a machine. This would include such structural characteristics as the types of materials to use, their weight, stiffening member requirements and placement, bearing types, bearing location, base support constraints, etc. Even with machines running at one speed, designing a structure so as to minimize vibration can prove a daunting task, potentially requiring computer modeling, finite-element analysis, and field testing. By throwing variable speeds into the mix, in many cases, it becomes impossible to design for all desirable speeds. The problem then becomes one of minimization, e.g., by speed avoidance. This is why many modern motor controllers are typically programmed to skip or quickly pass through specific speed ranges or bands. Embodiments may include identifying speed ranges in a vibration monitoring system. Non-torsional, structural resonances are typically fairly easy to detect using conventional vibration analysis techniques. However, this is not the case for torsion. One special area of current interest is the increased incidence of torsional resonance problems, apparently due to the increased torsional stresses of speed change as well as the operation of equipment at torsional resonance speeds. Unlike non-torsional structural resonances which generally manifest their effect with dramatically increased casing or external vibration, torsional resonances generally show no such effect. In the case of a shaft torsional resonance, the twisting motion induced by the resonance may only be discernible by looking for speed and/or phase changes. The current standard methodology for analyzing torsional vibration involves the use of specialized instrumentation. Methods and systems disclosed herein allow analysis of torsional vibration without such specialized instrumentation. This may consist of shutting the machine down and employing the use of strain gauges and/or other special fixturing such as speed encoder plates and/or gears. Friction wheels are another alternative but they typically require manual implementation and a specialized analyst. In general, these techniques can be prohibitively expensive and/or inconvenient. An increasing prevalence of continuous vibration monitoring systems due to decreasing costs and increasing convenience (e.g., remote access) exists. In embodiments, there is an ability to discern torsional speed and/or phase variations with just the vibration signal. In embodiments, transient analysis techniques may be utilized to distinguish torsionally induced vibrations from mere speed changes due to process control. In embodiments, factors for discernment might focus on one or more of the following aspects: the rate of speed change due to variable speed motor control would be relatively slow, sustained and deliberate; torsional speed changes would tend to be short, impulsive and not sustained; torsional speed changes would tend to be oscillatory, most likely decaying exponentially, process speed changes would not; and smaller speed changes associated with torsion relative to the shaft's rotational speed which suggest that monitoring phase behavior would show the quick or transient speed bursts in contrast to the slow phase changes historically associated with ramping a machine's speed up or down (as typified with Bode or Nyquist plots).

Embodiments of the methods and systems disclosed herein may include improved integration using both analog and digital methods. When a signal is digitally integrated using software, essentially the spectral low-end frequency data has its amplitude multiplied by a function which quickly blows up as it approaches zero and creates what is known in the industry as a "ski-slope" effect. The amplitude of the ski-slope is essentially the noise floor of the instrument. The simple remedy for this is the traditional hardware integrator, which can perform at signal-to-noise ratios much greater than that of an already digitized signal. It can also limit the amplification factor to a reasonable level so that multiplication by very large numbers is essentially prohibited. However, at high frequencies where the frequency becomes large, the original amplitude which may be well above the noise floor is multiplied by a very small number (1/f) that plunges it well below the noise floor. The hardware integrator has a fixed noise floor that although low floor does not scale down with the now lower amplitude high-frequency data. In contrast, the same digital multiplication of a digitized high-frequency signal also scales down the noise floor proportionally. In embodiments, hardware integration may be used below the point of unity gain where (at a value usually determined by units and/or desired signal to noise ratio based on gain) and software integration may be used above the value of unity gain to produce an ideal result. In embodiments, this integration is performed in the frequency domain. In embodiments, the resulting hybrid data can then be transformed back into a waveform which should be far superior in signal-to-noise ratio when compared to either hardware integrated or software integrated data. In embodiments, the strengths of hardware integration are used in conjunction with those of digital software integration to achieve the maximum signal-to-noise ratio. In embodiments, the first order gradual hardware integrator high pass filter along with curve fitting allow some relatively low frequency data to get through while reducing or eliminating the noise, allowing very useful analytical data that steep filters kill to be salvaged.

Embodiments of the methods and systems disclosed herein may include adaptive scheduling techniques for continuous monitoring. Continuous monitoring is often performed with an up-front Mux whose purpose it is to select a few channels of data among many to feed the hardware signal processing, A/D, and processing components of a DAQ system. This is done primarily out of practical cost considerations. The tradeoff is that all of the points are not monitored continuously (although they may be monitored to a lesser extent via alternative hardware methods). In embodiments, multiple scheduling levels are provided. In embodiments, at the lowest level, which is continuous for the most part, all of the measurement points will be cycled through in round-robin fashion. For example, if it takes 30 seconds to acquire and process a measurement point and there are 30 points, then each point is serviced once every 15 minutes. However, if a point should alarm by whatever criteria the user selects, its priority level can be increased so that it is serviced more often. As there can be multiple grades of severity for each alarm, so can there me multiple levels of priority with regards to monitoring. In embodiments, more severe alarms will be monitored more frequently. In embodiments, a number of additional high-level signal processing techniques can be applied at less frequent intervals. Embodiments may take advantage of the increased processing power of a PC and the PC can temporarily suspend the round-robin route collection (with its multiple tiers of collection) process and stream the required amount of data for a point of its choosing. Embodiments may include various advanced processing techniques such as envelope processing, wavelet analysis, as well as many other signal processing techniques. In embodiments, after acquisition of this data, the DAQ card set will continue with its route at the point it was interrupted. In embodiments, various PC scheduled data acquisitions will follow their own schedules which will be less frequency than the DAQ card route. They may be set up hourly, daily, by number of route cycles (for example, once every 10 cycles) and also increased scheduling-wise based on their alarm severity priority or type of measurement (e.g., motors may be monitored differently than fans.

Embodiments of the methods and systems disclosed herein may include data acquisition parking features. In embodiments, a data acquisition box used for route collection, real time analysis and in general as an acquisition instrument can be detached from its PC (tablet or otherwise) and powered by an external power supply or suitable battery. In embodiments, the data collector still retains continuous monitoring capability and its on-board firmware can implement dedicated monitoring functions for an extended period of time or can be controlled remotely for further analysis. Embodiments of the methods and systems disclosed herein may include extended statistical capabilities for continuous monitoring.

Embodiments of the methods and systems disclosed herein may include ambient sensing plus local sensing plus vibration for analysis. In embodiments, ambient environmental temperature and pressure, sensed temperature and pressure may be combined with long/medium term vibration analysis for prediction of any of a range of conditions or characteristics. Variants may add infrared sensing, infrared thermography, ultrasound, and many other types of sensors and input types in combination with vibration or with each other. Embodiments of the methods and systems disclosed herein may include a smart route. In embodiments, the continuous monitoring system's software will adapt/adjust the data collection sequence based on statistics, analytics, data alarms and dynamic analysis. Typically, the route is set based on the channels the sensors are attached to. In embodiments, with the crosspoint switch, the Mux can combine any input Mux channels to the (e.g., eight) output channels. In embodiments, as channels go into alarm or the system identifies key deviations, it will pause the normal route set in the software to gather specific simultaneous data, from the channels sharing key statistical changes, for more advanced analysis. Embodiments include conducting a smart ODS or smart transfer function.

Embodiments of the methods and systems disclosed herein may include smart ODS and one or more transfer functions. In embodiments, due to a system's multiplexer and crosspoint switch, an ODS, a transfer function, or other special tests on all the vibration sensors attached to a machine/structure can be performed and show exactly how the machine's points are moving in relationship to each other. In embodiments, 40-50 kHz and longer data lengths (e.g., at least one minute) may be streamed, which may reveal different information than what a normal ODS or transfer function will show. In embodiments, the system will be able to determine, based on the data/statistics/analytics to use, the smart route feature that breaks from the standard route and conducts an ODS across a machine, structure or multiple machines and structures that might show a correlation because the conditions/data directs it. In embodiments, for the transfer functions there may be an impact hammer used on one channel and compared against other vibration sensors on the machine. In embodiments, the system may use the condition changes such as load, speed, temperature or other changes in the machine or system to conduct the transfer function. In embodiments, different transfer functions may be compared to each other over time. In embodiments, difference transfer functions may be strung together like a movie that may show how the machinery fault changes, such as a bearing that could show how it moves through the four stages of bearing failure and so on. Embodiments of the methods and systems disclosed herein may include a hierarchical Mux. In embodiments, a hierarchical Mux may allow modularly output of more channels, such as 16, 24 or more to multiple of eight channel card sets, which would allow gathering more simultaneous channels of data for more complex analysis and faster data collection. Methods and systems are disclosed herein for continuous ultrasonic monitoring, including providing continuous ultrasonic monitoring of rotating elements and bearings of an energy production facility.

Figure 8:
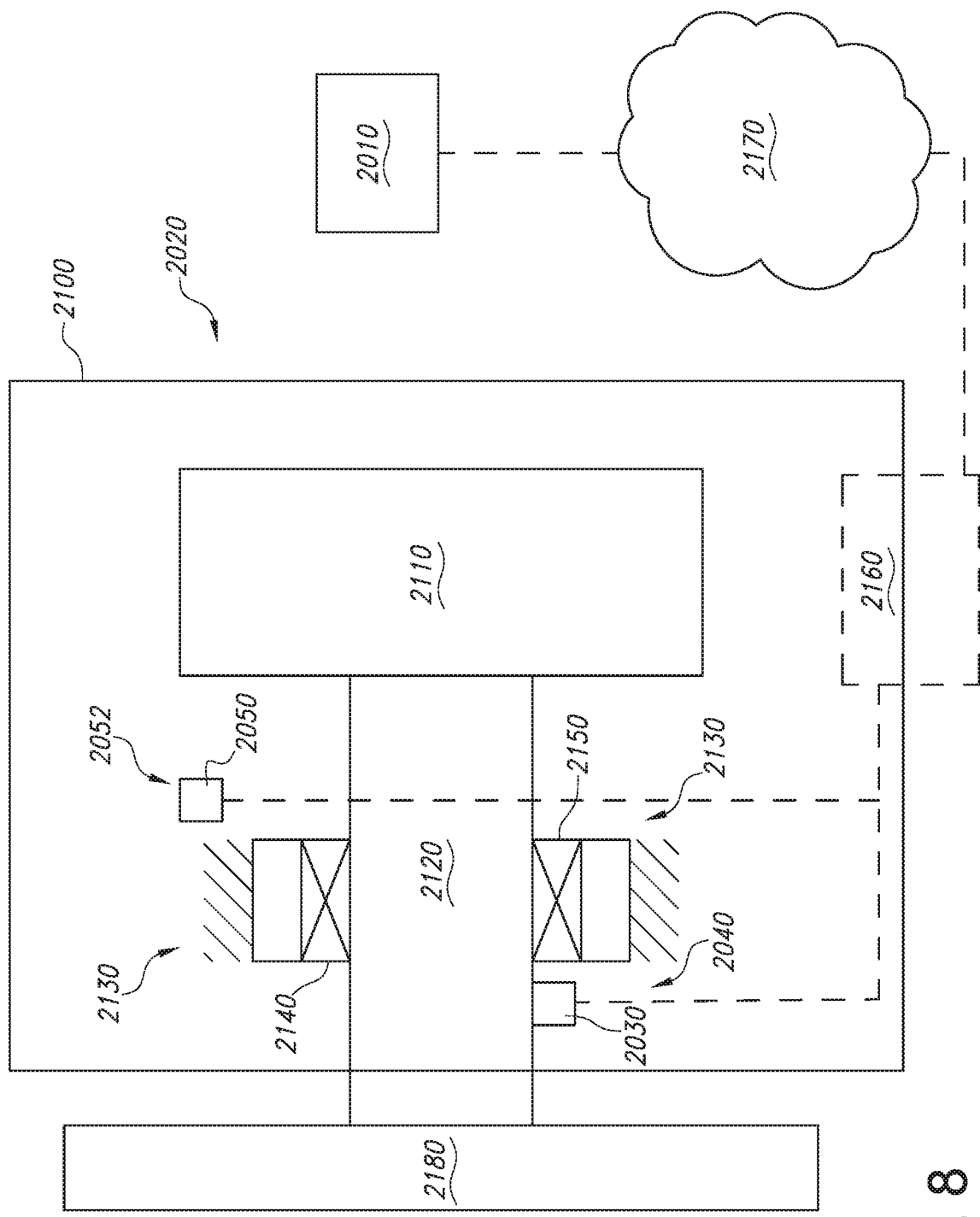
FIG. 8 is a diagrammatic view of a rotating or oscillating machine having a data acquisition module that is configured to collect waveform data in accordance with the present disclosure.

With reference to FIG. 8, the present disclosure generally includes digitally collecting or streaming waveform data 2010 from a machine 2020 whose operational speed can vary from relatively slow rotational or oscillational speeds to much higher speeds in different situations. The waveform data 2010, at least on one machine, may include data from a single axis sensor 2030 mounted at an unchanging reference location 2040 and from a three-axis sensor 2050 mounted at changing locations (or located at multiple locations), including location 2052. In embodiments, the waveform data 2010 can be vibration data obtained simultaneously from each sensor 2030, 2050 in a gap-free format for a duration of multiple minutes with maximum resolvable frequencies sufficiently large to capture periodic and transient impact events. By way of this example, the waveform data 2010 can include vibration data that can be used to create an operational deflecting shape. It can also be used, as needed, to diagnose vibrations from which a machine repair solution can be prescribed.

In embodiments, the machine 2020 can further include a housing 2100 that can contain a drive motor 2110 that can drive a shaft 2120. The shaft 2120 can be supported for rotation or oscillation by a set of bearings 2130, such as including a first bearing 2140 and a second bearing 2150. A data collection module 2160 can connect to (or be resident on) the machine 2020. In one example, the data collection module 2160 can be located and accessible through a cloud network facility 2170, can collect the waveform data 2010 from the machine 2020, and deliver the waveform data 2010 to a remote location. A working end 2180 of the drive shaft 2120 of the machine 2020 can drive a windmill, a fan, a pump, a drill, a gear system, a drive system, or other working element, as the techniques described herein can apply to a wide range of machines, equipment, tools, or the like that include rotating or oscillating elements. In other instances, a generator can be substituted for the motor 2110, and the working end of the drive shaft 2120 can direct rotational energy to the generator to generate power, rather than consume it.

In embodiments, the waveform data 2010 can be obtained using a predetermined route format based on the layout of the machine 2020. The waveform data 2010 may include data from the single axis sensor 2030 and the three-axis sensor 2050. The single-axis sensor 2030 can serve as a reference probe with its one channel of data and can be fixed at the unchanging location 2040 on the machine under survey. The three-axis sensor 2050 can serve as a tri-axial probe (e.g., three orthogonal axes) with its three channels of data and can be moved along a predetermined diagnostic route format from one test point to the next test point. In one example, both sensors 2030, 2050 can be mounted manually to the machine 2020 and can connect to a separate portable computer in certain service examples. The reference probe can remain at one location while the user can move the tri-axial vibration probe along the predetermined route, such as from bearing-to-bearing on a machine. In this example, the user is instructed to locate the sensors at the predetermined locations to complete the survey (or portion thereof) of the machine.

Figure 9:
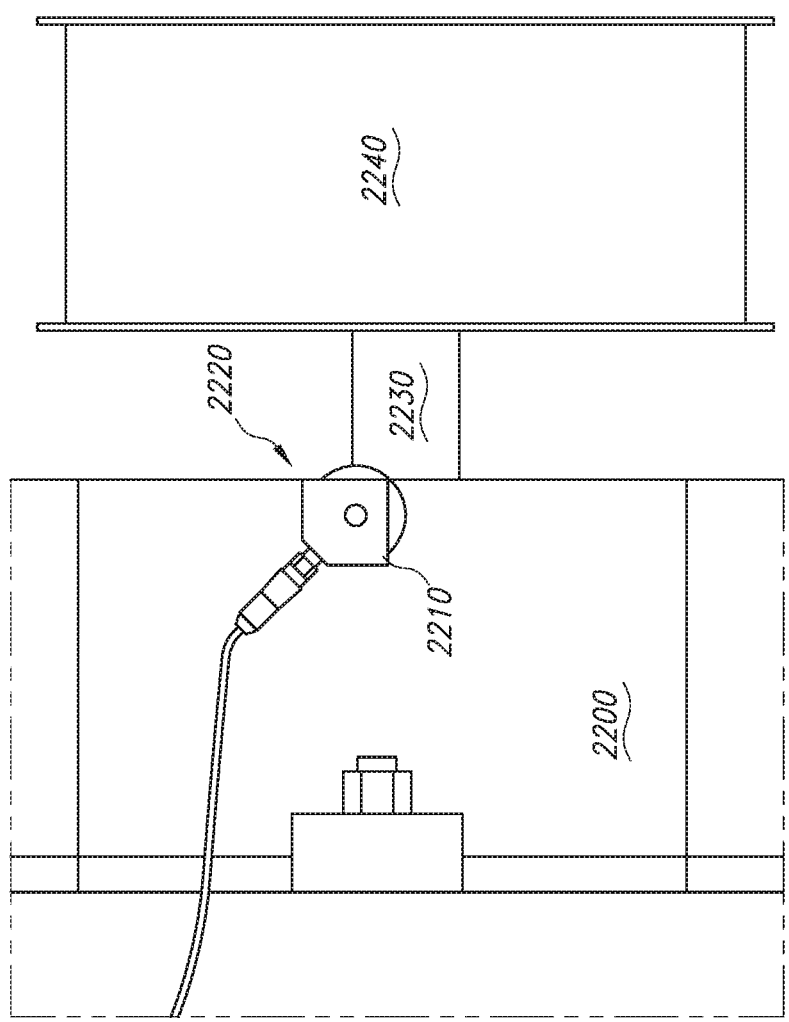
FIG. 9 is a diagrammatic view of an exemplary tri-axial sensor mounted to a motor bearing of an exemplary rotating machine in accordance with the present disclosure.
Figure 10:
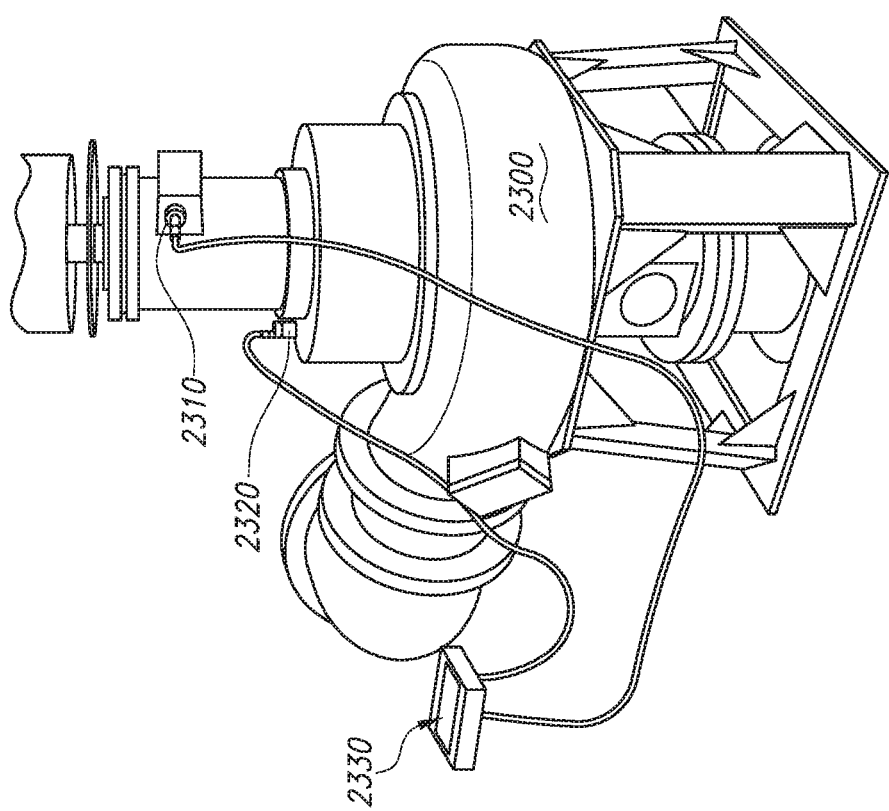
FIG. 10 and FIG. 11 are diagrammatic views of an exemplary tri-axial sensor and a single-axis sensor mounted to an exemplary rotating machine in accordance with the present disclosure.
Figure 11:
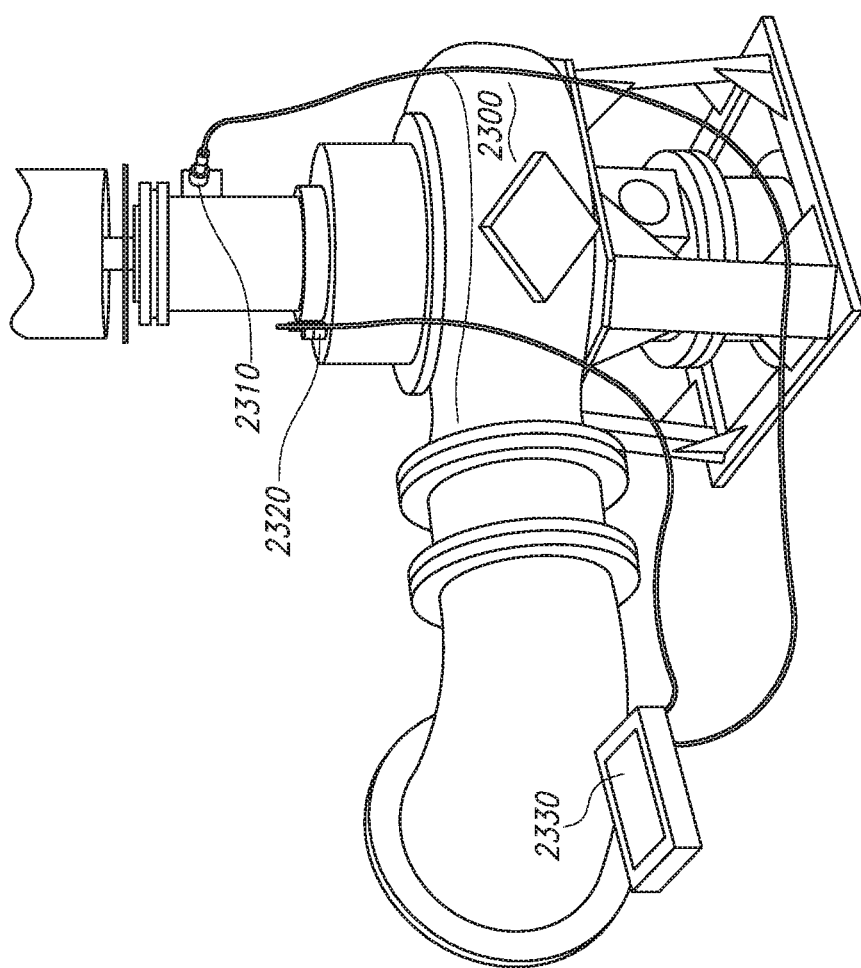

With reference to FIG. 9, a portion of an exemplary machine 2200 is shown having a tri-axial sensor 2210 mounted to a location 2220 associated with a motor bearing of the machine 2200 with an output shaft 2230 and output member 2240 in accordance with the present disclosure. With reference to FIG. 9 and FIG. 10, an exemplary machine 2300 is shown having a tri-axial sensor 2310 and a single-axis vibration sensor 2320 serving as the reference sensor that is attached on the machine 2300 at an unchanging location for the duration of the vibration survey in accordance with the present disclosure. The tri-axial sensor 2310 and the single-axis vibration sensor 2320 can be connected to a data collection system 2330

In further examples, the sensors and data acquisition modules and equipment can be integral to, or resident on, the rotating machine. By way of these examples, the machine can contain many single axis sensors and many tri-axial sensors at predetermined locations. The sensors can be originally installed equipment and provided by the original equipment manufacturer or installed at a different time in a retrofit application. The data collection module 2160, or the like, can select and use one single axis sensor and obtain data from it exclusively during the collection of waveform data 2010 while moving to each of the tri-axial sensors. The data collection module 2160 can be resident on the machine 2020 and/or connect via the cloud network facility 2170

With reference to FIG. 8, the various embodiments include collecting the waveform data 2010 by digitally recording locally, or streaming over, the cloud network facility 2170. The waveform data 2010 can be collected so as to be gap-free with no interruptions and, in some respects, can be similar to an analog recording of waveform data. The waveform data 2010 from all of the channels can be collected for one to two minutes depending on the rotating or oscillating speed of the machine being monitored. In embodiments, the data sampling rate can be at a relatively high sampling rate relative to the operating frequency of the machine 2020.

In embodiments, a second reference sensor can be used, and a fifth channel of data can be collected. As such, the single-axis sensor can be the first channel and tri-axial vibration can occupy the second, the third, and the fourth data channels. This second reference sensor, like the first, can be a single axis sensor, such as an accelerometer. In embodiments, the second reference sensor, like the first reference sensor, can remain in the same location on the machine for the entire vibration survey on that machine. The location of the first reference sensor (i.e., the single axis sensor) may be different than the location of the second reference sensors (i.e., another single axis sensor). In certain examples, the second reference sensor can be used when the machine has two shafts with different operating speeds, with the two reference sensors being located on the two different shafts. In accordance with this example, further single-axis reference sensors can be employed at additional but different unchanging locations associated with the rotating machine.

In embodiments, the waveform data can be transmitted electronically in a gap-free free format at a significantly high rate of sampling for a relatively longer period of time. In one example, the period of time is 60 seconds to 120 seconds. In another example, the rate of sampling is 100 kHz with a maximum resolvable frequency (Fmax) of 40 kHz. It will be appreciated in light of this disclosure that the waveform data can be shown to approximate more closely some of the wealth of data available from previous instances of analog recording of waveform data.

In embodiments, sampling, band selection, and filtering techniques can permit one or more portions of a long stream of data (i.e., one to two minutes in duration) to be under sampled or over sampled to realize varying effective sampling rates. To this end, interpolation and decimation can be used to further realize varying effective sampling rates. For example, oversampling may be applied to frequency bands that are proximal to rotational or oscillational operating speeds of the sampled machine, or to harmonics thereof, as vibration effects may tend to be more pronounced at those frequencies across the operating range of the machine. In embodiments, the digitally-sampled data set can be decimated to produce a lower sampling rate. It will be appreciated in light of the disclosure that decimate in this context can be the opposite of interpolate. In embodiments, decimating the data set can include first applying a low-pass filter to the digitally-sampled data set and then undersampling the data set.

In one example, a sample waveform at 100 Hz can be undersampled at every tenth point of the digital waveform to produce an effective sampling rate of 10 Hz, but the remaining nine points of that portion of the waveform are effectively discarded and not included in the modeling of the sample waveform. Moreover, this type of bare undersampling can create ghost frequencies due to the undersampling rate (i.e., 10 Hz) relative to the 100 Hz sample waveform.

Most hardware for analog to digital conversions use a sample-and-hold circuit that can charge up a capacitor for a given amount of time such that an average value of the waveform is determined over a specific change in time. It will be appreciated in light of the disclosure that the value of the waveform over the specific change in time in not linear but more similar to a cardinal sinusoidal function; and, therefore, it can be shown that more emphasis can be placed on the waveform data at the center of the sampling interval with exponential decay of the cardinal sinusoidal signal occurring from its center.

By way of the above example, the sample waveform at 100 Hz can be hardware-sampled at 10 Hz and therefore each sampling point is averaged over 100 milliseconds (e.g., a signal sampled at 100 Hz can have each point averaged over 10 milliseconds). In contrast to the effective discarding of nine out of the ten data points of the sampled waveform as discussed above, the present disclosure can include weighing adjacent data. The adjacent data can include refers to the sample points that were previously discarded and the one remaining point that was retained. In one example, a low pass filter can average the adjacent sample data linearly, i.e., determining the sum of every ten points and then dividing that sum by ten. In a further example, the adjacent data can be weighted with a sin c function. The process of weighting the original waveform with the sin c function can be referred to as an impulse function, or can be referred to in the time domain as a convolution.

The present disclosure can be applicable to not only digitizing a waveform signal based on a detected voltage, but can also be applicable to digitizing waveform signals based on current waveforms, vibration waveforms, and image processing signals including video signal rasterization. In one example, the resizing of a window on a computer screen can be decimated, albeit in at least two directions. In these further examples, it will be appreciated that undersampling by itself can be shown to be insufficient. To that end, oversampling or upsampling by itself can similarly be shown to be insufficient, such that interpolation can be used like decimation but in lieu of only undersampling by itself.

It will be appreciated in light of the disclosure that interpolation in this context can refer to first applying a low pass filter to the digitally-sampled waveform data and then upsampling the waveform data. It will be appreciated in light of the disclosure that real-world examples can often require the use of use non-integer factors for decimation or interpolation, or both. To that end, the present disclosure includes interpolating and decimating sequentially in order to realize a non-integer factor rate for interpolating and decimating. In one example, interpolating and decimating sequentially can define applying a low-pass filter to the sample waveform, then interpolating the waveform after the low-pass filter, and then decimating the waveform after the interpolation. In embodiments, the vibration data can be looped to purposely emulate conventional tape recorder loops, with digital filtering techniques used with the effective splice to facilitate longer analyses. It will be appreciated in light of the disclosure that the above techniques do not preclude waveform, spectrum, and other types of analyses to be processed and displayed with a GUI of the user at the time of collection. It will be appreciated in light of the disclosure that newer systems can permit this functionality to be performed in parallel to the high-performance collection of the raw waveform data.

With respect to time of collection issues, it will be appreciated that older systems using the compromised approach of improving data resolution, by collecting at different sampling rates and data lengths, do not in fact save as much time as expected. To that end, every time the data acquisition hardware is stopped and started, latency issues can be created, especially when there is hardware auto-scaling performed. The same can be true with respect to data retrieval of the route information (i.e., test locations) that is often in a database format and can be exceedingly slow. The storage of the raw data in bursts to disk (whether solid state or otherwise) can also be undesirably slow.

In contrast, the many embodiments include digitally streaming the waveform data 2010, as disclosed herein and also enjoying the benefit of needing to load the route parameter information while setting the data acquisition hardware only once. Because the waveform data 2010 is streamed to only one file, there is no need to open and close files, or switch between loading and writing operations with the storage medium. It can be shown that the collection and storage of the waveform data 2010, as described herein, can be shown to produce relatively more meaningful data in significantly less time than the traditional batch data acquisition approach. An example of this includes an electric motor about which waveform data can be collected with a data length of 4K points (i.e., 4,096) for sufficiently high resolution in order to, among other things, distinguish electrical sideband frequencies. For fans or blowers, a reduced resolution of 1K (i.e., 1,024) can be used. In certain instances, 1K can be the minimum waveform data length requirement. The sampling rate can be 1,280 Hz and that equates to an Fmax of 500 Hz. It will be appreciated in light of the disclosure that oversampling by an industry standard factor of 2.56 can satisfy the necessary two-times (2×) oversampling for the Nyquist Criterion with some additional leeway that can accommodate anti-aliasing filter-rolloff. The time to acquire this waveform data would be 1,024 points at 1,280 hertz, which are 800 milliseconds.

To improve accuracy, the waveform data can be averaged. Eight averages can be used with, for example, fifty percent overlap. This would extend the time from 800 milliseconds to 3.6 seconds, which is equal to 800 msec×8 averages×0.5 (overlap ratio)+0.5×800 msec (non-overlapped head and tail ends). After collection at Fmax=500 Hz waveform data, a higher sampling rate can be used. In one example, ten times (10×) the previous sampling rate can be used and Fmax=10 kHz. By way of this example, eight averages can be used with fifty percent (50%) overlap to collect waveform data at this higher rate that can amount to a collection time of 360 msec or 0.36 seconds. It will be appreciated in light of the disclosure that it can be necessary to read the hardware collection parameters for the higher sampling rate from the route list, as well as permit hardware auto-scaling, or the resetting of other necessary hardware collection parameters, or both. To that end, a few seconds of latency can be added to accommodate the changes in sampling rate. In other instances, introducing latency can accommodate hardware autoscaling and changes to hardware collection parameters that can be required when using the lower sampling rate disclosed herein. In addition to accommodating the change in sampling rate, additional time is needed for reading the route point information from the database (i.e., where to monitor and where to monitor next), displaying the route information, and processing the waveform data. Moreover, display of the waveform data and/or associated spectra can also consume significant time. In light of the above, 15 seconds to 20 seconds can elapse while obtaining waveform data at each measurement point.

In further examples, additional sampling rates can be added but this can make the total amount time for the vibration survey even longer because time adds up from changeover time from one sampling rate to another and from the time to obtain additional data at different sampling rate. In one example, a lower sampling rate is used, such as a sampling rate of 128 Hz where Fmax=50 Hz. By way of this example, the vibration survey would therefore require an additional 36 seconds for the first set of averaged data at this sampling rate, in addition to others mentioned above, and consequently the total time spent at each measurement point increases even more dramatically. Further embodiments include using similar digital streaming of gap free waveform data as disclosed herein for use with wind turbines and other machines that can have relatively slow speed rotating or oscillating systems. In many examples, the waveform data collected can include long samples of data at a relatively high sampling rate. In one example, the sampling rate can be 100 kHz and the sampling duration can be for two minutes on all of the channels being recorded. In many examples, one channel can be for the single axis reference sensor and three more data channels can be for the tri-axial three channel sensor. It will be appreciated in light of the disclosure that the long data length can be shown to facilitate detection of extremely low frequency phenomena. The long data length can also be shown to accommodate the inherent speed variability in wind turbine operations. Additionally, the long data length can further be shown to provide the opportunity for using numerous averages such as those discussed herein, to achieve very high spectral resolution, and to make feasible tape loops for certain spectral analyses. Many multiple advanced analytical techniques can now become available because such techniques can use the available long uninterrupted length of waveform data in accordance with the present disclosure.

It will also be appreciated in light of the disclosure that the simultaneous collection of waveform data from multiple channels can facilitate performing transfer functions between multiple channels. Moreover, the simultaneous collection of waveform data from multiple channels facilitates establishing phase relationships across the machine so that more sophisticated correlations can be utilized by relying on the fact that the waveforms from each of the channels are collected simultaneously. In other examples, more channels in the data collection can be used to reduce the time it takes to complete the overall vibration survey by allowing for simultaneous acquisition of waveform data from multiple sensors that otherwise would have to be acquired, in a subsequent fashion, moving sensor to sensor in the vibration survey.

The present disclosure includes the use of at least one of the single-axis reference probe on one of the channels to allow for acquisition of relative phase comparisons between channels. The reference probe can be an accelerometer or other type of transducer that is not moved and, therefore, fixed at an unchanging location during the vibration survey of one machine. Multiple reference probes can each be deployed as at suitable locations fixed in place (i.e., at unchanging locations) throughout the acquisition of vibration data during the vibration survey. In certain examples, up to seven reference probes can be deployed depending on the capacity of the data collection module 2160 or the like. Using transfer functions or similar techniques, the relative phases of all channels may be compared with one another at all selected frequencies. By keeping the one or more reference probes fixed at their unchanging locations while moving or monitoring the other tri-axial vibration sensors, it can be shown that the entire machine can be mapped with regard to amplitude and relative phase. This can be shown to be true even when there are more measurement points than channels of data collection. With this information, an operating deflection shape can be created that can show dynamic movements of the machine in 3D, which can provide an invaluable diagnostic tool. In embodiments, the one or more reference probes can provide relative phase, rather than absolute phase. It will be appreciated in light of the disclosure that relative phase may not be as valuable absolute phase for some purposes, but the relative phase the information can still be shown to be very useful.

In embodiments, the sampling rates used during the vibration survey can be digitally synchronized to predetermined operational frequencies that can relate to pertinent parameters of the machine such as rotating or oscillating speed. Doing this, can permit extracting even more information using synchronized averaging techniques. It will be appreciated in light of the disclosure that this can be done without the use of a key phasor or a reference pulse from a rotating shaft, which is usually not available for route collected data. As such, non-synchronous signals can be removed from a complex signal without the need to deploy synchronous averaging using the key phasor. This can be shown to be very powerful when analyzing a particular pinon in a gearbox or generally applied to any component within a complicated mechanical mechanism. In many instances, the key phasor or the reference pulse is rarely available with route collected data, but the techniques disclosed herein can overcome this absence. In embodiments, there can be multiple shafts running at different speeds within the machine being analyzed. In certain instances, there can be a single-axis reference probe for each shaft. In other instances, it is possible to relate the phase of one shaft to another shaft using only one single axis reference probe on one shaft at its unchanging location. In embodiments, variable speed equipment can be more readily analyzed with relatively longer duration of data relative to single speed equipment. The vibration survey can be conducted at several machine speeds within the same contiguous set of vibration data using the same techniques disclosed herein. These techniques can also permit the study of the change of the relationship between vibration and the change of the rate of speed that was not available before.

In embodiments, there are numerous analytical techniques that can emerge from because raw waveform data can be captured in a gap-free digital format as disclosed herein. The gap-free digital format can facilitate many paths to analyze the waveform data in many ways after the fact to identify specific problems. The vibration data collected in accordance with the techniques disclosed herein can provide the analysis of transient, semi-periodic and very low frequency phenomena. The waveform data acquired in accordance with the present disclosure can contain relatively longer streams of raw gap-free waveform data that can be conveniently played back as needed, and on which many and varied sophisticated analytical techniques can be performed. A large number of such techniques can provide for various forms of filtering to extract low amplitude modulations from transient impact data that can be included in the relatively longer stream of raw gap-free waveform data. It will be appreciated in light of the disclosure that in past data collection practices, these types of phenomena were typically lost by the averaging process of the spectral processing algorithms because the goal of the previous data acquisition module was purely periodic signals; or these phenomena were lost to file size reduction methodologies due to the fact that much of the content from an original raw signal was typically discarded knowing it would not be used.

In embodiments, there is a method of monitoring vibration of a machine having at least one shaft supported by a set of bearings. The method includes monitoring a first data channel assigned to a single-axis sensor at an unchanging location associated with the machine. The method also includes monitoring a second, third, and fourth data channel assigned to a three-axis sensor. The method further includes recording gap-free digital waveform data simultaneously from all of the data channels while the machine is in operation; and determining a change in relative phase based on the digital waveform data. The method also includes the tri-axial sensor being located at a plurality of positions associated with the machine while obtaining the digital waveform. In embodiments, the second, third, and fourth channels are assigned together to a sequence of tri-axial sensors each located at different positions associated with the machine. In embodiments, the data is received from all of the sensors on all of their channels simultaneously.

The method also includes determining an operating deflection shape based on the change in relative phase information and the waveform data. In embodiments, the unchanging location of the reference sensor is a position associated with a shaft of the machine. In embodiments, the tri-axial sensors in the sequence of the tri-axial sensors are each located at different positions and are each associated with different bearings in the machine. In embodiments, the unchanging location is a position associated with a shaft of the machine and, wherein, the tri-axial sensors in the sequence of the tri-axial sensors are each located at different positions and are each associated with different bearings that support the shaft in the machine. The various embodiments include methods of sequentially monitoring vibration or similar process parameters and signals of a rotating or oscillating machine or analogous process machinery from a number of channels simultaneously, which can be known as an ensemble. In various examples, the ensemble can include one to eight channels. In further examples, an ensemble can represent a logical measurement grouping on the equipment being monitored whether those measurement locations are temporary for measurement, supplied by the original equipment manufacturer, retrofit at a later date, or one or more combinations thereof.

In one example, an ensemble can monitor bearing vibration in a single direction. In a further example, an ensemble can monitor three different directions (e.g., orthogonal directions) using a tri-axial sensor. In yet further examples, an ensemble can monitor four or more channels where the first channel can monitor a single axis vibration sensor, and the second, the third, and the fourth channels can monitor each of the three directions of the tri-axial sensor. In other examples, the ensemble can be fixed to a group of adjacent bearings on the same piece of equipment or an associated shaft. The various embodiments provide methods that include strategies for collecting waveform data from various ensembles deployed in vibration studies or the like in a relatively more efficient manner. The methods also include simultaneously monitoring of a reference channel assigned to an unchanging reference location associated with the ensemble monitoring the machine. The cooperation with the reference channel can be shown to support a more complete correlation of the collected waveforms from the ensembles. The reference sensor on the reference channel can be a single axis vibration sensor, or a phase reference sensor that can be triggered by a reference location on a rotating shaft or the like. As disclosed herein, the methods can further include recording gap-free digital waveform data simultaneously from all of the channels of each ensemble at a relatively high rate of sampling so as to include all frequencies deemed necessary for the proper analysis of the machinery being monitored while it is in operation. The data from the ensembles can be streamed gap-free to a storage medium for subsequent processing that can be connected to a cloud network facility, a local data link, Bluetooth connectivity, cellular data connectivity, or the like.

In embodiments, the methods disclosed herein include strategies for collecting data from the various ensembles including digital signal processing techniques that can be subsequently applied to data from the ensembles to emphasize or better isolate specific frequencies or waveform phenomena. This can be in contrast with current methods that collect multiple sets of data at different sampling rates, or with different hardware filtering configurations including integration, that provide relatively less post-processing flexibility because of the commitment to these same (known as a priori hardware configurations). These same hardware configurations can also be shown to increase time of the vibration survey due to the latency delays associated with configuring the hardware for each independent test. In embodiments, the methods for collecting data from various ensembles include data marker technology that can be used for classifying sections of streamed data as homogenous and belonging to a specific ensemble. In one example, a classification can be defined as operating speed. In doing so, a multitude of ensembles can be created from what conventional systems would collect as only one. The many embodiments include post-processing analytic techniques for comparing the relative phases of all the frequencies of interest not only between each channel of the collected ensemble but also between all of the channels of all of the ensembles being monitored, when applicable.

Figure 12:
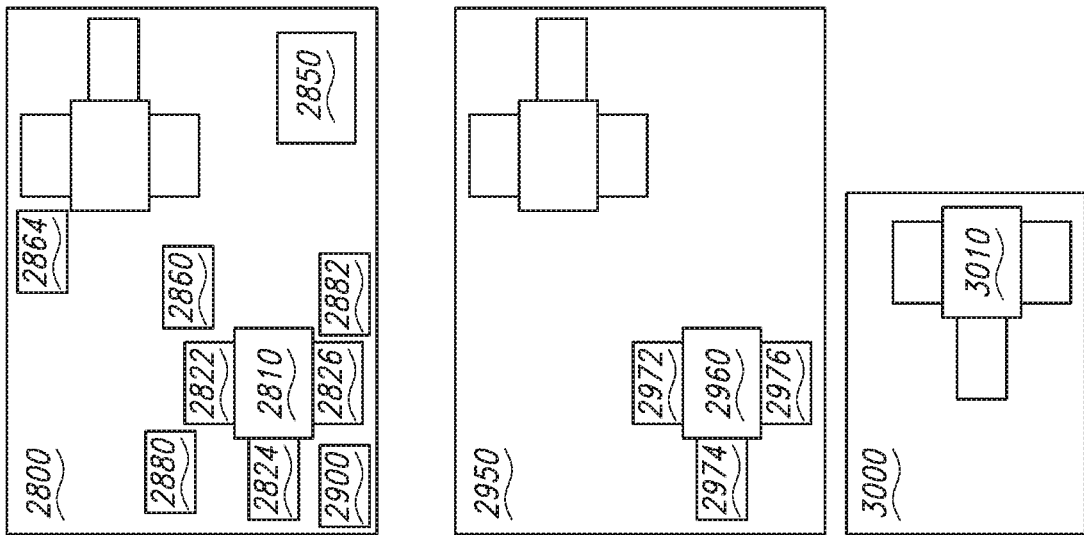
FIG. 12 is a diagrammatic view of a multiple machines under survey with ensembles of sensors in accordance with the present disclosure.
Figure 12:
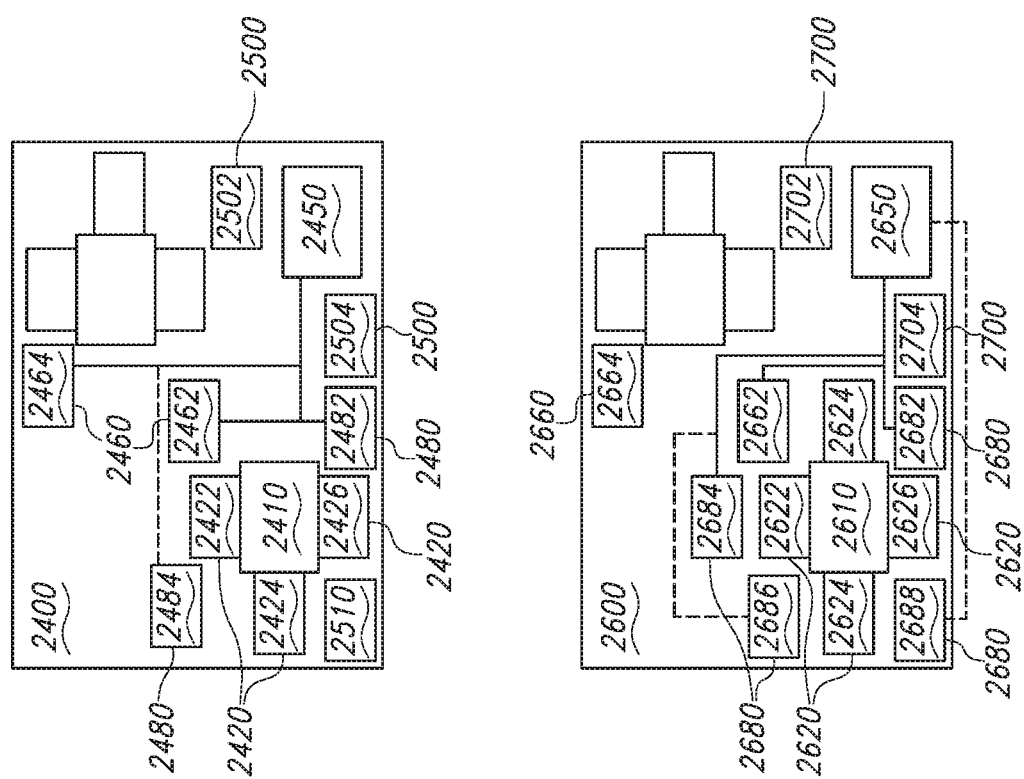

With reference to FIG. 12, the many embodiments include a first machine 2400 having rotating or oscillating components 2410, or both, each supported by a set of bearings 2420 including a bearing pack 2422, a bearing pack 2424, a bearing pack 2426, and more as needed. The first machine 2400 can be monitored by a first sensor ensemble 2450. The first ensemble 2450 can be configured to receive signals from sensors originally installed (or added later) on the first machine 2400. The sensors on the machine 2400 can include single-axis sensors 2460, such as a single-axis sensor 2462, a single-axis sensor 2464, and more as needed. In many examples, the single axis-sensors 2460 can be positioned in the machine 2400 at locations that allow for the sensing of one of the rotating or oscillating components 2410 of the machine 2400.

The machine 2400 can also have tri-axial (e.g., orthogonal axes) sensors 2480, such as a tri-axial sensor 2482, a tri-axial sensor 2484, and more as needed. In many examples, the tri-axial sensors 2480 can be positioned in the machine 2400 at locations that allow for the sensing of one of each of the bearing packs in the sets of bearings 2420 that is associated with the rotating or oscillating components of the machine 2400. The machine 2400 can also have temperature sensors 2500, such as a temperature sensor 2502, a temperature sensor 2504, and more as needed. The machine 2400 can also have a tachometer sensor 2510 or more as needed that each detail the RPMs of one of its rotating components. By way of the above example, the first sensor ensemble 2450 can survey the above sensors associated with the first machine 2400. To that end, the first ensemble 2450 can be configured to receive eight channels. In other examples, the first sensor ensemble 2450 can be configured to have more than eight channels, or less than eight channels as needed. In this example, the eight channels include two channels that can each monitor a single-axis reference sensor signal and three channels that can monitor a tri-axial sensor signal. The remaining three channels can monitor two temperature signals and a signal from a tachometer. In one example, the first ensemble 2450 can monitor the single-axis sensor 2462, the single-axis sensor 2464, the tri-axial sensor 2482, the temperature sensor 2502, the temperature sensor 2504, and the tachometer sensor 2510 in accordance with the present disclosure. During a vibration survey on the machine 2400, the first ensemble 2450 can first monitor the tri-axial sensor 2482 and then move next to the tri-axial sensor 2484.

After monitoring the tri-axial sensor 2484, the first ensemble 2450 can monitor additional tri-axial sensors on the machine 2400 as needed and that are part of the predetermined route list associated with the vibration survey of the machine 2400, in accordance with the present disclosure. During this vibration survey, the first ensemble 2450 can continually monitor the single-axis sensor 2462, the single-axis sensor 2464, the two temperature sensors 2502, 2504, and the tachometer sensor 2510 while the first ensemble 2450 can serially monitor the multiple tri-axial sensors 2480 in the pre-determined route plan for this vibration survey.

With reference to FIG. 12, the many embodiments include a second machine 2600 having rotating or oscillating components 2610, or both, each supported by a set of bearings 2620 including a bearing pack 2622, a bearing pack 2624, a bearing pack 2626, and more as needed. The second machine 2600 can be monitored by a second sensor ensemble 2650. The second ensemble 2650 can be configured to receive signals from sensors originally installed (or added later) on the second machine 2600. The sensors on the machine 2600 can include single-axis sensors 2660, such as a single-axis sensor 2662, a single-axis sensor 2664, and more as needed. In many examples, the single axis-sensors 2660 can be positioned in the machine 2600 at locations that allow for the sensing of one of the rotating or oscillating components 2610 of the machine 2600.

The machine 2600 can also have tri-axial (e.g., orthogonal axes) sensors 2680, such as a tri-axial sensor 2682, a tri-axial sensor 2684, a tri-axial sensor 2686, a tri-axial sensor 2688, and more as needed. In many examples, the tri-axial sensors 2680 can be positioned in the machine 2600 at locations that allow for the sensing of one of each of the bearing packs in the sets of bearings 2620 that is associated with the rotating or oscillating components of the machine 2600. The machine 2600 can also have temperature sensors 2700, such as a temperature sensor 2702, a temperature sensor 2704, and more as needed. The machine 2600 can also have a tachometer sensor 2710 or more as needed that each detail the RPMs of one of its rotating components.

By way of the above example, the second sensor ensemble 2650 can survey the above sensors associated with the second machine 2600. To that end, the second ensemble 2650 can be configured to receive eight channels. In other examples, the second sensor ensemble 2650 can be configured to have more than eight channels or less than eight channels as needed. In this example, the eight channels include one channel that can monitor a single-axis reference sensor signal and six channels that can monitor two tri-axial sensor signals. The remaining channel can monitor a temperature signal. In one example, the second ensemble 2650 can monitor the single axis sensor 2662, the tri-axial sensor 2682, the tri-axial sensor 2684, and the temperature sensor 2702. During a vibration survey on the machine 2600 in accordance with the present disclosure, the second ensemble 2650 can first monitor the tri-axial sensor 2682 simultaneously with the tri-axial sensor 2684 and then move onto the tri-axial sensor 2686 simultaneously with the tri-axial sensor 2688.

After monitoring the tri-axial sensors 2680, the second ensemble 2650 can monitor additional tri-axial sensors (in simultaneous pairs) on the machine 2600 as needed and that are part of the predetermined route list associated with the vibration survey of the machine 2600 in accordance with the present disclosure. During this vibration survey, the second ensemble 2650 can continually monitor the single-axis sensor 2662 at its unchanging location and the temperature sensor 2702 while the second ensemble 2650 can serially monitor the multiple tri-axial sensors in the pre-determined route plan for this vibration survey.

With continuing reference to FIG. 12, the many embodiments include a third machine 2800 having rotating or oscillating components 2810, or both, each supported by a set of bearings 2820 including a bearing pack 2822, a bearing pack 2824, a bearing pack 2826, and more as needed. The third machine 2800 can be monitored by a third sensor ensemble 2850. The third ensemble 2850 can be configured with a single-axis sensor 2860, and two tri-axial (e.g., orthogonal axes) sensors 2880, 2882. In many examples, the single axis-sensor 2860 can be secured by the user on the machine 2800 at a location that allows for the sensing of one of the rotating or oscillating components of the machine 2800. The tri-axial sensors 2880, 2882 can be also be located on the machine 2800 by the user at locations that allow for the sensing of one of each of the bearings in the sets of bearings that each associated with the rotating or oscillating components of the machine 2800. The third ensemble 2850 can also include a temperature sensor 2900. The third ensemble 2850 and its sensors can be moved to other machines unlike the first and second ensembles 2450, 2650.

The many embodiments also include a fourth machine 2950 having rotating or oscillating components 2960, or both, each supported by a set of bearings 2970 including a bearing pack 2972, a bearing pack 2974, a bearing pack 2976, and more as needed. The fourth machine 2950 can be also monitored by the third sensor ensemble 2850 when the user moves it to the fourth machine 2950. The many embodiments also include a fifth machine 3000 having rotating or oscillating components 3010, or both. The fifth machine 3000 may not be explicitly monitored by any sensor or any sensor ensembles in operation but it can create vibrations or other impulse energy of sufficient magnitude to be recorded in the data associated with any one the machines 2400, 2600, 2800, 2950 under a vibration survey.

The many embodiments include monitoring the first sensor ensemble 2450 on the first machine 2400 through the predetermined route as disclosed herein. The many embodiments also include monitoring the second sensor ensemble 2650 on the second machine 2600 through the predetermined route. The locations of machine 2400 being close to machine 2600 can be included in the contextual metadata of both vibration surveys. The third ensemble 2850 can be moved between machine 2800, machine 2950, and other suitable machines. The machine 3000 has no sensors onboard as configured, but could be monitored as needed by the third sensor ensemble 2850. The machine 3000 and its operational characteristics can be recorded in the metadata in relation to the vibration surveys on the other machines to note its contribution due to its proximity.

The many embodiments include hybrid database adaptation for harmonizing relational metadata and streaming raw data formats. Unlike older systems that utilized traditional database structure for associating nameplate and operational parameters (sometimes deemed metadata) with individual data measurements that are discrete and relatively simple, it will be appreciated in light of the disclosure that more modern systems can collect relatively larger quantities of raw streaming data with higher sampling rates and greater resolutions. At the same time, it will also be appreciated in light of the disclosure that the network of metadata with which to link and obtain this raw data or correlate with this raw data, or both, is expanding at ever-increasing rates.

In one example, a single overall vibration level can be collected as part of a route or prescribed list of measurement points. This data collected can then be associated with database measurement location information for a point located on a surface of a bearing housing on a specific piece of the machine adjacent to a coupling in a vertical direction. Machinery analysis parameters relevant to the proper analysis can be associated with the point located on the surface. Examples of machinery analysis parameters relevant to the proper analysis can include a running speed of a shaft passing through the measurement point on the surface. Further examples of machinery analysis parameters relevant to the proper analysis can include one of, or a combination of: running speeds of all component shafts for that piece of equipment and/or machine, bearing types being analyzed such as sleeve or rolling element bearings, the number of gear teeth on gears should there be a gearbox, the number of poles in a motor, slip and line frequency of a motor, roller bearing element dimensions, number of fan blades, or the like. Examples of machinery analysis parameters relevant to the proper analysis can further include machine operating conditions such as the load on the machines and whether load is expressed in percentage, wattage, air flow, head pressure, horsepower, and the like. Further examples of machinery analysis parameters include information relevant to adjacent machines that might influence the data obtained during the vibration study.

It will be appreciated in light of the disclosure that the vast array of equipment and machinery types can support many different classifications, each of which can be analyzed in distinctly different ways. For example, some machines, like screw compressors and hammer mills, can be shown to run much noisier and can be expected to vibrate significantly more than other machines. Machines known to vibrate more significantly can be shown to require a change in vibration levels that can be considered acceptable relative to quieter machines.

The present disclosure further includes hierarchical relationships found in the vibrational data collected that can be used to support proper analysis of the data. One example of the hierarchical data includes the interconnection of mechanical componentry such as a bearing being measured in a vibration survey and the relationship between that bearing, including how that bearing connects to a particular shaft on which is mounted a specific pinion within a particular gearbox, and the relationship between the shaft, the pinion, and the gearbox. The hierarchical data can further include in what particular spot within a machinery gear train that the bearing being monitored is located relative to other components in the machine. The hierarchical data can also detail whether the bearing being measured in a machine is in close proximity to another machine whose vibrations may affect what is being measured in the machine that is the subject of the vibration study.

The analysis of the vibration data from the bearing or other components related to one another in the hierarchical data can use table lookups, searches for correlations between frequency patterns derived from the raw data, and specific frequencies from the metadata of the machine. In some embodiments, the above can be stored in and retrieved from a relational database. In embodiments, National Instrument's Technical Data Management Solution (TDMS) file format can be used. The TDMS file format can be optimized for streaming various types of measurement data (i.e., binary digital samples of waveforms), as well as also being able to handle hierarchical metadata.

The many embodiments include a hybrid relational metadata-binary storage approach (HRM-BSA). The HRM-BSA can include a structured query language (SQL) based relational database engine. The structured query language based relational database engine can also include a raw data engine that can be optimized for throughput and storage density for data that is flat and relatively structureless. It will be appreciated in light of the disclosure that benefits can be shown in the cooperation between the hierarchical metadata and the SQL relational database engine. In one example, marker technologies and pointer sign-posts can be used to make correlations between the raw database engine and the SQL relational database engine. Three examples of correlations between the raw database engine and the SQL relational database engine linkages include: (1) pointers from the SQL database to the raw data; (2) pointers from the ancillary metadata tables or similar grouping of the raw data to the SQL database; and (3) independent storage tables outside the domain of either the SQL data base or raw data technologies.

Figure 13:
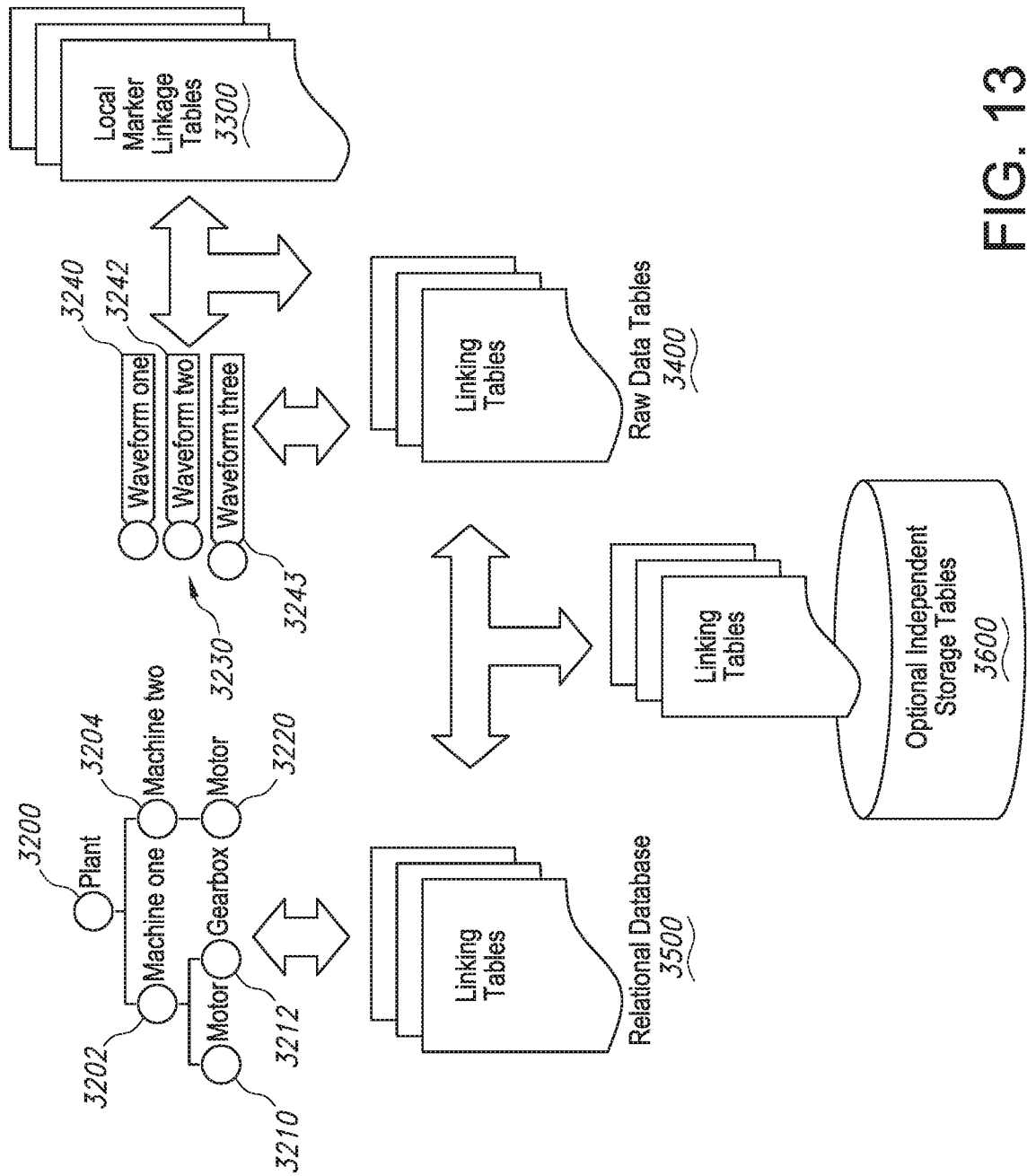
FIG. 13 is a diagrammatic view of hybrid relational metadata and a binary storage approach in accordance with the present disclosure.

With reference to FIG. 13, the present disclosure can include pointers for Group 1 and Group 2 that can include associated filenames, path information, table names, database key fields as employed with existing SQL database technologies that can be used to associate a specific database segments or locations, asset properties to specific measurement raw data streams, records with associated time/date stamps, or associated metadata such as operating parameters, panel conditions and the like. By way of this example, a plant 3200 can include machine one 3202, machine two 3204, and many others in the plant 3200. The machine one 3202 can include a gearbox 3210, a motor 3212, and other elements. The machine two 3204 can include a motor 3220, and other elements. Many waveforms 3230 including waveform 3240, waveform 3242, waveform 3244, and additional waveforms as needed can be acquired from the machines 3202, 3204 in the plant 3200. The waveforms 3230 can be associated with the local marker linking tables 3300 and the linking raw data tables 3400. The machines 3202, 3204 and their elements can be associated with linking tables having relational databases 3500. The linking tables raw data tables 3400 and the linking tables having relational databases 3500 can be associated with the linking tables with optional independent storage tables 3600.

The present disclosure can include markers that can be applied to a time mark or a sample length within the raw waveform data. The markers generally fall into two categories: preset or dynamic. The preset markers can correlate to preset or existing operating conditions (e.g., load, head pressure, air flow cubic feet per minute, ambient temperature, RPMs, and the like.). These preset markers can be fed into the data acquisition system directly. In certain instances, the preset markers can be collected on data channels in parallel with the waveform data (e.g., waveforms for vibration, current, voltage, etc.). Alternatively, the values for the preset markers can be entered manually.

For dynamic markers such as trending data, it can be important to compare similar data like comparing vibration amplitudes and patterns with a repeatable set of operating parameters. One example of the present disclosure includes one of the parallel channel inputs being a key phasor trigger pulse from an operating shaft that can provide RPM information at the instantaneous time of collection. In this example of dynamic markers, sections of collected waveform data can be marked with appropriate speeds or speed ranges.

The present disclosure can also include dynamic markers that can correlate to data that can be derived from post processing and analytics performed on the sample waveform. In further embodiments, the dynamic markers can also correlate to post-collection derived parameters including RPMs, as well as other operationally derived metrics such as alarm conditions like a maximum RPM. In certain examples, many modern pieces of equipment that are candidates for a vibration survey with the portable data collection systems described herein do not include tachometer information. This can be true because it is not always practical or cost-justifiable to add a tachometer even though the measurement of RPM can be of primary importance for the vibration survey and analysis. It will be appreciated that for fixed speed machinery obtaining an accurate RPM measurement can be less important especially when the approximate speed of the machine can be ascertained before-hand; however, variable-speed drives are becoming more and more prevalent. It will also be appreciated in light of the disclosure that various signal processing techniques can permit the derivation of RPM from the raw data without the need for a dedicated tachometer signal.

In many embodiments, the RPM information can be used to mark segments of the raw waveform data over its collection history. Further embodiments include techniques for collecting instrument data following a prescribed route of a vibration study. The dynamic markers can enable analysis and trending software to utilize multiple segments of the collection interval indicated by the markers (e.g., two minutes) as multiple historical collection ensembles, rather than just one as done in previous systems where route collection systems would historically store data for only one RPM setting. This could, in turn, be extended to any other operational parameter such as load setting, ambient temperature, and the like, as previously described. The dynamic markers, however, that can be placed in a type of index file pointing to the raw data stream can classify portions of the stream in homogenous entities that can be more readily compared to previously collected portions of the raw data stream The many embodiments include the hybrid relational metadata-binary storage approach that can use the best of pre-existing technologies for both relational and raw data streams. In embodiments, the hybrid relational metadata—binary storage approach can marry them together with a variety of marker linkages. The marker linkages can permit rapid searches through the relational metadata and can allow for more efficient analyses of the raw data using conventional SQL techniques with pre-existing technology. This can be shown to permit utilization of many of the capabilities, linkages, compatibilities, and extensions that conventional database technologies do not provide.

The marker linkages can also permit rapid and efficient storage of the raw data using conventional binary storage and data compression techniques. This can be shown to permit utilization of many of the capabilities, linkages, compatibilities, and extensions that conventional raw data technologies provide such as TMDS (National Instruments), UFF (Universal File Format such as UFF58), and the like. The marker linkages can further permit using the marker technology links where a vastly richer set of data from the ensembles can be amassed in the same collection time as more conventional systems. The richer set of data from the ensembles can store data snapshots associated with predetermined collection criterion and the proposed system can derive multiple snapshots from the collected data streams utilizing the marker technology. In doing so, it can be shown that a relatively richer analysis of the collected data can be achieved. One such benefit can include more trending points of vibration at a specific frequency or order of running speed versus RPM, load, operating temperature, flow rates and the like, which can be collected for a similar time relative to what is spent collecting data with a conventional system.

In embodiments, the platform 100 may include the local data collection system 102 deployed in the environment 104 to monitor signals from machines, elements of the machines and the environment of the machines including heavy duty machines deployed at a local job site or at distributed job sites under common control. The heavy-duty machines may include earthmoving equipment, heavy duty on-road industrial vehicles, heavy duty off-road industrial vehicles, industrial machines deployed in various settings such as turbines, turbomachinery, generators, pumps, pulley systems, manifold and valve systems, and the like. In embodiments, heavy industrial machinery may also include earth-moving equipment, earth-compacting equipment, hauling equipment, hoisting equipment, conveying equipment, aggregate production equipment, equipment used in concrete construction, and piledriving equipment. In examples, earth moving equipment may include excavators, backhoes, loaders, bulldozers, skid steer loaders, trenchers, motor graders, motor scrapers, crawker loaders, and wheeled loading shovels. In examples, construction vehicles may include dumpers, tankers, tippers, and trailers. In examples, material handling equipment may include cranes, conveyors, forklift, and hoists. In examples, construction equipment may include tunnel and handling equipment, road rollers, concrete mixers, hot mix plants, road making machines (compactors), stone crashers, pavers, slurry seal machines, spraying and plastering machines, and heavy-duty pumps. Further examples of heavy industrial equipment may include different systems such as implement traction, structure, power train, control, and information. Heavy industrial equipment may include many different powertrains and combinations thereof to provide power for locomotion and to also provide power to accessories and onboard functionality. In each of these examples, the platform 100 may deploy the local data collection system 102 into the environment 104 in which these machines, motors, pumps, and the like, operate and directly connected integrated into each of the machines, motors, pumps, and the like.

In embodiments, the platform 100 may include the local data collection system 102 deployed in the environment 104 to monitor signals from machines in operation and machines in being constructed such as turbine and generator sets like Siemens™ SGT6-5000F™ gas turbine, an SST-900™ steam turbine, an SGen6-1000A™ generator, and an SGen6-100A™ generator, and the like. In embodiments, the local data collection system 102 may be deployed to monitor steam turbines as they rotate in the currents caused by hot water vapor that may be directed through the turbine but otherwise generated from a different source such as from gas-fired burners, nuclear cores, molten salt loops and the like. In these systems, the local data collection system 102 may monitor the turbines and the water or other fluids in a closed loop cycle in which water condenses and is then heated until it evaporates again. The local data collection system 102 may monitor the steam turbines separately from the fuel source deployed to heat the water to steam. In examples, working temperatures of steam turbines may be between 500 and 650° C. In many embodiments, an array of steam turbines may be arranged and configured for high, medium, and low pressure, so they may optimally convert the respective steam pressure into rotational movement.

The local data collection system 102 may also be deployed in a gas turbines arrangement and therefore not only monitor the turbine in operation but also monitor the hot combustion gases feed into the turbine that may be in excess of 1,500° C. Because these gases are much hotter than those in steam turbines, the blades may be cooled with air that may flow out of small openings to create a protective film or boundary layer between the exhaust gases and the blades. This temperature profile may be monitored by the local data collection system 102. Gas turbine engines, unlike typical steam turbines, include a compressor, a combustion chamber, and a turbine all of which are journaled for rotation with a rotating shaft. The construction and operation of each of these components may be monitored by the local data collection system 102.

In embodiments, the platform 100 may include the local data collection system 102 deployed in the environment 104 to monitor signals from water turbines serving as rotary engines that may harvest energy from moving water and are used for electric power generation. The type of water turbine or hydro-power selected for a project may be based on the height of standing water, often referred to as head, and the flow, or volume of water, at the site. In this example, a generator may be placed at the top of a shaft that connects to the water turbine. As the turbine catches the naturally moving water in its blade and rotates, the turbine sends rotational power to the generator to generate electrical energy. In doing so, the platform 100 may monitor signals from the generators, the turbines, the local water system, flow controls such as dam windows and sluices. Moreover, the platform 100 may monitor local conditions on the electric grid including load, predicted demand, frequency response, and the like, and include such information in the monitoring and control deployed by platform 100 in these hydroelectric settings.

In embodiments, the platform 100 may include the local data collection system 102 deployed in the environment 104 to monitor signals from energy production environments, such as thermal, nuclear, geothermal, chemical, biomass, carbon-based fuels, hybrid-renewable energy plants, and the like. Many of these plants may use multiple forms of energy harvesting equipment like wind turbines, hydro turbines, and steam turbines powered by heat from nuclear, gas-fired, solar, and molten salt heat sources. In embodiments, elements in such systems may include transmission lines, heat exchangers, desulphurization scrubbers, pumps, coolers, recuperators, chillers, and the like. In embodiments, certain implementations of turbomachinery, turbines, scroll compressors, and the like may be configured in arrayed control so as to monitor large facilities creating electricity for consumption, providing refrigeration, creating steam for local manufacture and heating, and the like, and that arrayed control platforms may be provided by the provider of the industrial equipment such as Honeywell and their Experion™ PKS platform. In embodiments, the platform 100 may specifically communicate with and integrate the local manufacturer-specific controls and may allow equipment from one manufacturer to communicate with other equipment. Moreover, the platform 100 provides allows for the local data collection system 102 to collect information across systems from many different manufacturers. In embodiments, the platform 100 may include the local data collection system 102 deployed in the environment 104 to monitor signals from marine industrial equipment, marine diesel engines, shipbuilding, oil and gas plants, refineries, petrochemical plant, ballast water treatment solutions, marine pumps and turbines and the like.

In embodiments, the platform 100 may include the local data collection system 102 deployed in the environment 104 to monitor signals from heavy industrial equipment and processes including monitoring one or more sensors. By way of this example, sensors may be devices that may be used to detect or respond to some type of input from a physical environment, such as an electrical, heat, or optical signal. In embodiments, the local data collection system 102 may include multiple sensors such as, without limitation, a temperature sensor, a pressure sensor, a torque sensor, a flow sensor, a heat sensors, a smoke sensor, an arc sensor, a radiation sensor, a position sensor, an acceleration sensor, a strain sensor, a pressure cycle sensor, a pressure sensor, an air temperature sensor, and the like. The torque sensor may encompass a magnetic twist angle sensor. In one example, the torque and speed sensors in the local data collection system 102 may be similar to those discussed in U.S. Pat. No. 8,352,149 to Meachem, issued 8 Jan. 2013 and hereby incorporated by reference as if fully set forth herein. In embodiments, one or more sensors may be provided such as a tactile sensor, a biosensor, a chemical sensor, an image sensor, a humidity sensor, an inertial sensor, and the like.

In embodiments, the platform 100 may include the local data collection system 102 deployed in the environment 104 to monitor signals from sensors that may provide signals for fault detection including excessive vibration, incorrect material, incorrect material properties, trueness to the proper size, trueness to the proper shape, proper weight, trueness to balance. Additional fault sensors include those for inventory control and for inspections such as to confirming that parts packaged to plan, parts are to tolerance in a plan, occurrence of packaging damage or stress, and sensors that may indicate the occurrence of shock or damage in transit. Additional fault sensors may include detection of the lack of lubrication, over lubrication, the need for cleaning of the sensor detection window, the need for maintenance due to low lubrication, the need for maintenance due to blocking or reduced flow in a lubrication region, and the like.

In embodiments, the platform 100 may include the local data collection system 102 deployed in the environment 104 that includes aircraft operations and manufacture including monitoring signals from sensors for specialized applications such as sensors used in an aircraft's Attitude and Heading Reference System (AHRS), such as gyroscopes, accelerometers, and magnetometers. In embodiments, the platform 100 may include the local data collection system 102 deployed in the environment 104 to monitor signals from image sensors such as semiconductor charge coupled devices (CCDs), active pixel sensors, in complementary metal-oxide-semiconductor (CMOS) or N-type metal-oxide-semiconductor (NMOS, Live MOS) technologies. In embodiments, the platform 100 may include the local data collection system 102 deployed in the environment 104 to monitor signals from sensors such as an infra-red (IR) sensor, an ultraviolet (UV) sensor, a touch sensor, a proximity sensor, and the like. In embodiments, the platform 100 may include the local data collection system 102 deployed in the environment 104 to monitor signals from sensors configured for optical character recognition (OCR), reading barcodes, detecting surface acoustic waves, detecting transponders, communicating with home automation systems, medical diagnostics, health monitoring, and the like.

In embodiments, the platform 100 may include the local data collection system 102 deployed in the environment 104 to monitor signals from sensors such as a Micro-Electro-Mechanical Systems (MEMS) sensor, such as ST Microelectronic's™ LSM303AH smart MEMS sensor, which may include an ultra-low-power high-performance system-in-package featuring a 3D digital linear acceleration sensor and a 3D digital magnetic sensor.

In embodiments, the platform 100 may include the local data collection system 102 deployed in the environment 104 to monitor signals from additional large machines such as turbines, windmills, industrial vehicles, robots, and the like. These large mechanical machines include multiple components and elements providing multiple subsystems on each machine. Toward that end, the platform 100 may include the local data collection system 102 deployed in the environment 104 to monitor signals from individual elements such as axles, bearings, belts, buckets, gears, shafts, gear boxes, cams, carriages, camshafts, clutches, brakes, drums, dynamos, feeds, flywheels, gaskets, pumps, jaws, robotic arms, seals, sockets, sleeves, valves, wheels, actuators, motors, servomotor, and the like. Many of the machines and their elements may include servomotors. The local data collection system 102 may monitor the motor, the rotary encoder, and the potentiometer of the servomechanism to provide three-dimensional detail of position, placement, and progress of industrial processes.

In embodiments, the platform 100 may include the local data collection system 102 deployed in the environment 104 to monitor signals from gear drives, powertrains, transfer cases, multispeed axles, transmissions, direct drives, chain drives, belt-drives, shaft-drives, magnetic drives, and similar meshing mechanical drives. In embodiments, the platform 100 may include the local data collection system 102 deployed in the environment 104 to monitor signals from fault conditions of industrial machines that may include overheating, noise, grinding gears, locked gears, excessive vibration, wobbling, under-inflation, over-inflation, and the like. Operation faults, maintenance indicators, and interactions from other machines may cause maintenance or operational issues may occur during operation, during installation, and during maintenance. The faults may occur in the mechanisms of the industrial machines but may also occur in infrastructure that supports the machine such as its wiring and local installation platforms. In embodiments, the large industrial machines may face different types of fault conditions such as overheating, noise, grinding gears, excessive vibration of machine parts, fan vibration problems, problems with large industrial machines rotating parts.

In embodiments, the platform 100 may include the local data collection system 102 deployed in the environment 104 to monitor signals from industrial machinery including failures that may be caused by premature bearing failure that may occur due to contamination or loss of bearing lubricant. In another example, a mechanical defect such as misalignment of bearings may occur. Many factors may contribute to the failure such as metal fatigue, therefore, the local data collection system 102 may monitor cycles and local stresses. By way of this example, the platform 100 may monitor incorrect operation of machine parts, lack of maintenance and servicing of parts, corrosion of vital machine parts, such as couplings or gearboxes, misalignment of machine parts, and the like. Though the fault occurrences cannot be completely stopped, many industrial breakdowns may be mitigated to reduce operational and financial losses. The platform 100 provides real-time monitoring and predictive maintenance in many industrial environments wherein it has been shown to present a cost-savings over regularly-scheduled maintenance processes that replace parts according to a rigid expiration of time and not actual load and wear and tear on the element or machine. To that end, the platform 10 may provide reminders of, or perform some, preventive measures such as adhering to operating manual and mode instructions for machines, proper lubrication, and maintenance of machine parts, minimizing or eliminating overrun of machines beyond their defined capacities, replacement of worn but still functional parts as needed, properly training the personnel for machine use, and the like.

In embodiments, the platform 100 may include the local data collection system 102 deployed in the environment 104 to monitor multiple signals that may be carried by a plurality of physical, electronic, and symbolic formats or signals. The platform 100 may employ signal processing including a plurality of mathematical, statistical, computational, heuristic, and linguistic representations and processing of signals and a plurality of operations needed for extraction of useful information from signal processing operations such as techniques for representation, modeling, analysis, synthesis, sensing, acquisition, and extraction of information from signals. In examples, signal processing may be performed using a plurality of techniques, including but not limited to transformations, spectral estimations, statistical operations, probabilistic and stochastic operations, numerical theory analysis, data mining, and the like. The processing of various types of signals forms the basis of many electrical or computational process. As a result, signal processing applies to almost all disciplines and applications in the industrial environment such as audio and video processing, image processing, wireless communications, process control, industrial automation, financial systems, feature extraction, quality improvements such as noise reduction, image enhancement, and the like. Signal processing for images may include pattern recognition for manufacturing inspections, quality inspection, and automated operational inspection and maintenance. The platform 100 may employ many pattern recognition techniques including those that may classify input data into classes based on key features with the objective of recognizing patterns or regularities in data. The platform 100 may also implement pattern recognition processes with machine learning operations and may be used in applications such as computer vision, speech and text processing, radar processing, handwriting recognition, CAD systems, and the like. The platform 100 may employ supervised classification and unsupervised classification. The supervised learning classification algorithms may be based to create classifiers for image or pattern recognition, based on training data obtained from different object classes. The unsupervised learning classification algorithms may operate by finding hidden structures in unlabeled data using advanced analysis techniques such as segmentation and clustering. For example, some of the analysis techniques used in unsupervised learning may include K-means clustering, Gaussian mixture models, Hidden Markov models, and the like. The algorithms used in supervised and unsupervised learning methods of pattern recognition enable the use of pattern recognition in various high precision applications. The platform 100 may use pattern recognition in face detection related applications such as security systems, tracking, sports related applications, fingerprint analysis, medical and forensic applications, navigation and guidance systems, vehicle tracking, public infrastructure systems such as transport systems, license plate monitoring, and the like.

In embodiments, the platform 100 may include the local data collection system 102 deployed in the environment 104 using machine learning to enable derivation-based learning outcomes from computers without the need to program them. The platform 100 may, therefore, learn from and make decisions on a set of data, by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm itself structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may also be classified as machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost and adaboost, K-nearest neighbors (KNN), a priori algorithms, and the like. In embodiments, certain machine learning algorithms may be used (such as genetic algorithms defined for solving both constrained and unconstrained optimization problems that may be based on natural selection, the process that drives biological evolution). By way of this example, genetic algorithms may be deployed to solve a variety of optimization problems that are not well suited for standard optimization algorithms, including problems in which the objective functions are discontinuous, not differentiable, stochastic, or highly nonlinear. In an example, the genetic algorithm may be used to address problems of mixed integer programming, where some components restricted to being integer-valued. Genetic algorithms and machine learning techniques and systems may be used in computational intelligence systems, computer vision, Natural Language Processing (NLP), recommender systems, reinforcement learning, building graphical models, and the like. By way of this example, the machine learning systems may be used to perform intelligent computing based control and be responsive to tasks in a wide variety of systems (such as interactive websites and portals, brain-machine interfaces, online security and fraud detection systems, medical applications such as diagnosis and therapy assistance systems, classification of DNA sequences, and the like). In examples, machine learning systems may be used in advanced computing applications (such as online advertising, natural language processing, robotics, search engines, software engineering, speech and handwriting recognition, pattern matching, game playing, computational anatomy, bioinformatics systems and the like). In an example, machine learning may also be used in financial and marketing systems (such as for user behavior analytics, online advertising, economic estimations, financial market analysis, and the like).

Additional details are provided below in connection with the methods, systems, devices, and components depicted in connection with FIGS. 1 through 6. In embodiments, methods and systems are disclosed herein for cloud-based, machine pattern recognition based on fusion of remote, analog industrial sensors. For example, data streams from vibration, pressure, temperature, accelerometer, magnetic, electrical field, and other analog sensors may be multiplexed or otherwise fused, relayed over a network, and fed into a cloud-based machine learning facility, which may employ one or more models relating to an operating characteristic of an industrial machine, an industrial process, or a component or element thereof. A model may be created by a human who has experience with the industrial environment and may be associated with a training data set (such as created by human analysis or machine analysis of data that is collected by the sensors in the environment, or sensors in other similar environments. The learning machine may then operate on other data, initially using a set of rules or elements of a model, such as to provide a variety of outputs, such as classification of data into types, recognition of certain patterns (such as ones indicating the presence of faults, or ones indicating operating conditions, such as fuel efficiency, energy production, or the like). The machine learning facility may take feedback, such as one or more inputs or measures of success, such that it may train, or improve, its initial model (such as by adjusting weights, rules, parameters, or the like, based on the feedback). For example, a model of fuel consumption by an industrial machine may include physical model parameters that characterize weights, motion, resistance, momentum, inertia, acceleration, and other factors that indicate consumption, and chemical model parameters (such as ones that predict energy produced and/or consumed e.g., such as through combustion, through chemical reactions in battery charging and discharging, and the like). The model may be refined by feeding in data from sensors disposed in the environment of a machine, in the machine, and the like, as well as data indicating actual fuel consumption, so that the machine can provide increasingly accurate, sensor-based, estimates of fuel consumption and can also provide output that indicate what changes can be made to increase fuel consumption (such as changing operation parameters of the machine or changing other elements of the environment, such as the ambient temperature, the operation of a nearby machine, or the like). For example, if a resonance effect between two machines is adversely affecting one of them, the model may account for this and automatically provide an output that results in changing the operation of one of the machines (such as to reduce the resonance, to increase fuel efficiency of one or both machines). By continuously adjusting parameters to cause outputs to match actual conditions, the machine learning facility may self-organize to provide a highly accurate model of the conditions of an environment (such as for predicting faults, optimizing operational parameters, and the like). This may be used to increase fuel efficiency, to reduce wear, to increase output, to increase operating life, to avoid fault conditions, and for many other purposes.

Figure 14:
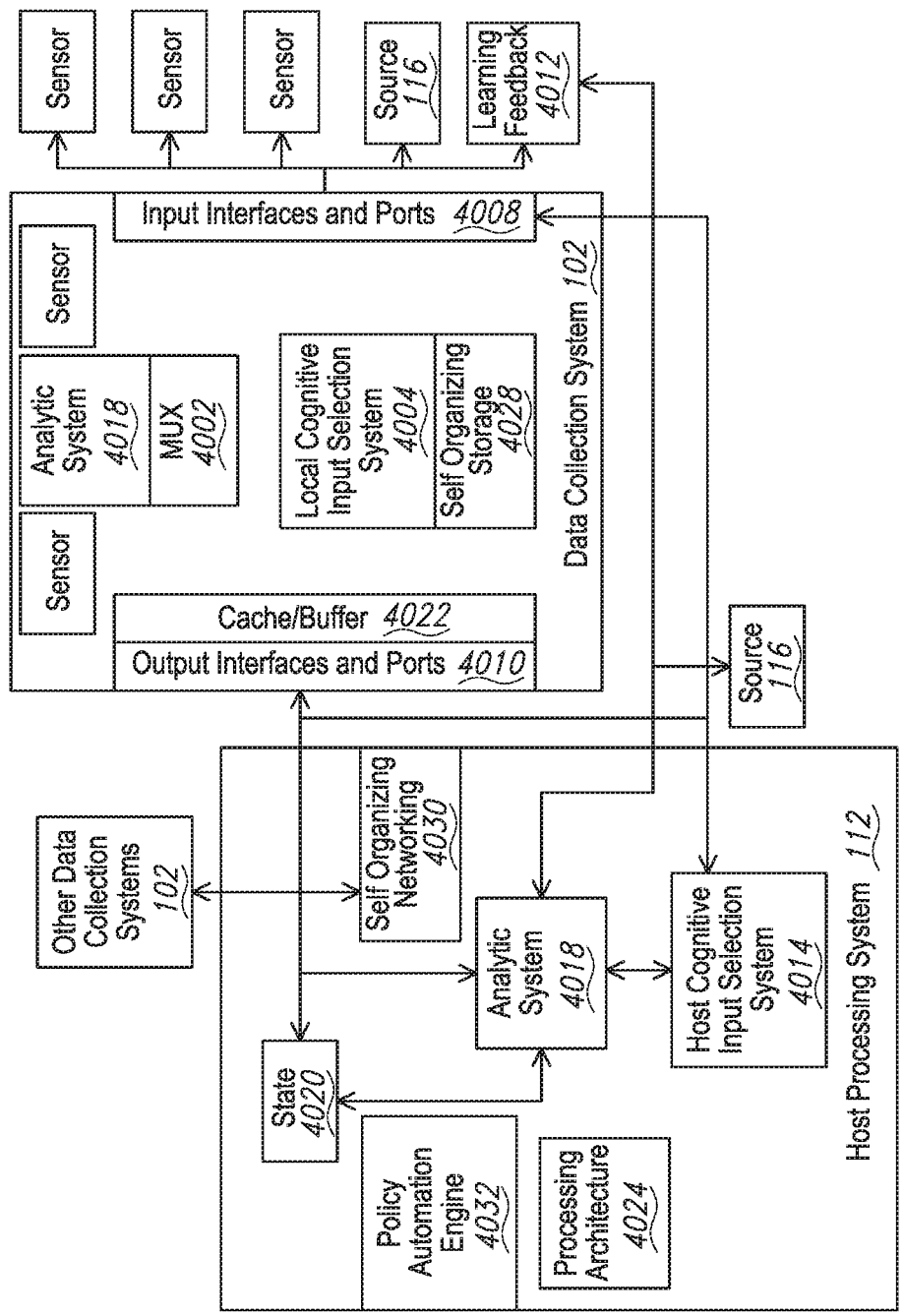
FIG. 14 is a diagrammatic view of components and interactions of a data collection architecture involving application of cognitive and machine learning systems to data collection and processing in accordance with the present disclosure.

FIG. 14 illustrates components and interactions of a data collection architecture involving application of cognitive and machine learning systems to data collection and processing. Referring to FIG. 14, a data collection system 102 may be disposed in an environment (such as an industrial environment where one or more complex systems, such as electro-mechanical systems and machines are manufactured, assembled, or operated). The data collection system 102 may include onboard sensors and may take input, such as through one or more input interfaces or ports 4008, from one or more sensors (such as analog or digital sensors of any type disclosed herein) and from one or more input sources 116 (such as sources that may be available through Wi-Fi, Bluetooth, NFC, or other local network connections or over the Internet). Sensors may be combined and multiplexed (such as with one or more multiplexers 4002). Data may be cached or buffered in a cache/buffer 4022 and made available to external systems, such as a remote host processing system 112 as described elsewhere in this disclosure (which may include an extensive processing architecture 4024, including any of the elements described in connection with other embodiments described throughout this disclosure and in the Figure), though one or more output interfaces and ports 4010 (which may in embodiments be separate from or the same as the input interfaces and ports 4008). The data collection system 102 may be configured to take input from a host processing system 112, such as input from an analytic system 4018, which may operate on data from the data collection system 102 and data from other input sources 116 to provide analytic results, which in turn may be provided as a learning feedback input 4012 to the data collection system, such as to assist in configuration and operation of the data collection system 102.

Combination of inputs (including selection of what sensors or input sources to turn "on" or "off") may be performed under the control of machine-based intelligence, such as using a local cognitive input selection system 4004, an optionally remote cognitive input selection system 4114, or a combination of the two. The cognitive input selection systems 4004, 4014 may use intelligence and machine learning capabilities described elsewhere in this disclosure, such as using detected conditions (such as informed by the input sources 116 or sensors), state information (including state information determined by a machine state recognition system 4020 that may determine a state), such as relating to an operational state, an environmental state, a state within a known process or workflow, a state involving a fault or diagnostic condition, or many others. This may include optimization of input selection and configuration based on learning feedback from the learning feedback system 4012, which may include providing training data (such as from the host processing system 112 or from other data collection systems 102 either directly or from the host 112) and may include providing feedback metrics, such as success metrics calculated within the analytic system 4018 of the host processing system 112. For example, if a data stream consisting of a particular combination of sensors and inputs yields positive results in a given set of conditions (such as providing improved pattern recognition, improved prediction, improved diagnosis, improved yield, improved return on investment, improved efficiency, or the like), then metrics relating to such results from the analytic system 4018 can be provided via the learning feedback system 4012 to the cognitive input selection systems 4004, 4014 to help configure future data collection to select that combination in those conditions (allowing other input sources to be de-selected, such as by powering down the other sensors). In embodiments, selection and de-selection of sensor combinations, under control of one or more of the cognitive input selection systems 4004, may occur with automated variation, such as using genetic programming techniques, such that over time, based on learning feedback 4012, such as from the analytic system 4018, effective combinations for a given state or set of conditions are promoted, and less effective combinations are demoted, resulting in progressive optimization and adaptation of the local data collection system to each unique environment. Thus, an automatically adapting, multi-sensor data collection system is provided, where cognitive input selection is used, with feedback, to improve the effectiveness, efficiency, or other performance parameter of the data collection system within its particular environment. Performance parameters may relate to overall system metrics (such as financial yields, process optimization results, energy production or usage, and the like), analytic metrics (such as success in recognizing patterns, making predictions, classifying data, or the like), and local system metrics (such as bandwidth utilization, storage utilization, power consumption, and the like). In embodiments, the analytic system 4018, the state system 4020 and the cognitive input selection system 4114 of a host may take data from multiple data collection systems 102, such that optimization (including of input selection) may be undertaken through coordinated operation of multiple systems 102. For example, the cognitive input selection system 4114 may understand that if one data collection system 102 is already collecting vibration data for an X-axis, the X-axis vibration sensor for the other data collection system might be turned off, in favor of getting Y-axis data from the other data collector 102. Thus, through coordinated collection by the host cognitive input selection system 4114, the activity of multiple collectors 102, across a host of different sensors, can provide for a rich data set for the host processing system 112, without wasting energy, bandwidth, storage space, or the like. As noted above, optimization may be based on overall system success metrics, analytic success metrics, and local system metrics, or a combination of the above.

Methods and systems are disclosed herein for cloud-based, machine pattern analysis of state information from multiple industrial sensors to provide anticipated state information for an industrial system. In embodiments, machine learning may take advantage of a state machine, such as tracking states of multiple analog and/or digital sensors, feeding the states into a pattern analysis facility, and determining anticipated states of the industrial system based on historical data about sequences of state information. For example, where a temperature state of an industrial machine exceeds a certain threshold and is followed by a fault condition, such as breaking down of a set of bearings, that temperature state may be tracked by a pattern recognizer, which may produce an output data structure indicating an anticipated bearing fault state (whenever an input state of a high temperature is recognized). A wide range of measurement values and anticipated states may be managed by a state machine, relating to temperature, pressure, vibration, acceleration, momentum, inertia, friction, heat, heat flux, galvanic states, magnetic field states, electrical field states, capacitance states, charge and discharge states, motion, position, and many others. States may comprise combined states, where a data structure includes a series of states, each of which is represented by a place in a byte-like data structure. For example, an industrial machine may be characterized by a genetic structure, such as one that provides pressure, temperature, vibration, and acoustic data, the measurement of which takes one place in the data structure, so that the combined state can be operated on as a byte-like structure, such as for compactly characterizing the current combined state of the machine or environment, or compactly characterizing the anticipated state. This byte-like structure can be used by a state machine for machine learning, such as by pattern recognition that operates on the structure to determine patterns that reflect combined effects of multiple conditions. A wide variety of such structure can be tracked and used, such as in machine learning, representing various combinations, of various length, of the different elements that can be sensed in an industrial environment. In embodiments, byte-like structures can be used in a genetic programming technique, such as by substituting different types of data, or data from varying sources, and tracking outcomes over time, so that one or more favorable structures emerges based on the success of those structures when used in real world situations, such as indicating successful predictions of anticipated states, or achievement of success operational outcomes, such as increased efficiency, successful routing of information, achieving increased profits, or the like. That is, by varying what data types and sources are used in byte-like structures that are used for machine optimization over time, a genetic programming-based machine learning facility can "evolve" a set of data structures, consisting of a favorable mix of data types (e.g., pressure, temperature, and vibration), from a favorable mix of data sources (e.g., temperature is derived from sensor X, while vibration comes from sensor Y), for a given purpose. Different desired outcomes may result in different data structures that are best adapted to support effective achievement of those outcomes over time with application of machine learning and promotion of structures with favorable results for the desired outcome in question by genetic programming. The promoted data structures may provide compact, efficient data for various activities as described throughout this disclosure, including being stored in data pools (which may be optimized by storing favorable data structures that provide the best operational results for a given environment), being presented in data marketplaces (such as being presented as the most effective structures for a given purpose), and the like.

In embodiments, a platform is provided having cloud-based, machine pattern analysis of state information from multiple analog industrial sensors to provide anticipated state information for an industrial system. In embodiments, the host processing system 112, such as disposed in the cloud, may include the state system 4020, which may be used to infer or calculate a current state or to determine an anticipated future state relating to the data collection system 102 or some aspect of the environment in which the data collection system 102 is disposed, such as the state of a machine, a component, a workflow, a process, an event (e.g., whether the event has occurred), an object, a person, a condition, a function, or the like. Maintaining state information allows the host processing system 112 to undertake analysis, such as in one or more analytic systems 4018, to determine contextual information, to apply semantic and conditional logic, and perform many other functions as enabled by the processing architecture 4024 described throughout this disclosure.

In embodiments, a platform is provided having cloud-based policy automation engine for IoT, with creation, deployment, and management of IoT devices. In embodiments, the platform 100 includes (or is integrated with, or included in) the host processing system 112, such as on a cloud platform, a policy automation engine 4032 for automating creation, deployment, and management of policies to IoT devices. Polices, which may include access policies, network usage policies, storage usage policies, bandwidth usage policies, device connection policies, security policies, rule-based policies, role-based polices, and others, may be required to govern the use of IoT devices. For example, as IoT devices may have many different network and data communications to other devices, policies may be needed to indicate to what devices a given device can connect, what data can be passed on, and what data can be received. As billions of devices with countless potential connections are expected to be deployed in the near future, it becomes impossible for humans to configure policies for IoT devices on a connection-by-connection basis. Accordingly, an intelligent policy automation engine 4032 may include cognitive features for creating, configuring, and managing policies. The policy automation engine 4032 may consume information about possible policies, such as from a policy database or library, which may include one or more public sources of available policies. These may be written in one or more conventional policy languages or scripts. The policy automation engine 4032 may apply the policies according to one or more models, such as based on the characteristics of a given device, machine, or environment. For example, a large machine, such as for power generation, may include a policy that only a verifiably local controller can change certain parameters of the power generation, thereby avoiding a remote "takeover" by a hacker. This may be accomplished in turn by automatically finding and applying security policies that bar connection of the control infrastructure of the machine to the Internet, by requiring access authentication, or the like. The policy automation engine 4032 may include cognitive features, such as varying the application of policies, the configuration of policies, and the like (such as based on state information from the state system 4020). The policy automation engine 4032 may take feedback, as from the learning feedback system 4012, such as based on one or more analytic results from the analytic system 4018, such as based on overall system results (such as the extent of security breaches, policy violations, and the like), local results, and analytic results. By variation and selection based on such feedback, the policy automation engine 4032 can, over time, learn to automatically create, deploy, configure, and manage policies across very large numbers of devices, such as managing policies for configuration of connections among IoT devices.

Methods and systems are disclosed herein for on-device sensor fusion and data storage for industrial IoT devices, including on-device sensor fusion and data storage for an industrial IoT device, where data from multiple sensors is multiplexed at the device for storage of a fused data stream. For example, pressure and temperature data may be multiplexed into a data stream that combines pressure and temperature in a time series, such as in a byte-like structure (where time, pressure, and temperature are bytes in a data structure, so that pressure and temperature remain linked in time, without requiring separate processing of the streams by outside systems), or by adding, dividing, multiplying, subtracting, or the like, such that the fused data can be stored on the device. Any of the sensor data types described throughout this disclosure can be fused in this manner and stored in a local data pool, in storage, or on an IoT device, such as a data collector, a component of a machine, or the like.

In embodiments, a platform is provided having on-device sensor fusion and data storage for industrial IoT devices. In embodiments, a cognitive system is used for a self-organizing storage system 4028 for the data collection system 102. Sensor data, and in particular analog sensor data, can consume large amounts of storage capacity, in particular where a data collector 102 has multiple sensor inputs onboard or from the local environment. Simply storing all the data indefinitely is not typically a favorable option, and even transmitting all of the data may strain bandwidth limitations, exceed bandwidth permissions (such as exceeding cellular data plan capacity), or the like. Accordingly, storage strategies are needed. These typically include capturing only portions of the data (such as snapshots), storing data for limited time periods, storing portions of the data (such as intermediate or abstracted forms), and the like. With many possible selections among these and other options, determining the correct storage strategy may be highly complex. In embodiments, the self-organizing storage system 4028 may use a cognitive system, based on learning feedback 4012, and use various metrics from the analytic system 4018 or other system of the host cognitive input selection system 4114, such as overall system metrics, analytic metrics, and local performance indicators. The self-organizing storage system 4028 may automatically vary storage parameters, such as storage locations (including local storage on the data collection system 102, storage on nearby data collection systems 102 (such as using peer-to-peer organization) and remote storage, such as network-based storage), storage amounts, storage duration, type of data stored (including individual sensors or input sources 116, as well as various combined or multiplexed data, such as selected under the cognitive input selection systems 4004, 4014), storage type (such as using RAM, Flash, or other short-term memory versus available hard drive space), storage organization (such as in raw form, in hierarchies, and the like), and others. Variation of the parameters may be undertaken with feedback, so that over time the data collection system 102 adapts its storage of data to optimize itself to the conditions of its environment, such as a particular industrial environment, in a way that results in its storing the data that is needed in the right amounts and of the right type for availability to users.

In embodiments, the local cognitive input selection system 4004 may organize fusion of data for various onboard sensors, external sensors (such as in the local environment) and other input sources 116 to the local collection system 102 into one or more fused data streams, such as using the multiplexer 4002 to create various signals that represent combinations, permutations, mixes, layers, abstractions, data-metadata combinations, and the like of the source analog and/or digital data that is handled by the data collection system 102. The selection of a particular fusion of sensors may be determined locally by the cognitive input selection system 4004, such as based on learning feedback from the learning feedback system 4012, such as various overall system, analytic system and local system results and metrics. In embodiments, the system may learn to fuse particular combinations and permutations of sensors, such as in order to best achieve correct anticipation of state, as indicated by feedback of the analytic system 4018 regarding its ability to predict future states, such as the various states handled by the state system 4020. For example, the input selection system 4004 may indicate selection of a sub-set of sensors among a larger set of available sensors, and the inputs from the selected sensors may be combined, such as by placing input from each of them into a byte of a defined, multi-bit data structure (such as by taking a signal from each at a given sampling rate or time and placing the result into the byte structure, then collecting and processing the bytes over time), by multiplexing in the multiplexer 4002, such as by additive mixing of continuous signals, and the like. Any of a wide range of signal processing and data processing techniques for combination and fusing may be used, including convolutional techniques, coercion techniques, transformation techniques, and the like. The particular fusion in question may be adapted to a given situation by cognitive learning, such as by having the cognitive input selection system 4004 learn, based on feedback 4012 from results (such as conveyed by the analytic system 4018), such that the local data collection system 102 executes context-adaptive sensor fusion.

In embodiments, the analytic system 4018 may apply to any of a wide range of analytic techniques, including statistical and econometric techniques (such as linear regression analysis, use similarity matrices, heat map based techniques, and the like), reasoning techniques (such as Bayesian reasoning, rule-based reasoning, inductive reasoning, and the like), iterative techniques (such as feedback, recursion, feed-forward and other techniques), signal processing techniques (such as Fourier and other transforms), pattern recognition techniques (such as Kalman and other filtering techniques), search techniques, probabilistic techniques (such as random walks, random forest algorithms, and the like), simulation techniques (such as random walks, random forest algorithms, linear optimization and the like), and others. This may include computation of various statistics or measures. In embodiments, the analytic system 4018 may be disposed, at least in part, on a data collection system 102, such that a local analytic system can calculate one or more measures, such as relating to any of the items noted throughout this disclosure. For example, measures of efficiency, power utilization, storage utilization, redundancy, entropy, and other factors may be calculated onboard, so that the data collection 102 can enable various cognitive and learning functions noted throughout this disclosure without dependence on a remote (e.g., cloud-based) analytic system.

In embodiments, the host processing system 112, a data collection system 102, or both, may include, connect to, or integrate with, a self-organizing networking system 4020, which may comprise a cognitive system for providing machine-based, intelligent or organization of network utilization for transport of data in a data collection system, such as for handling analog and other sensor data, or other source data, such as among one or more local data collection systems 102 and a host system 112. This may include organizing network utilization for source data delivered to data collection systems, for feedback data, such as analytic data provided to or via a learning feedback system 4012, data for supporting a marketplace (such as described in connection with other embodiments), and output data provided via output interfaces and ports 4010 from one or more data collection systems 102.

Methods and systems are disclosed herein for a self-organizing data marketplace for industrial IoT data, including where available data elements are organized in the marketplace for consumption by consumers based on training a self-organizing facility with a training set and feedback from measures of marketplace success. A marketplace may be set up initially to make available data collected from one or more industrial environments, such as presenting data by type, by source, by environment, by machine, by one or more patterns, or the like (such as in a menu or hierarchy). The marketplace may vary the data collected, the organization of the data, the presentation of the data (including pushing the data to external sites, providing links, configuring APIs by which the data may be accessed, and the like), the pricing of the data, or the like, such as under machine learning, which may vary different parameters of any of the foregoing. The machine learning facility may manage all of these parameters by self-organization, such as by varying parameters over time (including by varying elements of the data types presented, the data sourced used to obtain each type of data, the data structures presented (such as byte-like structures, fused or multiplexed structures (such as representing multiple sensor types), and statistical structures (such as representing various mathematical products of sensor information), among others), the pricing for the data, where the data is presented, how the data is presented (such as by APIs, by links, by push messaging, and the like), how the data is stored, how the data is obtained, and the like. As parameters are varied, feedback may be obtained as to measures of success, such as number of views, yield (e.g., price paid) per access, total yield, per unit profit, aggregate profit, and many others, and the self-organizing machine learning facility may promote configurations that improve measures of success and demote configurations that do not, so that, over time, the marketplace is progressively configured to present favorable combinations of data types (e.g., ones that provide robust prediction of anticipated states of particular industrial environments of a given type), from favorable sources (e.g., ones that are reliable, accurate and low priced), with effective pricing (e.g., pricing that tends to provide high aggregate profit from the marketplace). The marketplace may include spiders, web crawlers, and the like to seek input data sources, such as finding data pools, connected IoT devices, and the like that publish potentially relevant data. These may be trained by human users and improved by machine learning in a manner similar to that described elsewhere in this disclosure.

Figure 15:
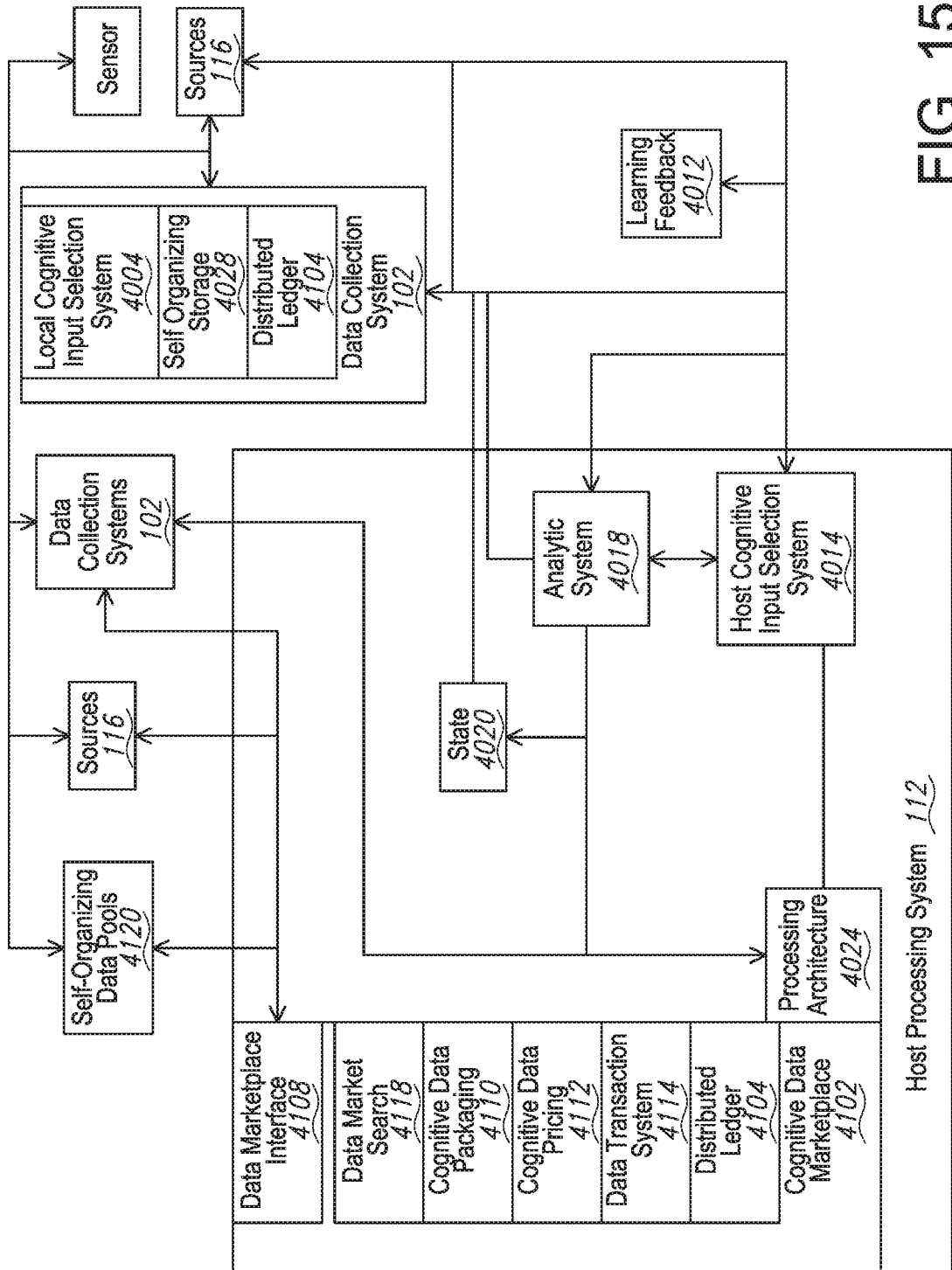
FIG. 15 is a diagrammatic view of components and interactions of a data collection architecture involving application of a platform having a cognitive data marketplace in accordance with the present disclosure.
Figure 16:
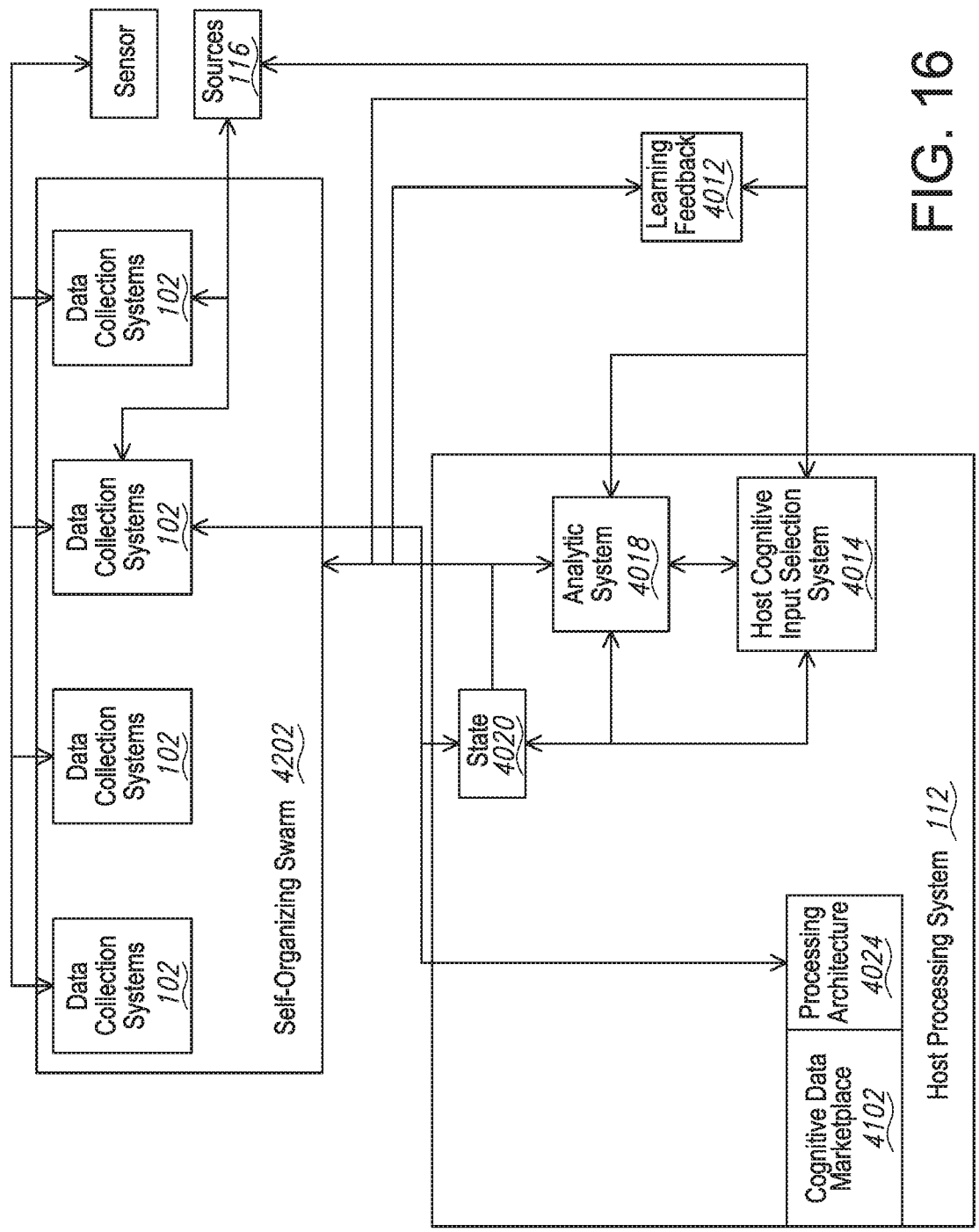
FIG. 16 is a diagrammatic view of components and interactions of a data collection architecture involving application of a self-organizing swarm of data collectors in accordance with the present disclosure.
Figure 17:
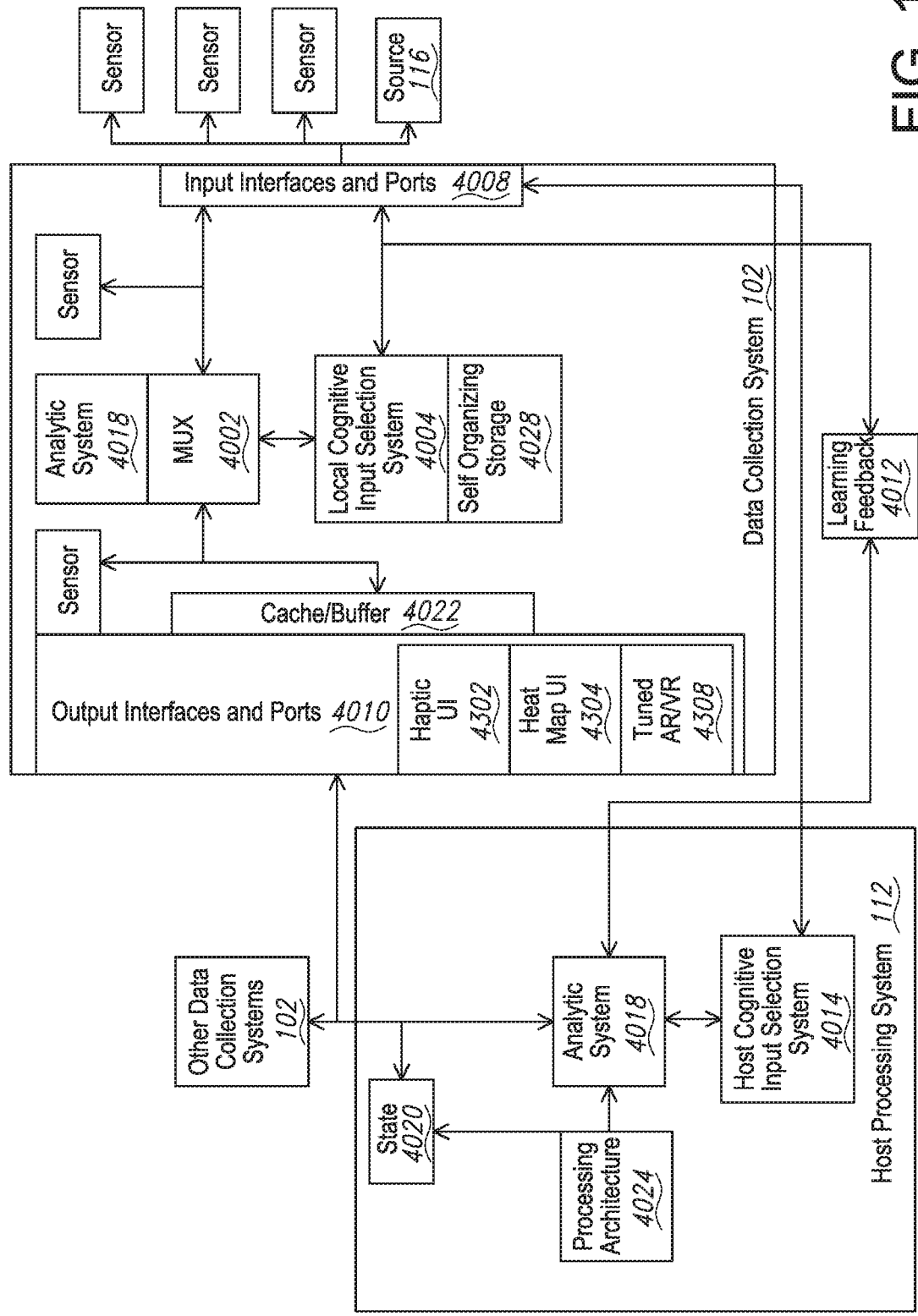
FIG. 17 is a diagrammatic view of components and interactions of a data collection architecture involving application of a haptic user interface in accordance with the present disclosure.

In embodiments, a platform is provided having a self-organizing data marketplace for industrial IoT data. Referring to FIG. 15, in embodiments, a platform is provided having a cognitive data marketplace 4102, referred to in some cases as a self-organizing data marketplace, for data collected by one or more data collection systems 102 or for data from other sensors or input sources 116 that are located in various data collection environments, such as industrial environments. In addition to data collection systems 102, this may include data collected, handled or exchanged by IoT devices, such as cameras, monitors, embedded sensors, mobile devices, diagnostic devices and systems, instrumentation systems, telematics systems, and the like, such as for monitoring various parameters and features of machines, devices, components, parts, operations, functions, conditions, states, events, workflows and other elements (collectively encompassed by the term "states") of such environments. Data may also include metadata about any of the foregoing, such as describing data, indicating provenance, indicating elements relating to identity, access, roles, and permissions, providing summaries or abstractions of data, or otherwise augmenting one or more items of data to enable further processing, such as for extraction, transforming, loading, and processing data. Such data (such term including metadata except where context indicates otherwise) may be highly valuable to third parties, either as an individual element (such as where data about the state of an environment can be used as a condition within a process) or in the aggregate (such as where collected data, optionally over many systems and devices in different environments can be used to develop models of behavior, to train learning systems, or the like). As billions of IoT devices are deployed, with countless connections, the amount of available data will proliferate. To enable access and utilization of data, the cognitive data marketplace 4102 enables various components, features, services, and processes for enabling users to supply, find, consume, and transact in packages of data, such as batches of data, streams of data (including event streams), data from various data pools 4120, and the like. In embodiments, the cognitive data marketplace 4102 may be included in, connected to, or integrated with, one or more other components of a host processing architecture 4024 of a host processing system 112, such as a cloud-based system, as well as to various sensors, input sources 115, data collection systems 102 and the like. The cognitive data marketplace 4102 may include marketplace interfaces 4108, which may include one or more supplier interfaces by which data suppliers may make data available and one more consumer interfaces by which data may be found and acquired. The consumer interface may include an interface to a data market search system 4118, which may include features that enable a user to indicate what types of data a user wishes to obtain, such as by entering keywords in a natural language search interface that characterize data or metadata. The search interface can use various search and filtering techniques, including keyword matching, collaborative filtering (such as using known preferences or characteristics of the consumer to match to similar consumers and the past outcomes of those other consumers), ranking techniques (such as ranking based on success of past outcomes according to various metrics, such as those described in connection with other embodiments in this disclosure). In embodiments, a supply interface may allow an owner or supplier of data to supply the data in one or more packages to and through the cognitive data marketplace 4102, such as packaging batches of data, streams of data, or the like. The supplier may pre-package data, such as by providing data from a single input source 116, a single sensor, and the like, or by providing combinations, permutations, and the like (such as multiplexed analog data, mixed bytes of data from multiple sources, results of extraction, loading and transformation, results of convolution, and the like), as well as by providing metadata with respect to any of the foregoing. Packaging may include pricing, such as on a per-batch basis, on a streaming basis (such as subscription to an event feed or other feed or stream), on a per item basis, on a revenue share basis, or other basis. For data involving pricing, a data transaction system 4114 may track orders, delivery, and utilization, including fulfillment of orders. The transaction system 4114 may include rich transaction features, including digital rights management, such as by managing cryptographic keys that govern access control to purchased data, that govern usage (such as allowing data to be used for a limited time, in a limited domain, by a limited set of users or roles, or for a limited purpose). The transaction system 4114 may manage payments, such as by processing credit cards, wire transfers, debits, and other forms of consideration.

In embodiments, a cognitive data packaging system 4012 of the marketplace 4102 may use machine-based intelligence to package data, such as by automatically configuring packages of data in batches, streams, pools, or the like. In embodiments, packaging may be according to one or more rules, models, or parameters, such as by packaging or aggregating data that is likely to supplement or complement an existing model. For example, operating data from a group of similar machines (such as one or more industrial machines noted throughout this disclosure) may be aggregated together, such as based on metadata indicating the type of data or by recognizing features or characteristics in the data stream that indicate the nature of the data. In embodiments, packaging may occur using machine learning and cognitive capabilities, such as by learning what combinations, permutations, mixes, layers, and the like of input sources 116, sensors, information from data pools 4120 and information from data collection systems 102 are likely to satisfy user requirements or result in measures of success. Learning may be based on learning feedback 4012, such as based on measures determined in an analytic system 4018, such as system performance measures, data collection measures, analytic measures, and the like. In embodiments, success measures may be correlated to marketplace success measures, such as viewing of packages, engagement with packages, purchase or licensing of packages, payments made for packages, and the like. Such measures may be calculated in an analytic system 4018, including associating particular feedback measures with search terms and other inputs, so that the cognitive packaging system 4110 can find and configure packages that are designed to provide increased value to consumers and increased returns for data suppliers. In embodiments, the cognitive data packaging system 4110 can automatically vary packaging, such as using different combinations, permutations, mixes, and the like, and varying weights applied to given input sources, sensors, data pools and the like, using learning feedback 4012 to promote favorable packages and de-emphasize less favorable packages. This may occur using genetic programming and similar techniques that compare outcomes for different packages. Feedback may include state information from the state system 4020 (such as about various operating states, and the like), as well as about marketplace conditions and states, such as pricing and availability information for other data sources. Thus, an adaptive cognitive data packaging system 4110 is provided that automatically adapts to conditions to provide favorable packages of data for the marketplace 4102.

In embodiments, a cognitive data pricing system 4112 may be provided to set pricing for data packages. In embodiments, the data pricing system 4112 may use a set of rules, models, or the like, such as setting pricing based on supply conditions, demand conditions, pricing of various available sources, and the like. For example, pricing for a package may be configured to be set based on the sum of the prices of constituent elements (such as input sources, sensor data, or the like), or to be set based on a rule-based discount to the sum of prices for constituent elements, or the like. Rules and conditional logic may be applied, such as rules that factor in cost factors (such as bandwidth and network usage, peak demand factors, scarcity factors, and the like), rules that factor in utilization parameters (such as the purpose, domain, user, role, duration, or the like for a package) and many others. In embodiments, the cognitive data pricing system 4112 may include fully cognitive, intelligent features, such as using genetic programming including automatically varying pricing and tracking feedback on outcomes. Outcomes on which tracking feedback may be based include various financial yield metrics, utilization metrics and the like that may be provided by calculating metrics in an analytic system 4018 on data from the data transaction system 4114.

Methods and systems are disclosed herein for self-organizing data pools which may include self-organization of data pools based on utilization and/or yield metrics, including utilization and/or yield metrics that are tracked for a plurality of data pools. The data pools may initially comprise unstructured or loosely structured pools of data that contain data from industrial environments, such as sensor data from or about industrial machines or components. For example, a data pool might take streams of data from various machines or components in an environment, such as turbines, compressors, batteries, reactors, engines, motors, vehicles, pumps, rotors, axles, bearings, valves, and many others, with the data streams containing analog and/or digital sensor data (of a wide range of types), data published about operating conditions, diagnostic and fault data, identifying data for machines or components, asset tracking data, and many other types of data. Each stream may have an identifier in the pool, such as indicating its source, and optionally its type. The data pool may be accessed by external systems, such as through one or more interfaces or APIs (e.g., RESTful APIs), or by data integration elements (such as gateways, brokers, bridges, connectors, or the like), and the data pool may use similar capabilities to get access to available data streams. A data pool may be managed by a self-organizing machine learning facility, which may configure the data pool, such as by managing what sources are used for the pool, managing what streams are available, and managing APIs or other connections into and out of the data pool. The self-organization may take feedback such as based on measures of success that may include measures of utilization and yield. The measures of utilization and yield that may include may account for the cost of acquiring and/or storing data, as well as the benefits of the pool, measured either by profit or by other measures that may include user indications of usefulness, and the like. For example, a self-organizing data pool might recognize that chemical and radiation data for an energy production environment are regularly accessed and extracted, while vibration and temperature data have not been used, in which case the data pool might automatically reorganize, such as by ceasing storage of vibration and/or temperature data, or by obtaining better sources of such data. This automated reorganization can also apply to data structures, such as promoting different data types, different data sources, different data structures, and the like, through progressive iteration and feedback.

In embodiments, a platform is provided having self-organization of data pools based on utilization and/or yield metrics. In embodiments, the data pools 4020 may be self-organizing data pools 4020, such as being organized by cognitive capabilities as described throughout this disclosure. The data pools 4020 may self-organize in response to learning feedback 4012, such as based on feedback of measures and results, including calculated in an analytic system 4018. Organization may include determining what data or packages of data to store in a pool (such as representing particular combinations, permutations, aggregations, and the like), the structure of such data (such as in flat, hierarchical, linked, or other structures), the duration of storage, the nature of storage media (such as hard disks, flash memory, SSDs, network-based storage, or the like), the arrangement of storage bits, and other parameters. The content and nature of storage may be varied, such that a data pool 4020 may learn and adapt, such as based on states of the host system 112, one or more data collection systems 102, storage environment parameters (such as capacity, cost, and performance factors), data collection environment parameters, marketplace parameters, and many others. In embodiments, pools 4020 may learn and adapt, such as by variation of the above and other parameters in response to yield metrics (such as return on investment, optimization of power utilization, optimization of revenue, and the like).

Methods and systems are disclosed herein for training AI models based on industry-specific feedback, including training an AI model based on industry-specific feedback that reflects a measure of utilization, yield, or impact, and where the AI model operates on sensor data from an industrial environment. As noted above, these models may include operating models for industrial environments, machines, workflows, models for anticipating states, models for predicting fault and optimizing maintenance, models for self-organizing storage (on devices, in data pools and/or in the cloud), models for optimizing data transport (such as for optimizing network coding, network-condition-sensitive routing, and the like), models for optimizing data marketplaces, and many others.

In embodiments, a platform is provided having training AI models based on industry-specific feedback. In embodiments, the various embodiments of cognitive systems disclosed herein may take inputs and feedback from industry-specific and domain-specific sources 116 (such as relating to optimization of specific machines, devices, components, processes, and the like). Thus, learning and adaptation of storage organization, network usage, combination of sensor and input data, data pooling, data packaging, data pricing, and other features (such as for a marketplace 4102 or for other purposes of the host processing system 112) may be configured by learning on the domain-specific feedback measures of a given environment or application, such as an application involving IoT devices (such as an industrial environment). This may include optimization of efficiency (such as in electrical, electromechanical, magnetic, physical, thermodynamic, chemical and other processes and systems), optimization of outputs (such as for production of energy, materials, products, services and other outputs), prediction, avoidance and mitigation of faults (such as in the aforementioned systems and processes), optimization of performance measures (such as returns on investment, yields, profits, margins, revenues and the like), reduction of costs (including labor costs, bandwidth costs, data costs, material input costs, licensing costs, and many others), optimization of benefits (such as relating to safety, satisfaction, health), optimization of work flows (such as optimizing time and resource allocation to processes), and others.

Methods and systems are disclosed herein for a self-organized swarm of industrial data collectors, including a self-organizing swarm of industrial data collectors that organize among themselves to optimize data collection based on the capabilities and conditions of the members of the swarm. Each member of the swarm may be configured with intelligence, and the ability to coordinate with other members. For example, a member of the swarm may track information about what data other members are handling, so that data collection activities, data storage, data processing, and data publishing can be allocated intelligently across the swarm, taking into account conditions of the environment, capabilities of the members of the swarm, operating parameters, rules (such as from a rules engine that governs the operation of the swarm), and current conditions of the members. For example, among four collectors, one that has relatively low current power levels (such as a low battery), might be temporarily allocated the role of publishing data, because it may receive a dose of power from a reader or interrogation device (such as an RFID reader) when it needs to publish the data. A second collector with good power levels and robust processing capability might be assigned more complex functions, such as processing data, fusing data, organizing the rest of the swarm (including self-organization under machine learning, such that the swarm is optimized over time, including by adjusting operating parameters, rules, and the like based on feedback), and the like. A third collector in the swarm with robust storage capabilities might be assigned the task of collecting and storing a category of data, such as vibration sensor data, that consumes considerable bandwidth. A fourth collector in the swarm, such as one with lower storage capabilities, might be assigned the role of collecting data that can usually be discarded, such as data on current diagnostic conditions, where only data on faults needs to be maintained and passed along. Members of a swarm may connect by peer-to-peer relationships by using a member as a "master" or "hub," or by having them connect in a series or ring, where each member passes along data (including commands) to the next, and is aware of the nature of the capabilities and commands that are suitable for the preceding and/or next member. The swarm may be used for allocation of storage across it (such as using memory of each memory as an aggregate data store. In these examples, the aggregate data store may support a distributed ledger, which may store transaction data, such as for transactions involving data collected by the swarm, transactions occurring in the industrial environment, or the like. In embodiments, the transaction data may also include data used to manage the swarm, the environment, or a machine or components thereof. The swarm may self-organize, either by machine learning capability disposed on one or more members of the swarm, or based on instructions from an external machine learning facility, which may optimize storage, data collection, data processing, data presentation, data transport, and other functions based on managing parameters that are relevant to each. The machine learning facility may start with an initial configuration and vary parameters of the swarm relevant to any of the foregoing (also including varying the membership of the swarm), such as iterating based on feedback to the machine learning facility regarding measures of success (such as utilization measures, efficiency measures, measures of success in prediction or anticipation of states, productivity measures, yield measures, profit measures, and others). Over time, the swarm may be optimized to a favorable configuration to achieve the desired measure of success for an owner, operator, or host of an industrial environment or a machine, component, or process thereof.

In embodiments, a platform is provided having a self-organized swarm of industrial data collectors. In embodiments, a host processing system 112, with its processing architecture 4024 (and optionally including integration with or inclusion of a cognitive data marketplace 4102) may integrate with, connect to, or use information from a self-organizing swarm 4202 of data collectors 102. In embodiments, the self-organizing swarm 4202 may organize (such as through deployment of cognitive features on one or more of the data collection systems 102) two or more data collection systems 102, such as to provided coordination of the swarm 4202. The swarm 4202 may be organized based on a hierarchical organization (such as where a master data collector 102 organizes and directs activities of one or more subservient data collectors 102), a collaborative organization (such as where decision-making for the organization of the swarm 4202 is distributed among the data collectors 102 (such as using various models for decision-making, such as voting systems, points systems, least-cost routing systems, prioritization systems, and the like, and the like. In embodiments, one or more of the data collectors 102 may have mobility capabilities, such as in cases where a data collector is disposed on or in a mobile robot, drone, mobile submersible, or the like, so that organization may include the location and positioning of the data collectors 102. Data collection systems 102 may communicate with each other and with the host processing system 112, including sharing an aggregate allocated storage space involving storage on or accessible to one or more of the collectors (which in embodiment may be treated as a unified storage space even if physically distributed, such as using virtualization capabilities). Organization may be automated based on one or more rules, models, conditions, processes, or the like (such as embodied or executed by conditional logic), and organization may be governed by policies, such as handled by the policy engine. Rules may be based on industry, application- and domain-specific objects, classes, events, workflows, processes, and systems, such as by setting up the swarm 4202 to collect selected types of data at designated places and times, such as coordinated with the foregoing. For example, the swarm 4202 may assign data collectors 102 to serially collect diagnostic, sensor, instrumentation and/or telematic data from each of a series of machines that execute an industrial process (such as a robotic manufacturing process), such as at the time and location of the input to and output from each of those machines. In embodiments, self-organization may be cognitive, such as where the swarm varies one or more collection parameters and adapts the selection of parameters, weights applied to the parameters, or the like, over time. In examples, this may be in response to learning and feedback, such as from the learning feedback system 4012 that may be based on various feedback measures that may be determined by applying the analytic system 4018 (which in embodiments may reside on the swarm 4202, the host processing system 112, or a combination thereof) to data handled by the swarm 4202 or to other elements of the various embodiments disclosed herein (including marketplace elements and others). Thus, the swarm 4202 may display adaptive behavior, such as adapting to the current state 4020 or an anticipated state of its environment (accounting for marketplace behavior), behavior of various objects (such as IoT devices, machines, components, and systems), processes (including events, states, workflows, and the like), and other factors at a given time. Parameters that may be varied in a process of variation (such as in a neural net, self-organizing map, or the like), selection, promotion, or the like (such as enabled by genetic programming or other AI-based techniques). Parameters that may be managed, varied, selected and adapted by cognitive, machine learning may include storage parameters (location, type, duration, amount, structure and the like across the swarm 4202), network parameters (such as how the swarm 4202 is organized, such as in mesh, peer-to-peer, ring, serial, hierarchical and other network configurations as well as bandwidth utilization, data routing, network protocol selection, network coding type, and other networking parameters), security parameters (such as settings for various security applications and services), location and positioning parameters (such as routing movement of mobile data collectors 102 to locations, positioning and orienting collectors 102 and the like relative to points of data acquisition, relative to each other, and relative to locations where network availability may be favorable, among others), input selection parameters (such as input selection among sensors, input sources 116 and the like for each collector 102 and for the aggregate collection), data combination parameters (such as for sensor fusion, input combination, multiplexing, mixing, layering, convolution, and other combinations), power parameters (such as based on power levels and power availability for one or more collectors 102 or other objects, devices, or the like), states (including anticipated states and conditions of the swarm 4202, individual collection systems 102, the host processing system 112 or one or more objects in an environment), events, and many others. Feedback may be based on any of the kinds of feedback described herein, such that over time the swarm may adapt to its current and anticipated situation to achieve a wide range of desired objectives.

Methods and systems are disclosed herein for an industrial IoT distributed ledger, including a distributed ledger supporting the tracking of transactions executed in an automated data marketplace for industrial IoT data. A distributed ledger may distribute storage across devices, using a secure protocol, such as ones used for cryptocurrencies (such as the Blockchain™ protocol used to support the Bitcoin™ currency). A ledger or similar transaction record, which may comprise a structure where each successive member of a chain stores data for previous transactions, and a competition can be established to determine which of alternative data stored data structures is "best" (such as being most complete), can be stored across data collectors, industrial machines or components, data pools, data marketplaces, cloud computing elements, servers, and/or on the IT infrastructure of an enterprise (such as an owner, operator or host of an industrial environment or of the systems disclosed herein). The ledger or transaction may be optimized by machine learning, such as to provide storage efficiency, security, redundancy, or the like.

In embodiments, the cognitive data marketplace 4102 may use a secure architecture for tracking and resolving transactions, such as a distributed ledger 4004, wherein transactions in data packages are tracked in a chained, distributed data structure, such as a Blockchain™, allowing forensic analysis and validation where individual devices store a portion of the ledger representing transactions in data packages. The distributed ledger 4004 may be distributed to IoT devices, to data pools 4020, to data collection systems 102, and the like, so that transaction information can be verified without reliance on a single, central repository of information. The transaction system 4114 may be configured to store data in the distributed ledger 4004 and to retrieve data from it (and from constituent devices) in order to resolve transactions. Thus, a distributed ledger 4004 for handling transactions in data, such as for packages of IoT data, is provided. In embodiments, the self-organizing storage system 4028 may be used for optimizing storage of distributed ledger data, as well as for organizing storage of packages of data, such as IoT data, that can be presented in the marketplace 4102.

Methods and systems are disclosed herein for a self-organizing collector, including a self-organizing, multi-sensor data collector that can optimize data collection, power and/or yield based on conditions in its environment. The collector may, for example, organize data collection by turning on and off particular sensors, such as based on past utilization patterns or measures of success, as managed by a machine learning facility that iterates configurations and tracks measures of success. For example, a multi-sensor collector may learn to turn off certain sensors when power levels are low or during time periods where utilization of the data from such sensors is low, or vice versa. Self-organization can also automatically organize how data is collected (which sensors, from what external sources), how data is stored (at what level of granularity or compression, for how long, etc.), how data is presented (such as in fused or multiplexed structures, in byte-like structures, or in intermediate statistical structures). This may be improved over time, from an initial configuration, by training the self-organizing facility based on data sets from real operating environments, such as based on feedback measures, including many of the types of feedback described throughout this disclosure.

Methods and systems are disclosed herein for a network-sensitive collector, including a network condition-sensitive, self-organizing, multi-sensor data collector that can optimize based on bandwidth, quality of service, pricing and/or other network conditions. Network sensitivity can include awareness of the price of data transport (such as allowing the system to pull or push data during off-peak periods or within the available parameters of paid data plans), the quality of the network (such as to avoid periods where errors are likely), the quality of environmental conditions (such as delaying transmission until signal quality is good, such as when a collector emerges from a shielded environment, avoiding wasting use of power when seeking a signal when shielded, such as by large metal structures typically of industrial environments), and the like.

Methods and systems are disclosed herein for a remotely organized universal data collector that can power up and down sensor interfaces based on need and/or conditions identified in an industrial data collection environment. For example, interfaces can recognize what sensors are available and interfaces and/or processors can be turned on to take input from such sensors, including hardware interfaces that allow the sensors to plug in to the data collector, wireless data interfaces (such as where the collector can ping the sensor, optionally providing some power via an interrogation signal), and software interfaces (such as for handling particular types of data). Thus, a collector that is capable of handling various kinds of data can be configured to adapt to the particular use in a given environment. In embodiments, configuration may be automatic or under machine learning, which may improve configuration by optimizing parameters based on feedback measures over time.

Methods and systems are disclosed herein for self-organizing storage for a multi-sensor data collector, including self-organizing storage for a multi-sensor data collector for industrial sensor data. Self-organizing storage may allocate storage based on application of machine learning, which may improve storage configuration based on feedback measure over time. Storage may be optimized by configuring what data types are used (e.g., byte-like structures, structures representing fused data from multiple sensors, structures representing statistics or measures calculated by applying mathematical functions on data, and the like) by configuring compression, by configuring data storage duration, by configuring write strategies (such as by striping data across multiple storage devices, using protocols where one device stores instructions for other devices in a chain, and the like), and by configuring storage hierarchies, such as by providing pre-calculated intermediate statistics to facilitate more rapid access to frequently accessed data items). Thus, highly intelligent storage systems may be configured and optimized, based on feedback, over time.

Methods and systems are disclosed herein for self-organizing network coding for a multi-sensor data network, including self-organizing network coding for a data network that transports data from multiple sensors in an industrial data collection environment. Network coding, including random linear network coding, can enable highly efficient and reliable transport of large amounts of data over various kinds of networks. Different network coding configurations can be selected, based on machine learning, to optimize network coding and other network transport characteristics based on network conditions, environmental conditions, and other factors, such as the nature of the data being transported, environmental conditions, operating conditions, and the like (including by training a network coding selection model over time based on feedback of measures of success, such as any of the measures described herein).

In embodiments, a platform is provided having a self-organizing network coding for multi-sensor data network. A cognitive system may vary one or more parameters for networking, such as network type selection (e.g., selecting among available local, cellular, satellite, Wi-Fi, Bluetooth, NFC, Zigbee and other networks), network selection (such as selecting a specific network, such as one that is known to have desired security features), network coding selection (such as selecting a type of network coding for efficient transport), network timing selection (such as configuring delivery based on network pricing conditions, traffic and the like), network feature selection (such as selecting cognitive features, security features, and the like), network conditions (such as network quality based on current environmental or operation conditions), network feature selection (such as enabling available authentication, permission and similar systems), network protocol selection (such as among HTTP, IP, TCP/IP, cellular, satellite, serial, packet, streaming, and many other protocols), and others. Given bandwidth constraints, price variations, sensitivity to environmental factors, security concerns, and the like, selecting the optimal network configuration can be highly complex and situation dependent. The self-organizing networking system 4030 may vary combinations and permutations of these parameters while taking input from a learning feedback system 4012 such as using information from the analytic system 4018 about various measures of outcomes. In the many examples, outcomes may include overall system measures, analytic success measures, and local performance indicators. In embodiments, input from a learning feedback system 4012 may include information from various sensors and input sources 116, information from the state system 4020 about states (such as events, environmental conditions, operating conditions, and many others), or other information) or taking other inputs. By variation and selection of alternative configurations of networking parameters in different states, the self-organizing networking system may find configurations that are well-adapted to the environment that is being monitored or controlled by the host system 112, such as the one where one or more data collection systems 102 are located and that are well-adapted to emerging network conditions. Thus, a self-organizing, network-condition-adaptive data collection system is provided.

Referring to FIG. 42, a data collection system 102 may have one or more output interfaces and/or ports 4010. These may include network ports and connections, application programming interfaces, and the like. Methods and systems are disclosed herein for a haptic or multi-sensory user interface, including a wearable haptic or multi-sensory user interface for an industrial sensor data collector, with vibration, heat, electrical and/or sound outputs. For example, an interface may, based on a data structure configured to support it, be set up to provide a user with input or feedback, such as based on data from sensors in the environment. For example, if a fault condition based on a vibration data (such as resulting from a bearing being worn down, an axle being misaligned, or a resonance condition between machines) is detected, it can be presented in a haptic interface by vibration of an interface, such as shaking a wrist-worn device. Similarly, thermal data indicating overheating could be presented by warming or cooling a wearable device, such as while a worker is working on a machine and cannot necessarily look at a user interface. Similarly, electrical, or magnetic data may be presented by a buzzing, and the like, such as to indicate presence of an open electrical connection or wire, etc. That is, a multi-sensory interface can intuitively help a user (such as one wearing a wearable device) get a quick indication of what is going on in an environment, with the wearable interface having various modes of interaction that do not require a user to have eyes on a graphical UI, which may be difficult or impossible in many industrial environments where a user needs to keep an eye on the environment.

In embodiments, a platform is provided having a wearable haptic user interface for an industrial sensor data collector, with vibration, heat, electrical and/or sound outputs. In embodiments, a haptic user interface 4302 is provided as an output for a data collection system 102, such as for handling and providing information for vibration, heat, electrical and/or sound outputs, such as to one or more components of the data collection system 102 or to another system, such as a wearable device, mobile phone, or the like. A data collection system 102 may be provided in a form factor suitable for delivering haptic input to a user, such as by vibrating, warming or cooling, buzzing, or the like, such as being disposed in headgear, an armband, a wristband or watch, a belt, an item of clothing, a uniform, or the like. In such cases, data collection systems 102 may be integrated with gear, uniforms, equipment, or the like worn by users, such as individuals responsible for operating or monitoring an industrial environment. In embodiments, signals from various sensors or input sources (or selective combinations, permutations, mixes, and the like, as managed by one or more of the cognitive input selection systems 4004, 4014) may trigger haptic feedback. For example, if a nearby industrial machine is overheating, the haptic interface may alert a user by warming up, or by sending a signal to another device (such as a mobile phone) to warm up. If a system is experiencing unusual vibrations, the haptic interface may vibrate. Thus, through various forms of haptic input, a data collection system 102 may inform users of the need to attend to one or more devices, machines, or other factors (such as in an industrial environment) without requiring them to read messages or divert their visual attention away from the task at hand. The haptic interface, and selection of what outputs should be provided, may be considered in the cognitive input selection systems 4004, 4014. For example, user behavior (such as responses to inputs) may be monitored and analyzed in an analytic system 4018, and feedback may be provided through the learning feedback system 4012, so that signals may be provided based on the right collection or package of sensors and inputs, at the right time and in the right manner, to optimize the effectiveness of the haptic system 4202. This may include rule-based or model-based feedback (such as providing outputs that correspond in some logical fashion to the source data that is being conveyed). In embodiments, a cognitive haptic system may be provided, where selection of inputs or triggers for haptic feedback, selection of outputs, timing, intensity levels, durations, and other parameters (or weights applied to them) may be varied in a process of variation, promotion, and selection (such as using genetic programming) with feedback based on real world responses to feedback in actual situations or based on results of simulation and testing of user behavior. Thus, an adaptive haptic interface for a data collection system 102 is provided, which may learn and adapt feedback to satisfy requirements and to optimize the impact on user behavior, such as for overall system outcomes, data collection outcomes, analytic outcomes, and the like.

Methods and systems are disclosed herein for a presentation layer for AR/VR industrial glasses, where heat map elements are presented based on patterns and/or parameters in collected data. Methods and systems are disclosed herein for condition-sensitive, self-organized tuning of AR/VR interfaces based on feedback metrics and/or training in industrial environments. In embodiments, any of the data, measures, and the like described throughout this disclosure can be presented by visual elements, overlays, and the like for presentation in the AR/VR interfaces, such as in industrial glasses, on AR/VR interfaces on smart phones or tablets, on AR/VR interfaces on data collectors (which may be embodied in smart phones or tablets), on displays located on machines or components, and/or on displays located in industrial environments.

In embodiments, a platform is provided having heat maps displaying collected data for AR/VR. In embodiments, a platform is provided having heat maps 4204 displaying collected data from a data collection system 102 for providing input to an AR/VR interface 4208. In embodiments, the heat map interface 4304 is provided as an output for a data collection system 102, such as for handling and providing information for visualization of various sensor data and other data (such as map data, analog sensor data, and other data), such as to one or more components of the data collection system 102 or to another system, such as a mobile device, tablet, dashboard, computer, AR/VR device, or the like. A data collection system 102 may be provided in a form factor suitable for delivering visual input to a user, such as by presenting a map that includes indicators of levels of analog and digital sensor data (such as indicating levels of rotation, vibration, heating or cooling, pressure, and many other conditions). In such cases, data collection systems 102 may be integrated with equipment, or the like that are used by individuals responsible for operating or monitoring an industrial environment. In embodiments, signals from various sensors or input sources (or selective combinations, permutations, mixes, and the like, as managed by one or more of the cognitive input selection systems 4004, 4014) may provide input data to a heat map. Coordinates may include real world location coordinates (such as geo-location or location on a map of an environment), as well as other coordinates, such as time-based coordinates, frequency-based coordinates, or other coordinates that allow for representation of analog sensor signals, digital signals, input source information, and various combinations, in a map-based visualization, such that colors may represent varying levels of input along the relevant dimensions. For example, if a nearby industrial machine is overheating, the heat map interface may alert a user by showing a machine in bright red. If a system is experiencing unusual vibrations, the heat map interface may show a different color for a visual element for the machine, or it may cause an icon or display element representing the machine to vibrate in the interface, calling attention to the element. Clicking, touching, or otherwise interacting with the map can allow a user to drill down and see underlying sensor or input data that is used as an input to the heat map display. Thus, through various forms of display, a data collection system 102 may inform users of the need to attend to one or more devices, machines, or other factors, such as in an industrial environment, without requiring them to read text-based messages or input. The heat map interface, and selection of what outputs should be provided, may be considered in the cognitive input selection systems 4004, 4014. For example, user behavior (such as responses to inputs or displays) may be monitored and analyzed in an analytic system 4018, and feedback may be provided through the learning feedback system 4012, so that signals may be provided based on the right collection or package of sensors and inputs, at the right time and in the right manner, to optimize the effectiveness of the heat map UI 4304. This may include rule-based or model-based feedback (such as providing outputs that correspond in some logical fashion to the source data that is being conveyed). In embodiments, a cognitive heat map system may be provided, where selection of inputs or triggers for heat map displays, selection of outputs, colors, visual representation elements, timing, intensity levels, durations and other parameters (or weights applied to them) may be varied in a process of variation, promotion and selection (such as using genetic programming) with feedback based on real world responses to feedback in actual situations or based on results of simulation and testing of user behavior. Thus, an adaptive heat map interface for a data collection system 102, or data collected thereby 102, or data handled by a host processing system 112, is provided, which may learn and adapt feedback to satisfy requirements and to optimize the impact on user behavior and reaction, such as for overall system outcomes, data collection outcomes, analytic outcomes, and the like.

In embodiments, a platform is provided having automatically tuned AR/VR visualization of data collected by a data collector. In embodiments, a platform is provided having an automatically tuned AR/VR visualization system 4308 for visualization of data collected by a data collection system 102, such as where the data collection system 102 has an AR/VR interface 4208 or provides input to an AR/VR interface 4308 (such as a mobile phone positioned in a virtual reality or AR headset, a set of AR glasses, or the like). In embodiments, the AR/VR system 4308 is provided as an output interface of a data collection system 102, such as for handling and providing information for visualization of various sensor data and other data (such as map data, analog sensor data, and other data), such as to one or more components of the data collection system 102 or to another system, such as a mobile device, tablet, dashboard, computer, AR/VR device, or the like. A data collection system 102 may be provided in a form factor suitable for delivering AR or VR visual, auditory, or other sensory input to a user, such as by presenting one or more displays (such as 3D-realistic visualizations, objects, maps, camera overlays, or other overlay elements, maps and the like that include or correspond to indicators of levels of analog and digital sensor data (such as indicating levels of rotation, vibration, heating or cooling, pressure and many other conditions, to input sources 116, or the like). In such cases, data collection systems 102 may be integrated with equipment, or the like that are used by individuals responsible for operating or monitoring an industrial environment.

In embodiments, signals from various sensors or input sources (or selective combinations, permutations, mixes, and the like as managed by one or more of the cognitive input selection systems 4004, 4014) may provide input data to populate, configure, modify, or otherwise determine the AR/VR element. Visual elements may include a wide range of icons, map elements, menu elements, sliders, toggles, colors, shapes, sizes, and the like, for representation of analog sensor signals, digital signals, input source information, and various combinations. In many examples, colors, shapes, and sizes of visual overlay elements may represent varying levels of input along the relevant dimensions for a sensor or combination of sensors. In further examples, if a nearby industrial machine is overheating, an AR element may alert a user by showing an icon representing that type of machine in flashing red color in a portion of the display of a pair of AR glasses. If a system is experiencing unusual vibrations, a virtual reality interface showing visualization of the components of the machine (such as overlaying a camera view of the machine with 3D visualization elements) may show a vibrating component in a highlighted color, with motion, or the like, so that it stands out in a virtual reality environment being used to help a user monitor or service the machine. Clicking, touching, moving eyes toward, or otherwise interacting with a visual element in an AR/VR interface may allow a user to drill down and see underlying sensor or input data that is used as an input to the display. Thus, through various forms of display, a data collection system 102 may inform users of the need to attend to one or more devices, machines, or other factors (such as in an industrial environment), without requiring them to read text-based messages or input or divert attention from the applicable environment (whether it is a real environment with AR features or a virtual environment, such as for simulation, training, or the like).

The AR/VR output interface 4208, and selection and configuration of what outputs or displays should be provided, may be handled in the cognitive input selection systems 4004, 4014. For example, user behavior (such as responses to inputs or displays) may be monitored and analyzed in an analytic system 4018, and feedback may be provided through the learning feedback system 4012, so that AR/VR display signals may be provided based on the right collection or package of sensors and inputs, at the right time and in the right manner, to optimize the effectiveness of the AR/VR UI 4308. This may include rule-based or model-based feedback (such as providing outputs that correspond in some logical fashion to the source data that is being conveyed). In embodiments, a cognitively tuned AR/VR interface control system 4308 may be provided, where selection of inputs or triggers for AR/VR display elements, selection of outputs (such as colors, visual representation elements, timing, intensity levels, durations and other parameters) and other parameters of a VR/AR environment may be varied in a process of variation, promotion and selection (such as using genetic programming) with feedback based on real world responses in actual situations or based on results of simulation and testing of user behavior. Thus, an adaptive, tuned AR/VR interface for a data collection system 102, or data collected thereby 102, or data handled by a host processing system 112, is provided, which may learn and adapt feedback to satisfy requirements and to optimize the impact on user behavior and reaction, such as for overall system outcomes, data collection outcomes, analytic outcomes, and the like.

As noted above, methods and systems are disclosed herein for continuous ultrasonic monitoring, including providing continuous ultrasonic monitoring of rotating elements and bearings of an energy production facility. Embodiments include using continuous ultrasonic monitoring of an industrial environment as a source for a cloud-deployed pattern recognizer. Embodiments include using continuous ultrasonic monitoring to provide updated state information to a state machine that is used as an input to a cloud-based pattern recognizer. Embodiments include making available continuous ultrasonic monitoring information to a user based on a policy declared in a policy engine. Embodiments include storing ultrasonic continuous monitoring data with other data in a fused data structure on an industrial sensor device. Embodiments include making a stream of continuous ultrasonic monitoring data from an industrial environment available as a service from a data marketplace. Embodiments include feeding a stream of continuous ultrasonic data into a self-organizing data pool. Embodiments include training a machine learning model to monitor a continuous ultrasonic monitoring data stream where the model is based on a training set created from human analysis of such a data stream, and is improved based on data collected on performance in an industrial environment. Embodiments include a swarm of data collectors that include at least one data collector for continuous ultrasonic monitoring of an industrial environment and at least one other type of data collector. Embodiments include using a distributed ledger to store time-series data from continuous ultrasonic monitoring across multiple devices. Embodiments include collecting a stream of continuous ultrasonic data in a self-organizing data collector. Embodiments include collecting a stream of continuous ultrasonic data in a network-sensitive data collector.

Embodiments include collecting a stream of continuous ultrasonic data in a remotely organized data collector. Embodiments include collecting a stream of continuous ultrasonic data in a data collector having self-organized storage. Embodiments include using self-organizing network coding to transport a stream of ultrasonic data collected from an industrial environment. Embodiments include conveying an indicator of a parameter of a continuously collected ultrasonic data stream via a sensory interface of a wearable device. Embodiments include conveying an indicator of a parameter of a continuously collected ultrasonic data stream via a heat map visual interface of a wearable device. Embodiments include conveying an indicator of a parameter of a continuously collected ultrasonic data stream via an interface that operates with self-organized tuning of the interface layer.

As noted above, methods and systems are disclosed herein for cloud-based, machine pattern recognition based on fusion of remote, analog industrial sensors. Embodiments include taking input from a plurality of analog sensors disposed in an industrial environment, multiplexing the sensors into a multiplexed data stream, feeding the data stream into a cloud-deployed machine learning facility, and training a model of the machine learning facility to recognize a defined pattern associated with the industrial environment. Embodiments include using a cloud-based pattern recognizer on input states from a state machine that characterizes states of an industrial environment. Embodiments include deploying policies by a policy engine that govern what data can be used by what users and for what purpose in cloud-based, machine learning. Embodiments include feeding inputs from multiple devices that have fused, on-device storage of multiple sensor streams into a cloud-based pattern recognizer. Embodiments include making an output from a cloud-based machine pattern recognizer that analyzes fused data from remote, analog industrial sensors available as a data service in a data marketplace. Embodiments include using a cloud-based platform to identify patterns in data across a plurality of data pools that contain data published from industrial sensors. Embodiments include training a model to identify preferred sensor sets to diagnose a condition of an industrial environment, where a training set is created by a human user and the model is improved based on feedback from data collected about conditions in an industrial environment.

Embodiments include a swarm of data collectors that is governed by a policy that is automatically propagated through the swarm. Embodiments include using a distributed ledger to store sensor fusion information across multiple devices. Embodiments include feeding input from a set of self-organizing data collectors into a cloud-based pattern recognizer that uses data from multiple sensors for an industrial environment. Embodiments include feeding input from a set of network-sensitive data collectors into a cloud-based pattern recognizer that uses data from multiple sensors from the industrial environment. Embodiments include feeding input from a set of remotely organized data collectors into a cloud-based pattern recognizer that determines user data from multiple sensors from the industrial environment. Embodiments include feeding input from a set of data collectors having self-organized storage into a cloud-based pattern recognizer that uses data from multiple sensors from the industrial environment. Embodiments include a system for data collection in an industrial environment with self-organizing network coding for data transport of data fused from multiple sensors in the environment. Embodiments include conveying information formed by fusing inputs from multiple sensors in an industrial data collection system in a multi-sensory interface. Embodiments include conveying information formed by fusing inputs from multiple sensors in an industrial data collection system in a heat map interface. Embodiments include conveying information formed by fusing inputs from multiple sensors in an industrial data collection system in an interface that operates with self-organized tuning of the interface layer.

As noted above, methods and systems are disclosed herein for cloud-based, machine pattern analysis of state information from multiple analog industrial sensors to provide anticipated state information for an industrial system. Embodiments include providing cloud-based pattern analysis of state information from multiple analog industrial sensors to provide anticipated state information for an industrial system. Embodiments include using a policy engine to determine what state information can be used for cloud-based machine analysis. Embodiments include feeding inputs from multiple devices that have fused and on-device storage of multiple sensor streams into a cloud-based pattern recognizer to determine an anticipated state of an industrial environment. Embodiments include making anticipated state information from a cloud-based machine pattern recognizer that analyzes fused data from remote, analog industrial sensors available as a data service in a data marketplace. Embodiments include using a cloud-based pattern recognizer to determine an anticipated state of an industrial environment based on data collected from data pools that contain streams of information from machines in the environment. Embodiments include training a model to identify preferred state information to diagnose a condition of an industrial environment, where a training set is created by a human user and the model is improved based on feedback from data collected about conditions in an industrial environment. Embodiments include a swarm of data collectors that feeds a state machine that maintains current state information for an industrial environment. Embodiments include using a distributed ledger to store historical state information for fused sensor states a self-organizing data collector that feeds a state machine that maintains current state information for an industrial environment. Embodiments include a network-sensitive data collector that feeds a state machine that maintains current state information for an industrial environment. Embodiments include a remotely organized data collector that feeds a state machine that maintains current state information for an industrial environment. Embodiments include a data collector with self-organized storage that feeds a state machine that maintains current state information for an industrial environment. Embodiments include a system for data collection in an industrial environment with self-organizing network coding for data transport and maintains anticipated state information for the environment. Embodiments include conveying anticipated state information determined by machine learning in an industrial data collection system in a multi-sensory interface. Embodiments include conveying anticipated state information determined by machine learning in an industrial data collection system in a heat map interface. Embodiments include conveying anticipated state information determined by machine learning in an industrial data collection system in an interface that operates with self-organized tuning of the interface layer.

As noted above, methods and systems are disclosed herein for a cloud-based policy automation engine for IoT, with creation, deployment, and management of IoT devices, including a cloud-based policy automation engine for IoT, enabling creation, deployment and management of policies that apply to IoT devices. Embodiments include deploying a policy regarding data usage to an on-device storage system that stores fused data from multiple industrial sensors. Embodiments include deploying a policy relating to what data can be provided to whom in a self-organizing marketplace for IoT sensor data. Embodiments include deploying a policy across a set of self-organizing pools of data that contain data streamed from industrial sensing devices to govern use of data from the pools. Embodiments include training a model to determine what policies should be deployed in an industrial data collection system. Embodiments include deploying a policy that governs how a self-organizing swarm should be organized for a particular industrial environment. Embodiments include storing a policy on a device that governs use of storage capabilities of the device for a distributed ledger. Embodiments include deploying a policy that governs how a self-organizing data collector should be organized for a particular industrial environment. Embodiments include deploying a policy that governs how a network-sensitive data collector should use network bandwidth for a particular industrial environment. Embodiments include deploying a policy that governs how a remotely organized data collector should collect, and make available, data relating to a specified industrial environment. Embodiments include deploying a policy that governs how a data collector should self-organize storage for a particular industrial environment. Embodiments include a system for data collection in an industrial environment with a policy engine for deploying policy within the system and self-organizing network coding for data transport. Embodiments include a system for data collection in an industrial environment with a policy engine for deploying a policy within the system, where a policy applies to how data will be presented in a multi-sensory interface. Embodiments include a system for data collection in an industrial environment with a policy engine for deploying a policy within the system, where a policy applies to how data will be presented in a heat map visual interface. Embodiments include a system for data collection in an industrial environment with a policy engine for deploying a policy within the system, where a policy applies to how data will be presented in an interface that operates with self-organized tuning of the interface layer.

As noted above, methods and systems are disclosed herein for on-device sensor fusion and data storage for industrial IoT devices, including on-device sensor fusion and data storage for an industrial IoT device, where data from multiple sensors is multiplexed at the device for storage of a fused data stream. Embodiments include a self-organizing marketplace that presents fused sensor data that is extracted from on-device storage of IoT devices. Embodiments include streaming fused sensor information from multiple industrial sensors and from an on-device data storage facility to a data pool. Embodiments include training a model to determine what data should be stored on a device in a data collection environment. Embodiments include a self-organizing swarm of industrial data collectors that organize among themselves to optimize data collection, where at least some of the data collectors have on-device storage of fused data from multiple sensors. Embodiments include storing distributed ledger information with fused sensor information on an industrial IoT device. Embodiments include on-device sensor fusion and data storage for a self-organizing industrial data collector. Embodiments include on-device sensor fusion and data storage for a network-sensitive industrial data collector. Embodiments include on-device sensor fusion and data storage for a remotely organized industrial data collector. Embodiments include on-device sensor fusion and self-organizing data storage for an industrial data collector. Embodiments include a system for data collection in an industrial environment with on-device sensor fusion and self-organizing network coding for data transport. Embodiments include a system for data collection with on-device sensor fusion of industrial sensor data, where data structures are stored to support alternative, multi-sensory modes of presentation. Embodiments include a system for data collection with on-device sensor fusion of industrial sensor data, where data structures are stored to support visual heat map modes of presentation. Embodiments include a system for data collection with on-device sensor fusion of industrial sensor data, where data structures are stored to support an interface that operates with self-organized tuning of the interface layer.

As noted above, methods and systems are disclosed herein for a self-organizing data marketplace for industrial IoT data, including a self-organizing data marketplace for industrial IoT data, where available data elements are organized in the marketplace for consumption by consumers based on training a self-organizing facility with a training set and feedback from measures of marketplace success. Embodiments include organizing a set of data pools in a self-organizing data marketplace based on utilization metrics for the data pools. Embodiments include training a model to determine pricing for data in a data marketplace. Embodiments include feeding a data marketplace with data streams from a self-organizing swarm of industrial data collectors. Embodiments include using a distributed ledger to store transactional data for a self-organizing marketplace for industrial IoT data. Embodiments include feeding a data marketplace with data streams from self-organizing industrial data collectors. Embodiments include feeding a data marketplace with data streams from a set of network-sensitive industrial data collectors. Embodiments include feeding a data marketplace with data streams from a set of remotely organized industrial data collectors. Embodiments include feeding a data marketplace with data streams from a set of industrial data collectors that have self-organizing storage. Embodiments include using self-organizing network coding for data transport to a marketplace for sensor data collected in industrial environments. Embodiments include providing a library of data structures suitable for presenting data in alternative, multi-sensory interface modes in a data marketplace. Embodiments include providing a library in a data marketplace of data structures suitable for presenting data in heat map visualization. Embodiments include providing a library in a data marketplace of data structures suitable for presenting data in interfaces that operate with self-organized tuning of the interface layer.

As noted above, methods and systems are disclosed herein for self-organizing data pools, including self-organization of data pools based on utilization and/or yield metrics, including utilization and/or yield metrics that are tracked for a plurality of data pools. Embodiments include training a model to present the most valuable data in a data marketplace, where training is based on industry-specific measures of success. Embodiments include populating a set of self-organizing data pools with data from a self-organizing swarm of data collectors. Embodiments include using a distributed ledger to store transactional information for data that is deployed in data pools, where the distributed ledger is distributed across the data pools. Embodiments include self-organizing of data pools based on utilization and/or yield metrics that are tracked for a plurality of data pools, where the pools contain data from self-organizing data collectors. Embodiments include populating a set of self-organizing data pools with data from a set of network-sensitive data collectors. Embodiments include populating a set of self-organizing data pools with data from a set of remotely organized data collectors. Embodiments include populating a set of self-organizing data pools with data from a set of data collectors having self-organizing storage. Embodiments include a system for data collection in an industrial environment with self-organizing pools for data storage and self-organizing network coding for data transport. Embodiments include a system for data collection in an industrial environment with self-organizing pools for data storage that include a source data structure for supporting data presentation in a multi-sensory interface. Embodiments include a system for data collection in an industrial environment with self-organizing pools for data storage that include a source data structure for supporting data presentation in a heat map interface. Embodiments include a system for data collection in an industrial environment with self-organizing pools for data storage that include source a data structure for supporting data presentation in an interface that operates with self-organized tuning of the interface layer.

As noted above, methods and systems are disclosed herein for training AI models based on industry-specific feedback, including training an AI model based on industry-specific feedback that reflects a measure of utilization, yield, or impact, where the AI model operates on sensor data from an industrial environment. Embodiments include training a swarm of data collectors based on industry-specific feedback. Embodiments include training an AI model to identify and use available storage locations in an industrial environment for storing distributed ledger information. Embodiments include training a swarm of self-organizing data collectors based on industry-specific feedback. Embodiments include training a network-sensitive data collector based on network and industrial conditions in an industrial environment. Embodiments include training a remote organizer for a remotely organized data collector based on industry-specific feedback measures. Embodiments include training a self-organizing data collector to configure storage based on industry-specific feedback. Embodiments include a system for data collection in an industrial environment with cloud-based training of a network coding model for organizing network coding for data transport. Embodiments include a system for data collection in an industrial environment with cloud-based training of a facility that manages presentation of data in a multi-sensory interface. Embodiments include a system for data collection in an industrial environment with cloud-based training of a facility that manages presentation of data in a heat map interface. Embodiments include a system for data collection in an industrial environment with cloud-based training of a facility that manages presentation of data in an interface that operates with self-organized tuning of the interface layer.

As noted above, methods and systems are disclosed herein for a self-organized swarm of industrial data collectors, including a self-organizing swarm of industrial data collectors that organize among themselves to optimize data collection based on the capabilities and conditions of the members of the swarm. Embodiments include deploying distributed ledger data structures across a swarm of data. Embodiments include a self-organizing swarm of self-organizing data collectors for data collection in industrial environments. Embodiments include a self-organizing swarm of network-sensitive data collectors for data collection in industrial environments. Embodiments include a self-organizing swarm of network-sensitive data collectors for data collection in industrial environments, where the swarm is also configured for remote organization. Embodiments include a self-organizing swarm of data collectors having self-organizing storage for data collection in industrial environments. Embodiments include a system for data collection in an industrial environment with a self-organizing swarm of data collectors and self-organizing network coding for data transport. Embodiments include a system for data collection in an industrial environment with a self-organizing swarm of data collectors that relay information for use in a multi-sensory interface. Embodiments include a system for data collection in an industrial environment with a self-organizing swarm of data collectors that relay information for use in a heat map interface. Embodiments include a system for data collection in an industrial environment with a self-organizing swarm of data collectors that relay information for use in an interface that operates with self-organized tuning of the interface layer.

As noted above, methods and systems are disclosed herein for an industrial IoT distributed ledger, including a distributed ledger supporting the tracking of transactions executed in an automated data marketplace for industrial IoT data. Embodiments include a self-organizing data collector that is configured to distribute collected information to a distributed ledger. Embodiments include a network-sensitive data collector that is configured to distribute collected information to a distributed ledger based on network conditions. Embodiments include a remotely organized data collector that is configured to distribute collected information to a distributed ledger based on intelligent, remote management of the distribution. Embodiments include a data collector with self-organizing local storage that is configured to distribute collected information to a distributed ledger. Embodiments include a system for data collection in an industrial environment using a distributed ledger for data storage and self-organizing network coding for data transport. Embodiments include a system for data collection in an industrial environment using a distributed ledger for data storage of a data structure supporting a haptic interface for data presentation. Embodiments include a system for data collection in an industrial environment using a distributed ledger for data storage of a data structure supporting a heat map interface for data presentation. Embodiments include a system for data collection in an industrial environment using a distributed ledger for data storage of a data structure supporting an interface that operates with self-organized tuning of the interface layer.

As noted above, methods and systems are disclosed herein for a self-organizing collector, including a self-organizing, multi-sensor data collector that can optimize data collection, power and/or yield based on conditions in its environment. Embodiments include a self-organizing data collector that organizes at least in part based on network conditions. Embodiments include a self-organizing data collector that is also responsive to remote organization. Embodiments include a self-organizing data collector with self-organizing storage for data collected in an industrial data collection environment. Embodiments include a system for data collection in an industrial environment with self-organizing data collection and self-organizing network coding for data transport. Embodiments include a system for data collection in an industrial environment with a self-organizing data collector that feeds a data structure supporting a haptic or multi-sensory wearable interface for data presentation. Embodiments include a system for data collection in an industrial environment with a self-organizing data collector that feeds a data structure supporting a heat map interface for data presentation. Embodiments include a system for data collection in an industrial environment with a self-organizing data collector that feeds a data structure supporting an interface that operates with self-organized tuning of the interface layer.

As noted above, methods and systems are disclosed herein for a network-sensitive collector, including a network condition-sensitive, self-organizing, multi-sensor data collector that can optimize based on bandwidth, quality of service, pricing and/or other network conditions. Embodiments include a remotely organized, network condition-sensitive universal data collector that can power up and down sensor interfaces based on need and/or conditions identified in an industrial data collection environment, including network conditions. Embodiments include a network-condition sensitive data collector with self-organizing storage for data collected in an industrial data collection environment. Embodiments include a network-condition sensitive data collector with self-organizing network coding for data transport in an industrial data collection environment. Embodiments include a system for data collection in an industrial environment with a network-sensitive data collector that relays a data structure supporting a haptic wearable interface for data presentation. Embodiments include a system for data collection in an industrial environment with a network-sensitive data collector that relays a data structure supporting a heat map interface for data presentation. Embodiments include a system for data collection in an industrial environment with a network-sensitive data collector that relays a data structure supporting an interface that operates with self-organized tuning of the interface layer.

As noted above, methods and systems are disclosed herein for a remotely organized universal data collector that can power up and down sensor interfaces based on need and/or conditions identified in an industrial data collection environment. Embodiments include a remotely organized universal data collector with self-organizing storage for data collected in an industrial data collection environment. Embodiments include a system for data collection in an industrial environment with remote control of data collection and self-organizing network coding for data transport. Embodiments include a remotely organized data collector for storing sensor data and delivering instructions for use of the data in a haptic or multi-sensory wearable interface. Embodiments include a remotely organized data collector for storing sensor data and delivering instructions for use of the data in a heat map visual interface. Embodiments include a remotely organized data collector for storing sensor data and delivering instructions for use of the data in an interface that operates with self-organized tuning of the interface layer.

As noted above, methods and systems are disclosed herein for self-organizing storage for a multi-sensor data collector, including self-organizing storage for a multi-sensor data collector for industrial sensor data. Embodiments include a system for data collection in an industrial environment with self-organizing data storage and self-organizing network coding for data transport. Embodiments include a data collector with self-organizing storage for storing sensor data and instructions for translating the data for use in a haptic wearable interface. Embodiments include a data collector with self-organizing storage for storing sensor data and instructions for translating the data for use in a heat map presentation interface. Embodiments include a data collector with self-organizing storage for storing sensor data and instructions for translating the data for use in an interface that operates with self-organized tuning of the interface layer.

As noted above, methods and systems are disclosed herein for self-organizing network coding for a multi-sensor data network, including self-organizing network coding for a data network that transports data from multiple sensors in an industrial data collection environment. Embodiments include a system for data collection in an industrial environment with self-organizing network coding for data transport and a data structure supporting a haptic wearable interface for data presentation. Embodiments include a system for data collection in an industrial environment with self-organizing network coding for data transport and a data structure supporting a heat map interface for data presentation. Embodiments include a system for data collection in an industrial environment with self-organizing network coding for data transport and self-organized tuning of an interface layer for data presentation.

As noted above, methods and systems are disclosed herein for a haptic or multi-sensory user interface, including a wearable haptic or multi-sensory user interface for an industrial sensor data collector, with vibration, heat, electrical, and/or sound outputs. Embodiments include a wearable haptic user interface for conveying industrial state information from a data collector, with vibration, heat, electrical, and/or sound outputs. Embodiments include a wearable haptic user interface for conveying industrial state information from a data collector, with vibration, heat, electrical, and/or sound outputs. The wearable also has a visual presentation layer for presenting a heat map that indicates a parameter of the data. Embodiments include condition-sensitive, self-organized tuning of AR/VR interfaces and multi-sensory interfaces based on feedback metrics and/or training in industrial environments.

As noted above, methods and systems are disclosed herein for a presentation layer for AR/VR industrial glasses, where heat map elements are presented based on patterns and/or parameters in collected data. Embodiments include condition-sensitive, self-organized tuning of a heat map AR/VR interface based on feedback metrics and/or training in industrial environments. As noted above, methods and systems are disclosed herein for condition-sensitive, self-organized tuning of AR/VR interfaces based on feedback metrics and/or training in industrial environments.

The following illustrative clauses describe certain embodiments of the present disclosure. The data collection system mentioned in the following disclosure may be a local data collection system 102, a host processing system 112 (e.g., using a cloud platform), or a combination of a local system and a host system. In embodiments, a data collection system is provided having the use of an analog crosspoint switch for collecting data having variable groups of analog sensor inputs. In embodiments, a data collection and processing system is provided having the use of an analog crosspoint switch for collecting data having variable groups of analog sensor inputs and having IP front-end-end signal conditioning on a multiplexer for improved signal-to-noise ratio. In embodiments, a data collection and processing system is provided having the use of an analog crosspoint switch for collecting data having variable groups of analog sensor inputs and having multiplexer continuous monitoring alarming features. In embodiments, a data collection and processing system is provided having the use of an analog crosspoint switch for collecting data having variable groups of analog sensor inputs and having the use of distributed CPLD chips with dedicated bus for logic control of multiple MUX and data acquisition sections. In embodiments, a data collection and processing system is provided having the use of an analog crosspoint switch for collecting data having variable groups of analog sensor inputs and having high-amperage input capability using solid state relays and design topology. In embodiments, a data collection and processing system is provided having the use of an analog crosspoint switch for collecting data having variable groups of analog sensor inputs and having power-down capability of at least one of an analog sensor channel and of a component board. In embodiments, a data collection and processing system is provided having the use of an analog crosspoint switch for collecting data having variable groups of analog sensor inputs and having unique electrostatic protection for trigger and vibration inputs. In embodiments, a data collection and processing system is provided having the use of an analog crosspoint switch for collecting data having variable groups of analog sensor inputs and having precise voltage reference for A/D zero reference.

In embodiments, a data collection and processing system is provided having the use of an analog crosspoint switch for collecting data having variable groups of analog sensor inputs and having a phase-lock loop band-pass tracking filter for obtaining slow-speed RPMs and phase information. In embodiments, a data collection and processing system is provided having the use of an analog crosspoint switch for collecting data having variable groups of analog sensor inputs and having digital derivation of phase relative to input and trigger channels using on-board timers. In embodiments, a data collection and processing system is provided having the use of an analog crosspoint switch for collecting data having variable groups of analog sensor inputs and having a peak-detector for auto-scaling that is routed into a separate analog-to-digital converter for peak detection. In embodiments, a data collection and processing system is provided having the use of an analog crosspoint switch for collecting data having variable groups of analog sensor inputs and having the routing of a trigger channel that is either raw or buffered into other analog channels. In embodiments, a data collection and processing system is provided having the use of an analog crosspoint switch for collecting data having variable groups of analog sensor inputs and having the use of higher input oversampling for delta-sigma A/D for lower sampling rate outputs to minimize AA filter requirements. In embodiments, a data collection and processing system is provided having the use of an analog crosspoint switch for collecting data having variable groups of analog sensor inputs and having the use of a CPLD as a clock-divider for a delta-sigma analog-to-digital converter to achieve lower sampling rates without the need for digital resampling.

In embodiments, a data collection and processing system is provided having the use of an analog crosspoint switch for collecting data having variable groups of analog sensor inputs and having long blocks of data at a high-sampling rate, as opposed to multiple sets of data taken at different sampling rates. In embodiments, a data collection and processing system is provided having the use of an analog crosspoint switch for collecting data having variable groups of analog sensor inputs and having storage of calibration data with maintenance history on-board card set. In embodiments, a data collection and processing system is provided having the use of an analog crosspoint switch for collecting data having variable groups of analog sensor inputs and having a rapid route creation capability using hierarchical templates. In embodiments, a data collection and processing system is provided having the use of an analog crosspoint switch for collecting data having variable groups of analog sensor inputs and having intelligent management of data collection bands. In embodiments, a data collection and processing system is provided having the use of an analog crosspoint switch for collecting data having variable groups of analog sensor inputs and having a neural net expert system using intelligent management of data collection bands.

In embodiments, a data collection and processing system is provided having the use of an analog crosspoint switch for collecting data having variable groups of analog sensor inputs and having use of a database hierarchy in sensor data analysis. In embodiments, a data collection and processing system is provided having the use of an analog crosspoint switch for collecting data having variable groups of analog sensor inputs and having an expert system GUI graphical approach to defining intelligent data collection bands and diagnoses for the expert system. In embodiments, a data collection and processing system is provided having the use of an analog crosspoint switch for collecting data having variable groups of analog sensor inputs and having a graphical approach for back-calculation definition. In embodiments, a data collection and processing system is provided having the use of an analog crosspoint switch for collecting data having variable groups of analog sensor inputs and having proposed bearing analysis methods. In embodiments, a data collection and processing system is provided having the use of an analog crosspoint switch for collecting data having variable groups of analog sensor inputs and having torsional vibration detection/analysis utilizing transitory signal analysis. In embodiments, a data collection and processing system is provided having the use of an analog crosspoint switch for collecting data having variable groups of analog sensor inputs and having improved integration using both analog and digital methods.

In embodiments, a data collection and processing system is provided having the use of an analog crosspoint switch for collecting data having variable groups of analog sensor inputs and having adaptive scheduling techniques for continuous monitoring of analog data in a local environment. In embodiments, a data collection and processing system is provided having the use of an analog crosspoint switch for collecting data having variable groups of analog sensor inputs and having data acquisition parking features. In embodiments, a data collection and processing system is provided having the use of an analog crosspoint switch for collecting data having variable groups of analog sensor inputs and having a self-sufficient data acquisition box. In embodiments, a data collection and processing system is provided having the use of an analog crosspoint switch for collecting data having variable groups of analog sensor inputs and having SD card storage. In embodiments, a data collection and processing system is provided having the use of an analog crosspoint switch for collecting data having variable groups of analog sensor inputs and having extended onboard statistical capabilities for continuous monitoring. In embodiments, a data collection and processing system is provided having the use of an analog crosspoint switch for collecting data having variable groups of analog sensor inputs and having the use of ambient, local and vibration noise for prediction. In embodiments, a data collection and processing system is provided having the use of an analog crosspoint switch for collecting data having variable groups of analog sensor inputs and having smart route changes based on incoming data or alarms to enable simultaneous dynamic data for analysis or correlation. In embodiments, a data collection and processing system is provided having the use of an analog crosspoint switch for collecting data having variable groups of analog sensor inputs and having smart ODS and transfer functions. In embodiments, a data collection and processing system is provided having the use of an analog crosspoint switch for collecting data having variable groups of analog sensor inputs and having a hierarchical multiplexer. In embodiments, a data collection and processing system is provided having the use of an analog crosspoint switch for collecting data having variable groups of analog sensor inputs and having identification of sensor overload. In embodiments, a data collection and processing system is provided having the use of an analog crosspoint switch for collecting data having variable groups of analog sensor inputs and having RF identification and an inclinometer.

In embodiments, a data collection and processing system is provided having the use of an analog crosspoint switch for collecting data having variable groups of analog sensor inputs and having continuous ultrasonic monitoring. In embodiments, a data collection and processing system is provided having the use of an analog crosspoint switch for collecting data having variable groups of analog sensor inputs and having cloud-based, machine pattern recognition based on the fusion of remote, analog industrial sensors. In embodiments, a data collection and processing system is provided having the use of an analog crosspoint switch for collecting data having variable groups of analog sensor inputs and having cloud-based, machine pattern analysis of state information from multiple analog industrial sensors to provide anticipated state information for an industrial system. In embodiments, a data collection and processing system is provided having the use of an analog crosspoint switch for collecting data having variable groups of analog sensor inputs and having cloud-based policy automation engine for IoT, with creation, deployment, and management of IoT devices. In embodiments, a data collection and processing system is provided having the use of an analog crosspoint switch for collecting data having variable groups of analog sensor inputs and having on-device sensor fusion and data storage for industrial IoT devices. In embodiments, a data collection and processing system is provided having the use of an analog crosspoint switch for collecting data having variable groups of analog sensor inputs and having a self-organizing data marketplace for industrial IoT data. In embodiments, a data collection and processing system is provided having the use of an analog crosspoint switch for collecting data having variable groups of analog sensor inputs and having self-organization of data pools based on utilization and/or yield metrics. In embodiments, a data collection and processing system is provided having the use of an analog crosspoint switch for collecting data having variable groups of analog sensor inputs and training AI models based on industry-specific feedback. In embodiments, a data collection and processing system is provided having the use of an analog crosspoint switch for collecting data having variable groups of analog sensor inputs and having a self-organized swarm of industrial data collectors. In embodiments, a data collection and processing system is provided having the use of an analog crosspoint switch for collecting data having variable groups of analog sensor inputs and having an IoT distributed ledger. In embodiments, a data collection and processing system is provided having the use of an analog crosspoint switch for collecting data having variable groups of analog sensor inputs and having a self-organizing collector. In embodiments, a data collection and processing system is provided having the use of an analog crosspoint switch for collecting data having variable groups of analog sensor inputs and having a network-sensitive collector. In embodiments, a data collection and processing system is provided having the use of an analog crosspoint switch for collecting data having variable groups of analog sensor inputs and having a remotely organized collector. In embodiments, a data collection and processing system is provided having the use of an analog crosspoint switch for collecting data having variable groups of analog sensor inputs and having a self-organizing storage for a multi-sensor data collector. In embodiments, a data collection and processing system is provided having the use of an analog crosspoint switch for collecting data having variable groups of analog sensor inputs and having a self-organizing network coding for multi-sensor data network. In embodiments, a data collection and processing system is provided having the use of an analog crosspoint switch for collecting data having variable groups of analog sensor inputs and having a wearable haptic user interface for an industrial sensor data collector, with vibration, heat, electrical, and/or sound outputs. In embodiments, a data collection and processing system is provided having the use of an analog crosspoint switch for collecting data having variable groups of analog sensor inputs and having heat maps displaying collected data for AR/VR. In embodiments, a data collection and processing system is provided having the use of an analog crosspoint switch for collecting data having variable groups of analog sensor inputs and having automatically tuned AR/VR visualization of data collected by a data collector.

In embodiments, a data collection and processing system is provided having IP front-end signal conditioning on a multiplexer for improved signal-to-noise ratio. In embodiments, a data collection and processing system is provided having IP front-end signal conditioning on a multiplexer for improved signal-to-noise ratio and having multiplexer continuous monitoring alarming features. In embodiments, a data collection and processing system is provided having IP front-end signal conditioning on a multiplexer for improved signal-to-noise ratio and having the use of distributed CPLD chips with dedicated bus for logic control of multiple MUX and data acquisition sections. In embodiments, a data collection and processing system is provided having IP front-end signal conditioning on a multiplexer for improved signal-to-noise ratio and having high-amperage input capability using solid state relays and design topology. In embodiments, a data collection and processing system is provided having IP front-end signal conditioning on a multiplexer for improved signal-to-noise ratio and having power-down capability of at least one analog sensor channel and of a component board. In embodiments, a data collection and processing system is provided having IP front-end signal conditioning on a multiplexer for improved signal-to-noise ratio and having unique electrostatic protection for trigger and vibration inputs. In embodiments, a data collection and processing system is provided having IP front-end signal conditioning on a multiplexer for improved signal-to-noise ratio and having precise voltage reference for A/D zero reference. In embodiments, a data collection and processing system is provided having IP front-end signal conditioning on a multiplexer for improved signal-to-noise ratio and having a phase-lock loop band-pass tracking filter for obtaining slow-speed RPMs and phase information. In embodiments, a data collection and processing system is provided having IP front-end signal conditioning on a multiplexer for improved signal-to-noise ratio and having digital derivation of phase relative to input and trigger channels using on-board timers. In embodiments, a data collection and processing system is provided having IP front-end signal conditioning on a multiplexer for improved signal-to-noise ratio and having a peak-detector for auto-scaling that is routed into a separate analog-to-digital converter for peak detection. In embodiments, a data collection and processing system is provided having IP front-end signal conditioning on a multiplexer for improved signal-to-noise ratio and having routing of a trigger channel that is either raw or buffered into other analog channels. In embodiments, a data collection and processing system is provided having IP front-end signal conditioning on a multiplexer for improved signal-to-noise ratio and having the use of higher input oversampling for delta-sigma A/D for lower sampling rate outputs to minimize AA filter requirements. In embodiments, a data collection and processing system is provided having IP front-end signal conditioning on a multiplexer for improved signal-to-noise ratio and having the use of a CPLD as a clock-divider for a delta-sigma analog-to-digital converter to achieve lower sampling rates without the need for digital resampling. In embodiments, a data collection and processing system is provided having IP front-end signal conditioning on a multiplexer for improved signal-to-noise ratio and having long blocks of data at a high-sampling rate as opposed to multiple sets of data taken at different sampling rates. In embodiments, a data collection and processing system is provided having IP front-end signal conditioning on a multiplexer for improved signal-to-noise ratio and having storage of calibration data with maintenance history on-board card set. In embodiments, a data collection and processing system is provided having IP front-end signal conditioning on a multiplexer for improved signal-to-noise ratio and having a rapid route creation capability using hierarchical templates. In embodiments, a data collection and processing system is provided having IP front-end signal conditioning on a multiplexer for improved signal-to-noise ratio and having intelligent management of data collection bands. In embodiments, a data collection and processing system is provided having IP front-end signal conditioning on a multiplexer for improved signal-to-noise ratio and having a neural net expert system using intelligent management of data collection bands. In embodiments, a data collection and processing system is provided having IP front-end signal conditioning on a multiplexer for improved signal-to-noise ratio and having use of a database hierarchy in sensor data analysis. In embodiments, a data collection and processing system is provided having IP front-end signal conditioning on a multiplexer for improved signal-to-noise ratio and having an expert system GUI graphical approach to defining intelligent data collection bands and diagnoses for the expert system. In embodiments, a data collection and processing system is provided having IP front-end signal conditioning on a multiplexer for improved signal-to-noise ratio and having a graphical approach for back-calculation definition. In embodiments, a data collection and processing system is provided having IP front-end signal conditioning on a multiplexer for improved signal-to-noise ratio and having proposed bearing analysis methods. In embodiments, a data collection and processing system is provided having IP front-end signal conditioning on a multiplexer for improved signal-to-noise ratio and having torsional vibration detection/analysis utilizing transitory signal analysis. In embodiments, a data collection and processing system is provided having IP front-end signal conditioning on a multiplexer for improved signal-to-noise ratio and having improved integration using both analog and digital methods. In embodiments, a data collection and processing system is provided having IP front-end signal conditioning on a multiplexer for improved signal-to-noise ratio and having adaptive scheduling techniques for continuous monitoring of analog data in a local environment. In embodiments, a data collection and processing system is provided having IP front-end signal conditioning on a multiplexer for improved signal-to-noise ratio and having data acquisition parking features. In embodiments, a data collection and processing system is provided having IP front-end signal conditioning on a multiplexer for improved signal-to-noise ratio and having a self-sufficient data acquisition box. In embodiments, a data collection and processing system is provided having IP front-end signal conditioning on a multiplexer for improved signal-to-noise ratio and having SD card storage. In embodiments, a data collection and processing system is provided having IP front-end signal conditioning on a multiplexer for improved signal-to-noise ratio and having extended onboard statistical capabilities for continuous monitoring. In embodiments, a data collection and processing system is provided having IP front-end signal conditioning on a multiplexer for improved signal-to-noise ratio and having the use of ambient, local and vibration noise for prediction. In embodiments, a data collection and processing system is provided having IP front-end signal conditioning on a multiplexer for improved signal-to-noise ratio and having smart route changes route based on incoming data or alarms to enable simultaneous dynamic data for analysis or correlation. In embodiments, a data collection and processing system is provided having IP front-end signal conditioning on a multiplexer for improved signal-to-noise ratio and having smart ODS and transfer functions. In embodiments, a data collection and processing system is provided having IP front-end signal conditioning on a multiplexer for improved signal-to-noise ratio and having a hierarchical multiplexer. In embodiments, a data collection and processing system is provided having IP front-end signal conditioning on a multiplexer for improved signal-to-noise ratio and having identification of sensor overload. In embodiments, a data collection and processing system is provided having IP front-end signal conditioning on a multiplexer for improved signal-to-noise ratio and having RF identification and an inclinometer. In embodiments, a data collection and processing system is provided having IP front-end signal conditioning on a multiplexer for improved signal-to-noise ratio and having continuous ultrasonic monitoring. In embodiments, a data collection and processing system is provided having IP front-end signal conditioning on a multiplexer for improved signal-to-noise ratio and having cloud-based, machine pattern recognition based on the fusion of remote, analog industrial sensors. In embodiments, a data collection and processing system is provided having IP front-end signal conditioning on a multiplexer for improved signal-to-noise ratio and having cloud-based, machine pattern analysis of state information from multiple analog industrial sensors to provide anticipated state information for an industrial system. In embodiments, a data collection and processing system is provided having IP front-end signal conditioning on a multiplexer for improved signal-to-noise ratio and having cloud-based policy automation engine for IoT, with creation, deployment, and management of IoT devices. In embodiments, a data collection and processing system is provided having IP front-end signal conditioning on a multiplexer for improved signal-to-noise ratio and having on-device sensor fusion and data storage for industrial IoT devices. In embodiments, a data collection and processing system is provided having IP front-end signal conditioning on a multiplexer for improved signal-to-noise ratio and having a self-organizing data marketplace for industrial IoT data. In embodiments, a data collection and processing system is provided having IP front-end signal conditioning on a multiplexer for improved signal-to-noise ratio and having self-organization of data pools based on utilization and/or yield metrics. In embodiments, a data collection and processing system is provided having IP front-end signal conditioning on a multiplexer for improved signal-to-noise ratio and having training AI models based on industry-specific feedback. In embodiments, a data collection and processing system is provided having IP front-end signal conditioning on a multiplexer for improved signal-to-noise ratio and having a self-organized swarm of industrial data collectors. In embodiments, a data collection and processing system is provided having IP front-end signal conditioning on a multiplexer for improved signal-to-noise ratio and having an IoT distributed ledger. In embodiments, a data collection and processing system is provided having IP front-end signal conditioning on a multiplexer for improved signal-to-noise ratio and having a self-organizing collector. In embodiments, a data collection and processing system is provided having IP front-end signal conditioning on a multiplexer for improved signal-to-noise ratio and having a network-sensitive collector. In embodiments, a data collection and processing system is provided having IP front-end signal conditioning on a multiplexer for improved signal-to-noise ratio and having a remotely organized collector. In embodiments, a data collection and processing system is provided having IP front-end signal conditioning on a multiplexer for improved signal-to-noise ratio and having a self-organizing storage for a multi-sensor data collector. In embodiments, a data collection and processing system is provided having IP front-end signal conditioning on a multiplexer for improved signal-to-noise ratio and having a self-organizing network coding for multi-sensor data network. In embodiments, a data collection and processing system is provided having IP front-end signal conditioning on a multiplexer for improved signal-to-noise ratio and having a wearable haptic user interface for an industrial sensor data collector, with vibration, heat, electrical, and/or sound outputs. In embodiments, a data collection and processing system is provided having IP front-end signal conditioning on a multiplexer for improved signal-to-noise ratio and having heat maps displaying collected data for AR/VR. In embodiments, a data collection and processing system is provided having IP front-end signal conditioning on a multiplexer for improved signal-to-noise ratio and having automatically tuned AR/VR visualization of data collected by a data collector.

In embodiments, a data collection and processing system is provided having multiplexer continuous monitoring alarming features. In embodiments, a data collection and processing system is provided having multiplexer continuous monitoring alarming features and having the use of distributed CPLD chips with dedicated bus for logic control of multiple MUX and data acquisition sections. In embodiments, a data collection and processing system is provided having multiplexer continuous monitoring alarming features and having high-amperage input capability using solid state relays and design topology. In embodiments, a data collection and processing system is provided having multiplexer continuous monitoring alarming features and having power-down capability of at least one of an analog sensor channel and of a component board. In embodiments, a data collection and processing system is provided having multiplexer continuous monitoring alarming features and having unique electrostatic protection for trigger and vibration inputs. In embodiments, a data collection and processing system is provided having multiplexer continuous monitoring alarming features and having precise voltage reference for A/D zero reference. In embodiments, a data collection and processing system is provided having multiplexer continuous monitoring alarming features and having a phase-lock loop band-pass tracking filter for obtaining slow-speed RPMs and phase information. In embodiments, a data collection and processing system is provided having multiplexer continuous monitoring alarming features and having digital derivation of phase relative to input and trigger channels using on-board timers. In embodiments, a data collection and processing system is provided having multiplexer continuous monitoring alarming features and having a peak-detector for auto-scaling that is routed into a separate analog-to-digital converter for peak detection. In embodiments, a data collection and processing system is provided having multiplexer continuous monitoring alarming features and having routing of a trigger channel that is either raw or buffered into other analog channels. In embodiments, a data collection and processing system is provided having multiplexer continuous monitoring alarming features and having the use of higher input oversampling for delta-sigma A/D for lower sampling rate outputs to minimize AA filter requirements. In embodiments, a data collection and processing system is provided having multiplexer continuous monitoring alarming features and having the use of a CPLD as a clock-divider for a delta-sigma analog-to-digital converter to achieve lower sampling rates without the need for digital resampling. In embodiments, a data collection and processing system is provided having multiplexer continuous monitoring alarming features and having long blocks of data at a high-sampling rate as opposed to multiple sets of data taken at different sampling rates. In embodiments, a data collection and processing system is provided having multiplexer continuous monitoring alarming features and having storage of calibration data with maintenance history on-board card set. In embodiments, a data collection and processing system is provided having multiplexer continuous monitoring alarming features and having a rapid route creation capability using hierarchical templates. In embodiments, a data collection and processing system is provided having multiplexer continuous monitoring alarming features and having intelligent management of data collection bands. In embodiments, a data collection and processing system is provided having multiplexer continuous monitoring alarming features and having a neural net expert system using intelligent management of data collection bands. In embodiments, a data collection and processing system is provided having multiplexer continuous monitoring alarming features and having use of a database hierarchy in sensor data analysis. In embodiments, a data collection and processing system is provided having multiplexer continuous monitoring alarming features and having an expert system GUI graphical approach to defining intelligent data collection bands and diagnoses for the expert system. In embodiments, a data collection and processing system is provided having multiplexer continuous monitoring alarming features and having a graphical approach for back-calculation definition. In embodiments, a data collection and processing system is provided having multiplexer continuous monitoring alarming features and having proposed bearing analysis methods. In embodiments, a data collection and processing system is provided having multiplexer continuous monitoring alarming features and having torsional vibration detection/analysis utilizing transitory signal analysis. In embodiments, a data collection and processing system is provided having multiplexer continuous monitoring alarming features and having improved integration using both analog and digital methods. In embodiments, a data collection and processing system is provided having multiplexer continuous monitoring alarming features and having adaptive scheduling techniques for continuous monitoring of analog data in a local environment. In embodiments, a data collection and processing system is provided having multiplexer continuous monitoring alarming features and having data acquisition parking features. In embodiments, a data collection and processing system is provided having multiplexer continuous monitoring alarming features and having a self-sufficient data acquisition box. In embodiments, a data collection and processing system is provided having multiplexer continuous monitoring alarming features and having SD card storage. In embodiments, a data collection and processing system is provided having multiplexer continuous monitoring alarming features and having extended onboard statistical capabilities for continuous monitoring. In embodiments, a data collection and processing system is provided having multiplexer continuous monitoring alarming features and having the use of ambient, local and vibration noise for prediction. In embodiments, a data collection and processing system is provided having multiplexer continuous monitoring alarming features and having smart route changes route based on incoming data or alarms to enable simultaneous dynamic data for analysis or correlation. In embodiments, a data collection and processing system is provided having multiplexer continuous monitoring alarming features and having smart ODS and transfer functions. In embodiments, a data collection and processing system is provided having multiplexer continuous monitoring alarming features and having a hierarchical multiplexer. In embodiments, a data collection and processing system is provided having multiplexer continuous monitoring alarming features and having identification of sensor overload. In embodiments, a data collection and processing system is provided having multiplexer continuous monitoring alarming features, and having RF identification, and an inclinometer. In embodiments, a data collection and processing system is provided having multiplexer continuous monitoring alarming features and having continuous ultrasonic monitoring. In embodiments, a data collection and processing system is provided having multiplexer continuous monitoring alarming features and having cloud-based, machine pattern recognition based on the fusion of remote, analog industrial sensors. In embodiments, a data collection and processing system is provided having multiplexer continuous monitoring alarming features and having cloud-based, machine pattern analysis of state information from multiple analog industrial sensors to provide anticipated state information for an industrial system. In embodiments, a data collection and processing system is provided having multiplexer continuous monitoring alarming features and having cloud-based policy automation engine for IoT, with creation, deployment, and management of IoT devices. In embodiments, a data collection and processing system is provided having multiplexer continuous monitoring alarming features and having on-device sensor fusion and data storage for industrial IoT devices. In embodiments, a data collection and processing system is provided having multiplexer continuous monitoring alarming features and having a self-organizing data marketplace for industrial IoT data. In embodiments, a data collection and processing system is provided having multiplexer continuous monitoring alarming features and having self-organization of data pools based on utilization and/or yield metrics. In embodiments, a data collection and processing system is provided having multiplexer continuous monitoring alarming features and having training AI models based on industry-specific feedback. In embodiments, a data collection and processing system is provided having multiplexer continuous monitoring alarming features and having a self-organized swarm of industrial data collectors. In embodiments, a data collection and processing system is provided having multiplexer continuous monitoring alarming features and having an IoT distributed ledger. In embodiments, a data collection and processing system is provided having multiplexer continuous monitoring alarming features and having a self-organizing collector. In embodiments, a data collection and processing system is provided having multiplexer continuous monitoring alarming features and having a network-sensitive collector. In embodiments, a data collection and processing system is provided having multiplexer continuous monitoring alarming features and having a remotely organized collector. In embodiments, a data collection and processing system is provided having multiplexer continuous monitoring alarming features and having a self-organizing storage for a multi-sensor data collector. In embodiments, a data collection and processing system is provided having multiplexer continuous monitoring alarming features and having a self-organizing network coding for multi-sensor data network. In embodiments, a data collection and processing system is provided having multiplexer continuous monitoring alarming features and having a wearable haptic user interface for an industrial sensor data collector, with vibration, heat, electrical, and/or sound outputs. In embodiments, a data collection and processing system is provided having multiplexer continuous monitoring alarming features and having heat maps displaying collected data for AR/VR. In embodiments, a data collection and processing system is provided having multiplexer continuous monitoring alarming features and having automatically tuned AR/VR visualization of data collected by a data collector.

In embodiments, a data collection and processing system is provided having the use of distributed CPLD chips with dedicated bus for logic control of multiple MUX and data acquisition sections. In embodiments, a data collection and processing system is provided having the use of distributed CPLD chips with dedicated bus for logic control of multiple MUX and data acquisition sections and having high-amperage input capability using solid state relays and design topology. In embodiments, a data collection and processing system is provided having the use of distributed CPLD chips with dedicated bus for logic control of multiple MUX and data acquisition sections and having power-down capability of at least one of an analog sensor channel and of a component board. In embodiments, a data collection and processing system is provided having the use of distributed CPLD chips with dedicated bus for logic control of multiple MUX and data acquisition sections and having unique electrostatic protection for trigger and vibration inputs. In embodiments, a data collection and processing system is provided having the use of distributed CPLD chips with dedicated bus for logic control of multiple MUX and data acquisition sections and having precise voltage reference for A/D zero reference. In embodiments, a data collection and processing system is provided having the use of distributed CPLD chips with dedicated bus for logic control of multiple MUX and data acquisition sections and having a phase-lock loop band-pass tracking filter for obtaining slow-speed RPMs and phase information. In embodiments, a data collection and processing system is provided having the use of distributed CPLD chips with dedicated bus for logic control of multiple MUX and data acquisition sections and having digital derivation of phase relative to input and trigger channels using on-board timers. In embodiments, a data collection and processing system is provided having the use of distributed CPLD chips with dedicated bus for logic control of multiple MUX and data acquisition sections and having a peak-detector for auto-scaling that is routed into a separate analog-to-digital converter for peak detection. In embodiments, a data collection and processing system is provided having the use of distributed CPLD chips with dedicated bus for logic control of multiple MUX and data acquisition sections and having routing of a trigger channel that is either raw or buffered into other analog channels. In embodiments, a data collection and processing system is provided having the use of distributed CPLD chips with dedicated bus for logic control of multiple MUX and data acquisition sections and having the use of higher input oversampling for delta-sigma A/D for lower sampling rate outputs to minimize AA filter requirements. In embodiments, a data collection and processing system is provided having the use of distributed CPLD chips with dedicated bus for logic control of multiple MUX and data acquisition sections and having the use of a CPLD as a clock-divider for a delta-sigma analog-to-digital converter to achieve lower sampling rates without the need for digital resampling. In embodiments, a data collection and processing system is provided having the use of distributed CPLD chips with dedicated bus for logic control of multiple MUX and data acquisition sections and having long blocks of data at a high-sampling rate as opposed to multiple sets of data taken at different sampling rates. In embodiments, a data collection and processing system is provided having the use of distributed CPLD chips with dedicated bus for logic control of multiple MUX and data acquisition sections and having storage of calibration data with maintenance history on-board card set. In embodiments, a data collection and processing system is provided having the use of distributed CPLD chips with dedicated bus for logic control of multiple MUX and data acquisition sections and having a rapid route creation capability using hierarchical templates. In embodiments, a data collection and processing system is provided having the use of distributed CPLD chips with dedicated bus for logic control of multiple MUX and data acquisition sections and having intelligent management of data collection bands. In embodiments, a data collection and processing system is provided having the use of distributed CPLD chips with dedicated bus for logic control of multiple MUX and data acquisition sections and having a neural net expert system using intelligent management of data collection bands. In embodiments, a data collection and processing system is provided having the use of distributed CPLD chips with dedicated bus for logic control of multiple MUX and data acquisition sections and having use of a database hierarchy in sensor data analysis. In embodiments, a data collection and processing system is provided having the use of distributed CPLD chips with dedicated bus for logic control of multiple MUX and data acquisition sections and having an expert system GUI graphical approach to defining intelligent data collection bands and diagnoses for the expert system. In embodiments, a data collection and processing system is provided having the use of distributed CPLD chips with dedicated bus for logic control of multiple MUX and data acquisition sections and having a graphical approach for back-calculation definition. In embodiments, a data collection and processing system is provided having the use of distributed CPLD chips with dedicated bus for logic control of multiple MUX and data acquisition sections and having proposed bearing analysis methods. In embodiments, a data collection and processing system is provided having the use of distributed CPLD chips with dedicated bus for logic control of multiple MUX and data acquisition sections and having torsional vibration detection/analysis utilizing transitory signal analysis. In embodiments, a data collection and processing system is provided having the use of distributed CPLD chips with dedicated bus for logic control of multiple MUX and data acquisition sections and having improved integration using both analog and digital methods. In embodiments, a data collection and processing system is provided having the use of distributed CPLD chips with dedicated bus for logic control of multiple MUX and data acquisition sections and having adaptive scheduling techniques for continuous monitoring of analog data in a local environment. In embodiments, a data collection and processing system is provided having the use of distributed CPLD chips with dedicated bus for logic control of multiple MUX and data acquisition sections and having data acquisition parking features. In embodiments, a data collection and processing system is provided having the use of distributed CPLD chips with dedicated bus for logic control of multiple MUX and data acquisition sections and having a self-sufficient data acquisition box. In embodiments, a data collection and processing system is provided having the use of distributed CPLD chips with dedicated bus for logic control of multiple MUX and data acquisition sections and having SD card storage. In embodiments, a data collection and processing system is provided having the use of distributed CPLD chips with dedicated bus for logic control of multiple MUX and data acquisition sections and having extended onboard statistical capabilities for continuous monitoring. In embodiments, a data collection and processing system is provided having the use of distributed CPLD chips with dedicated bus for logic control of multiple MUX and data acquisition sections and having the use of ambient, local and vibration noise for prediction. In embodiments, a data collection and processing system is provided having the use of distributed CPLD chips with dedicated bus for logic control of multiple MUX and data acquisition sections and having smart route changes route based on incoming data or alarms to enable simultaneous dynamic data for analysis or correlation. In embodiments, a data collection and processing system is provided having the use of distributed CPLD chips with dedicated bus for logic control of multiple MUX and data acquisition sections and having smart ODS and transfer functions. In embodiments, a data collection and processing system is provided having the use of distributed CPLD chips with dedicated bus for logic control of multiple MUX and data acquisition sections and having a hierarchical multiplexer. In embodiments, a data collection and processing system is provided having the use of distributed CPLD chips with dedicated bus for logic control of multiple MUX and data acquisition sections and having identification of sensor overload. In embodiments, a data collection and processing system is provided having the use of distributed CPLD chips with dedicated bus for logic control of multiple MUX and data acquisition sections and having RF identification and an inclinometer. In embodiments, a data collection and processing system is provided having the use of distributed CPLD chips with dedicated bus for logic control of multiple MUX and data acquisition sections and having continuous ultrasonic monitoring. In embodiments, a data collection and processing system is provided having the use of distributed CPLD chips with dedicated bus for logic control of multiple MUX and data acquisition sections and having cloud-based, machine pattern recognition based on fusion of remote, analog industrial sensors. In embodiments, a data collection and processing system is provided having the use of distributed CPLD chips with dedicated bus for logic control of multiple MUX and data acquisition sections and having cloud-based, machine pattern analysis of state information from multiple analog industrial sensors to provide anticipated state information for an industrial system. In embodiments, a data collection and processing system is provided having the use of distributed CPLD chips with dedicated bus for logic control of multiple MUX and data acquisition sections and having cloud-based policy automation engine for IoT, with creation, deployment, and management of IoT devices. In embodiments, a data collection and processing system is provided having the use of distributed CPLD chips with dedicated bus for logic control of multiple MUX and data acquisition sections and having on-device sensor fusion and data storage for industrial IoT devices. In embodiments, a data collection and processing system is provided having the use of distributed CPLD chips with dedicated bus for logic control of multiple MUX and data acquisition sections and having a self-organizing data marketplace for industrial IoT data. In embodiments, a data collection and processing system is provided having the use of distributed CPLD chips with dedicated bus for logic control of multiple MUX and data acquisition sections and having self-organization of data pools based on utilization and/or yield metrics. In embodiments, a data collection and processing system is provided having the use of distributed CPLD chips with dedicated bus for logic control of multiple MUX and data acquisition sections and having training AI models based on industry-specific feedback. In embodiments, a data collection and processing system is provided having the use of distributed CPLD chips with dedicated bus for logic control of multiple MUX and data acquisition sections and having a self-organized swarm of industrial data collectors. In embodiments, a data collection and processing system is provided having the use of distributed CPLD chips with dedicated bus for logic control of multiple MUX and data acquisition sections and having an IoT distributed ledger. In embodiments, a data collection and processing system is provided having the use of distributed CPLD chips with dedicated bus for logic control of multiple MUX and data acquisition sections and having a self-organizing collector. In embodiments, a data collection and processing system is provided having the use of distributed CPLD chips with dedicated bus for logic control of multiple MUX and data acquisition sections and having a network-sensitive collector. In embodiments, a data collection and processing system is provided having the use of distributed CPLD chips with dedicated bus for logic control of multiple MUX and data acquisition sections and having a remotely organized collector. In embodiments, a data collection and processing system is provided having the use of distributed CPLD chips with dedicated bus for logic control of multiple MUX and data acquisition sections and having a self-organizing storage for a multi-sensor data collector. In embodiments, a data collection and processing system is provided having the use of distributed CPLD chips with dedicated bus for logic control of multiple MUX and data acquisition sections and having a self-organizing network coding for multi-sensor data network. In embodiments, a data collection and processing system is provided having the use of distributed CPLD chips with dedicated bus for logic control of multiple MUX and data acquisition sections and having a wearable haptic user interface for an industrial sensor data collector, with vibration, heat, electrical and/or sound outputs. In embodiments, a data collection and processing system is provided having the use of distributed CPLD chips with dedicated bus for logic control of multiple MUX and data acquisition sections and having heat maps displaying collected data for AR/VR. In embodiments, a data collection and processing system is provided having the use of distributed CPLD chips with dedicated bus for logic control of multiple MUX and data acquisition sections and having automatically tuned AR/VR visualization of data collected by a data collector.

In embodiments, a data collection and processing system is provided having high-amperage input capability using solid state relays and design topology. In embodiments, a data collection and processing system is provided having high-amperage input capability using solid state relays and design topology and having power-down capability of at least one of an analog sensor channel and of a component board. In embodiments, a data collection and processing system is provided having high-amperage input capability using solid state relays and design topology and having unique electrostatic protection for trigger and vibration inputs. In embodiments, a data collection and processing system is provided having high-amperage input capability using solid state relays and design topology and having precise voltage reference for A/D zero reference. In embodiments, a data collection and processing system is provided having high-amperage input capability using solid state relays and design topology and having a phase-lock loop band-pass tracking filter for obtaining slow-speed RPMs and phase information. In embodiments, a data collection and processing system is provided having high-amperage input capability using solid state relays and design topology and having digital derivation of phase relative to input and trigger channels using on-board timers. In embodiments, a data collection and processing system is provided having high-amperage input capability using solid state relays and design topology and having a peak-detector for auto-scaling that is routed into a separate analog-to-digital converter for peak detection. In embodiments, a data collection and processing system is provided having high-amperage input capability using solid state relays and design topology and having routing of a trigger channel that is either raw or buffered into other analog channels. In embodiments, a data collection and processing system is provided having high-amperage input capability using solid state relays and design topology and having the use of higher input oversampling for delta-sigma A/D for lower sampling rate outputs to minimize AA filter requirements. In embodiments, a data collection and processing system is provided having high-amperage input capability using solid state relays and design topology and having the use of a CPLD as a clock-divider for a delta-sigma analog-to-digital converter to achieve lower sampling rates without the need for digital resampling. In embodiments, a data collection and processing system is provided having high-amperage input capability using solid state relays and design topology and having long blocks of data at a high-sampling rate as opposed to multiple sets of data taken at different sampling rates. In embodiments, a data collection and processing system is provided having high-amperage input capability using solid state relays and design topology and having storage of calibration data with maintenance history on-board card set. In embodiments, a data collection and processing system is provided having high-amperage input capability using solid state relays and design topology and having a rapid route creation capability using hierarchical templates. In embodiments, a data collection and processing system is provided having high-amperage input capability using solid state relays and design topology and having intelligent management of data collection bands. In embodiments, a data collection and processing system is provided having high-amperage input capability using solid state relays and design topology and having a neural net expert system using intelligent management of data collection bands. In embodiments, a data collection and processing system is provided having high-amperage input capability using solid state relays and design topology and having use of a database hierarchy in sensor data analysis. In embodiments, a data collection and processing system is provided having high-amperage input capability using solid state relays and design topology and having an expert system GUI graphical approach to defining intelligent data collection bands and diagnoses for the expert system. In embodiments, a data collection and processing system is provided having high-amperage input capability using solid state relays and design topology and having a graphical approach for back-calculation definition. In embodiments, a data collection and processing system is provided having high-amperage input capability using solid state relays and design topology and having proposed bearing analysis methods. In embodiments, a data collection and processing system is provided having high-amperage input capability using solid state relays and design topology and having torsional vibration detection/analysis utilizing transitory signal analysis. In embodiments, a data collection and processing system is provided having high-amperage input capability using solid state relays and design topology and having improved integration using both analog and digital methods. In embodiments, a data collection and processing system is provided having high-amperage input capability using solid state relays and design topology and having adaptive scheduling techniques for continuous monitoring of analog data in a local environment. In embodiments, a data collection and processing system is provided having high-amperage input capability using solid state relays and design topology and having data acquisition parking features. In embodiments, a data collection and processing system is provided having high-amperage input capability using solid state relays and design topology and having a self-sufficient data acquisition box. In embodiments, a data collection and processing system is provided having high-amperage input capability using solid state relays and design topology and having SD card storage. In embodiments, a data collection and processing system is provided having high-amperage input capability using solid state relays and design topology and having extended onboard statistical capabilities for continuous monitoring. In embodiments, a data collection and processing system is provided having high-amperage input capability using solid state relays and design topology and having the use of ambient, local and vibration noise for prediction. In embodiments, a data collection and processing system is provided having high-amperage input capability using solid state relays and design topology and having smart route changes route based on incoming data or alarms to enable simultaneous dynamic data for analysis or correlation. In embodiments, a data collection and processing system is provided having high-amperage input capability using solid state relays and design topology and having smart ODS and transfer functions. In embodiments, a data collection and processing system is provided having high-amperage input capability using solid state relays and design topology and having a hierarchical multiplexer. In embodiments, a data collection and processing system is provided having high-amperage input capability using solid state relays and design topology and having identification of sensor overload. In embodiments, a data collection and processing system is provided having high-amperage input capability using solid state relays and design topology and having RF identification and an inclinometer. In embodiments, a data collection and processing system is provided having high-amperage input capability using solid state relays and design topology and having continuous ultrasonic monitoring. In embodiments, a data collection and processing system is provided having high-amperage input capability using solid state relays and design topology and having cloud-based, machine pattern recognition based on fusion of remote, analog industrial sensors. In embodiments, a data collection and processing system is provided having high-amperage input capability using solid state relays and design topology and having cloud-based, machine pattern analysis of state information from multiple analog industrial sensors to provide anticipated state information for an industrial system. In embodiments, a data collection and processing system is provided having high-amperage input capability using solid state relays and design topology and having cloud-based policy automation engine for IoT, with creation, deployment, and management of IoT devices. In embodiments, a data collection and processing system is provided having high-amperage input capability using solid state relays and design topology and having on-device sensor fusion and data storage for industrial IoT devices. In embodiments, a data collection and processing system is provided having high-amperage input capability using solid state relays and design topology and having a self-organizing data marketplace for industrial IoT data. In embodiments, a data collection and processing system is provided having high-amperage input capability using solid state relays and design topology and having self-organization of data pools based on utilization and/or yield metrics. In embodiments, a data collection and processing system is provided having high-amperage input capability using solid state relays and design topology and having training AI models based on industry-specific feedback. In embodiments, a data collection and processing system is provided having high-amperage input capability using solid state relays and design topology and having a self-organized swarm of industrial data collectors. In embodiments, a data collection and processing system is provided having high-amperage input capability using solid state relays and design topology and having an IoT distributed ledger. In embodiments, a data collection and processing system is provided having high-amperage input capability using solid state relays and design topology and having a self-organizing collector. In embodiments, a data collection and processing system is provided having high-amperage input capability using solid state relays and design topology and having a network-sensitive collector. In embodiments, a data collection and processing system is provided having high-amperage input capability using solid state relays and design topology and having a remotely organized collector. In embodiments, a data collection and processing system is provided having high-amperage input capability using solid state relays and design topology and having a self-organizing storage for a multi-sensor data collector. In embodiments, a data collection and processing system is provided having high-amperage input capability using solid state relays and design topology and having a self-organizing network coding for multi-sensor data network. In embodiments, a data collection and processing system is provided having high-amperage input capability using solid state relays and design topology and having a wearable haptic user interface for an industrial sensor data collector, with vibration, heat, electrical, and/or sound outputs. In embodiments, a data collection and processing system is provided having high-amperage input capability using solid state relays and design topology and having heat maps displaying collected data for AR/VR. In embodiments, a data collection and processing system is provided having high-amperage input capability using solid state relays and design topology and having automatically tuned AR/VR visualization of data collected by a data collector.

In embodiments, a data collection and processing system is provided having power-down capability for at least one of an analog sensor and a component board. In embodiments, a data collection and processing system is provided having power-down capability for at least one of an analog sensor and a component board and having unique electrostatic protection for trigger and vibration inputs. In embodiments, a data collection and processing system is provided having power-down capability for at least one of an analog sensor and a component board and having precise voltage reference for A/D zero reference. In embodiments, a data collection and processing system is provided having power-down capability for at least one of an analog sensor and a component board and having a phase-lock loop band-pass tracking filter for obtaining slow-speed RPMs and phase information. In embodiments, a data collection and processing system is provided having power-down capability for at least one of an analog sensor and a component board and having digital derivation of phase relative to input and trigger channels using on-board timers. In embodiments, a data collection and processing system is provided having power-down capability for at least one of an analog sensor and a component board and having a peak-detector for auto-scaling that is routed into a separate analog-to-digital converter for peak detection. In embodiments, a data collection and processing system is provided having power-down capability for at least one of an analog sensor and a component board and having routing of a trigger channel that is either raw or buffered into other analog channels. In embodiments, a data collection and processing system is provided having power-down capability for at least one of an analog sensor and a component board and having the use of higher input oversampling for delta-sigma A/D for lower sampling rate outputs to minimize AA filter requirements. In embodiments, a data collection and processing system is provided having power-down capability for at least one of an analog sensor and a component board and having the use of a CPLD as a clock-divider for a delta-sigma analog-to-digital converter to achieve lower sampling rates without the need for digital resampling. In embodiments, a data collection and processing system is provided having power-down capability for at least one of an analog sensor and a component board and having long blocks of data at a high-sampling rate as opposed to multiple sets of data taken at different sampling rates. In embodiments, a data collection and processing system is provided having power-down capability for at least one of an analog sensor and a component board and having storage of calibration data with maintenance history on-board card set. In embodiments, a data collection and processing system is provided having power-down capability for at least one of an analog sensor and a component board and having a rapid route creation capability using hierarchical templates. In embodiments, a data collection and processing system is provided having power-down capability for at least one of an analog sensor and a component board and having intelligent management of data collection bands. In embodiments, a data collection and processing system is provided having power-down capability for at least one of an analog sensor and a component board and having a neural net expert system using intelligent management of data collection bands. In embodiments, a data collection and processing system is provided having power-down capability for at least one of an analog sensor and a component board and having use of a database hierarchy in sensor data analysis. In embodiments, a data collection and processing system is provided having power-down capability for at least one of an analog sensor and a component board and having an expert system GUI graphical approach to defining intelligent data collection bands and diagnoses for the expert system. In embodiments, a data collection and processing system is provided having power-down capability for at least one of an analog sensor and a component board and having a graphical approach for back-calculation definition. In embodiments, a data collection and processing system is provided having power-down capability for at least one of an analog sensor and a component board and having proposed bearing analysis methods. In embodiments, a data collection and processing system is provided having power-down capability for at least one of an analog sensor and a component board and having torsional vibration detection/analysis utilizing transitory signal analysis. In embodiments, a data collection and processing system is provided having power-down capability for at least one of an analog sensor and a component board and having improved integration using both analog and digital methods. In embodiments, a data collection and processing system is provided having power-down capability for at least one of an analog sensor and a component board and having adaptive scheduling techniques for continuous monitoring of analog data in a local environment. In embodiments, a data collection and processing system is provided having power-down capability for at least one of an analog sensor and a component board and having data acquisition parking features. In embodiments, a data collection and processing system is provided having power-down capability for at least one of an analog sensor and a component board and having a self-sufficient data acquisition box. In embodiments, a data collection and processing system is provided having power-down capability for at least one of an analog sensor and a component board and having SD card storage. In embodiments, a data collection and processing system is provided having power-down capability for at least one of an analog sensor and a component board and having extended onboard statistical capabilities for continuous monitoring. In embodiments, a data collection and processing system is provided having power-down capability for at least one of an analog sensor and a component board and having the use of ambient, local and vibration noise for prediction. In embodiments, a data collection and processing system is provided having power-down capability for at least one of an analog sensor and a component board and having smart route changes route based on incoming data or alarms to enable simultaneous dynamic data for analysis or correlation. In embodiments, a data collection and processing system is provided having power-down capability for at least one of an analog sensor and a component board and having smart ODS and transfer functions. In embodiments, a data collection and processing system is provided having power-down capability for at least one of an analog sensor and a component board and having a hierarchical multiplexer. In embodiments, a data collection and processing system is provided having power-down capability for at least one of an analog sensor and a component board and having identification of sensor overload. In embodiments, a data collection and processing system is provided having power-down capability for at least one of an analog sensor and a component board and having RF identification and an inclinometer. In embodiments, a data collection and processing system is provided having power-down capability for at least one of an analog sensor and a component board and having continuous ultrasonic monitoring. In embodiments, a data collection and processing system is provided having power-down capability for at least one of an analog sensor and a component board and having cloud-based, machine pattern recognition based on fusion of remote, analog industrial sensors. In embodiments, a data collection and processing system is provided having power-down capability for at least one of an analog sensor and a component board and having cloud-based, machine pattern analysis of state information from multiple analog industrial sensors to provide anticipated state information for an industrial system. In embodiments, a data collection and processing system is provided having power-down capability for at least one of an analog sensor and a component board and having cloud-based policy automation engine for IoT, with creation, deployment, and management of IoT devices. In embodiments, a data collection and processing system is provided having power-down capability for at least one of an analog sensor and a component board and having on-device sensor fusion and data storage for industrial IoT devices. In embodiments, a data collection and processing system is provided having power-down capability for at least one of an analog sensor and a component board and having a self-organizing data marketplace for industrial IoT data. In embodiments, a data collection and processing system is provided having power-down capability for at least one of an analog sensor and a component board and having self-organization of data pools based on utilization and/or yield metrics. In embodiments, a data collection and processing system is provided having power-down capability for at least one of an analog sensor and a component board and having training AI models based on industry-specific feedback. In embodiments, a data collection and processing system is provided having power-down capability for at least one of an analog sensor and a component board and having a self-organized swarm of industrial data collectors. In embodiments, a data collection and processing system is provided having power-down capability for at least one of an analog sensor and a component board and having an IoT distributed ledger. In embodiments, a data collection and processing system is provided having power-down capability for at least one of an analog sensor and a component board and having a self-organizing collector. In embodiments, a data collection and processing system is provided having power-down capability for at least one of an analog sensor and a component board and having a network-sensitive collector. In embodiments, a data collection and processing system is provided having power-down capability for at least one of an analog sensor and a component board and having a remotely organized collector. In embodiments, a data collection and processing system is provided having power-down capability for at least one of an analog sensor and a component board and having a self-organizing storage for a multi-sensor data collector. In embodiments, a data collection and processing system is provided having power-down capability for at least one of an analog sensor and a component board and having a self-organizing network coding for multi-sensor data network. In embodiments, a data collection and processing system is provided having power-down capability for at least one of an analog sensor and a component board and having a wearable haptic user interface for an industrial sensor data collector, with vibration, heat, electrical and/or sound outputs. In embodiments, a data collection and processing system is provided having power-down capability for at least one of an analog sensor and a component board and having heat maps displaying collected data for AR/VR. In embodiments, a data collection and processing system is provided having power-down capability for at least one of an analog sensor and a component board and having automatically tuned AR/VR visualization of data collected by a data collector.

In embodiments, a data collection and processing system is provided having unique electrostatic protection for trigger and vibration inputs. In embodiments, a data collection and processing system is provided having unique electrostatic protection for trigger and vibration inputs and having precise voltage reference for A/D zero reference. In embodiments, a data collection and processing system is provided having unique electrostatic protection for trigger and vibration inputs and having a phase-lock loop band-pass tracking filter for obtaining slow-speed RPMs and phase information. In embodiments, a data collection and processing system is provided having unique electrostatic protection for trigger and vibration inputs and having digital derivation of phase relative to input and trigger channels using on-board timers. In embodiments, a data collection and processing system is provided having unique electrostatic protection for trigger and vibration inputs and having a peak-detector for auto-scaling that is routed into a separate analog-to-digital converter for peak detection. In embodiments, a data collection and processing system is provided having unique electrostatic protection for trigger and vibration inputs and having routing of a trigger channel that is either raw or buffered into other analog channels. In embodiments, a data collection and processing system is provided having unique electrostatic protection for trigger and vibration inputs and having the use of higher input oversampling for delta-sigma A/D for lower sampling rate outputs to minimize AA filter requirements. In embodiments, a data collection and processing system is provided having unique electrostatic protection for trigger and vibration inputs and having the use of a CPLD as a clock-divider for a delta-sigma analog-to-digital converter to achieve lower sampling rates without the need for digital resampling. In embodiments, a data collection and processing system is provided having unique electrostatic protection for trigger and vibration inputs and having long blocks of data at a high-sampling rate as opposed to multiple sets of data taken at different sampling rates. In embodiments, a data collection and processing system is provided having unique electrostatic protection for trigger and vibration inputs and having storage of calibration data with maintenance history on-board card set. In embodiments, a data collection and processing system is provided having unique electrostatic protection for trigger and vibration inputs and having a rapid route creation capability using hierarchical templates. In embodiments, a data collection and processing system is provided having unique electrostatic protection for trigger and vibration inputs and having intelligent management of data collection bands. In embodiments, a data collection and processing system is provided having unique electrostatic protection for trigger and vibration inputs and having a neural net expert system using intelligent management of data collection bands. In embodiments, a data collection and processing system is provided having unique electrostatic protection for trigger and vibration inputs and having use of a database hierarchy in sensor data analysis. In embodiments, a data collection and processing system is provided having unique electrostatic protection for trigger and vibration inputs and having an expert system GUI graphical approach to defining intelligent data collection bands and diagnoses for the expert system. In embodiments, a data collection and processing system is provided having unique electrostatic protection for trigger and vibration inputs and having a graphical approach for back-calculation definition. In embodiments, a data collection and processing system is provided having unique electrostatic protection for trigger and vibration inputs and having proposed bearing analysis methods. In embodiments, a data collection and processing system is provided having unique electrostatic protection for trigger and vibration inputs and having torsional vibration detection/analysis utilizing transitory signal analysis. In embodiments, a data collection and processing system is provided having unique electrostatic protection for trigger and vibration inputs and having improved integration using both analog and digital methods. In embodiments, a data collection and processing system is provided having unique electrostatic protection for trigger and vibration inputs and having adaptive scheduling techniques for continuous monitoring of analog data in a local environment. In embodiments, a data collection and processing system is provided having unique electrostatic protection for trigger and vibration inputs and having data acquisition parking features. In embodiments, a data collection and processing system is provided having unique electrostatic protection for trigger and vibration inputs and having a self-sufficient data acquisition box. In embodiments, a data collection and processing system is provided having unique electrostatic protection for trigger and vibration inputs and having SD card storage. In embodiments, a data collection and processing system is provided having unique electrostatic protection for trigger and vibration inputs and having extended onboard statistical capabilities for continuous monitoring. In embodiments, a data collection and processing system is provided having unique electrostatic protection for trigger and vibration inputs and having the use of ambient, local and vibration noise for prediction. In embodiments, a data collection and processing system is provided having unique electrostatic protection for trigger and vibration inputs and having smart route changes route based on incoming data or alarms to enable simultaneous dynamic data for analysis or correlation. In embodiments, a data collection and processing system is provided having unique electrostatic protection for trigger and vibration inputs and having smart ODS and transfer functions. In embodiments, a data collection and processing system is provided having unique electrostatic protection for trigger and vibration inputs and having a hierarchical multiplexer. In embodiments, a data collection and processing system is provided having unique electrostatic protection for trigger and vibration inputs and having identification of sensor overload. In embodiments, a data collection and processing system is provided having unique electrostatic protection for trigger and vibration inputs and having RF identification and an inclinometer. In embodiments, a data collection and processing system is provided having unique electrostatic protection for trigger and vibration inputs and having continuous ultrasonic monitoring. In embodiments, a data collection and processing system is provided having unique electrostatic protection for trigger and vibration inputs and having cloud-based, machine pattern recognition based on fusion of remote, analog industrial sensors. In embodiments, a data collection and processing system is provided having unique electrostatic protection for trigger and vibration inputs and having cloud-based, machine pattern analysis of state information from multiple analog industrial sensors to provide anticipated state information for an industrial system. In embodiments, a data collection and processing system is provided having unique electrostatic protection for trigger and vibration inputs and having cloud-based policy automation engine for IoT, with creation, deployment, and management of IoT devices. In embodiments, a data collection and processing system is provided having unique electrostatic protection for trigger and vibration inputs and having on-device sensor fusion and data storage for industrial IoT devices. In embodiments, a data collection and processing system is provided having unique electrostatic protection for trigger and vibration inputs and having a self-organizing data marketplace for industrial IoT data. In embodiments, a data collection and processing system is provided having unique electrostatic protection for trigger and vibration inputs and having self-organization of data pools based on utilization and/or yield metrics. In embodiments, a data collection and processing system is provided having unique electrostatic protection for trigger and vibration inputs and having training AI models based on industry-specific feedback. In embodiments, a data collection and processing system is provided having unique electrostatic protection for trigger and vibration inputs and having a self-organized swarm of industrial data collectors. In embodiments, a data collection and processing system is provided having unique electrostatic protection for trigger and vibration inputs and having an IoT distributed ledger. In embodiments, a data collection and processing system is provided having unique electrostatic protection for trigger and vibration inputs and having a self-organizing collector. In embodiments, a data collection and processing system is provided having unique electrostatic protection for trigger and vibration inputs and having a network-sensitive collector. In embodiments, a data collection and processing system is provided having unique electrostatic protection for trigger and vibration inputs and having a remotely organized collector. In embodiments, a data collection and processing system is provided having unique electrostatic protection for trigger and vibration inputs and having a self-organizing storage for a multi-sensor data collector. In embodiments, a data collection and processing system is provided having unique electrostatic protection for trigger and vibration inputs and having a self-organizing network coding for multi-sensor data network. In embodiments, a data collection and processing system is provided having unique electrostatic protection for trigger and vibration inputs and having a wearable haptic user interface for an industrial sensor data collector, with vibration, heat, electrical and/or sound outputs. In embodiments, a data collection and processing system is provided having unique electrostatic protection for trigger and vibration inputs and having heat maps displaying collected data for AR/VR. In embodiments, a data collection and processing system is provided having unique electrostatic protection for trigger and vibration inputs and having automatically tuned AR/VR visualization of data collected by a data collector.

In embodiments, a data collection and processing system is provided having precise voltage reference for A/D zero reference. In embodiments, a data collection and processing system is provided having precise voltage reference for A/D zero reference and having a phase-lock loop band-pass tracking filter for obtaining slow-speed RPMs and phase information. In embodiments, a data collection and processing system is provided having precise voltage reference for A/D zero reference and having digital derivation of phase relative to input and trigger channels using on-board timers. In embodiments, a data collection and processing system is provided having precise voltage reference for A/D zero reference and having a peak-detector for auto-scaling that is routed into a separate analog-to-digital converter for peak detection. In embodiments, a data collection and processing system is provided having precise voltage reference for A/D zero reference and having routing of a trigger channel that is either raw or buffered into other analog channels. In embodiments, a data collection and processing system is provided having precise voltage reference for A/D zero reference and having the use of higher input oversampling for delta-sigma A/D for lower sampling rate outputs to minimize AA filter requirements. In embodiments, a data collection and processing system is provided having precise voltage reference for A/D zero reference and having the use of a CPLD as a clock-divider for a delta-sigma analog-to-digital converter to achieve lower sampling rates without the need for digital resampling. In embodiments, a data collection and processing system is provided having precise voltage reference for A/D zero reference and having long blocks of data at a high-sampling rate as opposed to multiple sets of data taken at different sampling rates. In embodiments, a data collection and processing system is provided having precise voltage reference for A/D zero reference and having storage of calibration data with maintenance history on-board card set. In embodiments, a data collection and processing system is provided having precise voltage reference for A/D zero reference and having a rapid route creation capability using hierarchical templates. In embodiments, a data collection and processing system is provided having precise voltage reference for A/D zero reference and having intelligent management of data collection bands. In embodiments, a data collection and processing system is provided having precise voltage reference for A/D zero reference and having a neural net expert system using intelligent management of data collection bands. In embodiments, a data collection and processing system is provided having precise voltage reference for A/D zero reference and having use of a database hierarchy in sensor data analysis. In embodiments, a data collection and processing system is provided having precise voltage reference for A/D zero reference and having an expert system GUI graphical approach to defining intelligent data collection bands and diagnoses for the expert system. In embodiments, a data collection and processing system is provided having precise voltage reference for A/D zero reference and having a graphical approach for back-calculation definition. In embodiments, a data collection and processing system is provided having precise voltage reference for A/D zero reference and having proposed bearing analysis methods. In embodiments, a data collection and processing system is provided having precise voltage reference for A/D zero reference and having torsional vibration detection/analysis utilizing transitory signal analysis. In embodiments, a data collection and processing system is provided having precise voltage reference for A/D zero reference and having improved integration using both analog and digital methods. In embodiments, a data collection and processing system is provided having precise voltage reference for A/D zero reference and having adaptive scheduling techniques for continuous monitoring of analog data in a local environment. In embodiments, a data collection and processing system is provided having precise voltage reference for A/D zero reference and having data acquisition parking features. In embodiments, a data collection and processing system is provided having precise voltage reference for A/D zero reference and having a self-sufficient data acquisition box. In embodiments, a data collection and processing system is provided having precise voltage reference for A/D zero reference and having SD card storage. In embodiments, a data collection and processing system is provided having precise voltage reference for A/D zero reference and having extended onboard statistical capabilities for continuous monitoring. In embodiments, a data collection and processing system is provided having precise voltage reference for A/D zero reference and having the use of ambient, local and vibration noise for prediction. In embodiments, a data collection and processing system is provided having precise voltage reference for A/D zero reference and having smart route changes route based on incoming data or alarms to enable simultaneous dynamic data for analysis or correlation. In embodiments, a data collection and processing system is provided having precise voltage reference for A/D zero reference and having smart ODS and transfer functions. In embodiments, a data collection and processing system is provided having precise voltage reference for A/D zero reference and having a hierarchical multiplexer. In embodiments, a data collection and processing system is provided having precise voltage reference for A/D zero reference and having identification of sensor overload. In embodiments, a data collection and processing system is provided having precise voltage reference for A/D zero reference and having RF identification and an inclinometer. In embodiments, a data collection and processing system is provided having precise voltage reference for A/D zero reference and having continuous ultrasonic monitoring. In embodiments, a data collection and processing system is provided having precise voltage reference for A/D zero reference and having cloud-based, machine pattern recognition based on fusion of remote, analog industrial sensors. In embodiments, a data collection and processing system is provided having precise voltage reference for A/D zero reference and having cloud-based, machine pattern analysis of state information from multiple analog industrial sensors to provide anticipated state information for an industrial system. In embodiments, a data collection and processing system is provided having precise voltage reference for A/D zero reference and having cloud-based policy automation engine for IoT, with creation, deployment, and management of IoT devices. In embodiments, a data collection and processing system is provided having precise voltage reference for A/D zero reference and having on-device sensor fusion and data storage for industrial IoT devices. In embodiments, a data collection and processing system is provided having precise voltage reference for A/D zero reference and having a self-organizing data marketplace for industrial IoT data. In embodiments, a data collection and processing system is provided having precise voltage reference for A/D zero reference and having self-organization of data pools based on utilization and/or yield metrics. In embodiments, a data collection and processing system is provided having precise voltage reference for A/D zero reference and having training AI models based on industry-specific feedback. In embodiments, a data collection and processing system is provided having precise voltage reference for A/D zero reference and having a self-organized swarm of industrial data collectors. In embodiments, a data collection and processing system is provided having precise voltage reference for A/D zero reference and having an IoT distributed ledger. In embodiments, a data collection and processing system is provided having precise voltage reference for A/D zero reference and having a self-organizing collector. In embodiments, a data collection and processing system is provided having precise voltage reference for A/D zero reference and having a network-sensitive collector. In embodiments, a data collection and processing system is provided having precise voltage reference for A/D zero reference and having a remotely organized collector. In embodiments, a data collection and processing system is provided having precise voltage reference for A/D zero reference and having a self-organizing storage for a multi-sensor data collector. In embodiments, a data collection and processing system is provided having precise voltage reference for A/D zero reference and having a self-organizing network coding for multi-sensor data network. In embodiments, a data collection and processing system is provided having precise voltage reference for A/D zero reference and having a wearable haptic user interface for an industrial sensor data collector, with vibration, heat, electrical and/or sound outputs. In embodiments, a data collection and processing system is provided having precise voltage reference for A/D zero reference and having heat maps displaying collected data for AR/VR. In embodiments, a data collection and processing system is provided having precise voltage reference for A/D zero reference and having automatically tuned AR/VR visualization of data collected by a data collector.

In embodiments, a data collection and processing system is provided having a phase-lock loop band-pass tracking filter for obtaining slow-speed RPMs and phase information. In embodiments, a data collection and processing system is provided having a phase-lock loop band-pass tracking filter for obtaining slow-speed RPMs and phase information and having digital derivation of phase relative to input and trigger channels using on-board timers. In embodiments, a data collection and processing system is provided having a phase-lock loop band-pass tracking filter for obtaining slow-speed RPMs and phase information and having a peak-detector for auto-scaling that is routed into a separate analog-to-digital converter for peak detection. In embodiments, a data collection and processing system is provided having a phase-lock loop band-pass tracking filter for obtaining slow-speed RPMs and phase information and having routing of a trigger channel that is either raw or buffered into other analog channels. In embodiments, a data collection and processing system is provided having a phase-lock loop band-pass tracking filter for obtaining slow-speed RPMs and phase information and having the use of higher input oversampling for delta-sigma A/D for lower sampling rate outputs to minimize AA filter requirements. In embodiments, a data collection and processing system is provided having a phase-lock loop band-pass tracking filter for obtaining slow-speed RPMs and phase information and having the use of a CPLD as a clock-divider for a delta-sigma analog-to-digital converter to achieve lower sampling rates without the need for digital resampling. In embodiments, a data collection and processing system is provided having a phase-lock loop band-pass tracking filter for obtaining slow-speed RPMs and phase information and having long blocks of data at a high-sampling rate as opposed to multiple sets of data taken at different sampling rates. In embodiments, a data collection and processing system is provided having a phase-lock loop band-pass tracking filter for obtaining slow-speed RPMs and phase information and having storage of calibration data with maintenance history on-board card set. In embodiments, a data collection and processing system is provided having a phase-lock loop band-pass tracking filter for obtaining slow-speed RPMs and phase information and having a rapid route creation capability using hierarchical templates. In embodiments, a data collection and processing system is provided having a phase-lock loop band-pass tracking filter for obtaining slow-speed RPMs and phase information and having intelligent management of data collection bands. In embodiments, a data collection and processing system is provided having a phase-lock loop band-pass tracking filter for obtaining slow-speed RPMs and phase information and having a neural net expert system using intelligent management of data collection bands. In embodiments, a data collection and processing system is provided having a phase-lock loop band-pass tracking filter for obtaining slow-speed RPMs and phase information and having use of a database hierarchy in sensor data analysis. In embodiments, a data collection and processing system is provided having a phase-lock loop band-pass tracking filter for obtaining slow-speed RPMs and phase information and having an expert system GUI graphical approach to defining intelligent data collection bands and diagnoses for the expert system. In embodiments, a data collection and processing system is provided having a phase-lock loop band-pass tracking filter for obtaining slow-speed RPMs and phase information and having a graphical approach for back-calculation definition. In embodiments, a data collection and processing system is provided having a phase-lock loop band-pass tracking filter for obtaining slow-speed RPMs and phase information and having proposed bearing analysis methods. In embodiments, a data collection and processing system is provided having a phase-lock loop band-pass tracking filter for obtaining slow-speed RPMs and phase information and having torsional vibration detection/analysis utilizing transitory signal analysis. In embodiments, a data collection and processing system is provided having a phase-lock loop band-pass tracking filter for obtaining slow-speed RPMs and phase information and having improved integration using both analog and digital methods. In embodiments, a data collection and processing system is provided having a phase-lock loop band-pass tracking filter for obtaining slow-speed RPMs and phase information and having adaptive scheduling techniques for continuous monitoring of analog data in a local environment. In embodiments, a data collection and processing system is provided having a phase-lock loop band-pass tracking filter for obtaining slow-speed RPMs and phase information and having data acquisition parking features. In embodiments, a data collection and processing system is provided having a phase-lock loop band-pass tracking filter for obtaining slow-speed RPMs and phase information and having a self-sufficient data acquisition box. In embodiments, a data collection and processing system is provided having a phase-lock loop band-pass tracking filter for obtaining slow-speed RPMs and phase information and having SD card storage. In embodiments, a data collection and processing system is provided having a phase-lock loop band-pass tracking filter for obtaining slow-speed RPMs and phase information and having extended onboard statistical capabilities for continuous monitoring. In embodiments, a data collection and processing system is provided having a phase-lock loop band-pass tracking filter for obtaining slow-speed RPMs and phase information and having the use of ambient, local and vibration noise for prediction. In embodiments, a data collection and processing system is provided having a phase-lock loop band-pass tracking filter for obtaining slow-speed RPMs and phase information and having smart route changes route based on incoming data or alarms to enable simultaneous dynamic data for analysis or correlation. In embodiments, a data collection and processing system is provided having a phase-lock loop band-pass tracking filter for obtaining slow-speed RPMs and phase information and having smart ODS and transfer functions. In embodiments, a data collection and processing system is provided having a phase-lock loop band-pass tracking filter for obtaining slow-speed RPMs and phase information and having a hierarchical multiplexer. In embodiments, a data collection and processing system is provided having a phase-lock loop band-pass tracking filter for obtaining slow-speed RPMs and phase information and having identification of sensor overload. In embodiments, a data collection and processing system is provided having a phase-lock loop band-pass tracking filter for obtaining slow-speed RPMs and phase information and having RF identification and an inclinometer. In embodiments, a data collection and processing system is provided having a phase-lock loop band-pass tracking filter for obtaining slow-speed RPMs and phase information and having continuous ultrasonic monitoring. In embodiments, a data collection and processing system is provided having a phase-lock loop band-pass tracking filter for obtaining slow-speed RPMs and phase information and having cloud-based, machine pattern recognition based on fusion of remote, analog industrial sensors. In embodiments, a data collection and processing system is provided having a phase-lock loop band-pass tracking filter for obtaining slow-speed RPMs and phase information and having cloud-based, machine pattern analysis of state information from multiple analog industrial sensors to provide anticipated state information for an industrial system. In embodiments, a data collection and processing system is provided having a phase-lock loop band-pass tracking filter for obtaining slow-speed RPMs and phase information and having cloud-based policy automation engine for IoT, with creation, deployment, and management of IoT devices. In embodiments, a data collection and processing system is provided having a phase-lock loop band-pass tracking filter for obtaining slow-speed RPMs and phase information and having on-device sensor fusion and data storage for industrial IoT devices. In embodiments, a data collection and processing system is provided having a phase-lock loop band-pass tracking filter for obtaining slow-speed RPMs and phase information and having a self-organizing data marketplace for industrial IoT data. In embodiments, a data collection and processing system is provided having a phase-lock loop band-pass tracking filter for obtaining slow-speed RPMs and phase information and having self-organization of data pools based on utilization and/or yield metrics. In embodiments, a data collection and processing system is provided having a phase-lock loop band-pass tracking filter for obtaining slow-speed RPMs and phase information and having training AI models based on industry-specific feedback. In embodiments, a data collection and processing system is provided having a phase-lock loop band-pass tracking filter for obtaining slow-speed RPMs and phase information and having a self-organized swarm of industrial data collectors. In embodiments, a data collection and processing system is provided having a phase-lock loop band-pass tracking filter for obtaining slow-speed RPMs and phase information and having an IoT distributed ledger. In embodiments, a data collection and processing system is provided having a phase-lock loop band-pass tracking filter for obtaining slow-speed RPMs and phase information and having a self-organizing collector. In embodiments, a data collection and processing system is provided having a phase-lock loop band-pass tracking filter for obtaining slow-speed RPMs and phase information and having a network-sensitive collector. In embodiments, a data collection and processing system is provided having a phase-lock loop band-pass tracking filter for obtaining slow-speed RPMs and phase information and having a remotely organized collector. In embodiments, a data collection and processing system is provided having a phase-lock loop band-pass tracking filter for obtaining slow-speed RPMs and phase information and having a self-organizing storage for a multi-sensor data collector. In embodiments, a data collection and processing system is provided having a phase-lock loop band-pass tracking filter for obtaining slow-speed RPMs and phase information and having a self-organizing network coding for multi-sensor data network. In embodiments, a data collection and processing system is provided having a phase-lock loop band-pass tracking filter for obtaining slow-speed RPMs and phase information and having a wearable haptic user interface for an industrial sensor data collector, with vibration, heat, electrical and/or sound outputs. In embodiments, a data collection and processing system is provided having a phase-lock loop band-pass tracking filter for obtaining slow-speed RPMs and phase information and having heat maps displaying collected data for AR/VR. In embodiments, a data collection and processing system is provided having a phase-lock loop band-pass tracking filter for obtaining slow-speed RPMs and phase information and having automatically tuned AR/VR visualization of data collected by a data collector.

In embodiments, a data collection and processing system is provided having digital derivation of phase relative to input and trigger channels using on-board timers. In embodiments, a data collection and processing system is provided having digital derivation of phase relative to input and trigger channels using on-board timers and having a peak-detector for auto-scaling that is routed into a separate analog-to-digital converter for peak detection. In embodiments, a data collection and processing system is provided having digital derivation of phase relative to input and trigger channels using on-board timers and having routing of a trigger channel that is either raw or buffered into other analog channels. In embodiments, a data collection and processing system is provided having digital derivation of phase relative to input and trigger channels using on-board timers and having the use of higher input oversampling for delta-sigma A/D for lower sampling rate outputs to minimize AA filter requirements. In embodiments, a data collection and processing system is provided having digital derivation of phase relative to input and trigger channels using on-board timers and having the use of a CPLD as a clock-divider for a delta-sigma analog-to-digital converter to achieve lower sampling rates without the need for digital resampling. In embodiments, a data collection and processing system is provided having digital derivation of phase relative to input and trigger channels using on-board timers and having long blocks of data at a high-sampling rate as opposed to multiple sets of data taken at different sampling rates. In embodiments, a data collection and processing system is provided having digital derivation of phase relative to input and trigger channels using on-board timers and having storage of calibration data with maintenance history on-board card set. In embodiments, a data collection and processing system is provided having digital derivation of phase relative to input and trigger channels using on-board timers and having a rapid route creation capability using hierarchical templates. In embodiments, a data collection and processing system is provided having digital derivation of phase relative to input and trigger channels using on-board timers and having intelligent management of data collection bands. In embodiments, a data collection and processing system is provided having digital derivation of phase relative to input and trigger channels using on-board timers and having a neural net expert system using intelligent management of data collection bands. In embodiments, a data collection and processing system is provided having digital derivation of phase relative to input and trigger channels using on-board timers and having use of a database hierarchy in sensor data analysis. In embodiments, a data collection and processing system is provided having digital derivation of phase relative to input and trigger channels using on-board timers and having an expert system GUI graphical approach to defining intelligent data collection bands and diagnoses for the expert system. In embodiments, a data collection and processing system is provided having digital derivation of phase relative to input and trigger channels using on-board timers and having a graphical approach for back-calculation definition. In embodiments, a data collection and processing system is provided having digital derivation of phase relative to input and trigger channels using on-board timers and having proposed bearing analysis methods. In embodiments, a data collection and processing system is provided having digital derivation of phase relative to input and trigger channels using on-board timers and having torsional vibration detection/analysis utilizing transitory signal analysis. In embodiments, a data collection and processing system is provided having digital derivation of phase relative to input and trigger channels using on-board timers and having improved integration using both analog and digital methods. In embodiments, a data collection and processing system is provided having digital derivation of phase relative to input and trigger channels using on-board timers and having adaptive scheduling techniques for continuous monitoring of analog data in a local environment. In embodiments, a data collection and processing system is provided having digital derivation of phase relative to input and trigger channels using on-board timers and having data acquisition parking features. In embodiments, a data collection and processing system is provided having digital derivation of phase relative to input and trigger channels using on-board timers and having a self-sufficient data acquisition box. In embodiments, a data collection and processing system is provided having digital derivation of phase relative to input and trigger channels using on-board timers and having SD card storage. In embodiments, a data collection and processing system is provided having digital derivation of phase relative to input and trigger channels using on-board timers and having extended onboard statistical capabilities for continuous monitoring. In embodiments, a data collection and processing system is provided having digital derivation of phase relative to input and trigger channels using on-board timers and having the use of ambient, local and vibration noise for prediction. In embodiments, a data collection and processing system is provided having digital derivation of phase relative to input and trigger channels using on-board timers and having smart route changes route based on incoming data or alarms to enable simultaneous dynamic data for analysis or correlation. In embodiments, a data collection and processing system is provided having digital derivation of phase relative to input and trigger channels using on-board timers and having smart ODS and transfer functions. In embodiments, a data collection and processing system is provided having digital derivation of phase relative to input and trigger channels using on-board timers and having a hierarchical multiplexer. In embodiments, a data collection and processing system is provided having digital derivation of phase relative to input and trigger channels using on-board timers and having identification of sensor overload. In embodiments, a data collection and processing system is provided having digital derivation of phase relative to input and trigger channels using on-board timers and having RF identification and an inclinometer. In embodiments, a data collection and processing system is provided having digital derivation of phase relative to input and trigger channels using on-board timers and having continuous ultrasonic monitoring. In embodiments, a data collection and processing system is provided having digital derivation of phase relative to input and trigger channels using on-board timers and having cloud-based, machine pattern recognition based on fusion of remote, analog industrial sensors. In embodiments, a data collection and processing system is provided having digital derivation of phase relative to input and trigger channels using on-board timers and having cloud-based, machine pattern analysis of state information from multiple analog industrial sensors to provide anticipated state information for an industrial system. In embodiments, a data collection and processing system is provided having digital derivation of phase relative to input and trigger channels using on-board timers and having cloud-based policy automation engine for IoT, with creation, deployment, and management of IoT devices. In embodiments, a data collection and processing system is provided having digital derivation of phase relative to input and trigger channels using on-board timers and having on-device sensor fusion and data storage for industrial IoT devices. In embodiments, a data collection and processing system is provided having digital derivation of phase relative to input and trigger channels using on-board timers and having a self-organizing data marketplace for industrial IoT data. In embodiments, a data collection and processing system is provided having digital derivation of phase relative to input and trigger channels using on-board timers and having self-organization of data pools based on utilization and/or yield metrics. In embodiments, a data collection and processing system is provided having digital derivation of phase relative to input and trigger channels using on-board timers and having training AI models based on industry-specific feedback. In embodiments, a data collection and processing system is provided having digital derivation of phase relative to input and trigger channels using on-board timers and having a self-organized swarm of industrial data collectors. In embodiments, a data collection and processing system is provided having digital derivation of phase relative to input and trigger channels using on-board timers and having an IoT distributed ledger. In embodiments, a data collection and processing system is provided having digital derivation of phase relative to input and trigger channels using on-board timers and having a self-organizing collector. In embodiments, a data collection and processing system is provided having digital derivation of phase relative to input and trigger channels using on-board timers and having a network-sensitive collector. In embodiments, a data collection and processing system is provided having digital derivation of phase relative to input and trigger channels using on-board timers and having a remotely organized collector. In embodiments, a data collection and processing system is provided having digital derivation of phase relative to input and trigger channels using on-board timers and having a self-organizing storage for a multi-sensor data collector. In embodiments, a data collection and processing system is provided having digital derivation of phase relative to input and trigger channels using on-board timers and having a self-organizing network coding for multi-sensor data network. In embodiments, a data collection and processing system is provided having digital derivation of phase relative to input and trigger channels using on-board timers and having a wearable haptic user interface for an industrial sensor data collector, with vibration, heat, electrical and/or sound outputs. In embodiments, a data collection and processing system is provided having digital derivation of phase relative to input and trigger channels using on-board timers and having heat maps displaying collected data for AR/VR. In embodiments, a data collection and processing system is provided having digital derivation of phase relative to input and trigger channels using on-board timers and having automatically tuned AR/VR visualization of data collected by a data collector.

In embodiments, a data collection and processing system is provided having a peak-detector for auto-scaling that is routed into a separate analog-to-digital converter for peak detection. In embodiments, a data collection and processing system is provided having a peak-detector for auto-scaling that is routed into a separate analog-to-digital converter for peak detection and having routing of a trigger channel that is either raw or buffered into other analog channels. In embodiments, a data collection and processing system is provided having a peak-detector for auto-scaling that is routed into a separate analog-to-digital converter for peak detection and having the use of higher input oversampling for delta-sigma A/D for lower sampling rate outputs to minimize AA filter requirements. In embodiments, a data collection and processing system is provided having a peak-detector for auto-scaling that is routed into a separate analog-to-digital converter for peak detection and having the use of a CPLD as a clock-divider for a delta-sigma analog-to-digital converter to achieve lower sampling rates without the need for digital resampling. In embodiments, a data collection and processing system is provided having a peak-detector for auto-scaling that is routed into a separate analog-to-digital converter for peak detection and having long blocks of data at a high-sampling rate as opposed to multiple sets of data taken at different sampling rates. In embodiments, a data collection and processing system is provided having a peak-detector for auto-scaling that is routed into a separate analog-to-digital converter for peak detection and having storage of calibration data with maintenance history on-board card set. In embodiments, a data collection and processing system is provided having a peak-detector for auto-scaling that is routed into a separate analog-to-digital converter for peak detection and having a rapid route creation capability using hierarchical templates. In embodiments, a data collection and processing system is provided having a peak-detector for auto-scaling that is routed into a separate analog-to-digital converter for peak detection and having intelligent management of data collection bands. In embodiments, a data collection and processing system is provided having a peak-detector for auto-scaling that is routed into a separate analog-to-digital converter for peak detection and having a neural net expert system using intelligent management of data collection bands. In embodiments, a data collection and processing system is provided having a peak-detector for auto-scaling that is routed into a separate analog-to-digital converter for peak detection and having use of a database hierarchy in sensor data analysis. In embodiments, a data collection and processing system is provided having a peak-detector for auto-scaling that is routed into a separate analog-to-digital converter for peak detection and having an expert system GUI graphical approach to defining intelligent data collection bands and diagnoses for the expert system. In embodiments, a data collection and processing system is provided having a peak-detector for auto-scaling that is routed into a separate analog-to-digital converter for peak detection and having a graphical approach for back-calculation definition. In embodiments, a data collection and processing system is provided having a peak-detector for auto-scaling that is routed into a separate analog-to-digital converter for peak detection and having proposed bearing analysis methods. In embodiments, a data collection and processing system is provided having a peak-detector for auto-scaling that is routed into a separate analog-to-digital converter for peak detection and having torsional vibration detection/analysis utilizing transitory signal analysis. In embodiments, a data collection and processing system is provided having a peak-detector for auto-scaling that is routed into a separate analog-to-digital converter for peak detection and having improved integration using both analog and digital methods. In embodiments, a data collection and processing system is provided having a peak-detector for auto-scaling that is routed into a separate analog-to-digital converter for peak detection and having adaptive scheduling techniques for continuous monitoring of analog data in a local environment. In embodiments, a data collection and processing system is provided having a peak-detector for auto-scaling that is routed into a separate analog-to-digital converter for peak detection and having data acquisition parking features. In embodiments, a data collection and processing system is provided having a peak-detector for auto-scaling that is routed into a separate analog-to-digital converter for peak detection and having a self-sufficient data acquisition box. In embodiments, a data collection and processing system is provided having a peak-detector for auto-scaling that is routed into a separate analog-to-digital converter for peak detection and having SD card storage. In embodiments, a data collection and processing system is provided having a peak-detector for auto-scaling that is routed into a separate analog-to-digital converter for peak detection and having extended onboard statistical capabilities for continuous monitoring. In embodiments, a data collection and processing system is provided having a peak-detector for auto-scaling that is routed into a separate analog-to-digital converter for peak detection and having the use of ambient, local and vibration noise for prediction. In embodiments, a data collection and processing system is provided having a peak-detector for auto-scaling that is routed into a separate analog-to-digital converter for peak detection and having smart route changes route based on incoming data or alarms to enable simultaneous dynamic data for analysis or correlation. In embodiments, a data collection and processing system is provided having a peak-detector for auto-scaling that is routed into a separate analog-to-digital converter for peak detection and having smart ODS and transfer functions. In embodiments, a data collection and processing system is provided having a peak-detector for auto-scaling that is routed into a separate analog-to-digital converter for peak detection and having a hierarchical multiplexer. In embodiments, a data collection and processing system is provided having a peak-detector for auto-scaling that is routed into a separate analog-to-digital converter for peak detection and having identification of sensor overload. In embodiments, a data collection and processing system is provided having a peak-detector for auto-scaling that is routed into a separate analog-to-digital converter for peak detection and having RF identification and an inclinometer.

In embodiments, a data collection and processing system is provided having a peak-detector for auto-scaling that is routed into a separate analog-to-digital converter for peak detection and having continuous ultrasonic monitoring. In embodiments, a data collection and processing system is provided having a peak-detector for auto-scaling that is routed into a separate analog-to-digital converter for peak detection and having cloud-based, machine pattern recognition based on fusion of remote, analog industrial sensors. In embodiments, a data collection and processing system is provided having a peak-detector for auto-scaling that is routed into a separate analog-to-digital converter for peak detection and having cloud-based, machine pattern analysis of state information from multiple analog industrial sensors to provide anticipated state information for an industrial system. In embodiments, a data collection and processing system is provided having a peak-detector for auto-scaling that is routed into a separate analog-to-digital converter for peak detection and having cloud-based policy automation engine for IoT, with creation, deployment, and management of IoT devices. In embodiments, a data collection and processing system is provided having a peak-detector for auto-scaling that is routed into a separate analog-to-digital converter for peak detection and having on-device sensor fusion and data storage for industrial IoT devices. In embodiments, a data collection and processing system is provided having a peak-detector for auto-scaling that is routed into a separate analog-to-digital converter for peak detection and having a self-organizing data marketplace for industrial IoT data. In embodiments, a data collection and processing system is provided having a peak-detector for auto-scaling that is routed into a separate analog-to-digital converter for peak detection and having self-organization of data pools based on utilization and/or yield metrics. In embodiments, a data collection and processing system is provided having a peak-detector for auto-scaling that is routed into a separate analog-to-digital converter for peak detection and having training AI models based on industry-specific feedback. In embodiments, a data collection and processing system is provided having a peak-detector for auto-scaling that is routed into a separate analog-to-digital converter for peak detection and having a self-organized swarm of industrial data collectors. In embodiments, a data collection and processing system is provided having a peak-detector for auto-scaling that is routed into a separate analog-to-digital converter for peak detection and having an IoT distributed ledger. In embodiments, a data collection and processing system is provided having a peak-detector for auto-scaling that is routed into a separate analog-to-digital converter for peak detection and having a self-organizing collector. In embodiments, a data collection and processing system is provided having a peak-detector for auto-scaling that is routed into a separate analog-to-digital converter for peak detection and having a network-sensitive collector. In embodiments, a data collection and processing system is provided having a peak-detector for auto-scaling that is routed into a separate analog-to-digital converter for peak detection and having a remotely organized collector. In embodiments, a data collection and processing system is provided having a peak-detector for auto-scaling that is routed into a separate analog-to-digital converter for peak detection and having a self-organizing storage for a multi-sensor data collector. In embodiments, a data collection and processing system is provided having a peak-detector for auto-scaling that is routed into a separate analog-to-digital converter for peak detection and having a self-organizing network coding for multi-sensor data network. In embodiments, a data collection and processing system is provided having a peak-detector for auto-scaling that is routed into a separate analog-to-digital converter for peak detection and having a wearable haptic user interface for an industrial sensor data collector, with vibration, heat, electrical and/or sound outputs. In embodiments, a data collection and processing system is provided having a peak-detector for auto-scaling that is routed into a separate analog-to-digital converter for peak detection and having heat maps displaying collected data for AR/VR. In embodiments, a data collection and processing system is provided having a peak-detector for auto-scaling that is routed into a separate analog-to-digital converter for peak detection and having automatically tuned AR/VR visualization of data collected by a data collector.

In embodiments, a data collection and processing system is provided having routing of a trigger channel that is either raw or buffered into other analog channels. In embodiments, a data collection and processing system is provided having routing of a trigger channel that is either raw or buffered into other analog channels and having the use of higher input oversampling for delta-sigma A/D for lower sampling rate outputs to minimize AA filter requirements. In embodiments, a data collection and processing system is provided having routing of a trigger channel that is either raw or buffered into other analog channels and having the use of a CPLD as a clock-divider for a delta-sigma analog-to-digital converter to achieve lower sampling rates without the need for digital resampling. In embodiments, a data collection and processing system is provided having routing of a trigger channel that is either raw or buffered into other analog channels and having long blocks of data at a high-sampling rate as opposed to multiple sets of data taken at different sampling rates. In embodiments, a data collection and processing system is provided having routing of a trigger channel that is either raw or buffered into other analog channels and having storage of calibration data with maintenance history on-board card set. In embodiments, a data collection and processing system is provided having routing of a trigger channel that is either raw or buffered into other analog channels and having a rapid route creation capability using hierarchical templates. In embodiments, a data collection and processing system is provided having routing of a trigger channel that is either raw or buffered into other analog channels and having intelligent management of data collection bands. In embodiments, a data collection and processing system is provided having routing of a trigger channel that is either raw or buffered into other analog channels and having a neural net expert system using intelligent management of data collection bands. In embodiments, a data collection and processing system is provided having routing of a trigger channel that is either raw or buffered into other analog channels and having use of a database hierarchy in sensor data analysis. In embodiments, a data collection and processing system is provided having routing of a trigger channel that is either raw or buffered into other analog channels and having an expert system GUI graphical approach to defining intelligent data collection bands and diagnoses for the expert system. In embodiments, a data collection and processing system is provided having routing of a trigger channel that is either raw or buffered into other analog channels and having a graphical approach for back-calculation definition. In embodiments, a data collection and processing system is provided having routing of a trigger channel that is either raw or buffered into other analog channels and having proposed bearing analysis methods. In embodiments, a data collection and processing system is provided having routing of a trigger channel that is either raw or buffered into other analog channels and having torsional vibration detection/analysis utilizing transitory signal analysis. In embodiments, a data collection and processing system is provided having routing of a trigger channel that is either raw or buffered into other analog channels and having improved integration using both analog and digital methods. In embodiments, a data collection and processing system is provided having routing of a trigger channel that is either raw or buffered into other analog channels and having adaptive scheduling techniques for continuous monitoring of analog data in a local environment. In embodiments, a data collection and processing system is provided having routing of a trigger channel that is either raw or buffered into other analog channels and having data acquisition parking features. In embodiments, a data collection and processing system is provided having routing of a trigger channel that is either raw or buffered into other analog channels and having a self-sufficient data acquisition box. In embodiments, a data collection and processing system is provided having routing of a trigger channel that is either raw or buffered into other analog channels and having SD card storage. In embodiments, a data collection and processing system is provided having routing of a trigger channel that is either raw or buffered into other analog channels and having extended onboard statistical capabilities for continuous monitoring. In embodiments, a data collection and processing system is provided having routing of a trigger channel that is either raw or buffered into other analog channels and having the use of ambient, local and vibration noise for prediction. In embodiments, a data collection and processing system is provided having routing of a trigger channel that is either raw or buffered into other analog channels and having smart route changes route based on incoming data or alarms to enable simultaneous dynamic data for analysis or correlation. In embodiments, a data collection and processing system is provided having routing of a trigger channel that is either raw or buffered into other analog channels and having smart ODS and transfer functions. In embodiments, a data collection and processing system is provided having routing of a trigger channel that is either raw or buffered into other analog channels and having a hierarchical multiplexer. In embodiments, a data collection and processing system is provided having routing of a trigger channel that is either raw or buffered into other analog channels and having identification of sensor overload. In embodiments, a data collection and processing system is provided having routing of a trigger channel that is either raw or buffered into other analog channels and having RF identification and an inclinometer. In embodiments, a data collection and processing system is provided having routing of a trigger channel that is either raw or buffered into other analog channels and having continuous ultrasonic monitoring. In embodiments, a data collection and processing system is provided having routing of a trigger channel that is either raw or buffered into other analog channels and having cloud-based, machine pattern recognition based on fusion of remote, analog industrial sensors. In embodiments, a data collection and processing system is provided having routing of a trigger channel that is either raw or buffered into other analog channels and having cloud-based, machine pattern analysis of state information from multiple analog industrial sensors to provide anticipated state information for an industrial system. In embodiments, a data collection and processing system is provided having routing of a trigger channel that is either raw or buffered into other analog channels and having cloud-based policy automation engine for IoT, with creation, deployment, and management of IoT devices. In embodiments, a data collection and processing system is provided having routing of a trigger channel that is either raw or buffered into other analog channels and having on-device sensor fusion and data storage for industrial IoT devices. In embodiments, a data collection and processing system is provided having routing of a trigger channel that is either raw or buffered into other analog channels and having a self-organizing data marketplace for industrial IoT data. In embodiments, a data collection and processing system is provided having routing of a trigger channel that is either raw or buffered into other analog channels and having self-organization of data pools based on utilization and/or yield metrics. In embodiments, a data collection and processing system is provided having routing of a trigger channel that is either raw or buffered into other analog channels and having training AI models based on industry-specific feedback. In embodiments, a data collection and processing system is provided having routing of a trigger channel that is either raw or buffered into other analog channels and having a self-organized swarm of industrial data collectors. In embodiments, a data collection and processing system is provided having routing of a trigger channel that is either raw or buffered into other analog channels and having an IoT distributed ledger. In embodiments, a data collection and processing system is provided having routing of a trigger channel that is either raw or buffered into other analog channels and having a self-organizing collector. In embodiments, a data collection and processing system is provided having routing of a trigger channel that is either raw or buffered into other analog channels and having a network-sensitive collector. In embodiments, a data collection and processing system is provided having routing of a trigger channel that is either raw or buffered into other analog channels and having a remotely organized collector. In embodiments, a data collection and processing system is provided having routing of a trigger channel that is either raw or buffered into other analog channels and having a self-organizing storage for a multi-sensor data collector. In embodiments, a data collection and processing system is provided having routing of a trigger channel that is either raw or buffered into other analog channels and having a self-organizing network coding for multi-sensor data network. In embodiments, a data collection and processing system is provided having routing of a trigger channel that is either raw or buffered into other analog channels and having a wearable haptic user interface for an industrial sensor data collector, with vibration, heat, electrical and/or sound outputs. In embodiments, a data collection and processing system is provided having routing of a trigger channel that is either raw or buffered into other analog channels and having heat maps displaying collected data for AR/VR. In embodiments, a data collection and processing system is provided having routing of a trigger channel that is either raw or buffered into other analog channels and having automatically tuned AR/VR visualization of data collected by a data collector.

In embodiments, a data collection and processing system is provided having the use of higher input oversampling for delta-sigma A/D for lower sampling rate outputs to minimize AA filter requirements. In embodiments, a data collection and processing system is provided having the use of higher input oversampling for delta-sigma A/D for lower sampling rate outputs to minimize AA filter requirements and having the use of a CPLD as a clock-divider for a delta-sigma analog-to-digital converter to achieve lower sampling rates without the need for digital resampling. In embodiments, a data collection and processing system is provided having the use of higher input oversampling for delta-sigma A/D for lower sampling rate outputs to minimize AA filter requirements and having long blocks of data at a high-sampling rate as opposed to multiple sets of data taken at different sampling rates. In embodiments, a data collection and processing system is provided having the use of higher input oversampling for delta-sigma A/D for lower sampling rate outputs to minimize AA filter requirements and having storage of calibration data with maintenance history on-board card set. In embodiments, a data collection and processing system is provided having the use of higher input oversampling for delta-sigma A/D for lower sampling rate outputs to minimize AA filter requirements and having a rapid route creation capability using hierarchical templates. In embodiments, a data collection and processing system is provided having the use of higher input oversampling for delta-sigma A/D for lower sampling rate outputs to minimize AA filter requirements and having intelligent management of data collection bands. In embodiments, a data collection and processing system is provided having the use of higher input oversampling for delta-sigma A/D for lower sampling rate outputs to minimize AA filter requirements and having a neural net expert system using intelligent management of data collection bands. In embodiments, a data collection and processing system is provided having the use of higher input oversampling for delta-sigma A/D for lower sampling rate outputs to minimize AA filter requirements and having use of a database hierarchy in sensor data analysis. In embodiments, a data collection and processing system is provided having the use of higher input oversampling for delta-sigma A/D for lower sampling rate outputs to minimize AA filter requirements and having an expert system GUI graphical approach to defining intelligent data collection bands and diagnoses for the expert system. In embodiments, a data collection and processing system is provided having the use of higher input oversampling for delta-sigma A/D for lower sampling rate outputs to minimize AA filter requirements and having a graphical approach for back-calculation definition. In embodiments, a data collection and processing system is provided having the use of higher input oversampling for delta-sigma A/D for lower sampling rate outputs to minimize AA filter requirements and having proposed bearing analysis methods. In embodiments, a data collection and processing system is provided having the use of higher input oversampling for delta-sigma A/D for lower sampling rate outputs to minimize AA filter requirements and having torsional vibration detection/analysis utilizing transitory signal analysis. In embodiments, a data collection and processing system is provided having the use of higher input oversampling for delta-sigma A/D for lower sampling rate outputs to minimize AA filter requirements and having improved integration using both analog and digital methods. In embodiments, a data collection and processing system is provided having the use of higher input oversampling for delta-sigma A/D for lower sampling rate outputs to minimize AA filter requirements and having adaptive scheduling techniques for continuous monitoring of analog data in a local environment. In embodiments, a data collection and processing system is provided having the use of higher input oversampling for delta-sigma A/D for lower sampling rate outputs to minimize AA filter requirements and having data acquisition parking features. In embodiments, a data collection and processing system is provided having the use of higher input oversampling for delta-sigma A/D for lower sampling rate outputs to minimize AA filter requirements and having a self-sufficient data acquisition box. In embodiments, a data collection and processing system is provided having the use of higher input oversampling for delta-sigma A/D for lower sampling rate outputs to minimize AA filter requirements and having SD card storage. In embodiments, a data collection and processing system is provided having the use of higher input oversampling for delta-sigma A/D for lower sampling rate outputs to minimize AA filter requirements and having extended onboard statistical capabilities for continuous monitoring. In embodiments, a data collection and processing system is provided having the use of higher input oversampling for delta-sigma A/D for lower sampling rate outputs to minimize AA filter requirements and having the use of ambient, local and vibration noise for prediction. In embodiments, a data collection and processing system is provided having the use of higher input oversampling for delta-sigma A/D for lower sampling rate outputs to minimize AA filter requirements and having smart route changes route based on incoming data or alarms to enable simultaneous dynamic data for analysis or correlation. In embodiments, a data collection and processing system is provided having the use of higher input oversampling for delta-sigma A/D for lower sampling rate outputs to minimize AA filter requirements and having smart ODS and transfer functions. In embodiments, a data collection and processing system is provided having the use of higher input oversampling for delta-sigma A/D for lower sampling rate outputs to minimize AA filter requirements and having a hierarchical multiplexer. In embodiments, a data collection and processing system is provided having the use of higher input oversampling for delta-sigma A/D for lower sampling rate outputs to minimize AA filter requirements and having identification of sensor overload. In embodiments, a data collection and processing system is provided having the use of higher input oversampling for delta-sigma A/D for lower sampling rate outputs to minimize AA filter requirements and having RF identification and an inclinometer. In embodiments, a data collection and processing system is provided having the use of higher input oversampling for delta-sigma A/D for lower sampling rate outputs to minimize AA filter requirements and having continuous ultrasonic monitoring. In embodiments, a data collection and processing system is provided having the use of higher input oversampling for delta-sigma A/D for lower sampling rate outputs to minimize AA filter requirements and having cloud-based, machine pattern recognition based on fusion of remote, analog industrial sensors. In embodiments, a data collection and processing system is provided having the use of higher input oversampling for delta-sigma A/D for lower sampling rate outputs to minimize AA filter requirements and having cloud-based, machine pattern analysis of state information from multiple analog industrial sensors to provide anticipated state information for an industrial system. In embodiments, a data collection and processing system is provided having the use of higher input oversampling for delta-sigma A/D for lower sampling rate outputs to minimize AA filter requirements and having cloud-based policy automation engine for IoT, with creation, deployment, and management of IoT devices. In embodiments, a data collection and processing system is provided having the use of higher input oversampling for delta-sigma A/D for lower sampling rate outputs to minimize AA filter requirements and having on-device sensor fusion and data storage for industrial IoT devices. In embodiments, a data collection and processing system is provided having the use of higher input oversampling for delta-sigma A/D for lower sampling rate outputs to mini-mize AA filter requirements and having a self-organizing data marketplace for industrial IoT data. In embodiments, a data collection and processing system is provided having the use of higher input oversampling for delta-sigma A/D for lower sampling rate outputs to minimize AA filter requirements and having self-organization of data pools based on utilization and/or yield metrics. In embodiments, a data collection and processing system is provided having the use of higher input oversampling for delta-sigma A/D for lower sampling rate outputs to minimize AA filter requirements and having training AI models based on industry-specific feedback. In embodiments, a data collection and processing system is provided having the use of higher input oversampling for delta-sigma A/D for lower sampling rate outputs to minimize AA filter requirements and having a self-organized swarm of industrial data collectors. In embodiments, a data collection and processing system is provided having the use of higher input oversampling for delta-sigma A/D for lower sampling rate outputs to minimize AA filter requirements and having an IoT distributed ledger. In embodiments, a data collection and processing system is provided having the use of higher input oversampling for delta-sigma A/D for lower sampling rate outputs to minimize AA filter requirements and having a self-organizing collector. In embodiments, a data collection and processing system is provided having the use of higher input oversampling for delta-sigma A/D for lower sampling rate outputs to minimize AA filter requirements and having a network-sensitive collector. In embodiments, a data collection and processing system is provided having the use of higher input oversampling for delta-sigma A/D for lower sampling rate outputs to minimize AA filter requirements and having a remotely organized collector. In embodiments, a data collection and processing system is provided having the use of higher input oversampling for delta-sigma A/D for lower sampling rate outputs to minimize AA filter requirements and having a self-organizing storage for a multi-sensor data collector. In embodiments, a data collection and processing system is provided having the use of higher input oversampling for delta-sigma A/D for lower sampling rate outputs to minimize AA filter requirements and having a self-organizing network coding for multi-sensor data network. In embodiments, a data collection and processing system is provided having the use of higher input oversampling for delta-sigma A/D for lower sampling rate outputs to minimize AA filter requirements and having a wearable haptic user interface for an industrial sensor data collector, with vibration, heat, electrical and/or sound outputs. In embodiments, a data collection and processing system is provided having the use of higher input oversampling for delta-sigma A/D for lower sampling rate outputs to minimize AA filter requirements and having heat maps displaying collected data for AR/VR. In embodiments, a data collection and processing system is provided having the use of higher input oversampling for delta-sigma A/D for lower sampling rate outputs to minimize AA filter requirements and having automatically tuned AR/VR visualization of data collected by a data collector.

In embodiments, a data collection and processing system is provided having the use of a CPLD as a clock-divider for a delta-sigma analog-to-digital converter to achieve lower sampling rates without the need for digital resampling. In embodiments, a data collection and processing system is provided having the use of a CPLD as a clock-divider for a delta-sigma analog-to-digital converter to achieve lower sampling rates without the need for digital resampling and having long blocks of data at a high-sampling rate as opposed to multiple sets of data taken at different sampling rates. In embodiments, a data collection and processing system is provided having the use of a CPLD as a clock-divider for a delta-sigma analog-to-digital converter to achieve lower sampling rates without the need for digital resampling and having storage of calibration data with maintenance history on-board card set. In embodiments, a data collection and processing system is provided having the use of a CPLD as a clock-divider for a delta-sigma analog-to-digital converter to achieve lower sampling rates without the need for digital resampling and having a rapid route creation capability using hierarchical templates. In embodiments, a data collection and processing system is provided having the use of a CPLD as a clock-divider for a delta-sigma analog-to-digital converter to achieve lower sampling rates without the need for digital resampling and having intelligent management of data collection bands. In embodiments, a data collection and processing system is provided having the use of a CPLD as a clock-divider for a delta-sigma analog-to-digital converter to achieve lower sampling rates without the need for digital resampling and having a neural net expert system using intelligent management of data collection bands. In embodiments, a data collection and processing system is provided having the use of a CPLD as a clock-divider for a delta-sigma analog-to-digital converter to achieve lower sampling rates without the need for digital resampling and having use of a database hierarchy in sensor data analysis. In embodiments, a data collection and processing system is provided having the use of a CPLD as a clock-divider for a delta-sigma analog-to-digital converter to achieve lower sampling rates without the need for digital resampling and having an expert system GUI graphical approach to defining intelligent data collection bands and diagnoses for the expert system. In embodiments, a data collection and processing system is provided having the use of a CPLD as a clock-divider for a delta-sigma analog-to-digital converter to achieve lower sampling rates without the need for digital resampling and having a graphical approach for back-calculation definition. In embodiments, a data collection and processing system is provided having the use of a CPLD as a clock-divider for a delta-sigma analog-to-digital converter to achieve lower sampling rates without the need for digital resampling and having proposed bearing analysis methods. In embodiments, a data collection and processing system is provided having the use of a CPLD as a clock-divider for a delta-sigma analog-to-digital converter to achieve lower sampling rates without the need for digital resampling and having torsional vibration detection/analysis utilizing transitory signal analysis. In embodiments, a data collection and processing system is provided having the use of a CPLD as a clock-divider for a delta-sigma analog-to-digital converter to achieve lower sampling rates without the need for digital resampling and having improved integration using both analog and digital methods. In embodiments, a data collection and processing system is provided having the use of a CPLD as a clock-divider for a delta-sigma analog-to-digital converter to achieve lower sampling rates without the need for digital resampling and having adaptive scheduling techniques for continuous monitoring of analog data in a local environment. In embodiments, a data collection and processing system is provided having the use of a CPLD as a clock-divider for a delta-sigma analog-to-digital converter to achieve lower sampling rates without the need for digital resampling and having data acquisition parking features. In embodiments, a data collection and processing system is provided having the use of a CPLD as a clock-divider for a delta-sigma analog-to-digital converter to achieve lower sampling rates without the need for digital resampling and having a self-sufficient data acquisition box. In embodiments, a data collection and processing system is provided having the use of a CPLD as a clock-divider for a delta-sigma analog-to-digital converter to achieve lower sampling rates without the need for digital resampling and having SD card storage. In embodiments, a data collection and processing system is provided having the use of a CPLD as a clock-divider for a delta-sigma analog-to-digital converter to achieve lower sampling rates without the need for digital resampling and having extended onboard statistical capabilities for continuous monitoring. In embodiments, a data collection and processing system is provided having the use of a CPLD as a clock-divider for a delta-sigma analog-to-digital converter to achieve lower sampling rates without the need for digital resampling and having the use of ambient, local and vibration noise for prediction. In embodiments, a data collection and processing system is provided having the use of a CPLD as a clock-divider for a delta-sigma analog-to-digital converter to achieve lower sampling rates without the need for digital resampling and having smart route changes route based on incoming data or alarms to enable simultaneous dynamic data for analysis or correlation. In embodiments, a data collection and processing system is provided having the use of a CPLD as a clock-divider for a delta-sigma analog-to-digital converter to achieve lower sampling rates without the need for digital resampling and having smart ODS and transfer functions. In embodiments, a data collection and processing system is provided having the use of a CPLD as a clock-divider for a delta-sigma analog-to-digital converter to achieve lower sampling rates without the need for digital resampling and having a hierarchical multiplexer. In embodiments, a data collection and processing system is provided having the use of a CPLD as a clock-divider for a delta-sigma analog-to-digital converter to achieve lower sampling rates without the need for digital resampling and having identification of sensor overload. In embodiments, a data collection and processing system is provided having the use of a CPLD as a clock-divider for a delta-sigma analog-to-digital converter to achieve lower sampling rates without the need for digital resampling and having RF identification and an inclinometer. In embodiments, a data collection and processing system is provided having the use of a CPLD as a clock-divider for a delta-sigma analog-to-digital converter to achieve lower sampling rates without the need for digital resampling and having continuous ultrasonic monitoring. In embodiments, a data collection and processing system is provided having the use of a CPLD as a clock-divider for a delta-sigma analog-to-digital converter to achieve lower sampling rates without the need for digital resampling and having cloud-based, machine pattern recognition based on fusion of remote, analog industrial sensors. In embodiments, a data collection and processing system is provided having the use of a CPLD as a clock-divider for a delta-sigma analog-to-digital converter to achieve lower sampling rates without the need for digital resampling and having cloud-based, machine pattern analysis of state information from multiple analog industrial sensors to provide anticipated state information for an industrial system. In embodiments, a data collection and processing system is provided having the use of a CPLD as a clock-divider for a delta-sigma analog-to-digital converter to achieve lower sampling rates without the need for digital resampling and having cloud-based policy automation engine for IoT, with creation, deployment, and management of IoT devices. In embodiments, a data collection and processing system is provided having the use of a CPLD as a clock-divider for a delta-sigma analog-to-digital converter to achieve lower sampling rates without the need for digital resampling and having on-device sensor fusion and data storage for industrial IoT devices. In embodiments, a data collection and processing system is provided having the use of a CPLD as a clock-divider for a delta-sigma analog-to-digital converter to achieve lower sampling rates without the need for digital resampling and having a self-organizing data marketplace for industrial IoT data. In embodiments, a data collection and processing system is provided having the use of a CPLD as a clock-divider for a delta-sigma analog-to-digital converter to achieve lower sampling rates without the need for digital resampling and having self-organization of data pools based on utilization and/or yield metrics. In embodiments, a data collection and processing system is provided having the use of a CPLD as a clock-divider for a delta-sigma analog-to-digital converter to achieve lower sampling rates without the need for digital resampling and having training AI models based on industry-specific feedback. In embodiments, a data collection and processing system is provided having the use of a CPLD as a clock-divider for a delta-sigma analog-to-digital converter to achieve lower sampling rates without the need for digital resampling and having a self-organized swarm of industrial data collectors. In embodiments, a data collection and processing system is provided having the use of a CPLD as a clock-divider for a delta-sigma analog-to-digital converter to achieve lower sampling rates without the need for digital resampling and having an IoT distributed ledger. In embodiments, a data collection and processing system is provided having the use of a CPLD as a clock-divider for a delta-sigma analog-to-digital converter to achieve lower sampling rates without the need for digital resampling and having a self-organizing collector. In embodiments, a data collection and processing system is provided having the use of a CPLD as a clock-divider for a delta-sigma analog-to-digital converter to achieve lower sampling rates without the need for digital resampling and having a network-sensitive collector. In embodiments, a data collection and processing system is provided having the use of a CPLD as a clock-divider for a delta-sigma analog-to-digital converter to achieve lower sampling rates without the need for digital resampling and having a remotely organized collector. In embodiments, a data collection and processing system is provided having the use of a CPLD as a clock-divider for a delta-sigma analog-to-digital converter to achieve lower sampling rates without the need for digital resampling and having a self-organizing storage for a multi-sensor data collector. In embodiments, a data collection and processing system is provided having the use of a CPLD as a clock-divider for a delta-sigma analog-to-digital converter to achieve lower sampling rates without the need for digital resampling and having a self-organizing network coding for multi-sensor data network. In embodiments, a data collection and processing system is provided having the use of a CPLD as a clock-divider for a delta-sigma analog-to-digital converter to achieve lower sampling rates without the need for digital resampling and having a wearable haptic user interface for an industrial sensor data collector, with vibration, heat, electrical and/or sound outputs. In embodiments, a data collection and processing system is provided having the use of a CPLD as a clock-divider for a delta-sigma analog-to-digital converter to achieve lower sampling rates without the need for digital resampling and having heat maps displaying collected data for AR/VR. In embodiments, a data collection and processing system is provided having the use of a CPLD as a clock-divider for a delta-sigma analog-to-digital converter to achieve lower sampling rates without the need for digital resampling and having automatically tuned AR/VR visualization of data collected by a data collector.

In embodiments, a data collection and processing system is provided having long blocks of data at a high-sampling rate as opposed to multiple sets of data taken at different sampling rates. In embodiments, a data collection and processing system is provided having long blocks of data at a high-sampling rate as opposed to multiple sets of data taken at different sampling rates and having storage of calibration data with maintenance history on-board card set. In embodiments, a data collection and processing system is provided having long blocks of data at a high-sampling rate as opposed to multiple sets of data taken at different sampling rates and having a rapid route creation capability using hierarchical templates. In embodiments, a data collection and processing system is provided having long blocks of data at a high-sampling rate as opposed to multiple sets of data taken at different sampling rates and having intelligent management of data collection bands. In embodiments, a data collection and processing system is provided having long blocks of data at a high-sampling rate as opposed to multiple sets of data taken at different sampling rates and having a neural net expert system using intelligent management of data collection bands. In embodiments, a data collection and processing system is provided having long blocks of data at a high-sampling rate as opposed to multiple sets of data taken at different sampling rates and having use of a database hierarchy in sensor data analysis. In embodiments, a data collection and processing system is provided having long blocks of data at a high-sampling rate as opposed to multiple sets of data taken at different sampling rates and having an expert system GUI graphical approach to defining intelligent data collection bands and diagnoses for the expert system. In embodiments, a data collection and processing system is provided having long blocks of data at a high-sampling rate as opposed to multiple sets of data taken at different sampling rates and having a graphical approach for back-calculation definition. In embodiments, a data collection and processing system is provided having long blocks of data at a high-sampling rate as opposed to multiple sets of data taken at different sampling rates and having proposed bearing analysis methods. In embodiments, a data collection and processing system is provided having long blocks of data at a high-sampling rate as opposed to multiple sets of data taken at different sampling rates and having torsional vibration detection/analysis utilizing transitory signal analysis. In embodiments, a data collection and processing system is provided having long blocks of data at a high-sampling rate as opposed to multiple sets of data taken at different sampling rates and having improved integration using both analog and digital methods. In embodiments, a data collection and processing system is provided having long blocks of data at a high-sampling rate as opposed to multiple sets of data taken at different sampling rates and having adaptive scheduling techniques for continuous monitoring of analog data in a local environment. In embodiments, a data collection and processing system is provided having long blocks of data at a high-sampling rate as opposed to multiple sets of data taken at different sampling rates and having data acquisition parking features. In embodiments, a data collection and processing system is provided having long blocks of data at a high-sampling rate as opposed to multiple sets of data taken at different sampling rates and having a self-sufficient data acquisition box. In embodiments, a data collection and processing system is provided having long blocks of data at a high-sampling rate as opposed to multiple sets of data taken at different sampling rates and having SD card storage. In embodiments, a data collection and processing system is provided having long blocks of data at a high-sampling rate as opposed to multiple sets of data taken at different sampling rates and having extended onboard statistical capabilities for continuous monitoring. In embodiments, a data collection and processing system is provided having long blocks of data at a high-sampling rate as opposed to multiple sets of data taken at different sampling rates and having the use of ambient, local and vibration noise for prediction. In embodiments, a data collection and processing system is provided having long blocks of data at a high-sampling rate as opposed to multiple sets of data taken at different sampling rates and having smart route changes route based on incoming data or alarms to enable simultaneous dynamic data for analysis or correlation. In embodiments, a data collection and processing system is provided having long blocks of data at a high-sampling rate as opposed to multiple sets of data taken at different sampling rates and having smart ODS and transfer functions. In embodiments, a data collection and processing system is provided having long blocks of data at a high-sampling rate as opposed to multiple sets of data taken at different sampling rates and having a hierarchical multiplexer. In embodiments, a data collection and processing system is provided having long blocks of data at a high-sampling rate as opposed to multiple sets of data taken at different sampling rates and having identification of sensor overload. In embodiments, a data collection and processing system is provided having long blocks of data at a high-sampling rate as opposed to multiple sets of data taken at different sampling rates and having RF identification and an inclinometer. In embodiments, a data collection and processing system is provided having long blocks of data at a high-sampling rate as opposed to multiple sets of data taken at different sampling rates and having continuous ultrasonic monitoring. In embodiments, a data collection and processing system is provided having long blocks of data at a high-sampling rate as opposed to multiple sets of data taken at different sampling rates and having cloud-based, machine pattern recognition based on fusion of remote, analog industrial sensors. In embodiments, a data collection and processing system is provided having long blocks of data at a high-sampling rate as opposed to multiple sets of data taken at different sampling rates and having cloud-based, machine pattern analysis of state information from multiple analog industrial sensors to provide anticipated state information for an industrial system. In embodiments, a data collection and processing system is provided having long blocks of data at a high-sampling rate as opposed to multiple sets of data taken at different sampling rates and having cloud-based policy automation engine for IoT, with creation, deployment, and management of IoT devices. In embodiments, a data collection and processing system is provided having long blocks of data at a high-sampling rate as opposed to multiple sets of data taken at different sampling rates and having on-device sensor fusion and data storage for industrial IoT devices. In embodiments, a data collection and processing system is provided having long blocks of data at a high-sampling rate as opposed to multiple sets of data taken at different sampling rates and having a self-organizing data marketplace for industrial IoT data. In embodiments, a data collection and processing system is provided having long blocks of data at a high-sampling rate as opposed to multiple sets of data taken at different sampling rates and having self-organization of data pools based on utilization and/or yield metrics. In embodiments, a data collection and processing system is provided having long blocks of data at a high-sampling rate as opposed to multiple sets of data taken at different sampling rates and having training AI models based on industry-specific feedback. In embodiments, a data collection and processing system is provided having long blocks of data at a high-sampling rate as opposed to multiple sets of data taken at different sampling rates and having a self-organized swarm of industrial data collectors. In embodiments, a data collection and processing system is provided having long blocks of data at a high-sampling rate as opposed to multiple sets of data taken at different sampling rates and having an IoT distributed ledger. In embodiments, a data collection and processing system is provided having long blocks of data at a high-sampling rate as opposed to multiple sets of data taken at different sampling rates and having a self-organizing collector. In embodiments, a data collection and processing system is provided having long blocks of data at a high-sampling rate as opposed to multiple sets of data taken at different sampling rates and having a network-sensitive collector. In embodiments, a data collection and processing system is provided having long blocks of data at a high-sampling rate as opposed to multiple sets of data taken at different sampling rates and having a remotely organized collector. In embodiments, a data collection and processing system is provided having long blocks of data at a high-sampling rate as opposed to multiple sets of data taken at different sampling rates and having a self-organizing storage for a multi-sensor data collector. In embodiments, a data collection and processing system is provided having long blocks of data at a high-sampling rate as opposed to multiple sets of data taken at different sampling rates and having a self-organizing network coding for multi-sensor data network. In embodiments, a data collection and processing system is provided having long blocks of data at a high-sampling rate as opposed to multiple sets of data taken at different sampling rates and having a wearable haptic user interface for an industrial sensor data collector, with vibration, heat, electrical, and/or sound outputs. In embodiments, a data collection and processing system is provided having long blocks of data at a high-sampling rate as opposed to multiple sets of data taken at different sampling rates and having heat maps displaying collected data for AR/VR. In embodiments, a data collection and processing system is provided having long blocks of data at a high-sampling rate as opposed to multiple sets of data taken at different sampling rates and having automatically tuned AR/VR visualization of data collected by a data collector.

In embodiments, a data collection and processing system is provided having storage of calibration data with maintenance history on-board card set. In embodiments, a data collection and processing system is provided having storage of calibration data with maintenance history on-board card set and having a rapid route creation capability using hierarchical templates. In embodiments, a data collection and processing system is provided having storage of calibration data with maintenance history on-board card set and having intelligent management of data collection bands. In embodiments, a data collection and processing system is provided having storage of calibration data with maintenance history on-board card set and having a neural net expert system using intelligent management of data collection bands. In embodiments, a data collection and processing system is provided having storage of calibration data with maintenance history on-board card set and having use of a database hierarchy in sensor data analysis. In embodiments, a data collection and processing system is provided having storage of calibration data with maintenance history on-board card set and having an expert system GUI graphical approach to defining intelligent data collection bands and diagnoses for the expert system. In embodiments, a data collection and processing system is provided having storage of calibration data with maintenance history on-board card set and having a graphical approach for back-calculation definition. In embodiments, a data collection and processing system is provided having storage of calibration data with maintenance history on-board card set and having proposed bearing analysis methods. In embodiments, a data collection and processing system is provided having storage of calibration data with maintenance history on-board card set and having torsional vibration detection/analysis utilizing transitory signal analysis. In embodiments, a data collection and processing system is provided having storage of calibration data with maintenance history on-board card set and having improved integration using both analog and digital methods. In embodiments, a data collection and processing system is provided having storage of calibration data with maintenance history on-board card set and having adaptive scheduling techniques for continuous monitoring of analog data in a local environment. In embodiments, a data collection and processing system is provided having storage of calibration data with maintenance history on-board card set and having data acquisition parking features. In embodiments, a data collection and processing system is provided having storage of calibration data with maintenance history on-board card set and having a self-sufficient data acquisition box. In embodiments, a data collection and processing system is provided having storage of calibration data with maintenance history on-board card set and having SD card storage. In embodiments, a data collection and processing system is provided having storage of calibration data with maintenance history on-board card set and having extended onboard statistical capabilities for continuous monitoring. In embodiments, a data collection and processing system is provided having storage of calibration data with maintenance history on-board card set and having the use of ambient, local and vibration noise for prediction. In embodiments, a data collection and processing system is provided having storage of calibration data with maintenance history on-board card set and having smart route changes route based on incoming data or alarms to enable simultaneous dynamic data for analysis or correlation. In embodiments, a data collection and processing system is provided having storage of calibration data with maintenance history on-board card set and having smart ODS and transfer functions. In embodiments, a data collection and processing system is provided having storage of calibration data with maintenance history on-board card set and having a hierarchical multiplexer. In embodiments, a data collection and processing system is provided having storage of calibration data with maintenance history on-board card set and having identification of sensor overload. In embodiments, a data collection and processing system is provided having storage of calibration data with maintenance history on-board card set and having RF identification and an inclinometer. In embodiments, a data collection and processing system is provided having storage of calibration data with maintenance history on-board card set and having continuous ultrasonic monitoring. In embodiments, a data collection and processing system is provided having storage of calibration data with maintenance history on-board card set and having cloud-based, machine pattern recognition based on fusion of remote, analog industrial sensors. In embodiments, a data collection and processing system is provided having storage of calibration data with maintenance history on-board card set and having cloud-based, machine pattern analysis of state information from multiple analog industrial sensors to provide anticipated state information for an industrial system. In embodiments, a data collection and processing system is provided having storage of calibration data with maintenance history on-board card set and having cloud-based policy automation engine for IoT, with creation, deployment, and management of IoT devices. In embodiments, a data collection and processing system is provided having storage of calibration data with maintenance history on-board card set and having on-device sensor fusion and data storage for industrial IoT devices. In embodiments, a data collection and processing system is provided having storage of calibration data with maintenance history on-board card set and having a self-organizing data marketplace for industrial IoT data. In embodiments, a data collection and processing system is provided having storage of calibration data with maintenance history on-board card set and having self-organization of data pools based on utilization and/or yield metrics. In embodiments, a data collection and processing system is provided having storage of calibration data with maintenance history on-board card set and having training AI models based on industry-specific feedback. In embodiments, a data collection and processing system is provided having storage of calibration data with maintenance history on-board card set and having a self-organized swarm of industrial data collectors. In embodiments, a data collection and processing system is provided having storage of calibration data with maintenance history on-board card set and having an IoT distributed ledger. In embodiments, a data collection and processing system is provided having storage of calibration data with maintenance history on-board card set and having a self-organizing collector. In embodiments, a data collection and processing system is provided having storage of calibration data with maintenance history on-board card set and having a network-sensitive collector. In embodiments, a data collection and processing system is provided having storage of calibration data with maintenance history on-board card set and having a remotely organized collector. In embodiments, a data collection and processing system is provided having storage of calibration data with maintenance history on-board card set and having a self-organizing storage for a multi-sensor data collector. In embodiments, a data collection and processing system is provided having storage of calibration data with maintenance history on-board card set and having a self-organizing network coding for multi-sensor data network. In embodiments, a data collection and processing system is provided having storage of calibration data with maintenance history on-board card set and having a wearable haptic user interface for an industrial sensor data collector, with vibration, heat, electrical, and/or sound outputs. In embodiments, a data collection and processing system is provided having storage of calibration data with maintenance history on-board card set and having heat maps displaying collected data for AR/VR. In embodiments, a data collection and processing system is provided having storage of calibration data with maintenance history on-board card set and having automatically tuned AR/VR visualization of data collected by a data collector.

In embodiments, a data collection and processing system is provided having a rapid route creation capability using hierarchical templates. In embodiments, a data collection and processing system is provided having a rapid route creation capability using hierarchical templates and having intelligent management of data collection bands. In embodiments, a data collection and processing system is provided having a rapid route creation capability using hierarchical templates and having a neural net expert system using intelligent management of data collection bands. In embodiments, a data collection and processing system is provided having a rapid route creation capability using hierarchical templates and having use of a database hierarchy in sensor data analysis. In embodiments, a data collection and processing system is provided having a rapid route creation capability using hierarchical templates and having an expert system GUI graphical approach to defining intelligent data collection bands and diagnoses for the expert system. In embodiments, a data collection and processing system is provided having a rapid route creation capability using hierarchical templates and having a graphical approach for back-calculation definition. In embodiments, a data collection and processing system is provided having a rapid route creation capability using hierarchical templates and having proposed bearing analysis methods. In embodiments, a data collection and processing system is provided having a rapid route creation capability using hierarchical templates and having torsional vibration detection/analysis utilizing transitory signal analysis. In embodiments, a data collection and processing system is provided having a rapid route creation capability using hierarchical templates and having improved integration using both analog and digital methods. In embodiments, a data collection and processing system is provided having a rapid route creation capability using hierarchical templates and having adaptive scheduling techniques for continuous monitoring of analog data in a local environment. In embodiments, a data collection and processing system is provided having a rapid route creation capability using hierarchical templates and having data acquisition parking features. In embodiments, a data collection and processing system is provided having a rapid route creation capability using hierarchical templates and having a self-sufficient data acquisition box. In embodiments, a data collection and processing system is provided having a rapid route creation capability using hierarchical templates and having SD card storage. In embodiments, a data collection and processing system is provided having a rapid route creation capability using hierarchical templates and having extended onboard statistical capabilities for continuous monitoring. In embodiments, a data collection and processing system is provided having a rapid route creation capability using hierarchical templates and having the use of ambient, local and vibration noise for prediction. In embodiments, a data collection and processing system is provided having a rapid route creation capability using hierarchical templates and having smart route changes route based on incoming data or alarms to enable simultaneous dynamic data for analysis or correlation. In embodiments, a data collection and processing system is provided having a rapid route creation capability using hierarchical templates and having smart ODS and transfer functions. In embodiments, a data collection and processing system is provided having a rapid route creation capability using hierarchical templates and having a hierarchical multiplexer. In embodiments, a data collection and processing system is provided having a rapid route creation capability using hierarchical templates and having identification of sensor overload. In embodiments, a data collection and processing system is provided having a rapid route creation capability using hierarchical templates and having RF identification and an inclinometer. In embodiments, a data collection and processing system is provided having a rapid route creation capability using hierarchical templates and having continuous ultrasonic monitoring. In embodiments, a data collection and processing system is provided having a rapid route creation capability using hierarchical templates and having cloud-based, machine pattern recognition based on fusion of remote, analog industrial sensors. In embodiments, a data collection and processing system is provided having a rapid route creation capability using hierarchical templates and having cloud-based, machine pattern analysis of state information from multiple analog industrial sensors to provide anticipated state information for an industrial system. In embodiments, a data collection and processing system is provided having a rapid route creation capability using hierarchical templates and having cloud-based policy automation engine for IoT, with creation, deployment, and management of IoT devices. In embodiments, a data collection and processing system is provided having a rapid route creation capability using hierarchical templates and having on-device sensor fusion and data storage for industrial IoT devices. In embodiments, a data collection and processing system is provided having a rapid route creation capability using hierarchical templates and having a self-organizing data marketplace for industrial IoT data. In embodiments, a data collection and processing system is provided having a rapid route creation capability using hierarchical templates and having self-organization of data pools based on utilization and/or yield metrics. In embodiments, a data collection and processing system is provided having a rapid route creation capability using hierarchical templates and having training AI models based on industry-specific feedback. In embodiments, a data collection and processing system is provided having a rapid route creation capability using hierarchical templates and having a self-organized swarm of industrial data collectors. In embodiments, a data collection and processing system is provided having a rapid route creation capability using hierarchical templates and having an IoT distributed ledger. In embodiments, a data collection and processing system is provided having a rapid route creation capability using hierarchical templates and having a self-organizing collector. In embodiments, a data collection and processing system is provided having a rapid route creation capability using hierarchical templates and having a network-sensitive collector. In embodiments, a data collection and processing system is provided having a rapid route creation capability using hierarchical templates and having a remotely organized collector. In embodiments, a data collection and processing system is provided having a rapid route creation capability using hierarchical templates and having a self-organizing storage for a multi-sensor data collector. In embodiments, a data collection and processing system is provided having a rapid route creation capability using hierarchical templates and having a self-organizing network coding for multi-sensor data network. In embodiments, a data collection and processing system is provided having a rapid route creation capability using hierarchical templates and having a wearable haptic user interface for an industrial sensor data collector, with vibration, heat, electrical and/or sound outputs. In embodiments, a data collection and processing system is provided having a rapid route creation capability using hierarchical templates and having heat maps displaying collected data for AR/VR. In embodiments, a data collection and processing system is provided having a rapid route creation capability using hierarchical templates and having automatically tuned AR/VR visualization of data collected by a data collector.

In embodiments, a data collection and processing system is provided having intelligent management of data collection bands. In embodiments, a data collection and processing system is provided having intelligent management of data collection bands and having a neural net expert system using intelligent management of data collection bands. In embodiments, a data collection and processing system is provided having intelligent management of data collection bands and having use of a database hierarchy in sensor data analysis. In embodiments, a data collection and processing system is provided having intelligent management of data collection bands and having an expert system GUI graphical approach to defining intelligent data collection bands and diagnoses for the expert system. In embodiments, a data collection and processing system is provided having intelligent management of data collection bands and having a graphical approach for back-calculation definition. In embodiments, a data collection and processing system is provided having intelligent management of data collection bands and having proposed bearing analysis methods. In embodiments, a data collection and processing system is provided having intelligent management of data collection bands and having torsional vibration detection/analysis utilizing transitory signal analysis. In embodiments, a data collection and processing system is provided having intelligent management of data collection bands and having improved integration using both analog and digital methods. In embodiments, a data collection and processing system is provided having intelligent management of data collection bands and having adaptive scheduling techniques for continuous monitoring of analog data in a local environment. In embodiments, a data collection and processing system is provided having intelligent management of data collection bands and having data acquisition parking features. In embodiments, a data collection and processing system is provided having intelligent management of data collection bands and having a self-sufficient data acquisition box. In embodiments, a data collection and processing system is provided having intelligent management of data collection bands and having SD card storage. In embodiments, a data collection and processing system is provided having intelligent management of data collection bands and having extended onboard statistical capabilities for continuous monitoring. In embodiments, a data collection and processing system is provided having intelligent management of data collection bands and having the use of ambient, local and vibration noise for prediction. In embodiments, a data collection and processing system is provided having intelligent management of data collection bands and having smart route changes route based on incoming data or alarms to enable simultaneous dynamic data for analysis or correlation. In embodiments, a data collection and processing system is provided having intelligent management of data collection bands and having smart ODS and transfer functions. In embodiments, a data collection and processing system is provided having intelligent management of data collection bands and having a hierarchical multiplexer. In embodiments, a data collection and processing system is provided having intelligent management of data collection bands and having identification of sensor overload. In embodiments, a data collection and processing system is provided having intelligent management of data collection bands and having RF identification and an inclinometer. In embodiments, a data collection and processing system is provided having intelligent management of data collection bands and having continuous ultrasonic monitoring. In embodiments, a data collection and processing system is provided having intelligent management of data collection bands and having cloud-based, machine pattern recognition based on fusion of remote, analog industrial sensors. In embodiments, a data collection and processing system is provided having intelligent management of data collection bands and having cloud-based, machine pattern analysis of state information from multiple analog industrial sensors to provide anticipated state information for an industrial system. In embodiments, a data collection and processing system is provided having intelligent management of data collection bands and having cloud-based policy automation engine for IoT, with creation, deployment, and management of IoT devices. In embodiments, a data collection and processing system is provided having intelligent management of data collection bands and having on-device sensor fusion and data storage for industrial IoT devices. In embodiments, a data collection and processing system is provided having intelligent management of data collection bands and having a self-organizing data marketplace for industrial IoT data. In embodiments, a data collection and processing system is provided having intelligent management of data collection bands and having self-organization of data pools based on utilization and/or yield metrics. In embodiments, a data collection and processing system is provided having intelligent management of data collection bands and having training AI models based on industry-specific feedback. In embodiments, a data collection and processing system is provided having intelligent management of data collection bands and having a self-organized swarm of industrial data collectors. In embodiments, a data collection and processing system is provided having intelligent management of data collection bands and having an IoT distributed ledger. In embodiments, a data collection and processing system is provided having intelligent management of data collection bands and having a self-organizing collector. In embodiments, a data collection and processing system is provided having intelligent management of data collection bands and having a network-sensitive collector. In embodiments, a data collection and processing system is provided having intelligent management of data collection bands and having a remotely organized collector. In embodiments, a data collection and processing system is provided having intelligent management of data collection bands and having a self-organizing storage for a multi-sensor data collector. In embodiments, a data collection and processing system is provided having intelligent management of data collection bands and having a self-organizing network coding for multi-sensor data network. In embodiments, a data collection and processing system is provided having intelligent management of data collection bands and having a wearable haptic user interface for an industrial sensor data collector, with vibration, heat, electrical, and/or sound outputs. In embodiments, a data collection and processing system is provided having intelligent management of data collection bands and having heat maps displaying collected data for AR/VR. In embodiments, a data collection and processing system is provided having intelligent management of data collection bands and having automatically tuned AR/VR visualization of data collected by a data collector.

In embodiments, a data collection and processing system is provided having a neural net expert system using intelligent management of data collection bands. In embodiments, a data collection and processing system is provided having a neural net expert system using intelligent management of data collection bands and having use of a database hierarchy in sensor data analysis. In embodiments, a data collection and processing system is provided having a neural net expert system using intelligent management of data collection bands and having an expert system GUI graphical approach to defining intelligent data collection bands and diagnoses for the expert system. In embodiments, a data collection and processing system is provided having a neural net expert system using intelligent management of data collection bands and having a graphical approach for back-calculation definition. In embodiments, a data collection and processing system is provided having a neural net expert system using intelligent management of data collection bands and having proposed bearing analysis methods. In embodiments, a data collection and processing system is provided having a neural net expert system using intelligent management of data collection bands and having torsional vibration detection/ analysis utilizing transitory signal analysis. In embodiments, a data collection and processing system is provided having a neural net expert system using intelligent management of data collection bands and having improved integration using both analog and digital methods. In embodiments, a data collection and processing system is provided having a neural net expert system using intelligent management of data collection bands and having adaptive scheduling techniques for continuous monitoring of analog data in a local environment. In embodiments, a data collection and processing system is provided having a neural net expert system using intelligent management of data collection bands and having data acquisition parking features. In embodiments, a data collection and processing system is provided having a neural net expert system using intelligent management of data collection bands and having a self-sufficient data acquisition box. In embodiments, a data collection and processing system is provided having a neural net expert system using intelligent management of data collection bands and having SD card storage. In embodiments, a data collection and processing system is provided having a neural net expert system using intelligent management of data collection bands and having extended onboard statistical capabilities for continuous monitoring. In embodiments, a data collection and processing system is provided having a neural net expert system using intelligent management of data collection bands and having the use of ambient, local and vibration noise for prediction. In embodiments, a data collection and processing system is provided having a neural net expert system using intelligent management of data collection bands and having smart route changes route based on incoming data or alarms to enable simultaneous dynamic data for analysis or correlation. In embodiments, a data collection and processing system is provided having a neural net expert system using intelligent management of data collection bands and having smart ODS and transfer functions. In embodiments, a data collection and processing system is provided having a neural net expert system using intelligent management of data collection bands and having a hierarchical multiplexer. In embodiments, a data collection and processing system is provided having a neural net expert system using intelligent management of data collection bands and having identification of sensor overload. In embodiments, a data collection and processing system is provided having a neural net expert system using intelligent management of data collection bands and having RF identification and an inclinometer. In embodiments, a data collection and processing system is provided having a neural net expert system using intelligent management of data collection bands and having continuous ultrasonic monitoring. In embodiments, a data collection and processing system is provided having a neural net expert system using intelligent management of data collection bands and having cloud-based, machine pattern recognition based on fusion of remote, analog industrial sensors. In embodiments, a data collection and processing system is provided having a neural net expert system using intelligent management of data collection bands and having cloud-based, machine pattern analysis of state information from multiple analog industrial sensors to provide anticipated state information for an industrial system. In embodiments, a data collection and processing system is provided having a neural net expert system using intelligent management of data collection bands and having cloud-based policy automation engine for IoT, with creation, deployment, and management of IoT devices. In embodiments, a data collection and processing system is provided having a neural net expert system using intelligent management of data collection bands and having on-device sensor fusion and data storage for industrial IoT devices. In embodiments, a data collection and processing system is provided having a neural net expert system using intelligent management of data collection bands and having a self-organizing data marketplace for industrial IoT data. In embodiments, a data collection and processing system is provided having a neural net expert system using intelligent management of data collection bands and having self-organization of data pools based on utilization and/or yield metrics. In embodiments, a data collection and processing system is provided having a neural net expert system using intelligent management of data collection bands and having training AI models based on industry-specific feedback. In embodiments, a data collection and processing system is provided having a neural net expert system using intelligent management of data collection bands and having a self-organized swarm of industrial data collectors. In embodiments, a data collection and processing system is provided having a neural net expert system using intelligent management of data collection bands and having an IoT distributed ledger. In embodiments, a data collection and processing system is provided having a neural net expert system using intelligent management of data collection bands and having a self-organizing collector. In embodiments, a data collection and processing system is provided having a neural net expert system using intelligent management of data collection bands and having a network-sensitive collector. In embodiments, a data collection and processing system is provided having a neural net expert system using intelligent management of data collection bands and having a remotely organized collector. In embodiments, a data collection and processing system is provided having a neural net expert system using intelligent management of data collection bands and having a self-organizing storage for a multi-sensor data collector. In embodiments, a data collection and processing system is provided having a neural net expert system using intelligent management of data collection bands and having a self-organizing network coding for multi-sensor data network. In embodiments, a data collection and processing system is provided having a neural net expert system using intelligent management of data collection bands and having a wearable haptic user interface for an industrial sensor data collector, with vibration, heat, electrical and/or sound outputs. In embodiments, a data collection and processing system is provided having a neural net expert system using intelligent management of data collection bands and having heat maps displaying collected data for AR/VR. In embodiments, a data collection and processing system is provided having a neural net expert system using intelligent management of data collection bands and having automatically tuned AR/VR visualization of data collected by a data collector.

In embodiments, a data collection and processing system is provided having use of a database hierarchy in sensor data analysis. In embodiments, a data collection and processing system is provided having use of a database hierarchy in sensor data analysis and having an expert system GUI graphical approach to defining intelligent data collection bands and diagnoses for the expert system. In embodiments, a data collection and processing system is provided having use of a database hierarchy in sensor data analysis and having a graphical approach for back-calculation definition. In embodiments, a data collection and processing system is provided having use of a database hierarchy in sensor data analysis and having proposed bearing analysis methods. In embodiments, a data collection and processing system is provided having use of a database hierarchy in sensor data analysis and having torsional vibration detection/analysis utilizing transitory signal analysis. In embodiments, a data collection and processing system is provided having use of a database hierarchy in sensor data analysis and having improved integration using both analog and digital methods. In embodiments, a data collection and processing system is provided having use of a database hierarchy in sensor data analysis and having adaptive scheduling techniques for continuous monitoring of analog data in a local environment. In embodiments, a data collection and processing system is provided having use of a database hierarchy in sensor data analysis and having data acquisition parking features. In embodiments, a data collection and processing system is provided having use of a database hierarchy in sensor data analysis and having a self-sufficient data acquisition box. In embodiments, a data collection and processing system is provided having use of a database hierarchy in sensor data analysis and having SD card storage. In embodiments, a data collection and processing system is provided having use of a database hierarchy in sensor data analysis and having extended onboard statistical capabilities for continuous monitoring. In embodiments, a data collection and processing system is provided having use of a database hierarchy in sensor data analysis and having the use of ambient, local and vibration noise for prediction. In embodiments, a data collection and processing system is provided having use of a database hierarchy in sensor data analysis and having smart route changes route based on incoming data or alarms to enable simultaneous dynamic data for analysis or correlation. In embodiments, a data collection and processing system is provided having use of a database hierarchy in sensor data analysis and having smart ODS and transfer functions. In embodiments, a data collection and processing system is provided having use of a database hierarchy in sensor data analysis and having a hierarchical multiplexer. In embodiments, a data collection and processing system is provided having use of a database hierarchy in sensor data analysis and having identification of sensor overload. In embodiments, a data collection and processing system is provided having use of a database hierarchy in sensor data analysis and having RF identification and an inclinometer. In embodiments, a data collection and processing system is provided having use of a database hierarchy in sensor data analysis and having continuous ultrasonic monitoring. In embodiments, a data collection and processing system is provided having use of a database hierarchy in sensor data analysis and having cloud-based, machine pattern recognition based on fusion of remote, analog industrial sensors. In embodiments, a data collection and processing system is provided having use of a database hierarchy in sensor data analysis and having cloud-based, machine pattern analysis of state information from multiple analog industrial sensors to provide anticipated state information for an industrial system. In embodiments, a data collection and processing system is provided having use of a database hierarchy in sensor data analysis and having cloud-based policy automation engine for IoT, with creation, deployment, and management of IoT devices. In embodiments, a data collection and processing system is provided having use of a database hierarchy in sensor data analysis and having on-device sensor fusion and data storage for industrial IoT devices. In embodiments, a data collection and processing system is provided having use of a database hierarchy in sensor data analysis and having a self-organizing data marketplace for industrial IoT data. In embodiments, a data collection and processing system is provided having use of a database hierarchy in sensor data analysis and having self-organization of data pools based on utilization and/or yield metrics. In embodiments, a data collection and processing system is provided having use of a database hierarchy in sensor data analysis and having training AI models based on industry-specific feedback. In embodiments, a data collection and processing system is provided having use of a database hierarchy in sensor data analysis and having a self-organized swarm of industrial data collectors. In embodiments, a data collection and processing system is provided having use of a database hierarchy in sensor data analysis and having an IoT distributed ledger. In embodiments, a data collection and processing system is provided having use of a database hierarchy in sensor data analysis and having a self-organizing collector. In embodiments, a data collection and processing system is provided having use of a database hierarchy in sensor data analysis and having a network-sensitive collector. In embodiments, a data collection and processing system is provided having use of a database hierarchy in sensor data analysis and having a remotely organized collector. In embodiments, a data collection and processing system is provided having use of a database hierarchy in sensor data analysis and having a self-organizing storage for a multi-sensor data collector. In embodiments, a data collection and processing system is provided having use of a database hierarchy in sensor data analysis and having a self-organizing network coding for multi-sensor data network. In embodiments, a data collection and processing system is provided having use of a database hierarchy in sensor data analysis and having a wearable haptic user interface for an industrial sensor data collector, with vibration, heat, electrical, and/or sound outputs. In embodiments, a data collection and processing system is provided having use of a database hierarchy in sensor data analysis and having heat maps displaying collected data for AR/VR. In embodiments, a data collection and processing system is provided having use of a database hierarchy in sensor data analysis and having automatically tuned AR/VR visualization of data collected by a data collector.

In embodiments, a data collection and processing system is provided having an expert system GUI graphical approach to defining intelligent data collection bands and diagnoses for the expert system. In embodiments, a data collection and processing system is provided having an expert system GUI graphical approach to defining intelligent data collection bands and diagnoses for the expert system and having a graphical approach for back-calculation definition. In embodiments, a data collection and processing system is provided having an expert system GUI graphical approach to defining intelligent data collection bands and diagnoses for the expert system and having proposed bearing analysis methods. In embodiments, a data collection and processing system is provided having an expert system GUI graphical approach to defining intelligent data collection bands and diagnoses for the expert system and having torsional vibration detection/analysis utilizing transitory signal analysis. In embodiments, a data collection and processing system is provided having an expert system GUI graphical approach to defining intelligent data collection bands and diagnoses for the expert system and having improved integration using both analog and digital methods. In embodiments, a data collection and processing system is provided having an expert system GUI graphical approach to defining intelligent data collection bands and diagnoses for the expert system and having adaptive scheduling techniques for continuous monitoring of analog data in a local environment. In embodiments, a data collection and processing system is provided having an expert system GUI graphical approach to defining intelligent data collection bands and diagnoses for the expert system and having data acquisition parking features. In embodiments, a data collection and processing system is provided having an expert system GUI graphical approach to defining intelligent data collection bands and diagnoses for the expert system and having a self-sufficient data acquisition box. In embodiments, a data collection and processing system is provided having an expert system GUI graphical approach to defining intelligent data collection bands and diagnoses for the expert system and having SD card storage. In embodiments, a data collection and processing system is provided having an expert system GUI graphical approach to defining intelligent data collection bands and diagnoses for the expert system and having extended onboard statistical capabilities for continuous monitoring. In embodiments, a data collection and processing system is provided having an expert system GUI graphical approach to defining intelligent data collection bands and diagnoses for the expert system and having the use of ambient, local and vibration noise for prediction. In embodiments, a data collection and processing system is provided having an expert system GUI graphical approach to defining intelligent data collection bands and diagnoses for the expert system and having smart route changes route based on incoming data or alarms to enable simultaneous dynamic data for analysis or correlation. In embodiments, a data collection and processing system is provided having an expert system GUI graphical approach to defining intelligent data collection bands and diagnoses for the expert system and having smart ODS and transfer functions. In embodiments, a data collection and processing system is provided having an expert system GUI graphical approach to defining intelligent data collection bands and diagnoses for the expert system and having a hierarchical multiplexer. In embodiments, a data collection and processing system is provided having an expert system GUI graphical approach to defining intelligent data collection bands and diagnoses for the expert system and having identification of sensor overload. In embodiments, a data collection and processing system is provided having an expert system GUI graphical approach to defining intelligent data collection bands and diagnoses for the expert system and having RF identification and an inclinometer. In embodiments, a data collection and processing system is provided having an expert system GUI graphical approach to defining intelligent data collection bands and diagnoses for the expert system and having continuous ultrasonic monitoring. In embodiments, a data collection and processing system is provided having an expert system GUI graphical approach to defining intelligent data collection bands and diagnoses for the expert system and having cloud-based, machine pattern recognition based on fusion of remote, analog industrial sensors. In embodiments, a data collection and processing system is provided having an expert system GUI graphical approach to defining intelligent data collection bands and diagnoses for the expert system and having cloud-based, machine pattern analysis of state information from multiple analog industrial sensors to provide anticipated state information for an industrial system. In embodiments, a data collection and processing system is provided having an expert system GUI graphical approach to defining intelligent data collection bands and diagnoses for the expert system and having cloud-based policy automation engine for IoT, with creation, deployment, and management of IoT devices. In embodiments, a data collection and processing system is provided having an expert system GUI graphical approach to defining intelligent data collection bands and diagnoses for the expert system and having on-device sensor fusion and data storage for industrial IoT devices. In embodiments, a data collection and processing system is provided having an expert system GUI graphical approach to defining intelligent data collection bands and diagnoses for the expert system and having a self-organizing data marketplace for industrial IoT data. In embodiments, a data collection and processing system is provided having an expert system GUI graphical approach to defining intelligent data collection bands and diagnoses for the expert system and having self-organization of data pools based on utilization and/or yield metrics. In embodiments, a data collection and processing system is provided having an expert system GUI graphical approach to defining intelligent data collection bands and diagnoses for the expert system and having training AI models based on industry-specific feedback. In embodiments, a data collection and processing system is provided having an expert system GUI graphical approach to defining intelligent data collection bands and diagnoses for the expert system and having a self-organized swarm of industrial data collectors. In embodiments, a data collection and processing system is provided having an expert system GUI graphical approach to defining intelligent data collection bands and diagnoses for the expert system and having an IoT distributed ledger. In embodiments, a data collection and processing system is provided having an expert system GUI graphical approach to defining intelligent data collection bands and diagnoses for the expert system and having a self-organizing collector. In embodiments, a data collection and processing system is provided having an expert system GUI graphical approach to defining intelligent data collection bands and diagnoses for the expert system and having a network-sensitive collector. In embodiments, a data collection and processing system is provided having an expert system GUI graphical approach to defining intelligent data collection bands and diagnoses for the expert system and having a remotely organized collector. In embodiments, a data collection and processing system is provided having an expert system GUI graphical approach to defining intelligent data collection bands and diagnoses for the expert system and having a self-organizing storage for a multi-sensor data collector. In embodiments, a data collection and processing system is provided having an expert system GUI graphical approach to defining intelligent data collection bands and diagnoses for the expert system and having a self-organizing network coding for multi-sensor data network. In embodiments, a data collection and processing system is provided having an expert system GUI graphical approach to defining intelligent data collection bands and diagnoses for the expert system and having a wearable haptic user interface for an industrial sensor data collector, with vibration, heat, electrical and/or sound outputs. In embodiments, a data collection and processing system is provided having an expert system GUI graphical approach to defining intelligent data collection bands and diagnoses for the expert system and having heat maps displaying collected data for AR/VR. In embodiments, a data collection and processing system is provided having an expert system GUI graphical approach to defining intelligent data collection bands and diagnoses for the expert system and having automatically tuned AR/VR visualization of data collected by a data collector.

In embodiments, a data collection and processing system is provided having a graphical approach for back-calculation definition. In embodiments, a data collection and processing system is provided having a graphical approach for back-calculation definition and having proposed bearing analysis methods. In embodiments, a data collection and processing system is provided having a graphical approach for back-calculation definition and having torsional vibration detection/analysis utilizing transitory signal analysis. In embodiments, a data collection and processing system is provided having a graphical approach for back-calculation definition and having improved integration using both analog and digital methods. In embodiments, a data collection and processing system is provided having a graphical approach for back-calculation definition and having adaptive scheduling techniques for continuous monitoring of analog data in a local environment. In embodiments, a data collection and processing system is provided having a graphical approach for back-calculation definition and having data acquisition parking features. In embodiments, a data collection and processing system is provided having a graphical approach for back-calculation definition and having a self-sufficient data acquisition box. In embodiments, a data collection and processing system is provided having a graphical approach for back-calculation definition and having SD card storage. In embodiments, a data collection and processing system is provided having a graphical approach for back-calculation definition and having extended onboard statistical capabilities for continuous monitoring. In embodiments, a data collection and processing system is provided having a graphical approach for back-calculation definition and having the use of ambient, local and vibration noise for prediction. In embodiments, a data collection and processing system is provided having a graphical approach for back-calculation definition and having smart route changes route based on incoming data or alarms to enable simultaneous dynamic data for analysis or correlation. In embodiments, a data collection and processing system is provided having a graphical approach for back-calculation definition and having smart ODS and transfer functions. In embodiments, a data collection and processing system is provided having a graphical approach for back-calculation definition and having a hierarchical multiplexer. In embodiments, a data collection and processing system is provided having a graphical approach for back-calculation definition and having identification of sensor overload. In embodiments, a data collection and processing system is provided having a graphical approach for back-calculation definition and having RF identification and an inclinometer. In embodiments, a data collection and processing system is provided having a graphical approach for back-calculation definition and having continuous ultrasonic monitoring. In embodiments, a data collection and processing system is provided having a graphical approach for back-calculation definition and having cloud-based, machine pattern recognition based on fusion of remote, analog industrial sensors. In embodiments, a data collection and processing system is provided having a graphical approach for back-calculation definition and having cloud-based, machine pattern analysis of state information from multiple analog industrial sensors to provide anticipated state information for an industrial system. In embodiments, a data collection and processing system is provided having a graphical approach for back-calculation definition and having cloud-based policy automation engine for IoT, with creation, deployment, and management of IoT devices. In embodiments, a data collection and processing system is provided having a graphical approach for back-calculation definition and having on-device sensor fusion and data storage for industrial IoT devices. In embodiments, a data collection and processing system is provided having a graphical approach for back-calculation definition and having a self-organizing data marketplace for industrial IoT data. In embodiments, a data collection and processing system is provided having a graphical approach for back-calculation definition and having self-organization of data pools based on utilization and/or yield metrics. In embodiments, a data collection and processing system is provided having a graphical approach for back-calculation definition and having training AI models based on industry-specific feedback. In embodiments, a data collection and processing system is provided having a graphical approach for back-calculation definition and having a self-organized swarm of industrial data collectors. In embodiments, a data collection and processing system is provided having a graphical approach for back-calculation definition and having an IoT distributed ledger. In embodiments, a data collection and processing system is provided having a graphical approach for back-calculation definition and having a self-organizing collector. In embodiments, a data collection and processing system is provided having a graphical approach for back-calculation definition and having a network-sensitive collector. In embodiments, a data collection and processing system is provided having a graphical approach for back-calculation definition and having a remotely organized collector. In embodiments, a data collection and processing system is provided having a graphical approach for back-calculation definition and having a self-organizing storage for a multi-sensor data collector. In embodiments, a data collection and processing system is provided having a graphical approach for back-calculation definition and having a self-organizing network coding for multi-sensor data network. In embodiments, a data collection and processing system is provided having a graphical approach for back-calculation definition and having a wearable haptic user interface for an industrial sensor data collector, with vibration, heat, electrical, and/or sound outputs. In embodiments, a data collection and processing system is provided having a graphical approach for back-calculation definition and having heat maps displaying collected data for AR/VR. In embodiments, a data collection and processing system is provided having a graphical approach for back-calculation definition and having automatically tuned AR/VR visualization of data collected by a data collector.

In embodiments, a data collection and processing system is provided having proposed bearing analysis methods. In embodiments, a data collection and processing system is provided having proposed bearing analysis methods and having torsional vibration detection/analysis utilizing transitory signal analysis. In embodiments, a data collection and processing system is provided having proposed bearing analysis methods and having improved integration using both analog and digital methods. In embodiments, a data collection and processing system is provided having proposed bearing analysis methods and having adaptive scheduling techniques for continuous monitoring of analog data in a local environment. In embodiments, a data collection and processing system is provided having proposed bearing analysis methods and having data acquisition parking features. In embodiments, a data collection and processing system is provided having proposed bearing analysis methods and having a self-sufficient data acquisition box. In embodiments, a data collection and processing system is provided having proposed bearing analysis methods and having SD card storage. In embodiments, a data collection and processing system is provided having proposed bearing analysis methods and having extended onboard statistical capabilities for continuous monitoring. In embodiments, a data collection and processing system is provided having proposed bearing analysis methods and having the use of ambient, local and vibration noise for prediction. In embodiments, a data collection and processing system is provided having proposed bearing analysis methods and having smart route changes route based on incoming data or alarms to enable simultaneous dynamic data for analysis or correlation. In embodiments, a data collection and processing system is provided having proposed bearing analysis methods and having smart ODS and transfer functions. In embodiments, a data collection and processing system is provided having proposed bearing analysis methods and having a hierarchical multiplexer. In embodiments, a data collection and processing system is provided having proposed bearing analysis methods and having identification of sensor overload. In embodiments, a data collection and processing system is provided having proposed bearing analysis methods and having RF identification and an inclinometer. In embodiments, a data collection and processing system is provided having proposed bearing analysis methods and having continuous ultrasonic monitoring. In embodiments, a data collection and processing system is provided having proposed bearing analysis methods and having cloud-based, machine pattern recognition based on fusion of remote, analog industrial sensors. In embodiments, a data collection and processing system is provided having proposed bearing analysis methods and having cloud-based, machine pattern analysis of state information from multiple analog industrial sensors to provide anticipated state information for an industrial system. In embodiments, a data collection and processing system is provided having proposed bearing analysis methods and having cloud-based policy automation engine for IoT, with creation, deployment, and management of IoT devices. In embodiments, a data collection and processing system is provided having proposed bearing analysis methods and having on-device sensor fusion and data storage for industrial IoT devices. In embodiments, a data collection and processing system is provided having proposed bearing analysis methods and having a self-organizing data marketplace for industrial IoT data. In embodiments, a data collection and processing system is provided having proposed bearing analysis methods and having self-organization of data pools based on utilization and/or yield metrics. In embodiments, a data collection and processing system is provided having proposed bearing analysis methods and having training AI models based on industry-specific feedback. In embodiments, a data collection and processing system is provided having proposed bearing analysis methods and having a self-organized swarm of industrial data collectors. In embodiments, a data collection and processing system is provided having proposed bearing analysis methods and having an IoT distributed ledger. In embodiments, a data collection and processing system is provided having proposed bearing analysis methods and having a self-organizing collector. In embodiments, a data collection and processing system is provided having proposed bearing analysis methods and having a network-sensitive collector. In embodiments, a data collection and processing system is provided having proposed bearing analysis methods and having a remotely organized collector. In embodiments, a data collection and processing system is provided having proposed bearing analysis methods and having a self-organizing storage for a multi-sensor data collector. In embodiments, a data collection and processing system is provided having proposed bearing analysis methods and having a self-organizing network coding for multi-sensor data network. In embodiments, a data collection and processing system is provided having proposed bearing analysis methods and having a wearable haptic user interface for an industrial sensor data collector, with vibration, heat, electrical and/or sound outputs. In embodiments, a data collection and processing system is provided having proposed bearing analysis methods and having heat maps displaying collected data for AR/VR. In embodiments, a data collection and processing system is provided having proposed bearing analysis methods and having automatically tuned AR/VR visualization of data collected by a data collector.

In embodiments, a data collection and processing system is provided having torsional vibration detection/analysis utilizing transitory signal analysis. In embodiments, a data collection and processing system is provided having torsional vibration detection/analysis utilizing transitory signal analysis and having improved integration using both analog and digital methods. In embodiments, a data collection and processing system is provided having torsional vibration detection/analysis utilizing transitory signal analysis and having adaptive scheduling techniques for continuous monitoring of analog data in a local environment. In embodiments, a data collection and processing system is provided having torsional vibration detection/analysis utilizing transitory signal analysis and having data acquisition parking features. In embodiments, a data collection and processing system is provided having torsional vibration detection/analysis utilizing transitory signal analysis and having a self-sufficient data acquisition box. In embodiments, a data collection and processing system is provided having torsional vibration detection/analysis utilizing transitory signal analysis and having SD card storage. In embodiments, a data collection and processing system is provided having torsional vibration detection/analysis utilizing transitory signal analysis and having extended onboard statistical capabilities for continuous monitoring. In embodiments, a data collection and processing system is provided having torsional vibration detection/analysis utilizing transitory signal analysis and having the use of ambient, local and vibration noise for prediction. In embodiments, a data collection and processing system is provided having torsional vibration detection/analysis utilizing transitory signal analysis and having smart route changes route based on incoming data or alarms to enable simultaneous dynamic data for analysis or correlation. In embodiments, a data collection and processing system is provided having torsional vibration detection/analysis utilizing transitory signal analysis and having smart ODS and transfer functions. In embodiments, a data collection and processing system is provided having torsional vibration detection/analysis utilizing transitory signal analysis and having a hierarchical multiplexer. In embodiments, a data collection and processing system is provided having torsional vibration detection/analysis utilizing transitory signal analysis and having identification of sensor overload. In embodiments, a data collection and processing system is provided having torsional vibration detection/analysis utilizing transitory signal analysis and having RF identification and an inclinometer. In embodiments, a data collection and processing system is provided having torsional vibration detection/analysis utilizing transitory signal analysis and having continuous ultrasonic monitoring. In embodiments, a data collection and processing system is provided having torsional vibration detection/analysis utilizing transitory signal analysis and having cloud-based, machine pattern recognition based on fusion of remote, analog industrial sensors. In embodiments, a data collection and processing system is provided having torsional vibration detection/analysis utilizing transitory signal analysis and having cloud-based, machine pattern analysis of state information from multiple analog industrial sensors to provide anticipated state information for an industrial system. In embodiments, a data collection and processing system is provided having torsional vibration detection/analysis utilizing transitory signal analysis and having cloud-based policy automation engine for IoT, with creation, deployment, and management of IoT devices. In embodiments, a data collection and processing system is provided having torsional vibration detection/analysis utilizing transitory signal analysis and having on-device sensor fusion and data storage for industrial IoT devices. In embodiments, a data collection and processing system is provided having torsional vibration detection/analysis utilizing transitory signal analysis and having a self-organizing data marketplace for industrial IoT data. In embodiments, a data collection and processing system is provided having torsional vibration detection/analysis utilizing transitory signal analysis and having self-organization of data pools based on utilization and/or yield metrics. In embodiments, a data collection and processing system is provided having torsional vibration detection/analysis utilizing transitory signal analysis and having training AI models based on industry-specific feedback. In embodiments, a data collection and processing system is provided having torsional vibration detection/analysis utilizing transitory signal analysis and having a self-organized swarm of industrial data collectors. In embodiments, a data collection and processing system is provided having torsional vibration detection/analysis utilizing transitory signal analysis and having an IoT distributed ledger. In embodiments, a data collection and processing system is provided having torsional vibration detection/analysis utilizing transitory signal analysis and having a self-organizing collector. In embodiments, a data collection and processing system is provided having torsional vibration detection/analysis utilizing transitory signal analysis and having a network-sensitive collector. In embodiments, a data collection and processing system is provided having torsional vibration detection/analysis utilizing transitory signal analysis and having a remotely organized collector. In embodiments, a data collection and processing system is provided having torsional vibration detection/analysis utilizing transitory signal analysis and having a self-organizing storage for a multi-sensor data collector. In embodiments, a data collection and processing system is provided having torsional vibration detection/analysis utilizing transitory signal analysis and having a self-organizing network coding for multi-sensor data network. In embodiments, a data collection and processing system is provided having torsional vibration detection/analysis utilizing transitory signal analysis and having a wearable haptic user interface for an industrial sensor data collector, with vibration, heat, electrical and/or sound outputs. In embodiments, a data collection and processing system is provided having torsional vibration detection/analysis utilizing transitory signal analysis and having heat maps displaying collected data for AR/VR. In embodiments, a data collection and processing system is provided having torsional vibration detection/analysis utilizing transitory signal analysis and having automatically tuned AR/VR visualization of data collected by a data collector.

In embodiments, a data collection and processing system is provided having improved integration using both analog and digital methods. In embodiments, a data collection and processing system is provided having improved integration using both analog and digital methods and having adaptive scheduling techniques for continuous monitoring of analog data in a local environment. In embodiments, a data collection and processing system is provided having improved integration using both analog and digital methods and having data acquisition parking features. In embodiments, a data collection and processing system is provided having improved integration using both analog and digital methods and having a self-sufficient data acquisition box. In embodiments, a data collection and processing system is provided having improved integration using both analog and digital methods and having SD card storage. In embodiments, a data collection and processing system is provided having improved integration using both analog and digital methods and having extended onboard statistical capabilities for continuous monitoring. In embodiments, a data collection and processing system is provided having improved integration using both analog and digital methods and having the use of ambient, local and vibration noise for prediction. In embodiments, a data collection and processing system is provided having improved integration using both analog and digital methods and having smart route changes route based on incoming data or alarms to enable simultaneous dynamic data for analysis or correlation. In embodiments, a data collection and processing system is provided having improved integration using both analog and digital methods and having smart ODS and transfer functions. In embodiments, a data collection and processing system is provided having improved integration using both analog and digital methods and having a hierarchical multiplexer. In embodiments, a data collection and processing system is provided having improved integration using both analog and digital methods and having identification of sensor overload. In embodiments, a data collection and processing system is provided having improved integration using both analog and digital methods and having RF identification and an inclinometer. In embodiments, a data collection and processing system is provided having improved integration using both analog and digital methods and having continuous ultrasonic monitoring. In embodiments, a data collection and processing system is provided having improved integration using both analog and digital methods and having cloud-based, machine pattern recognition based on fusion of remote, analog industrial sensors. In embodiments, a data collection and processing system is provided having improved integration using both analog and digital methods and having cloud-based, machine pattern analysis of state information from multiple analog industrial sensors to provide anticipated state information for an industrial system. In embodiments, a data collection and processing system is provided having improved integration using both analog and digital methods and having cloud-based policy automation engine for IoT, with creation, deployment, and management of IoT devices. In embodiments, a data collection and processing system is provided having improved integration using both analog and digital methods and having on-device sensor fusion and data storage for industrial IoT devices. In embodiments, a data collection and processing system is provided having improved integration using both analog and digital methods and having a self-organizing data marketplace for industrial IoT data. In embodiments, a data collection and processing system is provided having improved integration using both analog and digital methods and having self-organization of data pools based on utilization and/or yield metrics. In embodiments, a data collection and processing system is provided having improved integration using both analog and digital methods and having training AI models based on industry-specific feedback. In embodiments, a data collection and processing system is provided having improved integration using both analog and digital methods and having a self-organized swarm of industrial data collectors. In embodiments, a data collection and processing system is provided having improved integration using both analog and digital methods and having an IoT distributed ledger. In embodiments, a data collection and processing system is provided having improved integration using both analog and digital methods and having a self-organizing collector. In embodiments, a data collection and processing system is provided having improved integration using both analog and digital methods and having a network-sensitive collector. In embodiments, a data collection and processing system is provided having improved integration using both analog and digital methods and having a remotely organized collector. In embodiments, a data collection and processing system is provided having improved integration using both analog and digital methods and having a self-organizing storage for a multi-sensor data collector. In embodiments, a data collection and processing system is provided having improved integration using both analog and digital methods and having a self-organizing network coding for multi-sensor data network. In embodiments, a data collection and processing system is provided having improved integration using both analog and digital methods and having a wearable haptic user interface for an industrial sensor data collector, with vibration, heat, electrical and/or sound outputs. In embodiments, a data collection and processing system is provided having improved integration using both analog and digital methods and having heat maps displaying collected data for AR/VR. In embodiments, a data collection and processing system is provided having improved integration using both analog and digital methods and having automatically tuned AR/VR visualization of data collected by a data collector.

In embodiments, a data collection and processing system is provided having adaptive scheduling techniques for continuous monitoring of analog data in a local environment. In embodiments, a data collection and processing system is provided having adaptive scheduling techniques for continuous monitoring of analog data in a local environment and having data acquisition parking features. In embodiments, a data collection and processing system is provided having adaptive scheduling techniques for continuous monitoring of analog data in a local environment and having a self-sufficient data acquisition box. In embodiments, a data collection and processing system is provided having adaptive scheduling techniques for continuous monitoring of analog data in a local environment and having SD card storage. In embodiments, a data collection and processing system is provided having adaptive scheduling techniques for continuous monitoring of analog data in a local environment and having extended onboard statistical capabilities for continuous monitoring. In embodiments, a data collection and processing system is provided having adaptive scheduling techniques for continuous monitoring of analog data in a local environment and having the use of ambient, local and vibration noise for prediction. In embodiments, a data collection and processing system is provided having adaptive scheduling techniques for continuous monitoring of analog data in a local environment and having smart route changes route based on incoming data or alarms to enable simultaneous dynamic data for analysis or correlation. In embodiments, a data collection and processing system is provided having adaptive scheduling techniques for continuous monitoring of analog data in a local environment and having smart ODS and transfer functions. In embodiments, a data collection and processing system is provided having adaptive scheduling techniques for continuous monitoring of analog data in a local environment and having a hierarchical multiplexer. In embodiments, a data collection and processing system is provided having adaptive scheduling techniques for continuous monitoring of analog data in a local environment and having identification of sensor overload. In embodiments, a data collection and processing system is provided having adaptive scheduling techniques for continuous monitoring of analog data in a local environment and having RF identification and an inclinometer. In embodiments, a data collection and processing system is provided having adaptive scheduling techniques for continuous monitoring of analog data in a local environment and having continuous ultrasonic monitoring. In embodiments, a data collection and processing system is provided having adaptive scheduling techniques for continuous monitoring of analog data in a local environment and having cloud-based, machine pattern recognition based on fusion of remote, analog industrial sensors. In embodiments, a data collection and processing system is provided having adaptive scheduling techniques for continuous monitoring of analog data in a local environment and having cloud-based, machine pattern analysis of state information from multiple analog industrial sensors to provide anticipated state information for an industrial system. In embodiments, a data collection and processing system is provided having adaptive scheduling techniques for continuous monitoring of analog data in a local environment and having cloud-based policy automation engine for IoT, with creation, deployment, and management of IoT devices. In embodiments, a data collection and processing system is provided having adaptive scheduling techniques for continuous monitoring of analog data in a local environment and having on-device sensor fusion and data storage for industrial IoT devices. In embodiments, a data collection and processing system is provided having adaptive scheduling techniques for continuous monitoring of analog data in a local environment and having a self-organizing data marketplace for industrial IoT data. In embodiments, a data collection and processing system is provided having adaptive scheduling techniques for continuous monitoring of analog data in a local environment and having self-organization of data pools based on utilization and/or yield metrics. In embodiments, a data collection and processing system is provided having adaptive scheduling techniques for continuous monitoring of analog data in a local environment and having training AI models based on industry-specific feedback. In embodiments, a data collection and processing system is provided having adaptive scheduling techniques for continuous monitoring of analog data in a local environment and having a self-organized swarm of industrial data collectors. In embodiments, a data collection and processing system is provided having adaptive scheduling techniques for continuous monitoring of analog data in a local environment and having an IoT distributed ledger. In embodiments, a data collection and processing system is provided having adaptive scheduling techniques for continuous monitoring of analog data in a local environment and having a self-organizing collector. In embodiments, a data collection and processing system is provided having adaptive scheduling techniques for continuous monitoring of analog data in a local environment and having a network-sensitive collector. In embodiments, a data collection and processing system is provided having adaptive scheduling techniques for continuous monitoring of analog data in a local environment and having a remotely organized collector. In embodiments, a data collection and processing system is provided having adaptive scheduling techniques for continuous monitoring of analog data in a local environment and having a self-organizing storage for a multi-sensor data collector. In embodiments, a data collection and processing system is provided having adaptive scheduling techniques for continuous monitoring of analog data in a local environment and having a self-organizing network coding for multi-sensor data network. In embodiments, a data collection and processing system is provided having adaptive scheduling techniques for continuous monitoring of analog data in a local environment and having a wearable haptic user interface for an industrial sensor data collector, with vibration, heat, electrical and/or sound outputs. In embodiments, a data collection and processing system is provided having adaptive scheduling techniques for continuous monitoring of analog data in a local environment and having heat maps displaying collected data for AR/VR. In embodiments, a data collection and processing system is provided having adaptive scheduling techniques for continuous monitoring of analog data in a local environment and having automatically tuned AR/VR visualization of data collected by a data collector.

In embodiments, a data collection and processing system is provided having data acquisition parking features. In embodiments, a data collection and processing system is provided having data acquisition parking features and having a self-sufficient data acquisition box. In embodiments, a data collection and processing system is provided having data acquisition parking features and having SD card storage. In embodiments, a data collection and processing system is provided having data acquisition parking features and having extended onboard statistical capabilities for continuous monitoring. In embodiments, a data collection and processing system is provided having data acquisition parking features and having the use of ambient, local and vibration noise for prediction. In embodiments, a data collection and processing system is provided having data acquisition parking features and having smart route changes route based on incoming data or alarms to enable simultaneous dynamic data for analysis or correlation. In embodiments, a data collection and processing system is provided having data acquisition parking features and having smart ODS and transfer functions. In embodiments, a data collection and processing system is provided having data acquisition parking features and having a hierarchical multiplexer. In embodiments, a data collection and processing system is provided having data acquisition parking features and having identification of sensor overload. In embodiments, a data collection and processing system is provided having data acquisition parking features and having RF identification and an inclinometer. In embodiments, a data collection and processing system is provided having data acquisition parking features and having continuous ultrasonic monitoring. In embodiments, a data collection and processing system is provided having data acquisition parking features and having cloud-based, machine pattern recognition based on fusion of remote, analog industrial sensors. In embodiments, a data collection and processing system is provided having data acquisition parking features and having cloud-based, machine pattern analysis of state information from multiple analog industrial sensors to provide anticipated state information for an industrial system. In embodiments, a data collection and processing system is provided having data acquisition parking features and having cloud-based policy automation engine for IoT, with creation, deployment, and management of IoT devices. In embodiments, a data collection and processing system is provided having data acquisition parking features and having on-device sensor fusion and data storage for industrial IoT devices. In embodiments, a data collection and processing system is provided having data acquisition parking features and having a self-organizing data marketplace for industrial IoT data. In embodiments, a data collection and processing system is provided having data acquisition parking features and having self-organization of data pools based on utilization and/or yield metrics. In embodiments, a data collection and processing system is provided having data acquisition parking features and having training AI models based on industry-specific feedback. In embodiments, a data collection and processing system is provided having data acquisition parking features and having a self-organized swarm of industrial data collectors. In embodiments, a data collection and processing system is provided having data acquisition parking features and having an IoT distributed ledger. In embodiments, a data collection and processing system is provided having data acquisition parking features and having a self-organizing collector. In embodiments, a data collection and processing system is provided having data acquisition parking features and having a network-sensitive collector. In embodiments, a data collection and processing system is provided having data acquisition parking features and having a remotely organized collector. In embodiments, a data collection and processing system is provided having data acquisition parking features and having a self-organizing storage for a multi-sensor data collector. In embodiments, a data collection and processing system is provided having data acquisition parking features and having a self-organizing network coding for multi-sensor data network. In embodiments, a data collection and processing system is provided having data acquisition parking features and having a wearable haptic user interface for an industrial sensor data collector, with vibration, heat, electrical and/or sound outputs. In embodiments, a data collection and processing system is provided having data acquisition parking features and having heat maps displaying collected data for AR/VR. In embodiments, a data collection and processing system is provided having data acquisition parking features and having automatically tuned AR/VR visualization of data collected by a data collector.

In embodiments, a data collection and processing system is provided having a self-sufficient data acquisition box. In embodiments, a data collection and processing system is provided having a self-sufficient data acquisition box and having SD card storage. In embodiments, a data collection and processing system is provided having a self-sufficient data acquisition box and having extended onboard statistical capabilities for continuous monitoring. In embodiments, a data collection and processing system is provided having a self-sufficient data acquisition box and having the use of ambient, local and vibration noise for prediction. In embodiments, a data collection and processing system is provided having a self-sufficient data acquisition box and having smart route changes route based on incoming data or alarms to enable simultaneous dynamic data for analysis or correlation. In embodiments, a data collection and processing system is provided having a self-sufficient data acquisition box and having smart ODS and transfer functions. In embodiments, a data collection and processing system is provided having a self-sufficient data acquisition box and having a hierarchical multiplexer. In embodiments, a data collection and processing system is provided having a self-sufficient data acquisition box and having identification of sensor overload. In embodiments, a data collection and processing system is provided having a self-sufficient data acquisition box and having RF identification and an inclinometer. In embodiments, a data collection and processing system is provided having a self-sufficient data acquisition box and having continuous ultrasonic monitoring. In embodiments, a data collection and processing system is provided having a self-sufficient data acquisition box and having cloud-based, machine pattern recognition based on fusion of remote, analog industrial sensors. In embodiments, a data collection and processing system is provided having a self-sufficient data acquisition box and having cloud-based, machine pattern analysis of state information from multiple analog industrial sensors to provide anticipated state information for an industrial system. In embodiments, a data collection and processing system is provided having a self-sufficient data acquisition box and having cloud-based policy automation engine for IoT, with creation, deployment, and management of IoT devices. In embodiments, a data collection and processing system is provided having a self-sufficient data acquisition box and having on-device sensor fusion and data storage for industrial IoT devices. In embodiments, a data collection and processing system is provided having a self-sufficient data acquisition box and having a self-organizing data marketplace for industrial IoT data. In embodiments, a data collection and processing system is provided having a self-sufficient data acquisition box and having self-organization of data pools based on utilization and/or yield metrics. In embodiments, a data collection and processing system is provided having a self-sufficient data acquisition box and having training AI models based on industry-specific feedback. In embodiments, a data collection and processing system is provided having a self-sufficient data acquisition box and having a self-organized swarm of industrial data collectors. In embodiments, a data collection and processing system is provided having a self-sufficient data acquisition box and having an IoT distributed ledger. In embodiments, a data collection and processing system is provided having a self-sufficient data acquisition box and having a self-organizing collector. In embodiments, a data collection and processing system is provided having a self-sufficient data acquisition box and having a network-sensitive collector. In embodiments, a data collection and processing system is provided having a self-sufficient data acquisition box and having a remotely organized collector. In embodiments, a data collection and processing system is provided having a self-sufficient data acquisition box and having a self-organizing storage for a multi-sensor data collector. In embodiments, a data collection and processing system is provided having a self-sufficient data acquisition box and having a self-organizing network coding for multi-sensor data network. In embodiments, a data collection and processing system is provided having a self-sufficient data acquisition box and having a wearable haptic user interface for an industrial sensor data collector, with vibration, heat, electrical, and/or sound outputs. In embodiments, a data collection and processing system is provided having a self-sufficient data acquisition box and having heat maps displaying collected data for AR/VR. In embodiments, a data collection and processing system is provided having a self-sufficient data acquisition box and having automatically tuned AR/VR visualization of data collected by a data collector.

In embodiments, a data collection and processing system is provided having SD card storage. In embodiments, a data collection and processing system is provided having SD card storage and having extended onboard statistical capabilities for continuous monitoring. In embodiments, a data collection and processing system is provided having SD card storage and having the use of ambient, local and vibration noise for prediction. In embodiments, a data collection and processing system is provided having SD card storage and having smart route changes route based on incoming data or alarms to enable simultaneous dynamic data for analysis or correlation. In embodiments, a data collection and processing system is provided having SD card storage and having smart ODS and transfer functions. In embodiments, a data collection and processing system is provided having SD card storage and having a hierarchical multiplexer. In embodiments, a data collection and processing system is provided having SD card storage and having identification of sensor overload. In embodiments, a data collection and processing system is provided having SD card storage and having RF identification and an inclinometer. In embodiments, a data collection and processing system is provided having SD card storage and having continuous ultrasonic monitoring. In embodiments, a data collection and processing system is provided having SD card storage and having cloud-based, machine pattern recognition based on fusion of remote, analog industrial sensors. In embodiments, a data collection and processing system is provided having SD card storage and having cloud-based, machine pattern analysis of state information from multiple analog industrial sensors to provide anticipated state information for an industrial system. In embodiments, a data collection and processing system is provided having SD card storage and having cloud-based policy automation engine for IoT, with creation, deployment, and management of IoT devices. In embodiments, a data collection and processing system is provided having SD card storage and having on-device sensor fusion and data storage for industrial IoT devices. In embodiments, a data collection and processing system is provided having SD card storage and having a self-organizing data marketplace for industrial IoT data. In embodiments, a data collection and processing system is provided having SD card storage and having self-organization of data pools based on utilization and/or yield metrics. In embodiments, a data collection and processing system is provided having SD card storage and having training AI models based on industry-specific feedback. In embodiments, a data collection and processing system is provided having SD card storage and having a self-organized swarm of industrial data collectors. In embodiments, a data collection and processing system is provided having SD card storage and having an IoT distributed ledger. In embodiments, a data collection and processing system is provided having SD card storage and having a self-organizing collector. In embodiments, a data collection and processing system is provided having SD card storage and having a network-sensitive collector. In embodiments, a data collection and processing system is provided having SD card storage and having a remotely organized collector. In embodiments, a data collection and processing system is provided having SD card storage and having a self-organizing storage for a multi-sensor data collector. In embodiments, a data collection and processing system is provided having SD card storage and having a self-organizing network coding for multi-sensor data network. In embodiments, a data collection and processing system is provided having SD card storage and having a wearable haptic user interface for an industrial sensor data collector, with vibration, heat, electrical, and/or sound outputs. In embodiments, a data collection and processing system is provided having SD card storage and having heat maps displaying collected data for AR/VR. In embodiments, a data collection and processing system is provided having SD card storage and having automatically tuned AR/VR visualization of data collected by a data collector.

In embodiments, a data collection and processing system is provided having extended onboard statistical capabilities for continuous monitoring. In embodiments, a data collection and processing system is provided having extended onboard statistical capabilities for continuous monitoring and having the use of ambient, local and vibration noise for prediction. In embodiments, a data collection and processing system is provided having extended onboard statistical capabilities for continuous monitoring and having smart route changes route based on incoming data or alarms to enable simultaneous dynamic data for analysis or correlation. In embodiments, a data collection and processing system is provided having extended onboard statistical capabilities for continuous monitoring and having smart ODS and transfer functions. In embodiments, a data collection and processing system is provided having extended onboard statistical capabilities for continuous monitoring and having a hierarchical multiplexer. In embodiments, a data collection and processing system is provided having extended onboard statistical capabilities for continuous monitoring and having identification of sensor overload. In embodiments, a data collection and processing system is provided having extended onboard statistical capabilities for continuous monitoring and having RF identification and an inclinometer. In embodiments, a data collection and processing system is provided having extended onboard statistical capabilities for continuous monitoring and having continuous ultrasonic monitoring. In embodiments, a data collection and processing system is provided having extended onboard statistical capabilities for continuous monitoring and having cloud-based, machine pattern recognition based on fusion of remote, analog industrial sensors. In embodiments, a data collection and processing system is provided having extended onboard statistical capabilities for continuous monitoring and having cloud-based, machine pattern analysis of state information from multiple analog industrial sensors to provide anticipated state information for an industrial system. In embodiments, a data collection and processing system is provided having extended onboard statistical capabilities for continuous monitoring and having cloud-based policy automation engine for IoT, with creation, deployment, and management of IoT devices. In embodiments, a data collection and processing system is provided having extended onboard statistical capabilities for continuous monitoring and having on-device sensor fusion and data storage for industrial IoT devices. In embodiments, a data collection and processing system is provided having extended onboard statistical capabilities for continuous monitoring and having a self-organizing data marketplace for industrial IoT data. In embodiments, a data collection and processing system is provided having extended onboard statistical capabilities for continuous monitoring and having self-organization of data pools based on utilization and/or yield metrics. In embodiments, a data collection and processing system is provided having extended onboard statistical capabilities for continuous monitoring and having training AI models based on industry-specific feedback. In embodiments, a data collection and processing system is provided having extended onboard statistical capabilities for continuous monitoring and having a self-organized swarm of industrial data collectors. In embodiments, a data collection and processing system is provided having extended onboard statistical capabilities for continuous monitoring and having an IoT distributed ledger. In embodiments, a data collection and processing system is provided having extended onboard statistical capabilities for continuous monitoring and having a self-organizing collector. In embodiments, a data collection and processing system is provided having extended onboard statistical capabilities for continuous monitoring and having a network-sensitive collector. In embodiments, a data collection and processing system is provided having extended onboard statistical capabilities for continuous monitoring and having a remotely organized collector. In embodiments, a data collection and processing system is provided having extended onboard statistical capabilities for continuous monitoring and having a self-organizing storage for a multi-sensor data collector. In embodiments, a data collection and processing system is provided having extended onboard statistical capabilities for continuous monitoring and having a self-organizing network coding for multi-sensor data network. In embodiments, a data collection and processing system is provided having extended onboard statistical capabilities for continuous monitoring and having a wearable haptic user interface for an industrial sensor data collector, with vibration, heat, electrical and/or sound outputs. In embodiments, a data collection and processing system is provided having extended onboard statistical capabilities for continuous monitoring and having heat maps displaying collected data for AR/VR. In embodiments, a data collection and processing system is provided having extended onboard statistical capabilities for continuous monitoring and having automatically tuned AR/VR visualization of data collected by a data collector.

In embodiments, a data collection and processing system is provided having the use of ambient, local and vibration noise for prediction. In embodiments, a data collection and processing system is provided having the use of ambient, local and vibration noise for prediction and having smart route changes route based on incoming data or alarms to enable simultaneous dynamic data for analysis or correlation. In embodiments, a data collection and processing system is provided having the use of ambient, local and vibration noise for prediction and having smart ODS and transfer functions. In embodiments, a data collection and processing system is provided having the use of ambient, local and vibration noise for prediction and having a hierarchical multiplexer. In embodiments, a data collection and processing system is provided having the use of ambient, local and vibration noise for prediction and having identification of sensor overload. In embodiments, a data collection and processing system is provided having the use of ambient, local and vibration noise for prediction and having RF identification and an inclinometer. In embodiments, a data collection and processing system is provided having the use of ambient, local and vibration noise for prediction and having continuous ultrasonic monitoring. In embodiments, a data collection and processing system is provided having the use of ambient, local and vibration noise for prediction and having cloud-based, machine pattern recognition based on fusion of remote, analog industrial sensors. In embodiments, a data collection and processing system is provided having the use of ambient, local and vibration noise for prediction and having cloud-based, machine pattern analysis of state information from multiple analog industrial sensors to provide anticipated state information for an industrial system. In embodiments, a data collection and processing system is provided having the use of ambient, local and vibration noise for prediction and having cloud-based policy automation engine for IoT, with creation, deployment, and management of IoT devices. In embodiments, a data collection and processing system is provided having the use of ambient, local and vibration noise for prediction and having on-device sensor fusion and data storage for industrial IoT devices. In embodiments, a data collection and processing system is provided having the use of ambient, local and vibration noise for prediction and having a self-organizing data marketplace for industrial IoT data. In embodiments, a data collection and processing system is provided having the use of ambient, local and vibration noise for prediction and having self-organization of data pools based on utilization and/or yield metrics. In embodiments, a data collection and processing system is provided having the use of ambient, local and vibration noise for prediction and having training AI models based on industry-specific feedback. In embodiments, a data collection and processing system is provided having the use of ambient, local and vibration noise for prediction and having a self-organized swarm of industrial data collectors. In embodiments, a data collection and processing system is provided having the use of ambient, local and vibration noise for prediction and having an IoT distributed ledger. In embodiments, a data collection and processing system is provided having the use of ambient, local and vibration noise for prediction and having a self-organizing collector. In embodiments, a data collection and processing system is provided having the use of ambient, local and vibration noise for prediction and having a network-sensitive collector. In embodiments, a data collection and processing system is provided having the use of ambient, local and vibration noise for prediction and having a remotely organized collector. In embodiments, a data collection and processing system is provided having the use of ambient, local and vibration noise for prediction and having a self-organizing storage for a multi-sensor data collector. In embodiments, a data collection and processing system is provided having the use of ambient, local and vibration noise for prediction and having a self-organizing network coding for multi-sensor data network. In embodiments, a data collection and processing system is provided having the use of ambient, local and vibration noise for prediction and having a wearable haptic user interface for an industrial sensor data collector, with vibration, heat, electrical and/or sound outputs. In embodiments, a data collection and processing system is provided having the use of ambient, local and vibration noise for prediction and having heat maps displaying collected data for AR/VR. In embodiments, a data collection and processing system is provided having the use of ambient, local and vibration noise for prediction and having automatically tuned AR/VR visualization of data collected by a data collector.

In embodiments, a data collection and processing system is provided having smart route changes route based on incoming data or alarms to enable simultaneous dynamic data for analysis or correlation. In embodiments, a data collection and processing system is provided having smart route changes route based on incoming data or alarms to enable simultaneous dynamic data for analysis or correlation and having smart ODS and transfer functions. In embodiments, a data collection and processing system is provided having smart route changes route based on incoming data or alarms to enable simultaneous dynamic data for analysis or correlation and having a hierarchical multiplexer. In embodiments, a data collection and processing system is provided having smart route changes route based on incoming data or alarms to enable simultaneous dynamic data for analysis or correlation and having identification of sensor overload. In embodiments, a data collection and processing system is provided having smart route changes route based on incoming data or alarms to enable simultaneous dynamic data for analysis or correlation and having RF identification and an inclinometer. In embodiments, a data collection and processing system is provided having smart route changes route based on incoming data or alarms to enable simultaneous dynamic data for analysis or correlation and having continuous ultrasonic monitoring. In embodiments, a data collection and processing system is provided having smart route changes route based on incoming data or alarms to enable simultaneous dynamic data for analysis or correlation and having cloud-based, machine pattern recognition based on fusion of remote, analog industrial sensors. In embodiments, a data collection and processing system is provided having smart route changes route based on incoming data or alarms to enable simultaneous dynamic data for analysis or correlation and having cloud-based, machine pattern analysis of state information from multiple analog industrial sensors to provide anticipated state information for an industrial system. In embodiments, a data collection and processing system is provided having smart route changes route based on incoming data or alarms to enable simultaneous dynamic data for analysis or correlation and having cloud-based policy automation engine for IoT, with creation, deployment, and management of IoT devices. In embodiments, a data collection and processing system is provided having smart route changes route based on incoming data or alarms to enable simultaneous dynamic data for analysis or correlation and having on-device sensor fusion and data storage for industrial IoT devices. In embodiments, a data collection and processing system is provided having smart route changes route based on incoming data or alarms to enable simultaneous dynamic data for analysis or correlation and having a self-organizing data marketplace for industrial IoT data. In embodiments, a data collection and processing system is provided having smart route changes route based on incoming data or alarms to enable simultaneous dynamic data for analysis or correlation and having self-organization of data pools based on utilization and/or yield metrics. In embodiments, a data collection and processing system is provided having smart route changes route based on incoming data or alarms to enable simultaneous dynamic data for analysis or correlation and having training AI models based on industry-specific feedback. In embodiments, a data collection and processing system is provided having smart route changes route based on incoming data or alarms to enable simultaneous dynamic data for analysis or correlation and having a self-organized swarm of industrial data collectors. In embodiments, a data collection and processing system is provided having smart route changes route based on incoming data or alarms to enable simultaneous dynamic data for analysis or correlation and having an IoT distributed ledger. In embodiments, a data collection and processing system is provided having smart route changes route based on incoming data or alarms to enable simultaneous dynamic data for analysis or correlation and having a self-organizing collector. In embodiments, a data collection and processing system is provided having smart route changes route based on incoming data or alarms to enable simultaneous dynamic data for analysis or correlation and having a network-sensitive collector. In embodiments, a data collection and processing system is provided having smart route changes route based on incoming data or alarms to enable simultaneous dynamic data for analysis or correlation and having a remotely organized collector. In embodiments, a data collection and processing system is provided having smart route changes route based on incoming data or alarms to enable simultaneous dynamic data for analysis or correlation and having a self-organizing storage for a multi-sensor data collector. In embodiments, a data collection and processing system is provided having smart route changes route based on incoming data or alarms to enable simultaneous dynamic data for analysis or correlation and having a self-organizing network coding for multi-sensor data network. In embodiments, a data collection and processing system is provided having smart route changes route based on incoming data or alarms to enable simultaneous dynamic data for analysis or correlation and having a wearable haptic user interface for an industrial sensor data collector, with vibration, heat, electrical and/or sound outputs. In embodiments, a data collection and processing system is provided having smart route changes route based on incoming data or alarms to enable simultaneous dynamic data for analysis or correlation and having heat maps displaying collected data for AR/VR. In embodiments, a data collection and processing system is provided having smart route changes route based on incoming data or alarms to enable simultaneous dynamic data for analysis or correlation and having automatically tuned AR/VR visualization of data collected by a data collector.

In embodiments, a data collection and processing system is provided having smart ODS and transfer functions. In embodiments, a data collection and processing system is provided having smart ODS and transfer functions and having a hierarchical multiplexer. In embodiments, a data collection and processing system is provided having smart ODS and transfer functions and having identification of sensor overload. In embodiments, a data collection and processing system is provided having smart ODS and transfer functions and having RF identification and an inclinometer. In embodiments, a data collection and processing system is provided having smart ODS and transfer functions and having continuous ultrasonic monitoring. In embodiments, a data collection and processing system is provided having smart ODS and transfer functions and having cloud-based, machine pattern recognition based on fusion of remote, analog industrial sensors. In embodiments, a data collection and processing system is provided having smart ODS and transfer functions and having cloud-based, machine pattern analysis of state information from multiple analog industrial sensors to provide anticipated state information for an industrial system. In embodiments, a data collection and processing system is provided having smart ODS and transfer functions and having cloud-based policy automation engine for IoT, with creation, deployment, and management of IoT devices. In embodiments, a data collection and processing system is provided having smart ODS and transfer functions and having on-device sensor fusion and data storage for industrial IoT devices. In embodiments, a data collection and processing system is provided having smart ODS and transfer functions and having a self-organizing data marketplace for industrial IoT data. In embodiments, a data collection and processing system is provided having smart ODS and transfer functions and having self-organization of data pools based on utilization and/or yield metrics. In embodiments, a data collection and processing system is provided having smart ODS and transfer functions and having training AI models based on industry-specific feedback. In embodiments, a data collection and processing system is provided having smart ODS and transfer functions and having a self-organized swarm of industrial data collectors. In embodiments, a data collection and processing system is provided having smart ODS and transfer functions and having an IoT distributed ledger. In embodiments, a data collection and processing system is provided having smart ODS and transfer functions and having a self-organizing collector. In embodiments, a data collection and processing system is provided having smart ODS and transfer functions and having a network-sensitive collector. In embodiments, a data collection and processing system is provided having smart ODS and transfer functions and having a remotely organized collector. In embodiments, a data collection and processing system is provided having smart ODS and transfer functions and having a self-organizing storage for a multi-sensor data collector. In embodiments, a data collection and processing system is provided having smart ODS and transfer functions and having a self-organizing network coding for multi-sensor data network. In embodiments, a data collection and processing system is provided having smart ODS and transfer functions and having a wearable haptic user interface for an industrial sensor data collector, with vibration, heat, electrical and/or sound outputs. In embodiments, a data collection and processing system is provided having smart ODS and transfer functions and having heat maps displaying collected data for AR/VR. In embodiments, a data collection and processing system is provided having smart ODS and transfer functions and having automatically tuned AR/VR visualization of data collected by a data collector.

In embodiments, a data collection and processing system is provided having a hierarchical multiplexer. In embodiments, a data collection and processing system is provided having a hierarchical multiplexer and having identification of sensor overload. In embodiments, a data collection and processing system is provided having a hierarchical multiplexer and having RF identification and an inclinometer. In embodiments, a data collection and processing system is provided having a hierarchical multiplexer and having continuous ultrasonic monitoring. In embodiments, a data collection and processing system is provided having a hierarchical multiplexer and having cloud-based, machine pattern recognition based on fusion of remote, analog industrial sensors. In embodiments, a data collection and processing system is provided having a hierarchical multiplexer and having cloud-based, machine pattern analysis of state information from multiple analog industrial sensors to provide anticipated state information for an industrial system. In embodiments, a data collection and processing system is provided having a hierarchical multiplexer and having cloud-based policy automation engine for IoT, with creation, deployment, and management of IoT devices. In embodiments, a data collection and processing system is provided having a hierarchical multiplexer and having on-device sensor fusion and data storage for industrial IoT devices. In embodiments, a data collection and processing system is provided having a hierarchical multiplexer and having a self-organizing data marketplace for industrial IoT data. In embodiments, a data collection and processing system is provided having a hierarchical multiplexer and having self-organization of data pools based on utilization and/or yield metrics. In embodiments, a data collection and processing system is provided having a hierarchical multiplexer and having training AI models based on industry-specific feedback. In embodiments, a data collection and processing system is provided having a hierarchical multiplexer and having a self-organized swarm of industrial data collectors. In embodiments, a data collection and processing system is provided having a hierarchical multiplexer and having an IoT distributed ledger. In embodiments, a data collection and processing system is provided having a hierarchical multiplexer and having a self-organizing collector. In embodiments, a data collection and processing system is provided having a hierarchical multiplexer and having a network-sensitive collector. In embodiments, a data collection and processing system is provided having a hierarchical multiplexer and having a remotely organized collector. In embodiments, a data collection and processing system is provided having a hierarchical multiplexer and having a self-organizing storage for a multi-sensor data collector. In embodiments, a data collection and processing system is provided having a hierarchical multiplexer and having a self-organizing network coding for multi-sensor data network. In embodiments, a data collection and processing system is provided having a hierarchical multiplexer and having a wearable haptic user interface for an industrial sensor data collector, with vibration, heat, electrical and/or sound outputs. In embodiments, a data collection and processing system is provided having a hierarchical multiplexer and having heat maps displaying collected data for AR/VR. In embodiments, a data collection and processing system is provided having a hierarchical multiplexer and having automatically tuned AR/VR visualization of data collected by a data collector.

In embodiments, a data collection and processing system is provided having identification of sensor overload. In embodiments, a data collection and processing system is provided having identification of sensor overload and having RF identification and an inclinometer. In embodiments, a data collection and processing system is provided having identification of sensor overload and having continuous ultrasonic monitoring. In embodiments, a data collection and processing system is provided having identification of sensor overload and having cloud-based, machine pattern recognition based on fusion of remote, analog industrial sensors. In embodiments, a data collection and processing system is provided having identification of sensor overload and having cloud-based, machine pattern analysis of state information from multiple analog industrial sensors to provide anticipated state information for an industrial system. In embodiments, a data collection and processing system is provided having identification of sensor overload and having cloud-based policy automation engine for IoT, with creation, deployment, and management of IoT devices. In embodiments, a data collection and processing system is provided having identification of sensor overload and having on-device sensor fusion and data storage for industrial IoT devices. In embodiments, a data collection and processing system is provided having identification of sensor overload and having a self-organizing data marketplace for industrial IoT data. In embodiments, a data collection and processing system is provided having identification of sensor overload and having self-organization of data pools based on utilization and/or yield metrics. In embodiments, a data collection and processing system is provided having identification of sensor overload and having training AI models based on industry-specific feedback. In embodiments, a data collection and processing system is provided having identification of sensor overload and having a self-organized swarm of industrial data collectors. In embodiments, a data collection and processing system is provided having identification of sensor overload and having an IoT distributed ledger. In embodiments, a data collection and processing system is provided having identification of sensor overload and having a self-organizing collector. In embodiments, a data collection and processing system is provided having identification of sensor overload and having a network-sensitive collector. In embodiments, a data collection and processing system is provided having identification of sensor overload and having a remotely organized collector. In embodiments, a data collection and processing system is provided having identification of sensor overload and having a self-organizing storage for a multi-sensor data collector. In embodiments, a data collection and processing system is provided having identification of sensor overload and having a self-organizing network coding for multi-sensor data network. In embodiments, a data collection and processing system is provided having identification of sensor overload and having a wearable haptic user interface for an industrial sensor data collector, with vibration, heat, electrical, and/or sound outputs. In embodiments, a data collection and processing system is provided having identification of sensor overload and having heat maps displaying collected data for AR/VR. In embodiments, a data collection and processing system is provided having identification of sensor overload and having automatically tuned AR/VR visualization of data collected by a data collector.

In embodiments, a data collection and processing system is provided having RF identification and an inclinometer. In embodiments, a data collection and processing system is provided having RF identification and an inclinometer and having continuous ultrasonic monitoring. In embodiments, a data collection and processing system is provided having RF identification and an inclinometer and having cloud-based, machine pattern recognition based on fusion of remote, analog industrial sensors. In embodiments, a data collection and processing system is provided having RF identification and an inclinometer and having cloud-based, machine pattern analysis of state information from multiple analog industrial sensors to provide anticipated state information for an industrial system. In embodiments, a data collection and processing system is provided having RF identification and an inclinometer and having cloud-based policy automation engine for IoT, with creation, deployment, and management of IoT devices. In embodiments, a data collection and processing system is provided having RF identification and an inclinometer and having on-device sensor fusion and data storage for industrial IoT devices. In embodiments, a data collection and processing system is provided having RF identification and an inclinometer and having a self-organizing data marketplace for industrial IoT data. In embodiments, a data collection and processing system is provided having RF identification and an inclinometer and having self-organization of data pools based on utilization and/or yield metrics. In embodiments, a data collection and processing system is provided having RF identification and an inclinometer and having training AI models based on industry-specific feedback. In embodiments, a data collection and processing system is provided having RF identification and an inclinometer and having a self-organized swarm of industrial data collectors. In embodiments, a data collection and processing system is provided having RF identification and an inclinometer and having an IoT distributed ledger. In embodiments, a data collection and processing system is provided having RF identification and an inclinometer and having a self-organizing collector. In embodiments, a data collection and processing system is provided having RF identification and an inclinometer and having a network-sensitive collector. In embodiments, a data collection and processing system is provided having RF identification and an inclinometer and having a remotely organized collector. In embodiments, a data collection and processing system is provided having RF identification and an inclinometer and having a self-organizing storage for a multi-sensor data collector. In embodiments, a data collection and processing system is provided having RF identification and an inclinometer and having a self-organizing network coding for multi-sensor data network. In embodiments, a data collection and processing system is provided having RF identification and an inclinometer and having a wearable haptic user interface for an industrial sensor data collector, with vibration, heat, electrical, and/or sound outputs. In embodiments, a data collection and processing system is provided having RF identification and an inclinometer and having heat maps displaying collected data for AR/VR. In embodiments, a data collection and processing system is provided having RF identification and an inclinometer and having automatically tuned AR/VR visualization of data collected by a data collector.

In embodiments, a data collection and processing system is provided having continuous ultrasonic monitoring. In embodiments, a data collection and processing system is provided having continuous ultrasonic monitoring and having cloud-based, machine pattern recognition based on fusion of remote, analog industrial sensors. In embodiments, a data collection and processing system is provided having continuous ultrasonic monitoring and having cloud-based, machine pattern analysis of state information from multiple analog industrial sensors to provide anticipated state information for an industrial system. In embodiments, a data collection and processing system is provided having continuous ultrasonic monitoring and having cloud-based policy automation engine for IoT, with creation, deployment, and management of IoT devices. In embodiments, a data collection and processing system is provided having continuous ultrasonic monitoring and having on-device sensor fusion and data storage for industrial IoT devices. In embodiments, a data collection and processing system is provided having continuous ultrasonic monitoring and having a self-organizing data marketplace for industrial IoT data. In embodiments, a data collection and processing system is provided having continuous ultrasonic monitoring and having self-organization of data pools based on utilization and/or yield metrics. In embodiments, a data collection and processing system is provided having continuous ultrasonic monitoring and having training AI models based on industry-specific feedback. In embodiments, a data collection and processing system is provided having continuous ultrasonic monitoring and having a self-organized swarm of industrial data collectors. In embodiments, a data collection and processing system is provided having continuous ultrasonic monitoring and having an IoT distributed ledger. In embodiments, a data collection and processing system is provided having continuous ultrasonic monitoring and having a self-organizing collector. In embodiments, a data collection and processing system is provided having continuous ultrasonic monitoring and having a network-sensitive collector. In embodiments, a data collection and processing system is provided having continuous ultrasonic monitoring and having a remotely organized collector. In embodiments, a data collection and processing system is provided having continuous ultrasonic monitoring and having a self-organizing storage for a multi-sensor data collector. In embodiments, a data collection and processing system is provided having continuous ultrasonic monitoring and having a self-organizing network coding for multi-sensor data network. In embodiments, a data collection and processing system is provided having continuous ultrasonic monitoring and having a wearable haptic user interface for an industrial sensor data collector, with vibration, heat, electrical, and/or sound outputs. In embodiments, a data collection and processing system is provided having continuous ultrasonic monitoring and having heat maps displaying collected data for AR/VR. In embodiments, a data collection and processing system is provided having continuous ultrasonic monitoring and having automatically tuned AR/VR visualization of data collected by a data collector.

In embodiments, a platform is provided having cloud-based, machine pattern recognition based on fusion of remote, analog industrial sensors. In embodiments, a platform is provided having cloud-based, machine pattern recognition based on fusion of remote, analog industrial sensors and having cloud-based, machine pattern analysis of state information from multiple analog industrial sensors to provide anticipated state information for an industrial system. In embodiments, a platform is provided having cloud-based, machine pattern recognition based on fusion of remote, analog industrial sensors and having cloud-based policy automation engine for IoT, with creation, deployment, and management of IoT devices. In embodiments, a platform is provided having cloud-based, machine pattern recognition based on fusion of remote, analog industrial sensors and having on-device sensor fusion and data storage for industrial IoT devices. In embodiments, a platform is provided having cloud-based, machine pattern recognition based on fusion of remote, analog industrial sensors and having a self-organizing data marketplace for industrial IoT data. In embodiments, a platform is provided having cloud-based, machine pattern recognition based on fusion of remote, analog industrial sensors and having self-organization of data pools based on utilization and/or yield metrics. In embodiments, a platform is provided having cloud-based, machine pattern recognition based on fusion of remote, analog industrial sensors and having training AI models based on industry-specific feedback. In embodiments, a platform is provided having cloud-based, machine pattern recognition based on fusion of remote, analog industrial sensors and having a self-organized swarm of industrial data collectors. In embodiments, a platform is provided having cloud-based, machine pattern recognition based on fusion of remote, analog industrial sensors and having an IoT distributed ledger. In embodiments, a platform is provided having cloud-based, machine pattern recognition based on fusion of remote, analog industrial sensors and having a self-organizing collector. In embodiments, a platform is provided having cloud-based, machine pattern recognition based on fusion of remote, analog industrial sensors and having a network-sensitive collector. In embodiments, a platform is provided having cloud-based, machine pattern recognition based on fusion of remote, analog industrial sensors and having a remotely organized collector. In embodiments, a platform is provided having cloud-based, machine pattern recognition based on fusion of remote, analog industrial sensors and having a self-organizing storage for a multi-sensor data collector. In embodiments, a platform is provided having cloud-based, machine pattern recognition based on fusion of remote, analog industrial sensors and having a self-organizing network coding for multi-sensor data network. In embodiments, a platform is provided having cloud-based, machine pattern recognition based on fusion of remote, analog industrial sensors and having a wearable haptic user interface for an industrial sensor data collector, with vibration, heat, electrical and/or sound outputs. In embodiments, a platform is provided having cloud-based, machine pattern recognition based on fusion of remote, analog industrial sensors and having heat maps displaying collected data for AR/VR. In embodiments, a platform is provided having cloud-based, machine pattern recognition based on fusion of remote, analog industrial sensors and having automatically tuned AR/VR visualization of data collected by a data collector.

In embodiments, a platform is provided having cloud-based, machine pattern analysis of state information from multiple analog industrial sensors to provide anticipated state information for an industrial system. In embodiments, a platform is provided having cloud-based, machine pattern analysis of state information from multiple analog industrial sensors to provide anticipated state information for an industrial system and having cloud-based policy automation engine for IoT, with creation, deployment, and management of IoT devices. In embodiments, a platform is provided having cloud-based, machine pattern analysis of state information from multiple analog industrial sensors to provide anticipated state information for an industrial system and having on-device sensor fusion and data storage for industrial IoT devices. In embodiments, a platform is provided having cloud-based, machine pattern analysis of state information from multiple analog industrial sensors to provide anticipated state information for an industrial system and having a self-organizing data marketplace for industrial IoT data. In embodiments, a platform is provided having cloud-based, machine pattern analysis of state information from multiple analog industrial sensors to provide anticipated state information for an industrial system and having self-organization of data pools based on utilization and/or yield metrics. In embodiments, a platform is provided having cloud-based, machine pattern analysis of state information from multiple analog industrial sensors to provide anticipated state information for an industrial system and having training AI models based on industry-specific feedback. In embodiments, a platform is provided having cloud-based, machine pattern analysis of state information from multiple analog industrial sensors to provide anticipated state information for an industrial system and having a self-organized swarm of industrial data collectors. In embodiments, a platform is provided having cloud-based, machine pattern analysis of state information from multiple analog industrial sensors to provide anticipated state information for an industrial system and having an IoT distributed ledger. In embodiments, a platform is provided having cloud-based, machine pattern analysis of state information from multiple analog industrial sensors to provide anticipated state information for an industrial system and having a self-organizing collector. In embodiments, a platform is provided having cloud-based, machine pattern analysis of state information from multiple analog industrial sensors to provide anticipated state information for an industrial system and having a network-sensitive collector. In embodiments, a platform is provided having cloud-based, machine pattern analysis of state information from multiple analog industrial sensors to provide anticipated state information for an industrial system and having a remotely organized collector. In embodiments, a platform is provided having cloud-based, machine pattern analysis of state information from multiple analog industrial sensors to provide anticipated state information for an industrial system and having a self-organizing storage for a multi-sensor data collector. In embodiments, a platform is provided having cloud-based, machine pattern analysis of state information from multiple analog industrial sensors to provide anticipated state information for an industrial system and having a self-organizing network coding for multi-sensor data network. In embodiments, a platform is provided having cloud-based, machine pattern analysis of state information from multiple analog industrial sensors to provide anticipated state information for an industrial system and having a wearable haptic user interface for an industrial sensor data collector, with vibration, heat, electrical and/or sound outputs. In embodiments, a platform is provided having cloud-based, machine pattern analysis of state information from multiple analog industrial sensors to provide anticipated state information for an industrial system and having heat maps displaying collected data for AR/VR. In embodiments, a platform is provided having cloud-based, machine pattern analysis of state information from multiple analog industrial sensors to provide anticipated state information for an industrial system and having automatically tuned AR/VR visualization of data collected by a data collector.

In embodiments, a platform is provided having cloud-based policy automation engine for IoT, with creation, deployment, and management of IoT devices. In embodiments, a platform is provided having cloud-based policy automation engine for IoT, with creation, deployment, and management of IoT devices and having on-device sensor fusion and data storage for industrial IoT devices. In embodiments, a platform is provided having cloud-based policy automation engine for IoT, with creation, deployment, and management of IoT devices and having a self-organizing data marketplace for industrial IoT data. In embodiments, a platform is provided having cloud-based policy automation engine for IoT, with creation, deployment, and management of IoT devices and having self-organization of data pools based on utilization and/or yield metrics. In embodiments, a platform is provided having cloud-based policy automation engine for IoT, with creation, deployment, and management of IoT devices and having training AI models based on industry-specific feedback. In embodiments, a platform is provided having cloud-based policy automation engine for IoT, with creation, deployment, and management of IoT devices and having a self-organized swarm of industrial data collectors. In embodiments, a platform is provided having cloud-based policy automation engine for IoT, with creation, deployment, and management of IoT devices and having an IoT distributed ledger. In embodiments, a platform is provided having cloud-based policy automation engine for IoT, with creation, deployment, and management of IoT devices and having a self-organizing collector. In embodiments, a platform is provided having cloud-based policy automation engine for IoT, with creation, deployment, and management of IoT devices and having a network-sensitive collector. In embodiments, a platform is provided having cloud-based policy automation engine for IoT, with creation, deployment, and management of IoT devices and having a remotely organized collector. In embodiments, a platform is provided having cloud-based policy automation engine for IoT, with creation, deployment, and management of IoT devices and having a self-organizing storage for a multi-sensor data collector. In embodiments, a platform is provided having cloud-based policy automation engine for IoT, with creation, deployment, and management of IoT devices and having a self-organizing network coding for multi-sensor data network. In embodiments, a platform is provided having cloud-based policy automation engine for IoT, with creation, deployment, and management of IoT devices and having a wearable haptic user interface for an industrial sensor data collector, with vibration, heat, electrical and/or sound outputs. In embodiments, a platform is provided having cloud-based policy automation engine for IoT, with creation, deployment, and management of IoT devices and having heat maps displaying collected data for AR/VR. In embodiments, a platform is provided having cloud-based policy automation engine for IoT, with creation, deployment, and management of IoT devices and having automatically tuned AR/VR visualization of data collected by a data collector.

In embodiments, a platform is provided having on-device sensor fusion and data storage for industrial IoT devices. In embodiments, a platform is provided having on-device sensor fusion and data storage for industrial IoT devices and having a self-organizing data marketplace for industrial IoT data. In embodiments, a platform is provided having on-device sensor fusion and data storage for industrial IoT devices and having self-organization of data pools based on utilization and/or yield metrics. In embodiments, a platform is provided having on-device sensor fusion and data storage for industrial IoT devices and having training AI models based on industry-specific feedback. In embodiments, a platform is provided having on-device sensor fusion and data storage for industrial IoT devices and having a self-organized swarm of industrial data collectors. In embodiments, a platform is provided having on-device sensor fusion and data storage for industrial IoT devices and having an IoT distributed ledger. In embodiments, a platform is provided having on-device sensor fusion and data storage for industrial IoT devices and having a self-organizing collector. In embodiments, a platform is provided having on-device sensor fusion and data storage for industrial IoT devices and having a network-sensitive collector. In embodiments, a platform is provided having on-device sensor fusion and data storage for industrial IoT devices and having a remotely organized collector. In embodiments, a platform is provided having on-device sensor fusion and data storage for industrial IoT devices and having a self-organizing storage for a multi-sensor data collector. In embodiments, a platform is provided having on-device sensor fusion and data storage for industrial IoT devices and having a self-organizing network coding for multi-sensor data network. In embodiments, a platform is provided having on-device sensor fusion and data storage for industrial IoT devices and having a wearable haptic user interface for an industrial sensor data collector, with vibration, heat, electrical and/or sound outputs. In embodiments, a platform is provided having on-device sensor fusion and data storage for industrial IoT devices and having heat maps displaying collected data for AR/VR. In embodiments, a platform is provided having on-device sensor fusion and data storage for industrial IoT devices and having automatically tuned AR/VR visualization of data collected by a data collector.

In embodiments, a platform is provided having a self-organizing data marketplace for industrial IoT data. In embodiments, a platform is provided having a self-organizing data marketplace for industrial IoT data and having self-organization of data pools based on utilization and/or yield metrics. In embodiments, a platform is provided having a self-organizing data marketplace for industrial IoT data and having training AI models based on industry-specific feedback. In embodiments, a platform is provided having a self-organizing data marketplace for industrial IoT data and having a self-organized swarm of industrial data collectors. In embodiments, a platform is provided having a self-organizing data marketplace for industrial IoT data and having an IoT distributed ledger. In embodiments, a platform is provided having a self-organizing data marketplace for industrial IoT data and having a self-organizing collector. In embodiments, a platform is provided having a self-organizing data marketplace for industrial IoT data and having a network-sensitive collector. In embodiments, a platform is provided having a self-organizing data marketplace for industrial IoT data and having a remotely organized collector. In embodiments, a platform is provided having a self-organizing data marketplace for industrial IoT data and having a self-organizing storage for a multi-sensor data collector. In embodiments, a platform is provided having a self-organizing data marketplace for industrial IoT data and having a self-organizing network coding for multi-sensor data network. In embodiments, a platform is provided having a self-organizing data marketplace for industrial IoT data and having a wearable haptic user interface for an industrial sensor data collector, with vibration, heat, electrical and/or sound outputs. In embodiments, a platform is provided having a self-organizing data marketplace for industrial IoT data and having heat maps displaying collected data for AR/VR. In embodiments, a platform is provided having a self-organizing data marketplace for industrial IoT data and having automatically tuned AR/VR visualization of data collected by a data collector.

In embodiments, platform is provided having self-organization of data pools based on utilization and/or yield metrics. In embodiments, platform is provided having self-organization of data pools based on utilization and/or yield metrics and having training AI models based on industry-specific feedback. In embodiments, platform is provided having self-organization of data pools based on utilization and/or yield metrics and having a self-organized swarm of industrial data collectors. In embodiments, platform is provided having self-organization of data pools based on utilization and/or yield metrics and having an IoT distributed ledger. In embodiments, platform is provided having self-organization of data pools based on utilization and/or yield metrics and having a self-organizing collector. In embodiments, platform is provided having self-organization of data pools based on utilization and/or yield metrics and having a network-sensitive collector. In embodiments, platform is provided having self-organization of data pools based on utilization and/or yield metrics and having a remotely organized collector. In embodiments, platform is provided having self-organization of data pools based on utilization and/or yield metrics and having a self-organizing storage for a multi-sensor data collector. In embodiments, platform is provided having self-organization of data pools based on utilization and/or yield metrics and having a self-organizing network coding for multi-sensor data network. In embodiments, platform is provided having self-organization of data pools based on utilization and/or yield metrics and having a wearable haptic user interface for an industrial sensor data collector, with vibration, heat, electrical and/or sound outputs. In embodiments, platform is provided having self-organization of data pools based on utilization and/or yield metrics and having heat maps displaying collected data for AR/VR. In embodiments, platform is provided having self-organization of data pools based on utilization and/or yield metrics and having automatically tuned AR/VR visualization of data collected by a data collector.

In embodiments, a platform is provided having training AI models based on industry-specific feedback. In embodiments, a platform is provided having training AI models based on industry-specific feedback and having a self-organized swarm of industrial data collectors. In embodiments, a platform is provided having training AI models based on industry-specific feedback and having an IoT distributed ledger. In embodiments, a platform is provided having training AI models based on industry-specific feedback and having a self-organizing collector. In embodiments, a platform is provided having training AI models based on industry-specific feedback and having a network-sensitive collector. In embodiments, a platform is provided having training AI models based on industry-specific feedback and having a remotely organized collector. In embodiments, a platform is provided having training AI models based on industry-specific feedback and having a self-organizing storage for a multi-sensor data collector. In embodiments, a platform is provided having training AI models based on industry-specific feedback and having a self-organizing network coding for multi-sensor data network. In embodiments, a platform is provided having training AI models based on industry-specific feedback and having a wearable haptic user interface for an industrial sensor data collector, with vibration, heat, electrical, and/or sound outputs. In embodiments, a platform is provided having training AI models based on industry-specific feedback and having heat maps displaying collected data for AR/VR. In embodiments, a platform is provided having training AI models based on industry-specific feedback and having automatically tuned AR/VR visualization of data collected by a data collector.

In embodiments, a platform is provided having a self-organized swarm of industrial data collectors. In embodiments, a platform is provided having a self-organized swarm of industrial data collectors and having an IoT distributed ledger. In embodiments, a platform is provided having a self-organized swarm of industrial data collectors and having a self-organizing collector. In embodiments, a platform is provided having a self-organized swarm of industrial data collectors and having a network-sensitive collector. In embodiments, a platform is provided having a self-organized swarm of industrial data collectors and having a remotely organized collector. In embodiments, a platform is provided having a self-organized swarm of industrial data collectors and having a self-organizing storage for a multi-sensor data collector. In embodiments, a platform is provided having a self-organized swarm of industrial data collectors and having a self-organizing network coding for multi-sensor data network. In embodiments, a platform is provided having a self-organized swarm of industrial data collectors and having a wearable haptic user interface for an industrial sensor data collector, with vibration, heat, electrical and/or sound outputs. In embodiments, a platform is provided having a self-organized swarm of industrial data collectors and having heat maps displaying collected data for AR/VR. In embodiments, a platform is provided having a self-organized swarm of industrial data collectors and having automatically tuned AR/VR visualization of data collected by a data collector.

In embodiments, a platform is provided having an IoT distributed ledger. In embodiments, a platform is provided having an IoT distributed ledger and having a self-organizing collector. In embodiments, a platform is provided having an IoT distributed ledger and having a network-sensitive collector. In embodiments, a platform is provided having an IoT distributed ledger and having a remotely organized collector. In embodiments, a platform is provided having an IoT distributed ledger and having a self-organizing storage for a multi-sensor data collector. In embodiments, a platform is provided having an IoT distributed ledger and having a self-organizing network coding for multi-sensor data network. In embodiments, a platform is provided having an IoT distributed ledger and having a wearable haptic user interface for an industrial sensor data collector, with vibration, heat, electrical and/or sound outputs. In embodiments, a platform is provided having an IoT distributed ledger and having heat maps displaying collected data for AR/VR. In embodiments, a platform is provided having an IoT distributed ledger and having automatically tuned AR/VR visualization of data collected by a data collector.

In embodiments, a platform is provided having a self-organizing collector. In embodiments, a platform is provided having a self-organizing collector and having a network-sensitive collector. In embodiments, a platform is provided having a self-organizing collector and having a remotely organized collector. In embodiments, a platform is provided having a self-organizing collector and having a self-organizing storage for a multi-sensor data collector. In embodiments, a platform is provided having a self-organizing collector and having a self-organizing network coding for multi-sensor data network. In embodiments, a platform is provided having a self-organizing collector and having a wearable haptic user interface for an industrial sensor data collector, with vibration, heat, electrical and/or sound outputs. In embodiments, a platform is provided having a self-organizing collector and having heat maps displaying collected data for AR/VR. In embodiments, a platform is provided having a self-organizing collector and having automatically tuned AR/VR visualization of data collected by a data collector.

In embodiments, a platform is provided having a network-sensitive collector. In embodiments, a platform is provided having a network-sensitive collector and having a remotely organized collector. In embodiments, a platform is provided having a network-sensitive collector and having a self-organizing storage for a multi-sensor data collector. In embodiments, a platform is provided having a network-sensitive collector and having a self-organizing network coding for multi-sensor data network. In embodiments, a platform is provided having a network-sensitive collector and having a wearable haptic user interface for an industrial sensor data collector, with vibration, heat, electrical and/or sound outputs. In embodiments, a platform is provided having a network-sensitive collector and having heat maps displaying collected data for AR/VR. In embodiments, a platform is provided having a network-sensitive collector and having automatically tuned AR/VR visualization of data collected by a data collector.

In embodiments, a platform is provided having a remotely organized collector. In embodiments, a platform is provided having a remotely organized collector and having a self-organizing storage for a multi-sensor data collector. In embodiments, a platform is provided having a remotely organized collector and having a self-organizing network coding for multi-sensor data network. In embodiments, a platform is provided having a remotely organized collector and having a wearable haptic user interface for an industrial sensor data collector, with vibration, heat, electrical and/or sound outputs. In embodiments, a platform is provided having a remotely organized collector and having heat maps displaying collected data for AR/VR. In embodiments, a platform is provided having a remotely organized collector and having automatically tuned AR/VR visualization of data collected by a data collector.

In embodiments, a platform is provided having a self-organizing storage for a multi-sensor data collector. In embodiments, a platform is provided having a self-organizing storage for a multi-sensor data collector and having a self-organizing network coding for multi-sensor data network. In embodiments, a platform is provided having a self-organizing storage for a multi-sensor data collector and having a wearable haptic user interface for an industrial sensor data collector, with vibration, heat, electrical and/or sound outputs. In embodiments, a platform is provided having a self-organizing storage for a multi-sensor data collector and having heat maps displaying collected data for AR/VR. In embodiments, a platform is provided having a self-organizing storage for a multi-sensor data collector and having automatically tuned AR/VR visualization of data collected by a data collector.

In embodiments, a platform is provided having a self-organizing network coding for multi-sensor data network. In embodiments, a platform is provided having a self-organizing network coding for multi-sensor data network and having a wearable haptic user interface for an industrial sensor data collector, with vibration, heat, electrical, and/or sound outputs. In embodiments, a platform is provided having a self-organizing network coding for multi-sensor data network and having heat maps displaying collected data for AR/VR. In embodiments, a platform is provided having a self-organizing network coding for multi-sensor data network and having automatically tuned AR/VR visualization of data collected by a data collector. In embodiments, a platform is provided having a wearable haptic user interface for an industrial sensor data collector, with vibration, heat, electrical and/or sound outputs. In embodiments, a platform is provided having a wearable haptic user interface for an industrial sensor data collector, with vibration, heat, electrical and/or sound outputs and having heat maps displaying collected data for AR/VR. In embodiments, a platform is provided having a wearable haptic user interface for an industrial sensor data collector, with vibration, heat, electrical and/or sound outputs and having automatically tuned AR/VR visualization of data collected by a data collector. In embodiments, a platform is provided having heat maps displaying collected data for AR/VR. In embodiments, a platform is provided having heat maps displaying collected data for AR/VR and having automatically tuned AR/VR visualization of data collected by a data collector.

While only a few embodiments of the present disclosure have been shown and described, it will be obvious to those skilled in the art that many changes and modifications may be made thereunto without departing from the spirit and scope of the present disclosure as described in the following claims. All patent applications and patents, both foreign and domestic, and all other publications referenced herein are incorporated herein in their entireties to the full extent permitted by law.

The methods and systems described herein may be deployed in part or in whole through a machine that executes computer software, program codes, and/or instructions on a processor. The present disclosure may be implemented as a method on the machine, as a system or apparatus as part of or in relation to the machine, or as a computer program product embodied in a computer readable medium executing on one or more of the machines. In embodiments, the processor may be part of a server, cloud server, client, network infrastructure, mobile computing platform, stationary computing platform, or other computing platform. A processor may be any kind of computational or processing device capable of executing program instructions, codes, binary instructions, and the like. The processor may be or may include a signal processor, digital processor, embedded processor, microprocessor, or any variant such as a co-processor (math co-processor, graphic co-processor, communication co-processor, and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor, or any machine utilizing one, may include non-transitory memory that stores methods, codes, instructions, and programs as described herein and elsewhere. The processor may access a non-transitory storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache, and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server, cloud server, and other variants such as secondary server, host server, distributed server, and the like. The server may include one or more of memories, processors, computer readable transitory and/or non-transitory media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers, social networks, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client, and the like. The client may include one or more of memories, processors, computer readable transitory and/or non-transitory media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers, and the like. Additionally, this coupling and/or connection may facilitate remote execution of program across the network. The networking of some or all of these devices may facilitate parallel processing of a program or method at one or more location without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM, and the like. The processes, methods, program codes, instructions described herein and elsewhere may be executed by one or more of the network infrastructural elements. The methods and systems described herein may be configured for use with any kind of private, community, or hybrid cloud computing network or cloud computing environment, including those which involve features of software as a service ("SaaS"), platform as a service ("PaaS"), and/or infrastructure as a service ("IaaS").

The methods, program codes, and instructions described herein and elsewhere may be implemented on a cellular network having multiple cells. The cellular network may either be frequency division multiple access ("FDMA") network or code division multiple access ("CDMA") network. The cellular network may include mobile devices, cell sites, base stations, repeaters, antennas, towers, and the like. The cell network may be a GSM, GPRS, 3G, EVDO, mesh, or other networks types.

The methods, program codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable transitory and/or non-transitory media that may include: computer components, devices, and recording media that retain digital data used for computing for some interval of time; semiconductor storage known as random access memory ("RAM"); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g., USB sticks or keys), floppy disks, magnetic tape, paper tape, punch cards, stand-alone RAM disks, zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the Figures, imply logical boundaries between the elements. However, according to software or hardware engineering practices, the depicted elements and the functions thereof may be implemented on machines through computer executable transitory and/or non-transitory media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers, and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps associated therewith, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, methods described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the disclosure has been disclosed in connection with the preferred embodiments shown and described in detail, various modifications and improvements thereon will become readily apparent to those skilled in the art. Accordingly, the spirit and scope of the present disclosure is not to be limited by the foregoing examples, but is to be understood in the broadest sense allowable by law.

The use of the terms "a" and "an" and "the" and similar referents in the context of describing the disclosure (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure, and does not pose a limitation on the scope of the disclosure unless otherwise claimed. No language in the specification should be construed as indicating any non-claimed element as essential to the practice of the disclosure.

While the foregoing written description enables one skilled in the art to make and use what is considered presently to be the best mode thereof, those skilled in the art will understand and appreciate the existence of variations, combinations, and equivalents of the specific embodiment, method, and examples herein. The disclosure should therefore not be limited by the above described embodiment, method, and examples, but by all embodiments and methods within the scope and spirit of the disclosure.

Any element in a claim that does not explicitly state "means for" performing a specified function, or "step for" performing a specified function, is not to be interpreted as a "means" or "step" clause as specified in 35 U.S.C. § 112(f). In particular, any use of "step of" in the claims is not intended to invoke the provision of 35 U.S.C. § 112(f).

Persons skilled in the art may appreciate that numerous design configurations may be possible to enjoy the functional benefits of the inventive systems. Thus, given the wide variety of configurations and arrangements of embodiments of the present invention, the scope of the invention is reflected by the breadth of the claims below rather than narrowed by the embodiments described above.

What is claimed is:

1. A system for data collection, processing, and utilization of signals from at least a first element in a machine in an industrial environment, the system comprising:
   a platform including a computing environment connected to a local data collection system having at least a first sensor signal and a second sensor signal obtained from the machine in the industrial environment;
   a first sensor in the local data collection system configured to be connected to the machine for obtaining the first sensor signal from the machine;
   a second sensor in the local data collection system for obtaining the first second sensor signal from the machine; and
   a cognitive input selection system in the local data collection system for at least one of selecting and de-selecting one or more sensors including at least one of the first sensor and the second sensor based on learning feedback,
   wherein the local data collection system includes multiple inputs and multiple outputs having a first input connected to the first sensor and a second input connected to the second sensor, wherein the multiple outputs include a first output and a second output configured to permit simultaneous delivery of the first sensor signal from the first output and the second sensor signal from the second output.

2. The system of claim 1 wherein the local data collection system is configured to manage data collection bands.

3. The system of claim 2 wherein the data collection bands define a specific frequency band and at least one of a group of spectral peaks, a true-peak level, a crest factor derived from a time waveform, and an overall waveform derived from a vibration envelope.

4. The system of claim 2 wherein the local data collection system includes a neural net expert system using intelligent management of the data collection bands.

5. The system of claim 2 wherein the local data collection system is configured to create data acquisition routes based on hierarchical templates that each include the data collection bands related to machines associated with the data acquisition routes.

6. The system of claim 5 wherein at least one hierarchical template of the hierarchical templates is associated with multiple interconnected elements of the machine.

7. The system of claim 5 wherein at least one hierarchical template of the hierarchical templates is associated with similar elements associated with the machine and another second machine.

8. The system of claim 5 wherein at least one hierarchical template of the hierarchical templates is associated with the machine being proximate in location to another second machine.

9. The system of claim 2 wherein the local data collection system includes a graphical user interface system configured to manage the data collection bands.

10. The system of claim 9 wherein the graphical user interface system includes an expert system diagnostic tool.

11. The system of claim 1 wherein the platform is configured to provide self-organization of data pools based on at least one of utilization metrics and yield metrics.

12. The system of claim 1 wherein the platform includes a self-organized swarm of industrial data collectors.

13. The system of claim 1 wherein the local data collection system includes a wearable haptic user interface for an industrial sensor data collector with at least one of vibration, heat, electrical, and sound outputs.

14. The system of claim 1 wherein multiple inputs of the local data collection system include a third input connected to the second sensor and a fourth input connected to the second sensor, and wherein the first sensor signal is from a single-axis sensor at an unchanging location associated with the machine.

15. The system of claim 14 wherein the second sensor is a three-axis sensor.

16. The system of claim 14 wherein the local data collection system is configured to record gap-free digital waveform data simultaneously from at least the first input, the second input, the third input, and the fourth input.

17. The system of claim 16 wherein the platform is configured to determine a change in relative phase based on the simultaneously recorded gap-free digital waveform data.

18. The system of claim 16 wherein the second sensor is configured to be movable to a plurality of positions associated with the machine while obtaining the simultaneously recorded gap-free digital waveform data.

19. The system of claim 17 wherein the platform is configured to determine an operating deflection shape based on the change in relative phase and the simultaneously recorded gap-free digital waveform data.

20. The system of claim 16 wherein the multiple outputs of the local data collection system include a third output and a fourth output, and wherein the second output, the third output, and the fourth output are assigned together to a sequence of tri-axial sensors each located at different positions associated with the machine.

21. The system of claim 20 wherein tri-axial sensors in the sequence of the tri-axial sensors are each located at different positions on the machine but are each associated with different bearings in the machine.

22. The system of claim 20 wherein tri-axial sensors in the sequence of the tri-axial sensors are each located at similar positions associated with similar bearings but are each associated with different machines.

23. The system of claim 16 wherein the local data collection system is configured to obtain the simultaneously recorded gap-free digital waveform data from the machine while the machine and another second machine are both in operation.

24. The system of claim 23 wherein the local data collection system is configured to characterize a contribution from the machine and the second machine in the simultaneously recorded gap-free digital waveform data from the machine.

25. The system of claim 16 wherein the simultaneously recorded gap-free digital waveform data has a duration that is in excess of one minute.

26. The system of claim 14 wherein the unchanging location is a position associated with rotating shaft of the machine.

27. A computer implemented method for data collection, processing, and utilization of signals from at least a first element in a machine in an industrial environment, the method comprising:
obtaining at least one of a first sensor signal and a second sensor signal from the machine;
selecting or de-selecting one or more sensors connected to the machine based on learning feedback; and
permitting simultaneous delivery of the first sensor signal from a first output and the second sensor signal from a second output.

28. The method of claim 27, further comprising selecting the first output and the second output between a condition in which the first output is selected between delivery of the first sensor signal and the second sensor signal, and a condition in which there is the simultaneous delivery of the first sensor signal from the first output and the second sensor signal from the second output.

29. A non-transitory computer readable storage medium having a plurality of instructions stored thereon which, when executed across one or more processors, causes at least a portion of the one or more processors to perform operations comprising:
obtaining at least one of a first sensor signal and a second sensor signal from a machine;
selecting or de-selecting one or more sensors connected to the machine based on learning feedback; and
permitting simultaneous delivery of the first sensor signal from a first output and the second sensor signal from a second output.

30. The computer readable storage medium of claim 29, wherein the operations performed by the one or more processors further comprise recording gap-free digital waveform data simultaneously from at least a first input and a second input of a local data collection system.

* * * * *

UNITED STATES PATENT AND TRADEMARK OFFICE
CERTIFICATE OF CORRECTION

PATENT NO. : 11,106,188 B2
APPLICATION NO. : 16/382400
DATED : August 31, 2021
INVENTOR(S) : Charles Howard Cella et al.

Page 1 of 1

It is certified that error appears in the above-identified patent and that said Letters Patent is hereby corrected as shown below:

In the Claims

Column 168, Line 46 at Claim 1, "first second sensor" should be --second sensor--.

Signed and Sealed this
Twentieth Day of June, 2023

Katherine Kelly Vidal
*Director of the United States Patent and Trademark Office*